(12) United States Patent
Bamat et al.

(10) Patent No.: US 12,556,128 B2
(45) Date of Patent: *Feb. 17, 2026

(54) UNIVERSAL SLOPED ROOF SOLAR PANEL MOUNTING SYSTEM

(71) Applicant: Unirac Inc., Albuquerque, NM (US)

(72) Inventors: Christopher John Bamat, Denver, CO (US); Devin Glen MacRostie, Boulder, CO (US)

(73) Assignee: Unirac, Inc., Albuquerque, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/227,708

(22) Filed: Jul. 28, 2023

(65) Prior Publication Data

US 2024/0039455 A1 Feb. 1, 2024

Related U.S. Application Data

(60) Continuation of application No. 17/000,092, filed on Aug. 21, 2020, now Pat. No. 11,757,398, which is a
(Continued)

(51) Int. Cl.
*H02S 20/23* (2014.01)
*F16B 2/12* (2006.01)
(Continued)

(52) U.S. Cl.
CPC ............ *H02S 20/23* (2014.12); *F16B 2/12* (2013.01); *F16B 5/0028* (2013.01);
(Continued)

(58) Field of Classification Search
CPC .......... H02S 20/23; H02S 30/00; F24S 25/00; F24S 25/60; F24S 25/61; F24S 25/70;
(Continued)

(56) References Cited

U.S. PATENT DOCUMENTS 1,281,531 A 10/1918 Dietrich
2,486,670 A 11/1949 Nigg et al.
(Continued)

FOREIGN PATENT DOCUMENTS

CA 3040911 11/2019
EP 2295893 3/2011
(Continued)

OTHER PUBLICATIONS

Notice of Rejection issued Oct. 23, 2018 byJapanese Patent Office for Japanese Patent Appln. No 2016-530120.
(Continued)

*Primary Examiner* — Jessie T Fonseca
(74) *Attorney, Agent, or Firm* — Lee & Hayes, P.C.

(57) ABSTRACT

A universal mounting system for supporting a plurality of photovoltaic modules on a sloped support surface, such as a sloped roof, is disclosed herein. The universal mounting system may include one or more support surface attachment devices, each support surface attachment device configured to attach one or more photovoltaic modules to a support surface; and one or more module coupling devices, each module coupling device configured to couple a plurality of photovoltaic modules to one another.

7 Claims, 120 Drawing Sheets

Related U.S. Application Data division of application No. 16/126,441, filed on Sep. 10, 2018, now Pat. No. 10,756,668, and a continuation-in-part of application No. 15/387,481, filed on Dec. 21, 2016, now Pat. No. 10,312,853, which is a continuation-in-part of application No. 15/068,370, filed on Mar. 11, 2016, now Pat. No. 10,340,837.

(60) Provisional application No. 62/556,486, filed on Sep. 10, 2017, provisional application No. 62/192,529, filed on Jul. 14, 2015, provisional application No. 62/131,743, filed on Mar. 11, 2015.

(51) Int. Cl.

| | | |
|---|---|---|
| *F16B 5/00* | (2006.01) | |
| *F16B 5/06* | (2006.01) | |
| *F24S 25/61* | (2018.01) | |
| *F24S 25/636* | (2018.01) | |
| *F24S 25/70* | (2018.01) | |
| *H02S 30/00* | (2014.01) | |
| *F16B 2/00* | (2006.01) | |
| *F24S 25/00* | (2018.01) | |
| *F24S 40/44* | (2018.01) | |

(52) U.S. Cl.
CPC ............ *F16B 5/0628* (2013.01); *F16B 5/065* (2013.01); *F24S 25/61* (2018.05); *F24S 25/636* (2018.05); *F24S 25/70* (2018.05); *H02S 30/00* (2013.01); *F16B 2/005* (2013.01); *F24S 2025/021* (2018.05); *F24S 40/44* (2018.05); *Y02B 10/10* (2013.01); *Y02B 10/20* (2013.01); *Y02E 10/47* (2013.01)

(58) Field of Classification Search
CPC .... F24S 25/636; F24S 2025/021; F24S 40/44; F16B 2/12; F16B 2/005; F16B 5/0028; F16B 5/0628; F16B 5/065; Y02B 10/10; Y02B 10/20; Y02E 10/47; Y02E 10/50
See application file for complete search history.

(56) References Cited

U.S. PATENT DOCUMENTS

| | | |
|---|---|---|
| 2,607,816 A | 8/1952 | Ryder et al. |
| 3,844,087 A | 10/1974 | Schultz et al. |
| 4,114,330 A | 9/1978 | Sukolics |
| 4,677,248 A | 6/1987 | Lacey |
| 4,680,905 A | 7/1987 | Rockar |
| 5,092,939 A | 3/1992 | Nath et al. |
| 5,497,587 A | 3/1996 | Hirai et al. |
| 5,746,839 A | 5/1998 | Dinwoodie |
| 6,105,316 A | 8/2000 | Bottger et al. |
| 6,105,317 A | 8/2000 | Tomiuchi et al. |
| 6,191,320 B1 | 2/2001 | Kashammer et al. |
| 6,331,671 B1 | 12/2001 | Makita et al. |
| 6,360,491 B1 | 3/2002 | Ullman |
| 6,672,018 B2 | 1/2004 | Shingleton |
| D510,315 S | 10/2005 | Shugar et al. |
| 6,959,517 B2 | 11/2005 | Poddany et al. |
| D519,444 S | 4/2006 | Mascolo |
| D547,262 S | 7/2007 | Ullman |
| D560,605 S | 1/2008 | McClintock et al. |
| D564,958 S | 3/2008 | Almy et al. |
| D565,505 S | 4/2008 | Shugar et al. |
| 7,406,800 B2 | 8/2008 | Cinnamon et al. |
| 7,435,134 B2 | 10/2008 | Lenox |
| 7,476,832 B2 | 1/2009 | Vendig et al. |
| D586,737 S | 2/2009 | Shugar et al. |
| 7,492,120 B2 | 2/2009 | Benn et al. |
| D598,372 S | 8/2009 | Sasada |
| 7,592,537 B1 | 9/2009 | West |
| 7,634,875 B2 | 12/2009 | Genschorek |
| 7,758,011 B2 | 7/2010 | Haddock |
| 7,780,472 B2 | 8/2010 | Lenox |
| 7,832,157 B2 | 11/2010 | Cinnamon |
| 7,866,098 B2 | 1/2011 | Cinnamon |
| 7,866,099 B2 | 1/2011 | Komamine et al. |
| 7,921,843 B1 | 4/2011 | Rawlings |
| 7,987,641 B2 | 8/2011 | Cinnamon |
| 8,109,048 B2 | 2/2012 | West et al. |
| 8,136,311 B2 | 3/2012 | Liu |
| 8,146,299 B2 | 4/2012 | Stearns et al. |
| 8,191,320 B2 | 6/2012 | Mittan et al. |
| 8,266,848 B2 | 9/2012 | Miros et al. |
| 8,272,174 B2 | 9/2012 | Stearns et al. |
| 8,276,330 B2 | 10/2012 | Harberts et al. |
| 8,375,654 B1 | 2/2013 | West et al. |
| 8,382,513 B2 | 2/2013 | Kobayashi |
| 8,397,448 B2 | 3/2013 | Brown et al. |
| 8,424,255 B2 | 4/2013 | Lenox et al. |
| 8,505,248 B1 | 8/2013 | Leong et al. |
| 8,505,864 B1 | 8/2013 | Taylor et al. |
| 8,511,008 B2 | 8/2013 | Sagayama |
| 8,539,719 B2 | 9/2013 | McPheeters et al. |
| D692,372 S | 10/2013 | Rothschild et al. |
| 8,555,569 B2 | 10/2013 | Crasnianski |
| 8,627,617 B2 | 1/2014 | Haddock et al. |
| 8,635,818 B2 | 1/2014 | Wildes |
| 8,746,646 B2 | 6/2014 | Fluhrer et al. |
| 8,806,813 B2 | 8/2014 | Plaisted et al. |
| 8,813,441 B2 | 8/2014 | Rizzo |
| D713,784 S | 9/2014 | Wildes |
| 8,844,215 B2 | 9/2014 | Wildes et al. |
| 8,869,471 B2 | 10/2014 | Wildes et al. |
| 8,935,893 B2 | 1/2015 | Liu et al. |
| 8,938,932 B1 | 1/2015 | Wentworth et al. |
| 9,166,522 B1 | 10/2015 | Zvanut et al. |
| 9,166,552 B2 | 10/2015 | Hara et al. |
| 9,175,878 B2 | 11/2015 | Kemmer et al. |
| 9,196,755 B2 | 11/2015 | Wildes |
| 9,209,609 B2 | 12/2015 | Kellerman et al. |
| 9,413,285 B2 | 8/2016 | Wildes et al. |
| 9,584,062 B2 | 2/2017 | Ganshaw et al. |
| 9,698,289 B2 | 7/2017 | Braley et al. |
| 9,825,581 B2 | 11/2017 | Wildes |
| 10,033,328 B2 | 7/2018 | Wildes et al. |
| 10,087,132 B2 | 10/2018 | Sarker et al. |
| 10,205,419 B2 | 2/2019 | McPheeters et al. |
| 10,230,324 B2 | 3/2019 | Dick et al. |
| 10,270,383 B2 | 4/2019 | Wildes |
| 10,312,285 B2 | 6/2019 | Mizuta |
| 10,312,853 B2 | 6/2019 | MacRostie et al. |
| 10,340,837 B2 | 7/2019 | Wildes et al. |
| 10,340,838 B2 | 7/2019 | Schuit et al. |
| 10,605,282 B1 | 3/2020 | Young |
| 2001/0053316 A1 | 12/2001 | Bakker |
| 2003/0070368 A1 | 4/2003 | Shingleton |
| 2004/0163338 A1 | 8/2004 | Liebendorfer |
| 2005/0072456 A1 | 4/2005 | Stevenson et al. |
| 2005/0166955 A1 | 8/2005 | Nath et al. |
| 2005/0257453 A1 | 11/2005 | Cinnamon |
| 2006/0086382 A1 | 4/2006 | Plaisted |
| 2007/0095388 A1 | 5/2007 | Mergola et al. |
| 2007/0144575 A1 | 6/2007 | Mascolo et al. |
| 2008/0053517 A1 | 3/2008 | Plaisted et al. |
| 2008/0172955 A1 | 7/2008 | McClintock et al. |
| 2009/0019796 A1 | 1/2009 | Liebendorfer |
| 2009/0078299 A1 | 3/2009 | Cinnamon et al. |
| 2009/0134291 A1 | 5/2009 | Meier et al. |
| 2009/0242014 A1 | 10/2009 | Leary |
| 2009/0320904 A1 | 12/2009 | Botkin et al. |
| 2009/0320905 A1 | 12/2009 | Botkin et al. |
| 2009/0320906 A1 | 12/2009 | Botkin et al. |
| 2009/0320907 A1 | 12/2009 | Botkin et al. |
| 2010/0089390 A1 | 4/2010 | Miros et al. |
| 2010/0147362 A1 | 6/2010 | King et al. |
| 2010/0154780 A1 | 6/2010 | Linke |
| 2010/0192505 A1 | 8/2010 | Schaefer et al. |
| 2010/0212714 A1 | 8/2010 | Rothschild et al. |
| 2010/0219304 A1 | 9/2010 | Miros et al. |
| 2010/0236542 A1 | 9/2010 | Pierson et al. |

(56) References Cited

U.S. PATENT DOCUMENTS

| | | |
|---|---|---|
| 2010/0263704 A1 | 10/2010 | Forage et al. |
| 2010/0269428 A1 | 10/2010 | Stancel et al. |
| 2010/0269430 A1 | 10/2010 | Haddock |
| 2011/0000519 A1 | 1/2011 | West |
| 2011/0000520 A1 | 1/2011 | West |
| 2011/0000526 A1 | 1/2011 | West |
| 2011/0000544 A1 | 1/2011 | West |
| 2011/0056536 A1 | 3/2011 | Meppelink et al. |
| 2011/0120047 A1 | 5/2011 | Stearns et al. |
| 2011/0179727 A1 | 7/2011 | Liu |
| 2011/0220180 A1 | 9/2011 | Cinnamon et al. |
| 2011/0260027 A1 | 10/2011 | Farnham, Jr. |
| 2011/0278411 A1 | 11/2011 | Carbonare et al. |
| 2011/0284058 A1 | 11/2011 | Cinnamon |
| 2012/0031473 A1 | 2/2012 | Chan et al. |
| 2012/0032045 A1 | 2/2012 | Lallier et al. |
| 2012/0048351 A1 | 3/2012 | Rizzo |
| 2012/0061337 A1 | 3/2012 | Seery et al. |
| 2012/0073220 A1 | 3/2012 | Kobayashi et al. |
| 2012/0102853 A1 | 5/2012 | Rizzo |
| 2012/0138764 A1 | 6/2012 | Kemple |
| 2012/0180406 A1 | 7/2012 | Kobayashi |
| 2012/0234378 A1 | 9/2012 | West et al. |
| 2012/0240489 A1 | 9/2012 | Rivera et al. |
| 2012/0255598 A1 | 10/2012 | West |
| 2012/0260972 A1 | 10/2012 | West et al. |
| 2012/0266944 A1 | 10/2012 | Wildes |
| 2012/0275066 A1 | 11/2012 | O'Brien et al. |
| 2012/0279558 A1 | 11/2012 | West et al. |
| 2012/0298186 A1 | 11/2012 | West |
| 2012/0298188 A1 | 11/2012 | West et al. |
| 2012/0298817 A1 | 11/2012 | West et al. |
| 2013/0032208 A1 | 2/2013 | Walz et al. |
| 2013/0075152 A1 | 3/2013 | Mazzone |
| 2013/0133270 A1 | 5/2013 | West et al. |
| 2013/0133723 A1 | 5/2013 | Croft et al. |
| 2013/0140416 A1 | 6/2013 | West et al. |
| 2013/0180089 A1 | 7/2013 | Seery et al. |
| 2013/0180572 A1 | 7/2013 | West |
| 2013/0180573 A1 | 7/2013 | West |
| 2013/0180574 A1 | 7/2013 | West et al. |
| 2013/0183084 A1 | 7/2013 | West et al. |
| 2013/0200245 A1 | 8/2013 | Markiewicz et al. |
| 2013/0220403 A1 | 8/2013 | Rizzo |
| 2013/0276867 A1 | 10/2013 | Wildes et al. |
| 2014/0014158 A1 | 1/2014 | Wildes et al. |
| 2014/0041706 A1 | 2/2014 | Haddock et al. |
| 2014/0174510 A1 | 6/2014 | Kanbara |
| 2014/0175244 A1 | 6/2014 | West et al. |
| 2014/0182662 A1 | 7/2014 | West et al. |
| 2014/0202525 A1 | 7/2014 | Janssens et al. |
| 2014/0220834 A1 | 8/2014 | Rizzo |
| 2014/0311552 A1 | 10/2014 | Garrett |
| 2014/0319307 A1 | 10/2014 | Schrock et al. |
| 2015/0040969 A1 | 2/2015 | Wildes |
| 2015/0129517 A1 | 5/2015 | Wildes |
| 2015/0288320 A1 | 10/2015 | Stearns et al. |
| 2016/0079912 A1 | 3/2016 | Wildes et al. |
| 2016/0126884 A1* | 5/2016 | Stearns ............... F24S 25/632 52/173.3 |
| 2016/0190979 A1 | 6/2016 | Wildes |
| 2016/0268958 A1 | 9/2016 | Wildes et al. |
| 2016/0268959 A1* | 9/2016 | Meine ................. F24S 25/61 |
| 2021/0058023 A1 | 2/2021 | Bamat et al. |

FOREIGN PATENT DOCUMENTS

| | | |
|---|---|---|
| EP | 2584282 | 4/2013 |
| EP | 2592365 | 5/2013 |
| EP | 2607816 | 6/2013 |
| FR | 2990730 | 11/2013 |
| GB | 1366862 | 9/1974 |
| GB | 2466003 | 6/2010 |
| JP | 07018795 | 1/1995 |
| JP | 09177272 | 7/1997 |
| JP | 2004060358 | 2/2004 |
| JP | 2008214875 | 9/2008 |
| JP | 2013044114 | 3/2013 |
| JP | 201387579 | 5/2013 |
| JP | WO2011077538 | 5/2013 |
| JP | 2013227859 | 7/2013 |
| WO | WO2005020290 | 3/2005 |
| WO | WO2008028151 | 3/2008 |
| WO | WO2009120923 | 10/2009 |
| WO | WO2011025585 | 3/2011 |
| WO | WO2011019460 | 8/2011 |
| WO | WO2012079060 | 6/2012 |
| WO | WO2012079061 | 6/2012 |
| WO | WO2012082806 | 6/2012 |
| WO | WO2012086271 | 6/2012 |
| WO | WO2012116121 | 8/2012 |

OTHER PUBLICATIONS

Non-Final Office Action issued Jan. 17, 2018 for related U.S. Appl. No. 15/387,481.
Non-Final Office Action issued Jan. 30, 2015 for related U.S. Appl. No. 14/521,951.
Non-Final Office Action issued Mar. 21, 2013 for related U.S. Appl. No. 13/273,525.
Non-Final Office Action issued Apr. 7, 2016 for related U.S. Appl. No. 14/541,127.
Non-Final Office Action issued Apr. 18, 2017 for related U.S. Appl. No. 14/541,127.
Final Office Action issued Jun. 29, 2018 for related U.S. Appl. No. 15/387,481.
Non-Final Office Action issued Jul. 21, 2017 for related U.S. Appl. No. 15/068,370.
Office Action issued Sep. 9, 2021 for related U.S. Appl. No. 17/000,092 (8 pages).
Non-Final Office Action issued Sep. 17, 2013 for related U.S. Appl. No. 13/923,342.
Non-Final Office Action issued Sep. 20, 2013 for related U.S. Appl. No. 13/923,303.
Office Action issued Jan. 9, 2023 for related U.S. Appl. No. 17/000,092 (9 pages).
Final Office Action issued Dec. 7, 2016 for related U.S. Appl. No. 14/541,127.
Non-Final Office Action issued Dec. 22, 2015 for related U.S. Appl. No. 14/948,342.
Office Action issued Jul. 2, 2022 for related U.S. Appl. No. 17/000,092 (8 Pages).
International Search Report issued Mar. 18, 2013 for related International Appln. No. PCT/US2012/060032.
International Search Report issued Apr. 9, 2015 for related International Appln. No. PCT/US2014/065624.
International Search Report issued Jul. 26, 2015 for related International Appln. No. PCT/US2016/022219.
International Search Report issued Nov. 7, 2013 for related International Appln. No. PCT/US2013/049851.
Written Opinion of the International Searching Authority issued Mar. 18, 2013 for related International Appln. Pub. No. PCT/US2012/060032.
Written Opinion issued Apr. 9, 2015 by the International Searching Authority for related International Appln. No. PCT/US2014/065624.
Written Opinion issued Jul. 26, 2016 by the International Searching Authority for related International Appln. No. PCT/US2016/022219.
Written Opinion issued Nov. 7, 2013 by the International Searching Authority for related International Appln. No. PCT/US2013/049851.

\* cited by examiner

Detail "A"

Detail "B"

Detail "C"

Detail "D"

Detail "E"

Detail "F"

Detail "G"

UNIVERSAL SLOPED ROOF SOLAR PANEL MOUNTING SYSTEM

CROSS-REFERENCE TO RELATED APPLICATIONS

This patent application is a continuation of and claims priority to U.S. patent application Ser. No. 17/000,092, entitled "Universal Sloped Roof Solar Panel Mounting System," filed Aug. 21, 2020, which is a division of U.S. application Ser. No. 16/126,441, entitled "Universal Sloped Roof Solar Panel Mounting System", filed on Sep. 10, 2018; and U.S. Provisional Application No. 62/556,486, entitled "Universal Sloped Roof Solar Panel Mounting System", filed on Sep. 10, 2017; and is a continuation-in-part of U.S. Nonprovisional patent application Ser. No. 15/387,481, entitled "Sloped Roof Solar Panel Mounting System", filed on Dec. 21, 2016; and U.S. Nonprovisional patent application Ser. No. 15/387,481 is a continuation-in-part of U.S. Nonprovisional patent application Ser. No. 15/068,370, entitled "Sloped Roof Solar Panel Mounting System", filed on Mar. 11, 2016, which claims priority to U.S. Provisional Patent Application No. 62/131,743, entitled "Sloped Roof Solar Panel Mounting System", filed on Mar. 11, 2015, and to U.S. Provisional Patent Application No. 62/192,529, entitled "Sloped Roof Solar Panel Mounting System", filed on Jul. 14, 2015, the disclosure of each of which is hereby incorporated by reference in their entireties herein.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The field of the present invention generally relates to mounting systems and, more particularly, to support assemblies and mounting systems for mounting photovoltaic modules or panels on sloped support surfaces such as, for example, sloped building rooftops, or the like.

2. Background

There is a need for a sloped roof solar panel mounting system that attaches to rafters or roof supporting members, avoids using rails or struts, and is universal.

Solar panels must be secured to the roof and underlying structure to disperse wind and snow loads into the building structure. Although some mounting systems that avoid using rails attach to the roof decking, they do not attach to the roof rafters because the spacing of rafters is different than the length of modules.

Rails and struts are long extrusions or roll-formed strips that must be cut to length, use excess material, are costly to manufacture and high in shipping cost. Therefore, a mounting system avoiding the use of rails or struts is desired.

There is a need for the system to mount to any solar module on the market, giving installers the flexibility to choose the module of their choice, rather than be required to buy a module with a custom profile rail to accommodate the mounting system. Also, there is a need for a mounting system that utilizes a universal skirt for all common solar module thicknesses.

BRIEF SUMMARY OF EMBODIMENTS OF THE INVENTION

Accordingly, the present invention is directed to a universal sloped roof solar panel mounting system that substantially obviates one or more problems resulting from the limitations and deficiencies of the related art.

In accordance with one or more embodiments of the present invention, there is provided a support surface attachment device, the support surface attachment device configured to attach one or more photovoltaic modules to a support surface. The support surface attachment device includes a base assembly configured to be attached to a support surface; and a clamp assembly configured to engage one or more photovoltaic modules, the clamp assembly including a lower clamp member and an upper clamp member, the upper clamp member connected to the lower clamp member by a fastener member, the lower clamp member including one or more first teeth disposed thereon, and the upper clamp member including one or more second teeth disposed thereon, the one or more first teeth on the lower clamp member configured to engage the one or more second teeth on the upper clamp member when the fastener is being tightened so as to maintain a minimum gap between the upper clamp member and the lower clamp member for receiving one or more photovoltaic module frames of the one or more photovoltaic modules when the one or more photovoltaic modules are pivotably installed into a first side of the clamp assembly. The clamp assembly is capable of being selectively positioned along a length of the base assembly prior to being fixed in place relative to the base assembly so as to permit adjustability when the one or more photovoltaic modules are being attached to the support surface.

In a further embodiment of the present invention, the upper clamp member of the clamp assembly comprises one or more grooves for receiving a portion of a bonding clip for grounding the one or more photovoltaic modules.

In yet a further embodiment, the support surface attachment device further comprises a spring member disposed between the upper clamp member and the lower clamp member of the clamp assembly, the spring member configured to hold the clamp assembly open for facilitating the installation of the one or more photovoltaic modules into the clamp assembly, and the spring member further configured to enable the clamp assembly to be secured on the base assembly while maintaining the minimum gap between the upper clamp member and the lower clamp member.

In still a further embodiment, the support surface attachment device further comprises a strut nut threadingly coupled to the fastener member, the strut nut configured to fix the clamp assembly in place relative to the base assembly when the fastener member is tightened.

In yet a further embodiment, the fastener member comprises a visual indicator line formed on a head portion of the fastener member for indicating an orientation of the strut nut.

In still a further embodiment, the support surface attachment device further comprises a glider member coupling the upper and lower clamp members of the clamp assembly to the base assembly, the glider member configured to slide relative to the base assembly so as to allow the clamp assembly to be selectively positioned along the length of the base assembly prior to being fixed in place relative to the base assembly.

In yet a further embodiment, the glider member comprises one or more protrusions or grooves formed in an outer side of the glider member, the one or more protrusions or grooves configured to serve as a visual indicator indicating a height of the clamp assembly relative to the base assembly and/or serve as a means for holding a chalk line during an installation of the one or more photovoltaic modules.

In yet a further embodiment, the upper and lower clamp members of the clamp assembly are configured to rotate together relative to the glider member, and wherein an upstanding base member of the base assembly is configured to rotate relative to the support surface, whereby the rotation of the upper and lower clamp members relative to the glider member and the rotation of the upstanding base member of the base assembly relative to a flashing member of the support surface attachment device enables a lateral position of the clamp assembly to be adjusted by an installer.

In still a further embodiment, the lower clamp member of the clamp assembly comprises one or more ridges disposed on a bottom surface of the lower clamp member, the one or more ridges configured to increase a frictional engagement between the lower clamp member and the glider member so as resist the upper and lower clamp members of the clamp assembly from rotating relative to the glider member when the fastener member is tightened by an installer.

In yet a further embodiment, base assembly includes an upstanding base member, the upstanding base member comprising one or more mating grooves and one or more mating protrusions for engaging with one or more mating protrusions and one or more mating grooves of the glider member, wherein a selected engagement between the one or more mating grooves and protrusions of the upstanding base member and the one or more mating grooves and protrusions of the glider member enables the clamp assembly to be selectively positioned at a predetermined height relative to the base assembly prior to being fixed in place relative to the base assembly so as to permit vertical adjustability when the one or more photovoltaic modules are being attached to the support surface.

In still a further embodiment, the upper clamp member of the clamp assembly comprises a first downwardly protruding member and a second downwardly protruding member spaced apart from the first downwardly protruding member by a gap, the second downwardly protruding member being shorter in length than the first downwardly protruding member, and the second downwardly protruding member configured to provide an abutment surface for a skirt member.

In yet a further embodiment, the lower clamp member of the clamp assembly comprises one or more mating grooves and one or more mating protrusions for engaging with one or more mating protrusions and one or more mating grooves of a skirt member.

In still a further embodiment, the one or more mating protrusions on the lower clamp member are upwardly inclined so as to enable the skirt member to be inserted into the clamp assembly from above during installation, and so as to prevent the skirt member from becoming disengaged from the clamp assembly after the installation of the skirt member.

In yet a further embodiment, the upper clamp member of the clamp assembly comprises a pair of downwardly extending lip portions on opposite sides of a top portion of the upper clamp member, a first one of the pair of downwardly extending lip portions being longer than a second one of the pair of downwardly extending lip portions so as to facilitate the one or more photovoltaic modules being pivotably installed into the first side of the clamp assembly.

In still a further embodiment, the lower clamp member of the clamp assembly comprises an upwardly tapered ledge extending outwardly from the first side of the clamp assembly, the upwardly tapered ledge configured to support the one or more photovoltaic module frames of the one or more photovoltaic modules, and the upwardly tapered ledge being configured to function as a spring for applying a compressive force against the one or more photovoltaic module frames of the one or more photovoltaic modules so as to securely retain the one or more photovoltaic modules in the clamp assembly after the one or more photovoltaic modules are pivotably installed.

In yet a further embodiment, the base assembly includes an upstanding base member, the upstanding base member including a pair of vertically spaced-apart bottom wall portions, a first of the pair of vertically spaced-apart bottom wall portions comprising a first aperture and a second of the pair of vertically spaced-apart bottom wall portions comprising a second aperture, the first and second apertures of the upstanding base member configured to receive a raised portion of a flashing member therein so as to permit a fastener aperture disposed in the flashing member to be elevated above the support surface, thereby enabling the support surface attachment device to be more leakage resistant.

In yet a further embodiment, the upstanding base member of the base assembly further comprises one or more base flange portions, the one or more base flange portions having one or more mounting apertures disposed therethrough, the one or more mounting apertures configured to receive one or more respective fasteners for securing the upstanding base member to the support surface.

In still a further embodiment, a bottom surface of the upstanding base member comprises one or more ridges disposed thereon, the one or more ridges configured to increase a frictional engagement between the upstanding base member and the flashing member so as prevent the upstanding base member from rotating relative to the flashing member when a base fastener member is tightened by an installer.

In yet a further embodiment, the one or more ridges disposed on the bottom surface of the upstanding base member are additionally configured to capture and hold sealing tape when the upstanding base member is mounted directly against the support surface.

In still a further embodiment, a top surface of the upstanding base member comprises one or more visual installation guide marks configured to facilitate an installation of one or more rows of the one or more photovoltaic modules.

In yet a further embodiment, the support surface attachment device further comprises a flashing member having a fastener aperture configured to receive a base fastener member for attaching an upstanding base member of the base assembly and the flashing member to the support surface, the fastener aperture being disposed through a raised position of the flashing member so that water is prevented from passing through the fastener aperture.

In yet a further embodiment, the support surface attachment device further comprises a sealing washer configured to be disposed between a head of the base fastener member and a top rim of the raised position of the flashing member, the sealing washer including an upper portion formed from a first material and a lower portion formed from a second material, the first material forming the upper portion of the sealing washer restricting a deformation of the second material forming the lower portion of the sealing washer so as to prevent the sealing washer from entering the fastener aperture in the flashing member.

In still a further embodiment, the lower portion of the sealing washer further comprises a tapered bottom surface so as to tightly engage the top rim of the raised portion of the flashing member and to prevent the second material forming the lower portion of the sealing washer from entering the fastener aperture in the flashing member.

In yet a further embodiment, the raised portion of the flashing member comprises a circumferential ledge portion, wherein, when the upstanding base member of the base assembly is assembled with the flashing member, a top surface of the circumferential ledge portion of the raised portion of the flashing member is configured to regulate a height of an upper section of the raised portion of the flashing member that is disposed above the circumferential ledge portion so that a top rim of the upper section of the raised portion does not protrude substantially above a top surface of an elevated shelf of the upstanding base member.

In still a further embodiment, the support surface attachment device further comprises a cantilevered mounting arm coupling the clamp assembly to the base assembly, the cantilevered mounting arm configured to support the clamp assembly in a cantilevered manner from the base assembly so that the clamp assembly is capable of being horizontally offset from the base assembly, thereby allowing one or more edges of the one or more photovoltaic modules to be disposed above a region of the support surface that is unable to accommodate the base assembly.

In yet a further embodiment, the region of the support surface that is unable to accommodate the base assembly comprises an area at or near a roof ridge, and wherein the cantilevered mounting arm enables one or more additional photovoltaic modules to be installed proximate to the roof ridge.

In still a further embodiment, the support surface attachment device further comprises an electrical accessory bracket configured to mount an electrical accessory of a photovoltaic system to an upstanding base member of the base assembly, the electrical accessory bracket comprising at least one flange portion configured to attach the electrical accessory bracket to the upstanding base member, the electrical accessory bracket further comprising a bracket base portion comprising one or more mounting apertures for attaching the electrical accessory to the electrical accessory bracket.

In yet a further embodiment, the at least one flange portion of the electrical accessory bracket is offset from a center position of the bracket base portion in a widthwise direction of the bracket base portion so as to facilitate a connection of one or more wires to the electrical accessory without the upstanding base member of the base assembly interfering with a routing of the one or more wires.

In still a further embodiment, the bracket base portion of the electrical accessory bracket comprises a plurality of slots formed therein for accommodating various electrical accessories, and wherein the at least one flange portion of the electrical accessory bracket comprises at least one aperture formed therein for accommodating a grounding lug.

In yet a further embodiment, the support surface attachment device further comprises a conduit mounting member configured to mount electrical conduit of a photovoltaic system to an upstanding base member of the base assembly, the conduit mounting member including a securement portion comprising one or more mounting apertures for attaching the conduit mounting member to the upstanding base member, the conduit mounting member further comprising a conduit mounting portion connected to the securement portion, the conduit mounting portion comprising one or more securement apertures for attaching the electrical conduit to the conduit mounting member.

In accordance with one or more other embodiments of the present invention, there is provided a coupling device configured to attach one or more photovoltaic modules to one or more other photovoltaic modules. The coupling device includes a lower coupling member including at least one ledge extending outwardly from a side surface of the lower coupling member, the lower coupling member further including one or more first teeth disposed thereon; and an upper coupling member including at least one flange portion extending outwardly from the upper coupling member, the upper coupling member further including one or more second teeth disposed thereon, the upper coupling member being adjustably connected to the lower coupling member by at least one fastening device, the one or more first teeth on the lower coupling member configured to engage the one or more second teeth on the lower coupling member when the at least one fastening device is being tightened so as to maintain a minimum gap between the upper coupling member and the lower coupling member for receiving one or more photovoltaic module frames of the one or more photovoltaic modules when the one or more photovoltaic modules are pivotably installed into a first side of the clamp assembly. The one or more other photovoltaic modules are configured to be clamped between the at least one ledge of the lower coupling member and the at least one flange portion of the upper coupling member.

In a further embodiment of the present invention, the at least one flange portion of the upper coupling member comprises a plurality of spaced-apart apertures disposed thererough, and wherein the at least one fastening device comprises a first and second fastening device, a first one of the plurality of spaced-apart apertures comprising a fastener hole for receiving the first fastening device, and the second one of the plurality of spaced-apart apertures comprising a fastener slot for receiving the second fastening device, the fastener slot providing clearance so as to allow the tightening of one of the first and second fastening devices prior to the tightening of the other of the first and second fastening devices.

In yet a further embodiment, the at least one flange portion of the upper coupling member comprises a central slot disposed between the first one of the plurality of spaced-apart apertures and the second one of the plurality of spaced-apart apertures, the central slot configured to receive a fastener member for connecting the coupling device to a glider member of a support surface attachment device so that the coupling device is capable of being used with a base assembly of the support surface attachment device for attaching the one or more photovoltaic modules to a support surface.

In still a further embodiment, a top surface of the at least one flange portion of the upper coupling member comprises one or more visual installation guide marks to indicate locational limits of mounting the one or more photovoltaic modules within the coupling device.

In yet a further embodiment, the lower coupling member comprises one or more mating grooves and one or more mating protrusions for engaging with one or more mating protrusions and one or more mating grooves of a skirt member.

In still a further embodiment, the one or more mating protrusions of the lower coupling member comprise a plurality of mating protrusions disposed in alternating upward and downward orientations so that the coupling device is capable of remaining in engagement with the skirt member prior to the at least one fastening device being tightened by an installer.

In yet a further embodiment, the lower coupling member comprises one or more water drainage troughs formed therein for draining water from the one or more photovoltaic modules.

In accordance with yet one or more other embodiments of the present invention, there is provided a bonding clip configured to ground one or more photovoltaic modules. The bonding clip includes a clip body portion having a first surface and a second surface disposed opposite to the first surface, the clip body portion further including a plurality of protruding members, at least one of the plurality of protruding members projecting outwardly from the first surface in a first direction, and at least another of the plurality of protruding members projecting outwardly from the second surface in a second direction, the first direction being generally opposite to the second direction; and one or more clip attachment portions connected to the clip body portion, the one or more clip attachment portions configured to attach the bonding clip to an object on which the bonding clip is mounted.

In a further embodiment of the present invention, the plurality of protruding members are arranged in a generally staggered pattern along a length of the clip body portion.

In yet a further embodiment, the clip body portion is in the form of flat plate that does not comprise any folds formed therein.

In still a further embodiment, the one or more clip attachment portions comprise a plurality of bent tab members, the plurality of bent tab members configured to engage with a groove in the object.

In yet a further embodiment, the one or more clip attachment portions comprise a pair of flange members, each of the pair of flange members being disposed at an opposite end of the clip body portion; and wherein, when the bonding clip is installed on the object, a top portion of each of the pair of flange members remains visible to an installer so that an installed condition of the bonding clip is capable of being verified by the installer.

In accordance with still one or more other embodiments of the present invention, there is provided a power accessory bracket configured to attach one or more power accessories of a photovoltaic system to one or more frames of one or more photovoltaic modules. The power accessory bracket includes a bracket body portion having a first side and a second side disposed opposite to the first surface; a first plurality of teeth disposed on the first side of the bracket body portion, the first plurality of teeth configured to engage the one or more frames of the one or more photovoltaic modules; and a second plurality of teeth disposed on the second side of the bracket body portion, the second plurality of teeth configured to engage one or more mounting members of the one or more power accessories. The power accessory bracket is configured to provide electrical bonding of the one or more photovoltaic modules to the one or more power accessories.

In a further embodiment of the present invention, at least one of the first and second pluralities of teeth extend below a bottom surface of the bracket body portion so as to provide the electrical bonding and to accommodate a plurality of different photovoltaic module flange dimensions.

In yet a further embodiment, the bracket body portion comprises at least one mounting aperture disposed therethrough, the at least one mounting aperture being offset from a center position of the bracket body portion in a widthwise direction of the bracket body portion so as to accommodate a plurality of different photovoltaic module flange dimensions by allowing the power accessory bracket to positioned in two different orientations.

In still a further embodiment, the bracket body portion comprises at least one additional aperture formed therein for accommodating one or more components of one or more power accessories.

In accordance with still one or more other embodiments of the present invention, there is provided a support surface attachment device, the support surface attachment device configured to attach one or more photovoltaic modules to a support surface. The support surface attachment device includes a base assembly configured to be attached to a support surface; and a clamp assembly configured to engage one or more photovoltaic modules, the clamp assembly including a lower clamp member and an upper clamp member, the upper clamp member being adjustably connected to the lower clamp member by a fastener member, the upper and lower clamp members defining a panel receiving gap therebetween, the panel receiving gap being continuously adjustable by a user within the range between approximately 32 millimeters and approximately 50 millimeters so as to accommodate any photovoltaic module thickness within the range.

In a further embodiment of the present invention, the clamp assembly comprises integrated grounding means, the integrated grounding means configured to provide integrated grounding between adjacent photovoltaic modules.

In yet a further embodiment, the integrated grounding means of the clamp assembly comprises one or more grounding protrusions or teeth.

In still a further embodiment, the upper clamp member of the clamp assembly comprises at least one downwardly extending portion and the lower clamp member of the clamp assembly comprises at least one upwardly extending portion, the at least one downwardly extending portion of the upper clamp member configured to engage with the at least one upwardly extending portion of the lower clamp member so as to hold open the panel receiving gap for facilitating an insertion of the one or more photovoltaic modules after the fastener member of the clamp assembly has been partially tightened.

In yet a further embodiment, the at least one upwardly extending portion of the lower clamp member comprises one or more outwardly extending protrusions, the one or more outwardly extending protrusions configured to facilitate the holding open of the panel receiving gap, the one or more outwardly extending protrusions further configured to be deformed and/or severed from the remainder of the upwardly extending portion of the lower clamp member when the fastener member of the clamp assembly is tightened.

In still a further embodiment, the at least one downwardly extending portion of the upper clamp member comprises one or more dimples formed in a side surface thereof, the one or more dimples configured to facilitate the holding open of the panel receiving gap.

In yet a further embodiment, the clamp assembly is capable of being rotated 360 degrees relative to the base assembly of the support surface attachment device so as to accommodate various photovoltaic module mounting arrangements.

In still a further embodiment, the clamp assembly is capable of being interchangeably used with or without a skirt member of a photovoltaic array.

In yet a further embodiment, the upper clamp member of the clamp assembly comprises at least one skirt receiving groove, the at least one skirt receiving groove configured to receive a downwardly extending edge portion of a skirt member.

In still a further embodiment, the fastener member is configured to secure the skirt member to the clamp assembly.

In accordance with yet one or more other embodiments of the present invention, there is provided a coupling device configured to attach one or more photovoltaic modules to one or more other photovoltaic modules. The coupling device includes a lower coupling member including at least one ledge extending outwardly from a side surface of the lower coupling member; and an upper coupling member including at least one flange portion extending outwardly from the upper coupling member, the upper coupling member being adjustably connected to the lower coupling member by at least one fastening device, the at least one ledge of the lower coupling member and the at least one flange portion of the upper coupling member defining a panel receiving gap therebetween, the panel receiving gap being continuously adjustable by a user within the range between approximately 32 millimeters and approximately 50 millimeters so as to accommodate any photovoltaic module thickness within the range.

In a further embodiment of the present invention, the coupling device further comprises integrated grounding means, the integrated grounding means configured to provide integrated grounding between adjacent photovoltaic modules.

In yet a further embodiment, the integrated grounding means of the coupling device comprises one or more grounding protrusions or teeth.

In still a further embodiment, the lower coupling member further comprises at least one drainage slot formed therethrough for draining water from the one or more photovoltaic modules.

In yet a further embodiment, the lower coupling member comprises one or more water drainage channels formed therein for draining water from one or more drainage weep holes of the one or more photovoltaic modules.

In still a further embodiment, the lower coupling member further comprises a plurality of extruded threads formed therein for threadingly engaging a plurality of external threads of the at least one fastening device.

In yet a further embodiment, the at least one ledge of the lower coupling member comprises a pair of ledges extending outwardly from oppositely disposed outer side surfaces of the lower coupling member, the at least one flange portion of the upper coupling member comprises a pair of flange portions extending outwardly from oppositely disposed outer side surfaces of the upper coupling member, the pair of ledges of the lower coupling member and the pair of flange portions of the upper coupling member allowing the coupling device to be rotated 180 degrees relative to the one or more photovoltaic modules so that the coupling device is capable of being interchangeably used on north and south rows of a photovoltaic array.

In still a further embodiment, the coupling device is capable of being interchangeably used with or without a skirt member of a photovoltaic array.

In yet a further embodiment, the upper coupling member of the coupling device comprises at least one skirt receiving groove, the at least one skirt receiving groove configured to receive a downwardly extending edge portion of a skirt member.

In accordance with still one or more other embodiments of the present invention, there is provided a mounting system for supporting a plurality of photovoltaic modules on a support surface. The mounting system includes a support surface attachment device, the support surface attachment device configured to attach one or more photovoltaic modules to a support surface, the support surface attachment device including a clamp assembly, the clamp assembly including a lower clamp member and an upper clamp member, at least one of the upper and lower clamp members including a skirt receiving groove or notch formed therein; and a skirt member, the skirt member including a downwardly extending edge portion configured to be received within the skirt receiving groove or notch of the at least one of the upper and lower clamp members, the engagement between the skirt member and the clamp assembly of the support surface attachment device being configured to allow the clamp assembly to accommodate any photovoltaic module thickness within a range between approximately 32 millimeters and approximately 50 millimeters.

In a further embodiment of the present invention, the skirt member comprises a curled lower edge portion, the curled lower edge portion of the skirt member being configured to receive a pin member therein for facilitating an alignment of multiple skirt sections in a photovoltaic array.

In accordance with yet one or more other embodiments of the present invention, there is provided a support surface attachment device, the support surface attachment device configured to attach one or more photovoltaic modules to a support surface. The support surface attachment device includes a base assembly configured to be attached to a support surface; and a clamp assembly configured to engage one or more photovoltaic modules, the clamp assembly including a lower clamp member and an upper clamp member, the upper clamp member connected to the lower clamp member by a fastener member, the upper clamp member including one or more first teeth disposed thereon, and the lower clamp member including one or more second teeth disposed thereon, and the one or more first teeth on the upper clamp member configured to engage the one or more second teeth on the lower clamp member when the fastener member is being tightened so as to provide one or more predetermined module thickness settings in a range between 32 millimeters and 46 millimeters.

In a further embodiment of the present invention, the one or more first teeth on the upper clamp member comprises a plurality of first teeth and the one or more second teeth on the lower clamp member comprises a plurality of second teeth, a predetermined one of the plurality first teeth on the upper clamp member configured to engage with a predetermined one of the plurality of second teeth on the lower clamp member when the fastener member is being tightened so as to provide predetermined settings for photovoltaic modules having the following module thicknesses: 32 millimeters, 33 millimeters, 35 millimeters, 38 millimeters, 40 millimeters, and 46 millimeters.

In yet a further embodiment, the support surface attachment device further comprises a spring member disposed between the upper clamp member and the lower clamp member of the clamp assembly, the spring member configured to hold the clamp assembly open for facilitating the installation of the one or more photovoltaic modules into the clamp assembly, and the spring member further configured to enable the clamp assembly to be secured on the base assembly while maintaining the minimum gap between the upper clamp member and the lower clamp member.

In still a further embodiment, the upper clamp member further comprises a flange portion and a vertical base portion extending downwardly from the flange portion, the flange portion of the upper clamp member having an angled lower surface, the angled lower surface of the flange portion configured to interact with the spring member as so to displace the vertical base portion and the plurality of first teeth outwardly away from the plurality of second teeth on the lower clamp member when the fastener member is being tightened until the desired module thickness setting pulls the upper clamp member into the lower clamp member.

In yet a further embodiment, the lower clamp member of the clamp assembly comprises an upwardly tapered first ledge extending outwardly from a first side of the clamp assembly, the upwardly tapered first ledge comprising an end portion of reduced thickness so as to accommodate a wire retaining clip.

In still a further embodiment, the upwardly tapered ledge of the lower clamp member comprises a water drainage trough formed therein for draining water from the one or more photovoltaic modules.

In yet a further embodiment, the lower clamp member of the clamp assembly further comprises a second ledge extending outwardly from a second side of the clamp assembly, the second ledge being oppositely disposed relative to the upwardly tapered first ledge.

In still a further embodiment, the second ledge of the lower clamp member comprises a groove formed therein for engaging with a mating protrusion of a skirt spacer member.

In yet a further embodiment, the second ledge of the lower clamp member further comprises a retaining element for retaining the skirt spacer member in place on the second ledge of the lower clamp member after the mating protrusion of the skirt spacer member is engaged with the groove in the second ledge.

In still a further embodiment, the second ledge of the lower clamp member further comprises a plurality of serrations for securely gripping the one or more photovoltaic modules and for providing airflow and water drainage on the second side of the clamp assembly.

In accordance with still one or more other embodiments of the present invention, there is provided a coupling device configured to attach one or more photovoltaic modules to one or more other photovoltaic modules. The coupling device includes a lower coupling member including at least one ledge extending outwardly from a side surface of the lower coupling member; and an upper coupling member including at least one flange portion extending outwardly from the upper coupling member, the upper coupling member being adjustably connected to the lower coupling member by at least one fastener member, the upper coupling member including one or more first teeth disposed thereon, and the lower coupling member including one or more second teeth disposed thereon, and the one or more first teeth on the upper coupling member configured to engage the one or more second teeth on the lower coupling member when the at least one fastener member is being tightened so as to provide one or more predetermined module thickness settings in a range between 32 millimeters and 46 millimeters.

In a further embodiment of the present invention, the one or more first teeth on the upper coupling member comprises a plurality of first teeth and the one or more second teeth on the lower coupling member comprises a plurality of second teeth, a predetermined one of the plurality first teeth on the upper coupling member configured to engage with a predetermined one of the plurality of second teeth on the lower coupling member when the fastener is being tightened so as to provide predetermined settings for photovoltaic modules having the following module thicknesses: 32 millimeters, 33 millimeters, 35 millimeters, 38 millimeters, 40 millimeters, and 46 millimeters.

In yet a further embodiment, the upper coupling member further comprises a vertical base portion extending downwardly from the at least one flange portion, the at least one flange portion of the upper coupling member having an angled lower surface, the angled lower surface of the at least flange portion being substantially equivalent to an angled lower surface of a flange portion of an upper clamp member of a support surface attachment device so as to allow the same extrusion profile to be used for both the upper coupling member and the upper clamp member of the support surface attachment device.

In still a further embodiment, the at least one ledge of the lower coupling member comprises an end portion of reduced thickness so as to accommodate a wire retaining clip.

In yet a further embodiment, the at least one ledge of the lower coupling member comprises a water drainage trough formed therein for draining water from the one or more photovoltaic modules.

In still a further embodiment, the at least one ledge of the lower coupling member comprises an upwardly tapered first ledge and a second ledge, the second ledge being oppositely disposed relative to the upwardly tapered first ledge.

In yet a further embodiment, the second ledge of the lower coupling member comprises a groove formed therein for engaging with one or more mating protrusions of one or more respective skirt spacer members.

In still a further embodiment, the second ledge of the lower coupling member further comprises one or more retaining elements for retaining the one or more skirt spacer members in place on the second ledge of the lower coupling member after the one or more mating protrusions of the one or more respective skirt spacer members is engaged with the groove in the second ledge.

In yet a further embodiment, the second ledge of the lower coupling member further comprises a plurality of serrations for securely gripping the one or more photovoltaic modules and for providing airflow and water drainage on the side of the coupling device with the second ledge.

In accordance with yet one or more other embodiments of the present invention, there is provided a mounting system for supporting a plurality of photovoltaic modules on a support surface. The mounting system includes a support surface attachment device, the support surface attachment device configured to attach one or more photovoltaic modules to a support surface, the support surface attachment device including a clamp assembly, the clamp assembly including a lower clamp member and an upper clamp member, the lower clamp member having an outwardly extending component extending from an outer side of the lower clamp member; a skirt member, the skirt member configured to be supported by the clamp assembly; and a skirt spacer member, the skirt spacer member configured to be disposed between a portion of the skirt member and the outwardly extending component of the lower clamp member so as to elevate the skirt member above a top surface of the outwardly extending component, the skirt spacer member configured to enable the skirt member to be interchangeably used with a plurality of different photovoltaic module thicknesses ranging from 32 millimeters to 46 millimeters.

In a further embodiment of the present invention, the skirt member comprises a vertical skirt leg extending downwardly from an upper end portion of the skirt member, the vertical skirt leg configured to retain the skirt member between the skirt spacer member and the lower clamp member during the installation of the skirt member until the skirt member is secured in the clamp assembly between the upper and lower clamp members.

In yet a further embodiment, the skirt spacer member is one of a plurality of skirt spacer members having different sizes, respective ones of the plurality of skirt spacer members being sized to accommodate photovoltaic modules having the following module thicknesses: 32 millimeters, 33 millimeters, 35 millimeters, 38 millimeters, 40 millimeters, and 46 millimeters.

In still a further embodiment, each of the plurality of skirt spacer members comprises indicia for indicating the spacer size.

In yet a further embodiment, the outwardly extending component of the lower clamp member comprises a groove formed therein for engaging with a mating protrusion of the skirt spacer member, the engagement between the mating protrusion of the skirt spacer member and the groove of the lower clamp member configured to secure the skirt spacer member in place on the lower clamp member.

In still a further embodiment, the mounting system further comprises a module coupling device, the module coupling device configured to attach one or more photovoltaic modules to one or more other photovoltaic modules; and the mounting system additionally comprises a pair of skirt spacer members configured to be disposed between a portion of the skirt member and an outwardly extending ledge of the module coupling device so as to elevate the skirt member above a top surface of the outwardly extending ledge.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which:

FIG. 116 is an end view of the upper clamp member of FIG. 115A;

FIG. 117 is a side view of the upper clamp member of FIG. 115A;

FIG. 118 is a top plan view of the upper clamp member of FIG. 115A;

FIG. 119A is a perspective view of still another upper clamp member used in conjunction with the clamp assemblies described herein, according to still another embodiment of the invention;

FIG. 119B is an enlarged perspective view of one of the grounding protrusions and the skirt receiving groove of the upper clamp member illustrated in the perspective view of FIG. 119A (Detail "E");

FIG. 120 is a top plan view of the upper clamp member of FIG. 119A;

FIG. 121 is a side view of the upper clamp member of FIG. 119A;

FIG. 122 is an end view of the upper clamp member of FIG. 119A;

FIG. 123A is a perspective view of the upper clamp member of the clamp assembly of FIG. 94;

FIG. 123B is an enlarged perspective view of the grounding protrusions and the skirt receiving groove of the upper clamp member illustrated in the perspective view of FIG. 123A (Detail "F");

FIG. 124 is an end view of the upper clamp member of FIG. 123A;

FIG. 125 is a side view of the upper clamp member of FIG. 123A;

Figure 89:
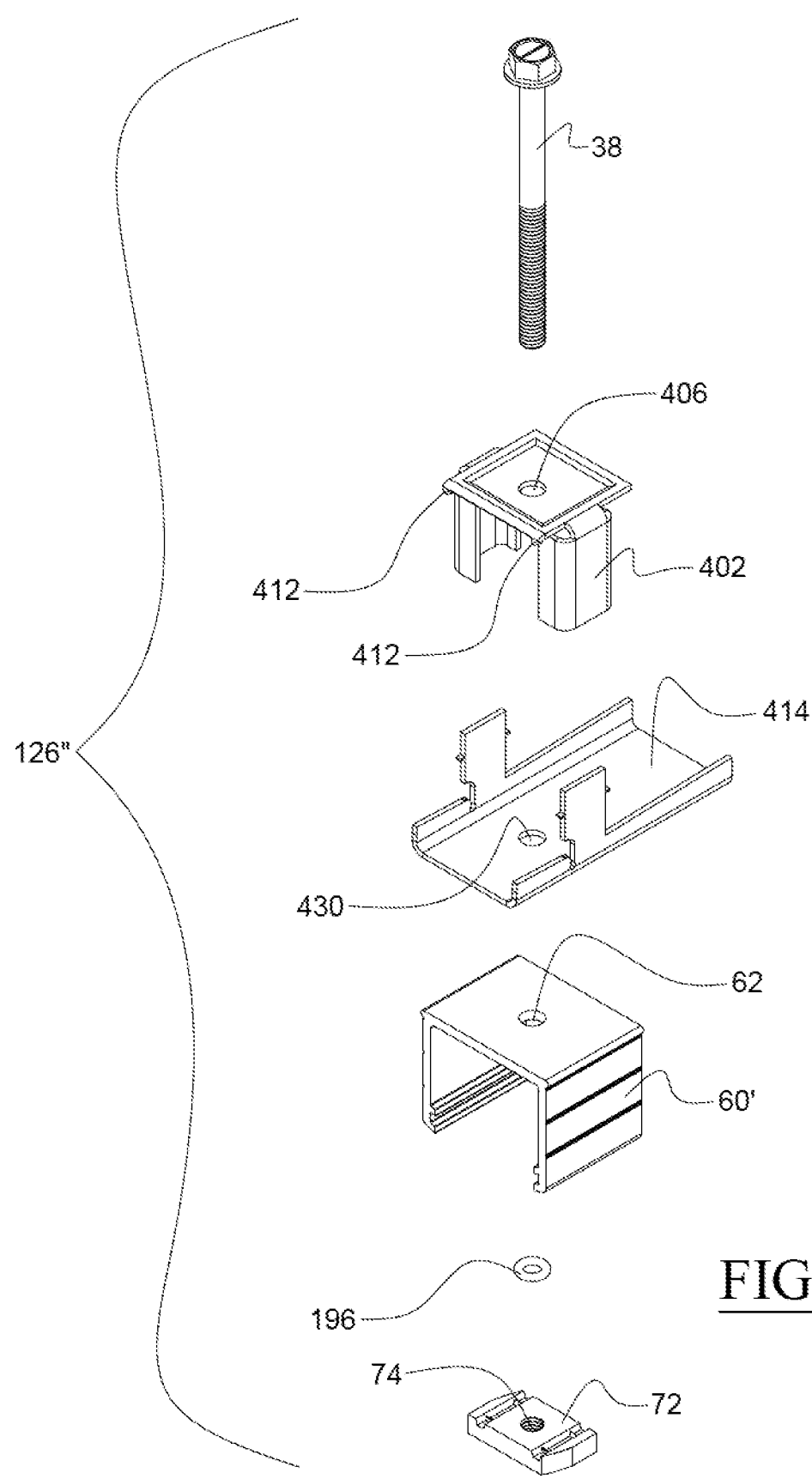
FIG. 89 is an exploded perspective view of another clamp assembly used in conjunction with the support surface attachment devices described herein, according to another embodiment of the invention.
Figure 90:
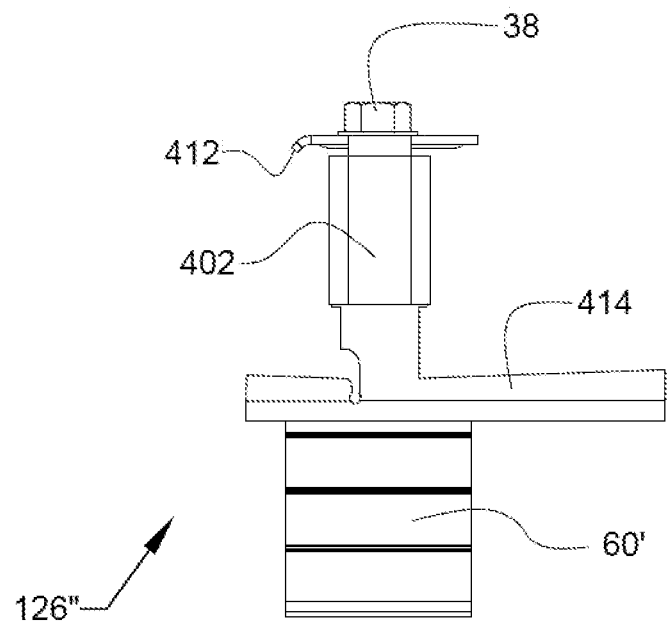
FIG. 90 is a side view of the clamp assembly of FIG. 89, wherein the clamp assembly is in its assembled state.
Figure 91:
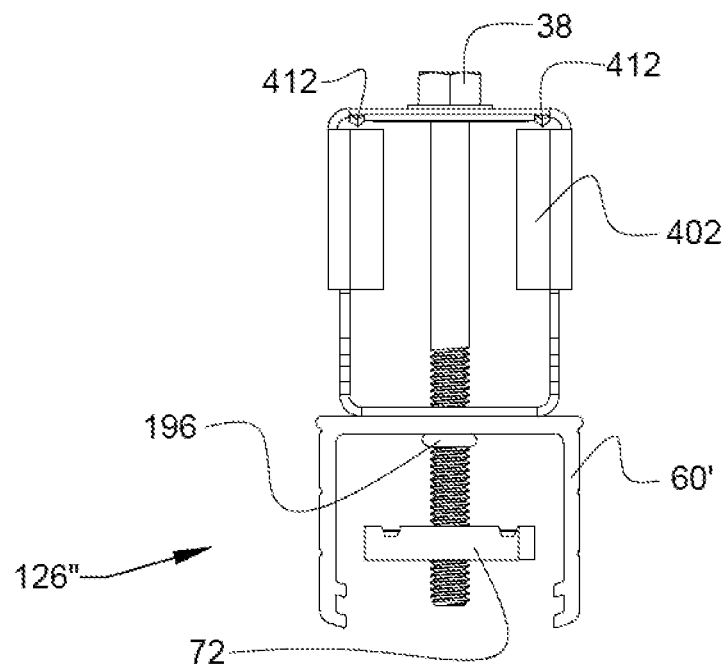
FIG. 91 is an end view of the clamp assembly of FIG. 90.
Figure 94:
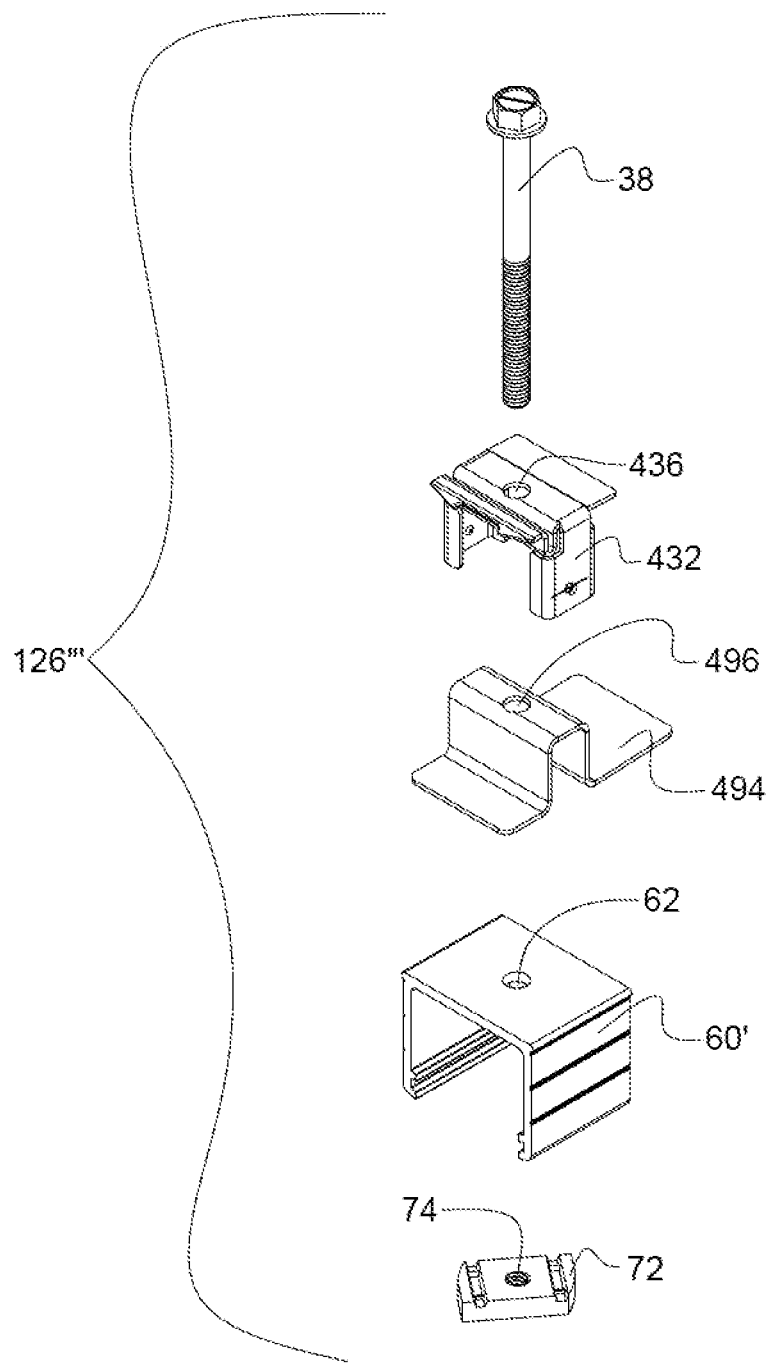
FIG. 94 is an exploded perspective view of yet another clamp assembly used in conjunction with the support surface attachment devices described herein, according to yet another embodiment of the invention.
Figure 95:
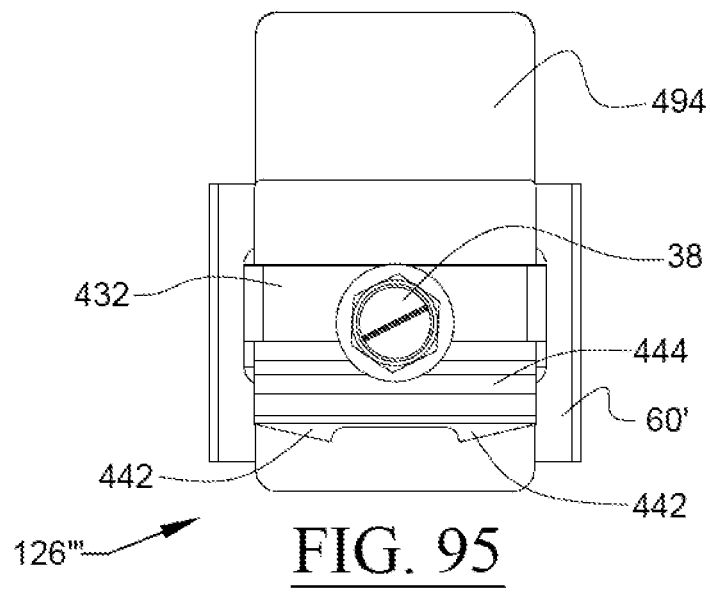
FIG. 95 is a top plan view of the clamp assembly of FIG. 94, wherein the clamp assembly is in its assembled state.
Figure 96:
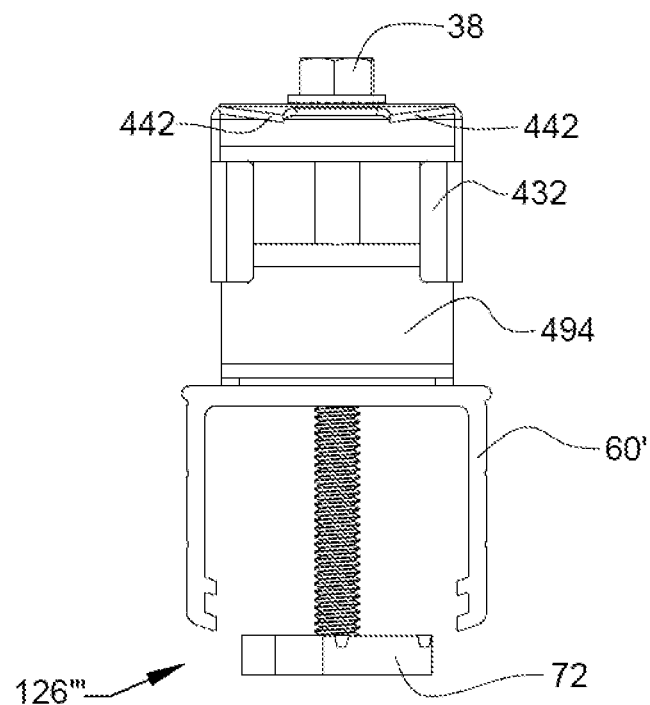
FIG. 96 is an end view of the clamp assembly of FIG. 95.
Figure 97:
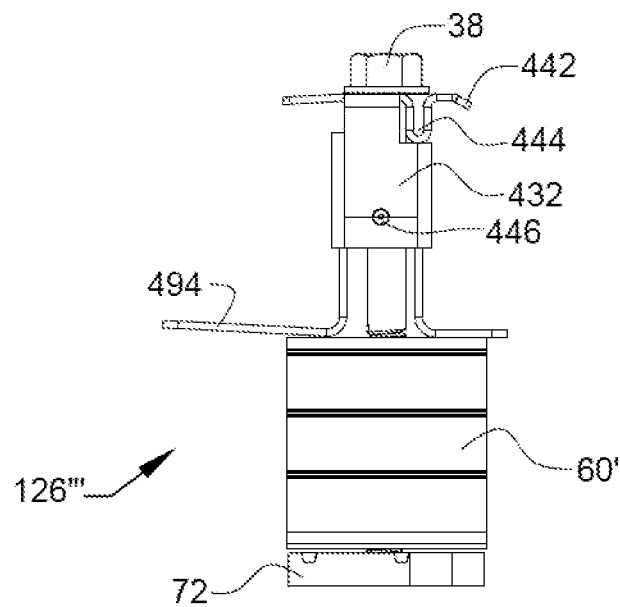
FIG. 97 is a side view of the clamp assembly of FIG. 95.
Figure 123A:
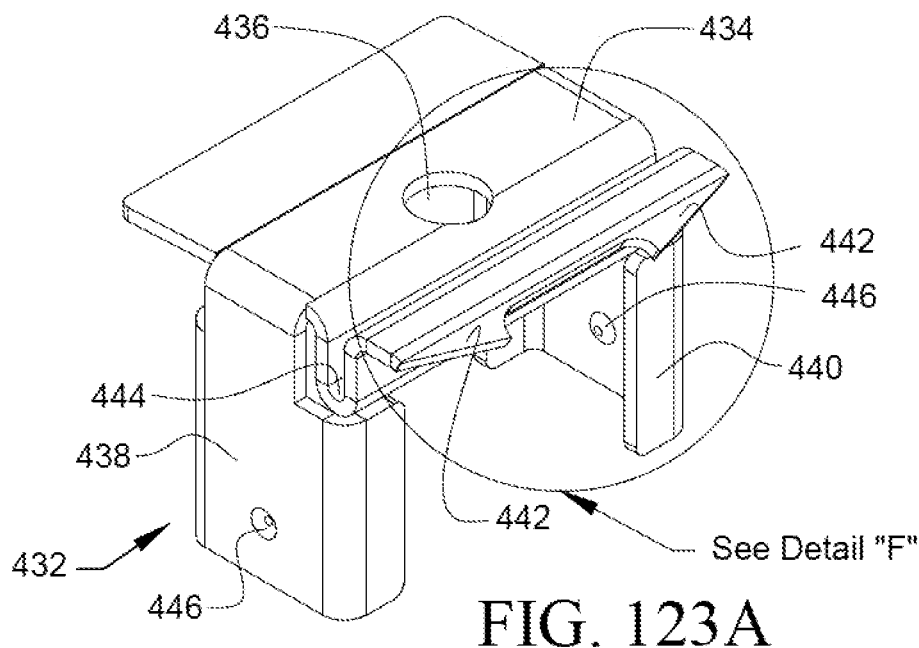
Figure 126:
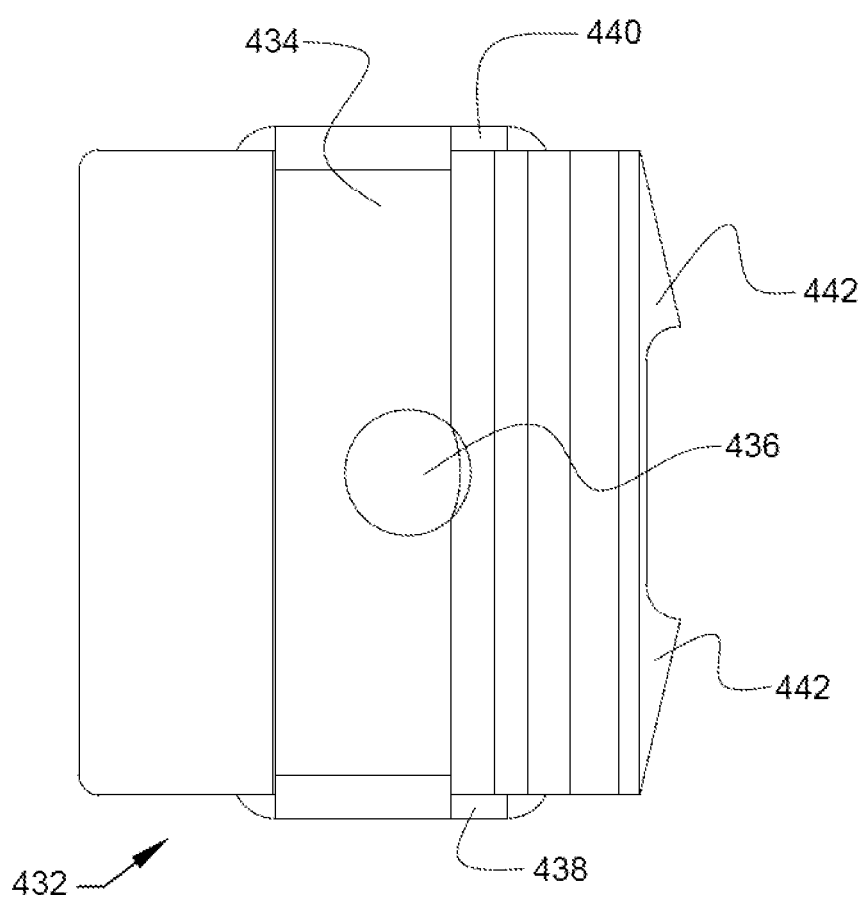
Figure 127:
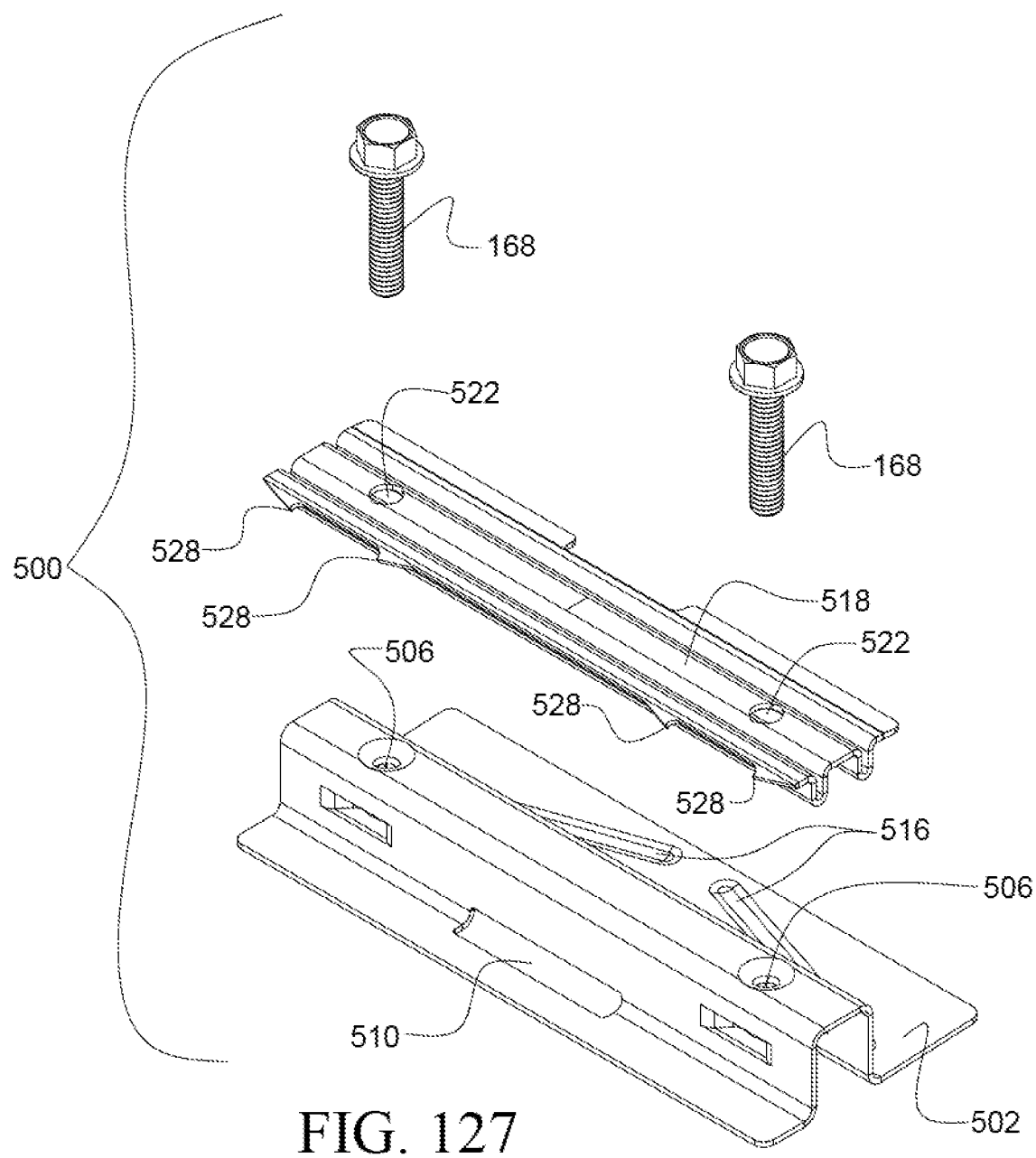
Figure 128:
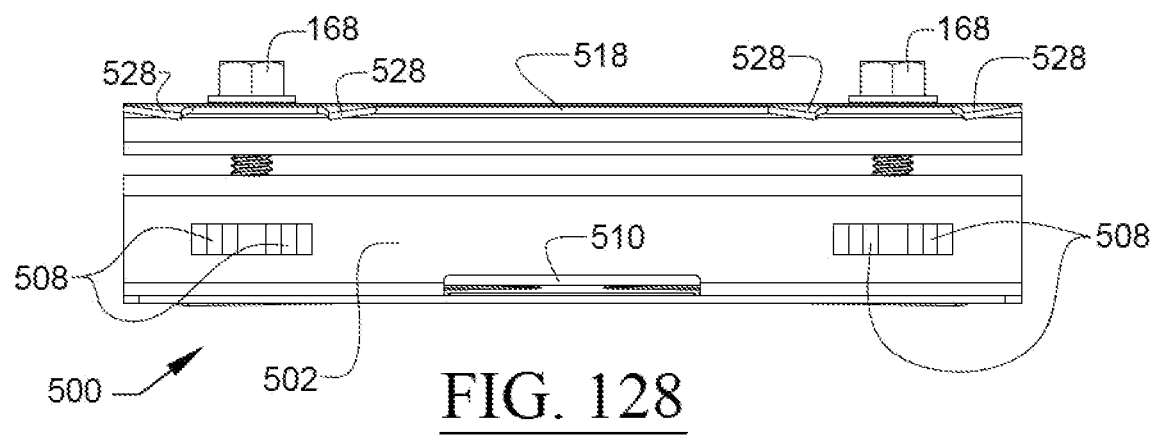
Figure 129:
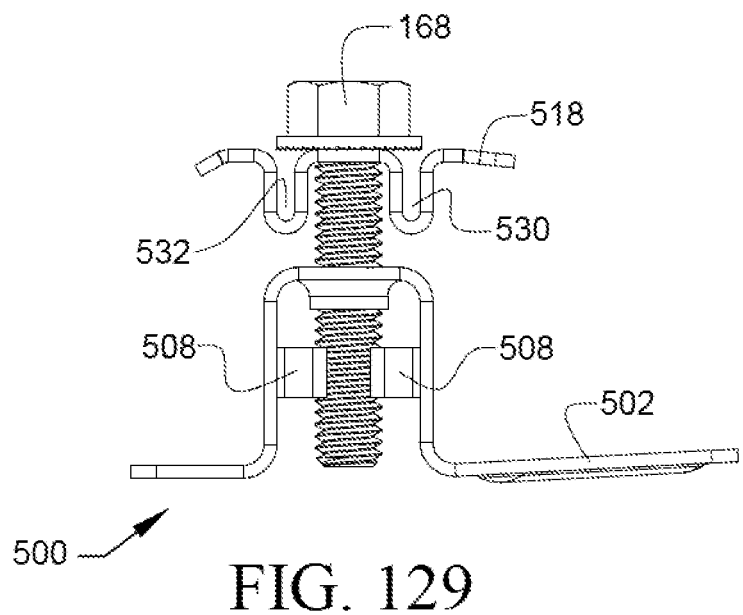
Figure 130:
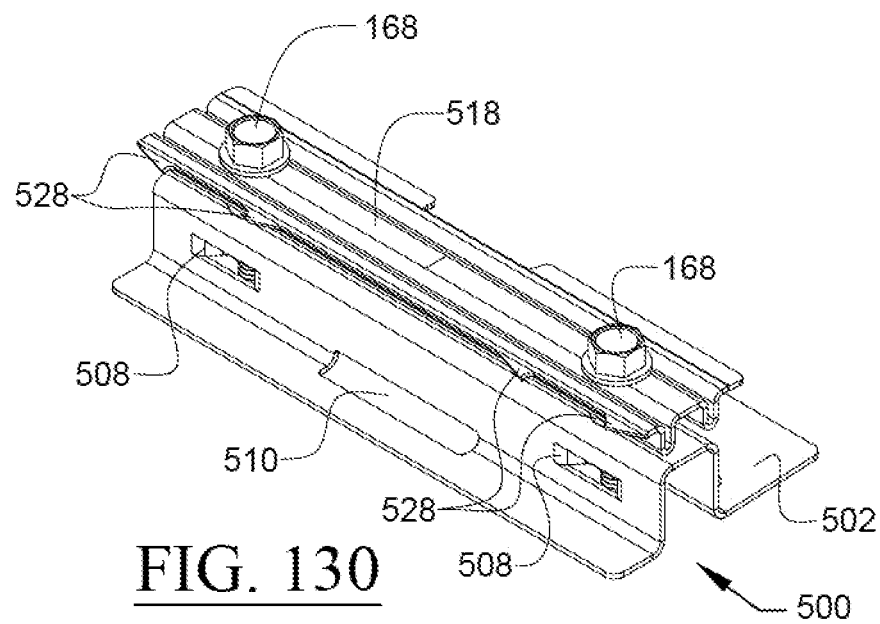
Figure 131:
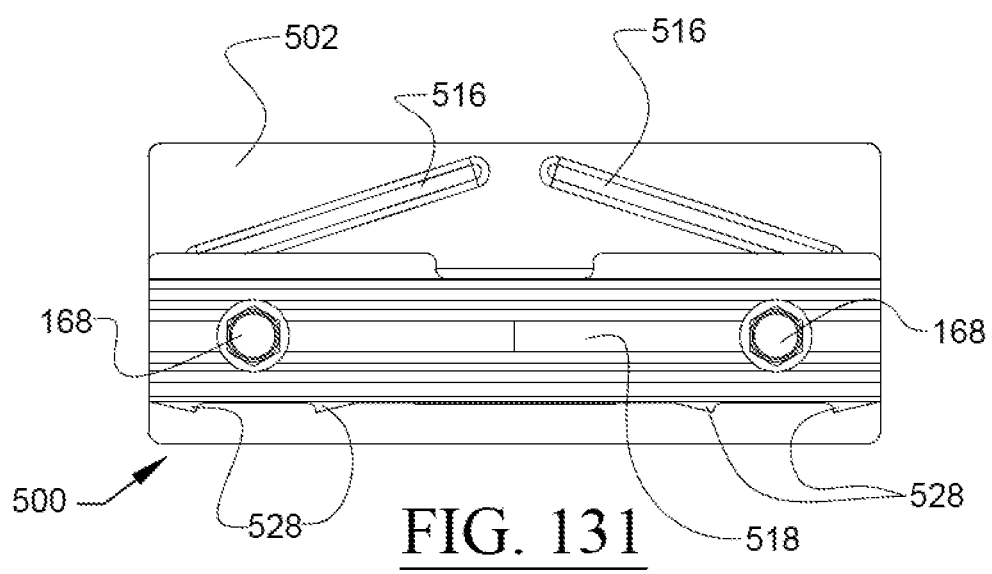
Figure 132:
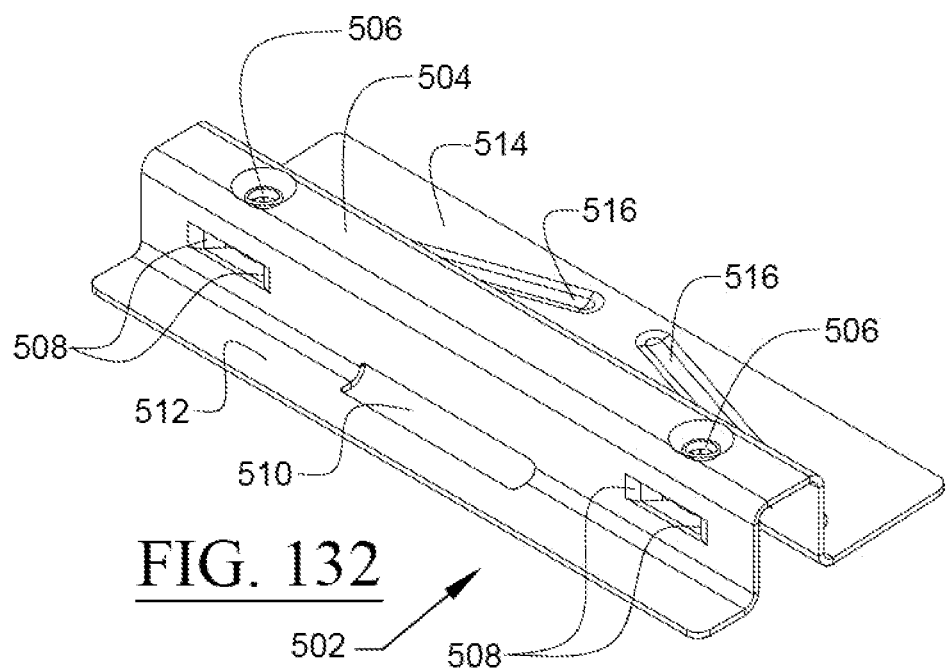
Figure 133:
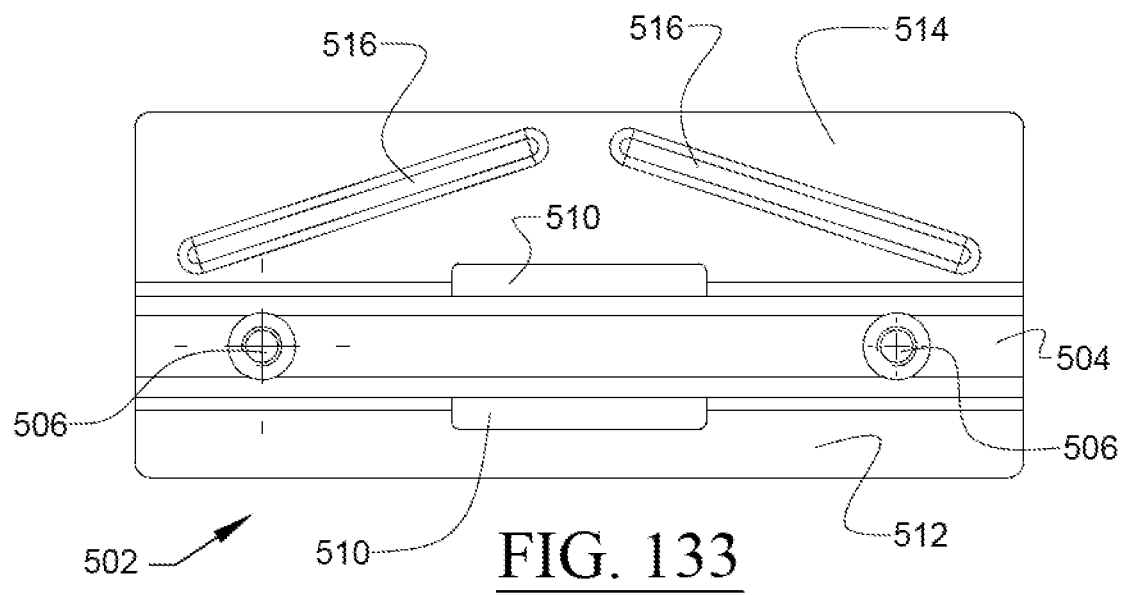
Figure 134:
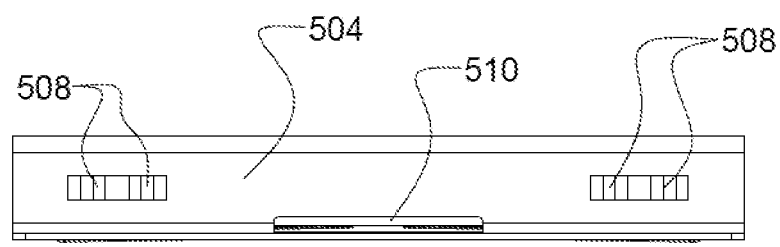
Figure 135:
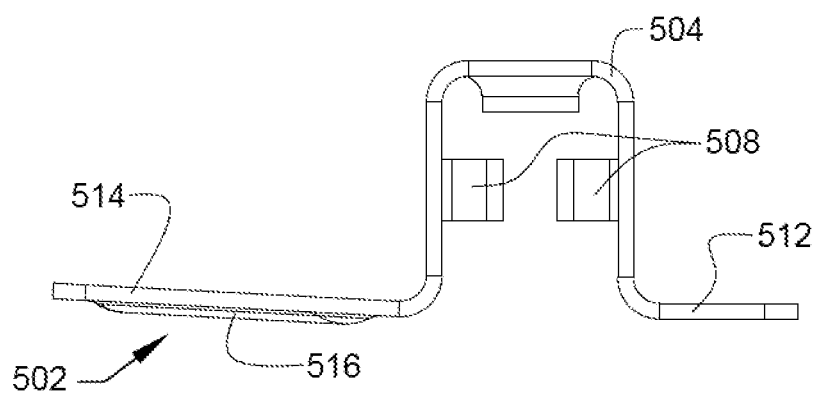
Figure 136:
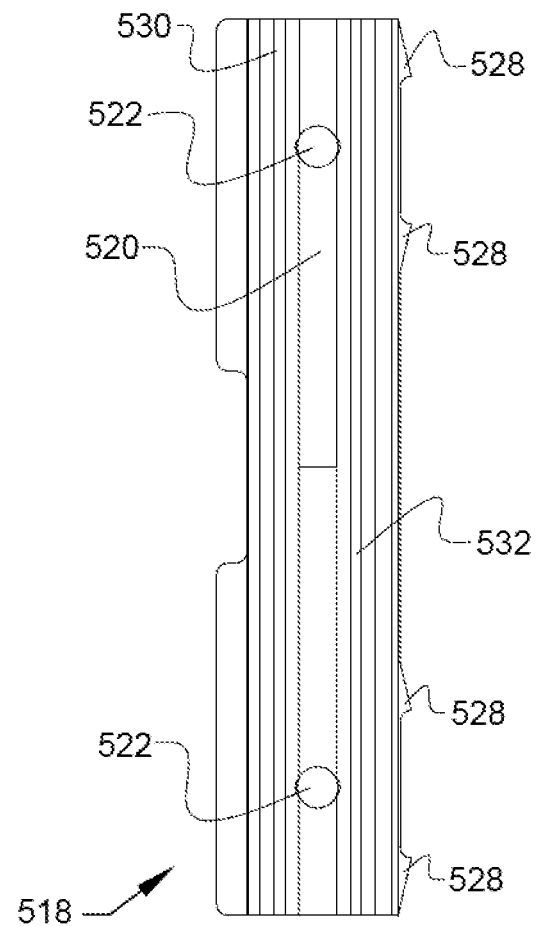
Figure 137:
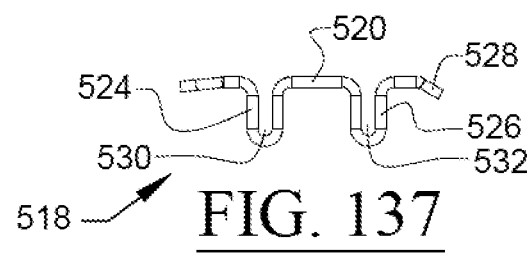
Figure 138:
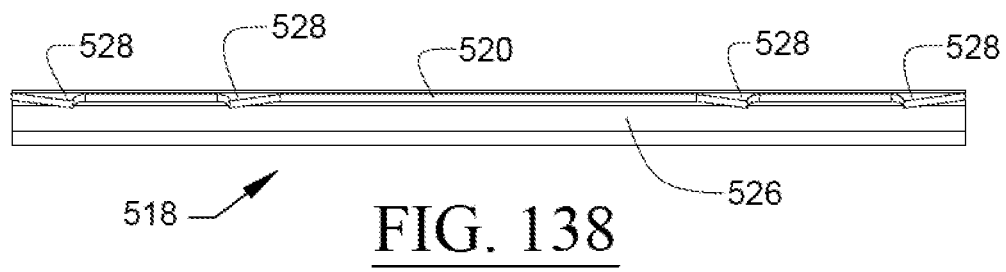
Figure 139A:
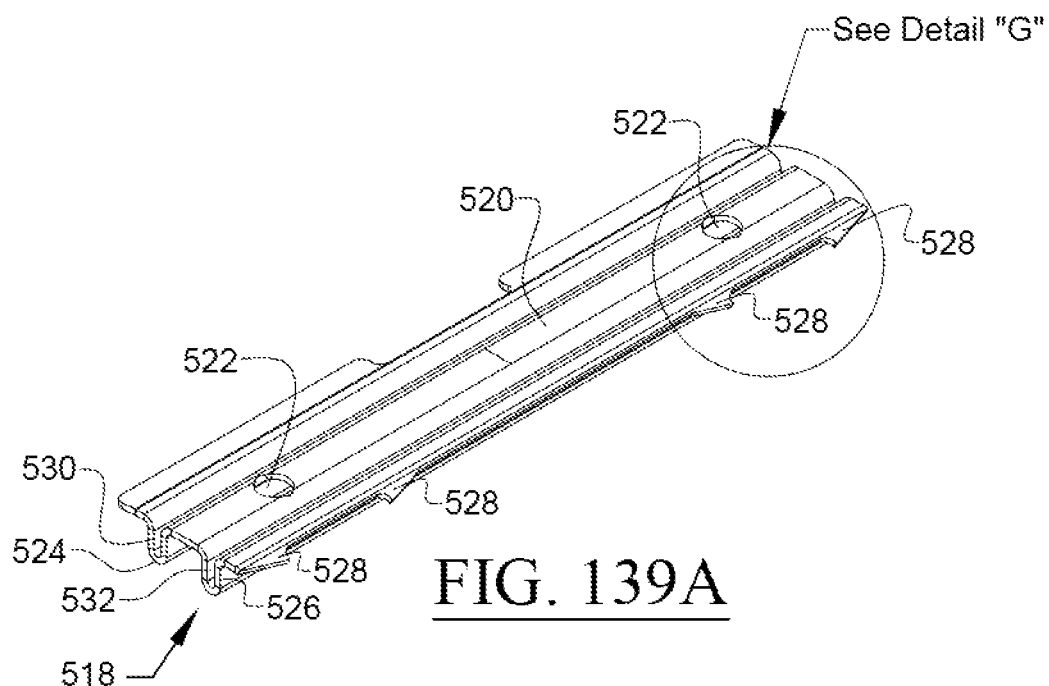
Figure 139B:
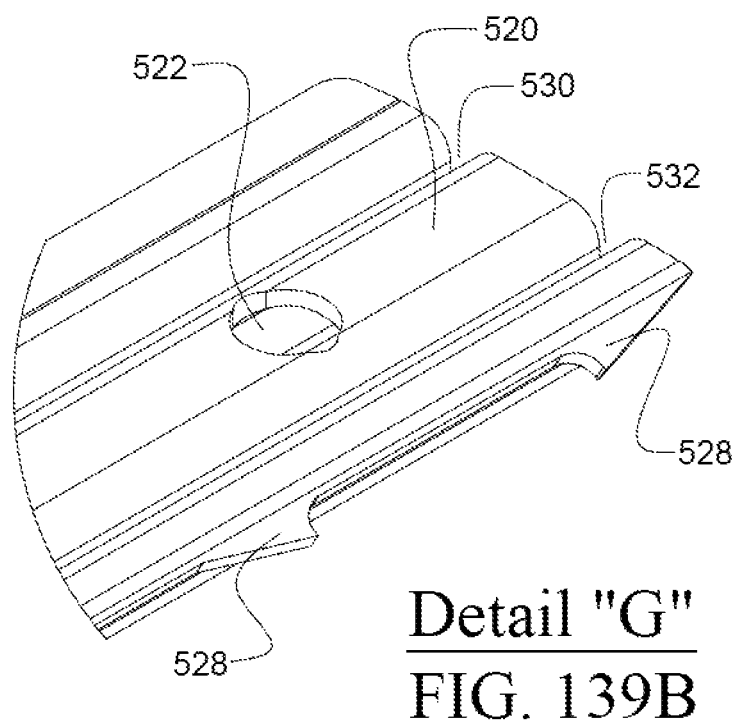
Figure 140A:
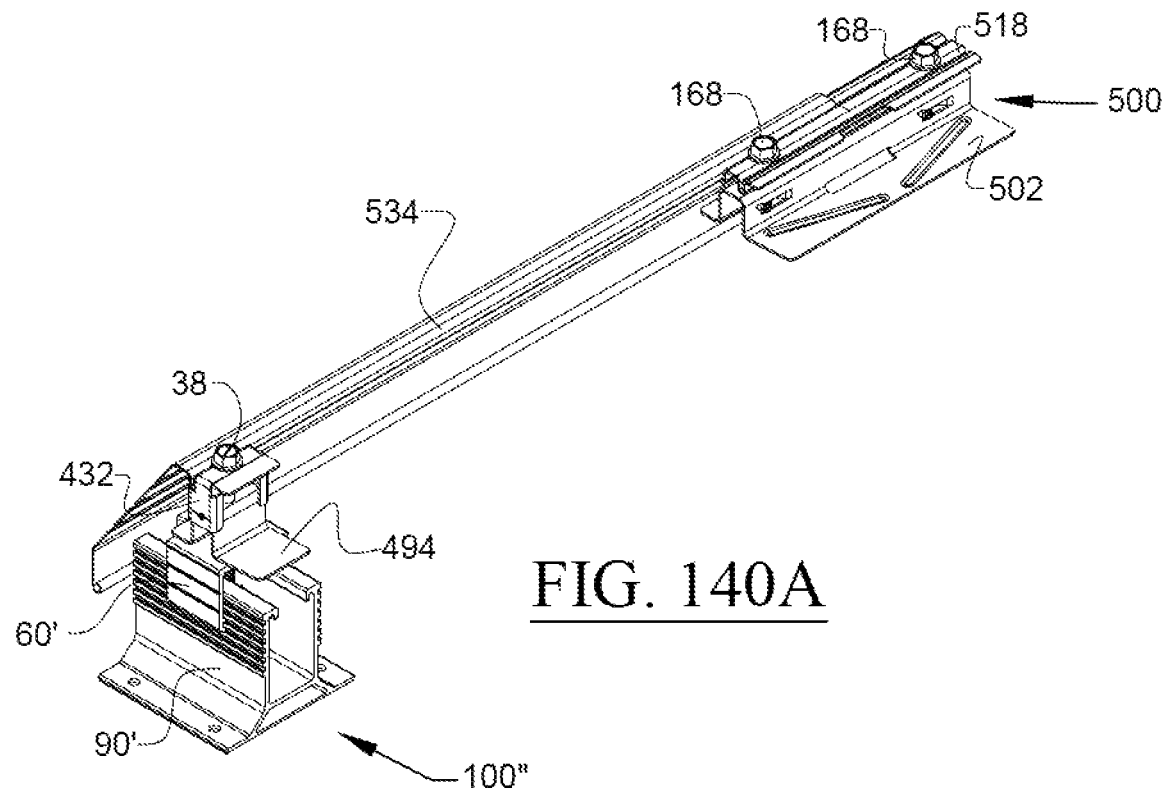
Figure 140B:
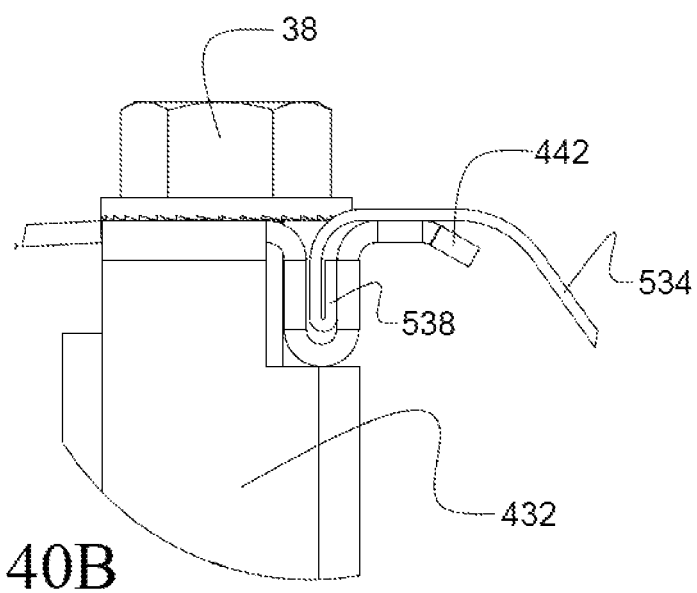
Figure 141A:
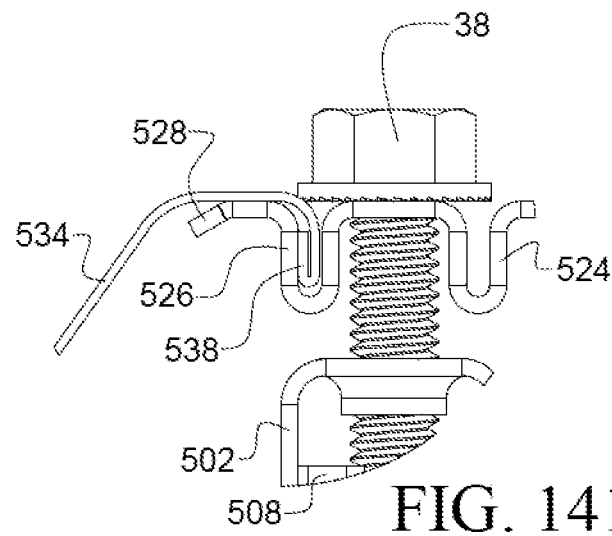
Figure 141B:
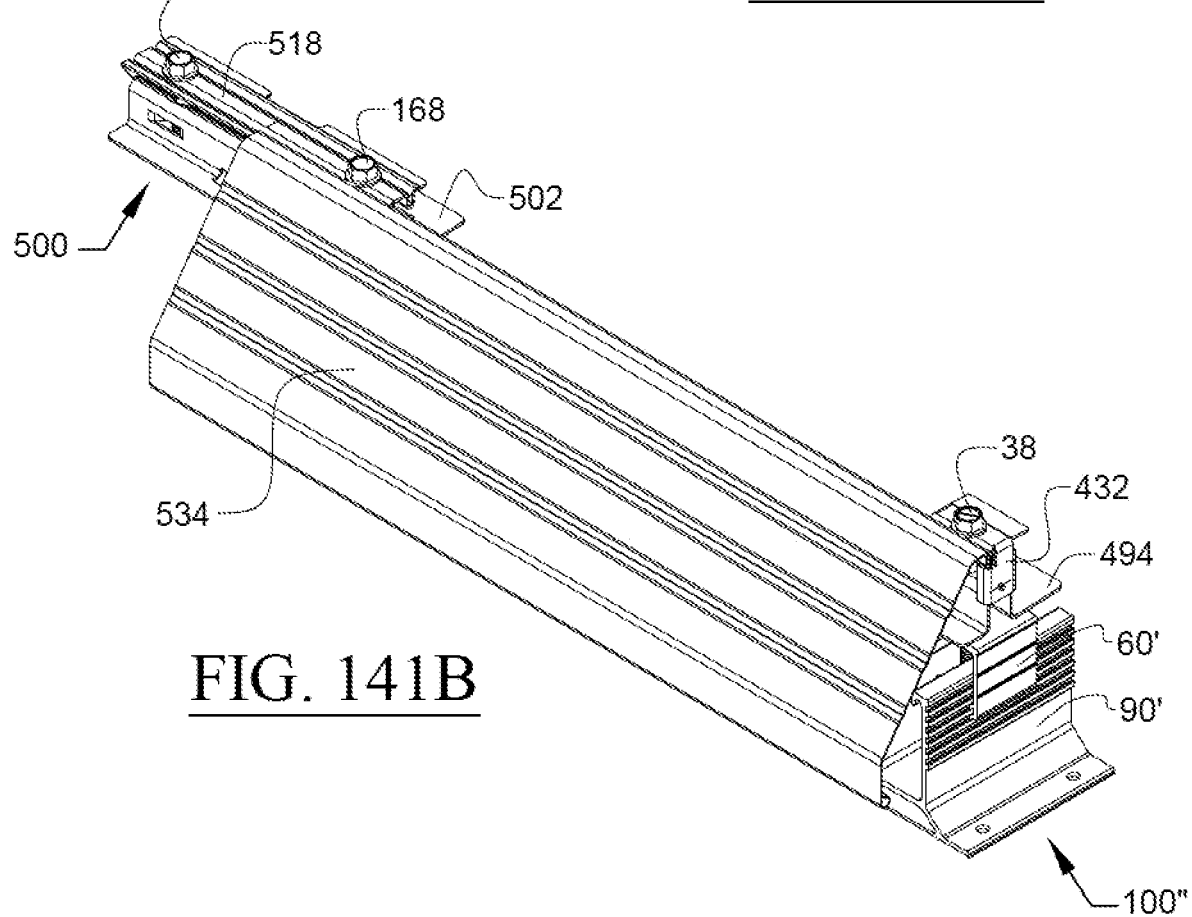
Figure 142:
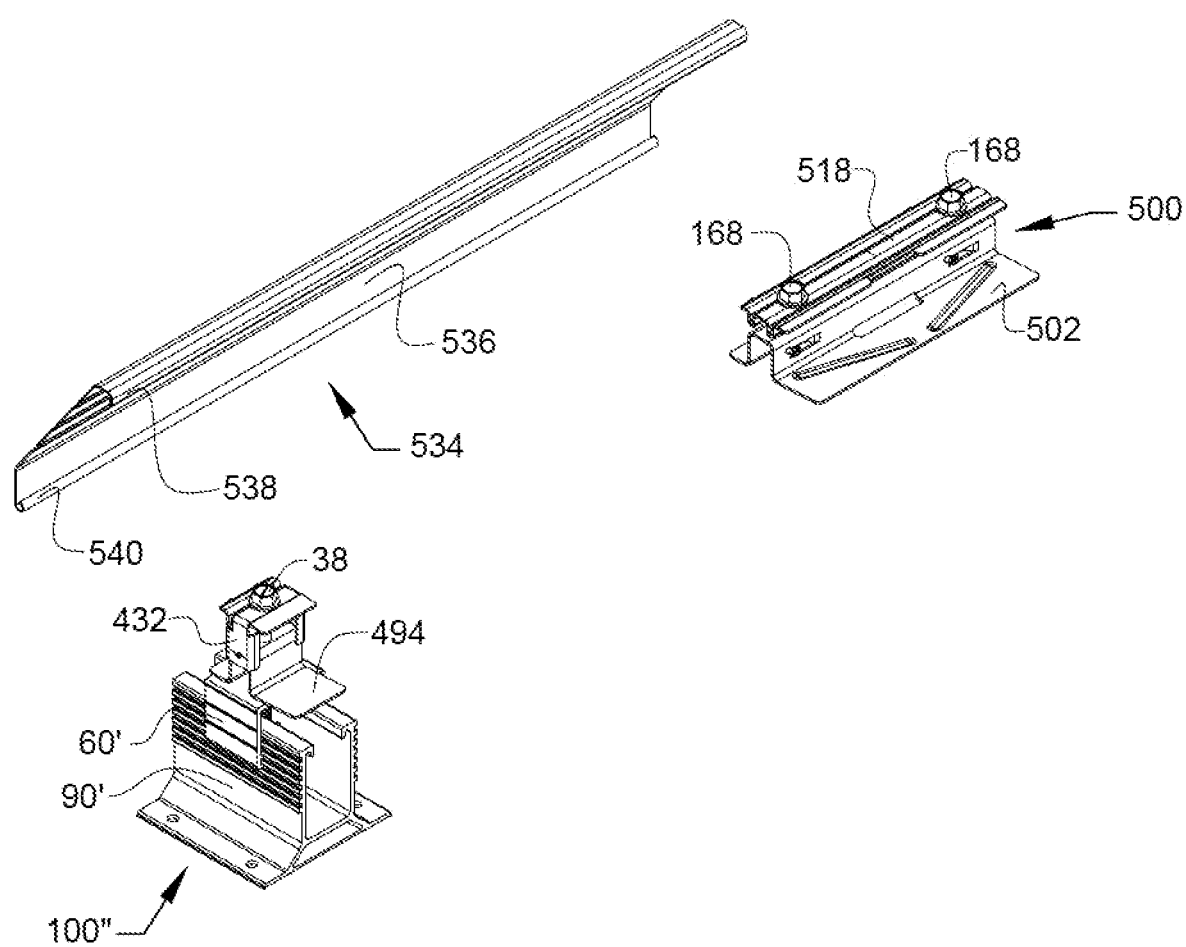
Figure 143:
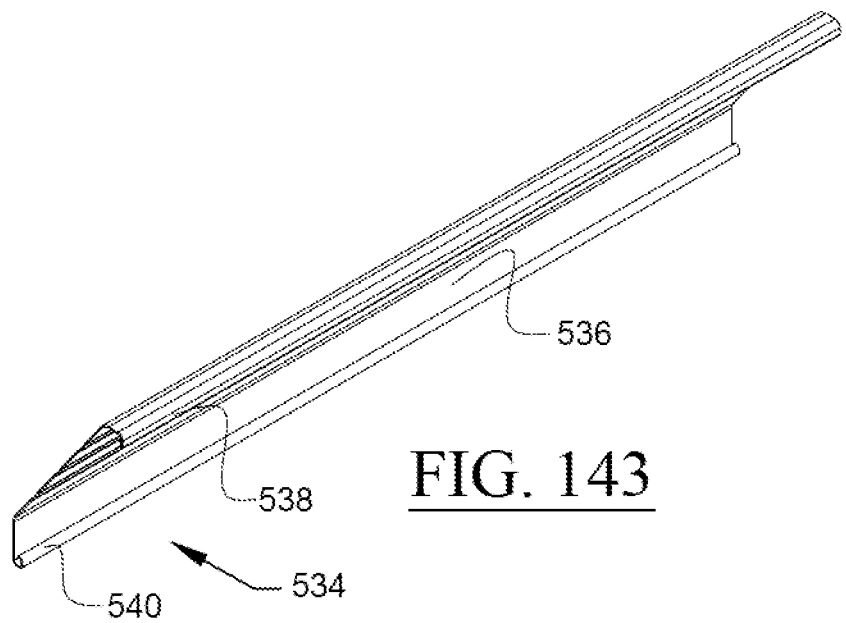
Figure 144:
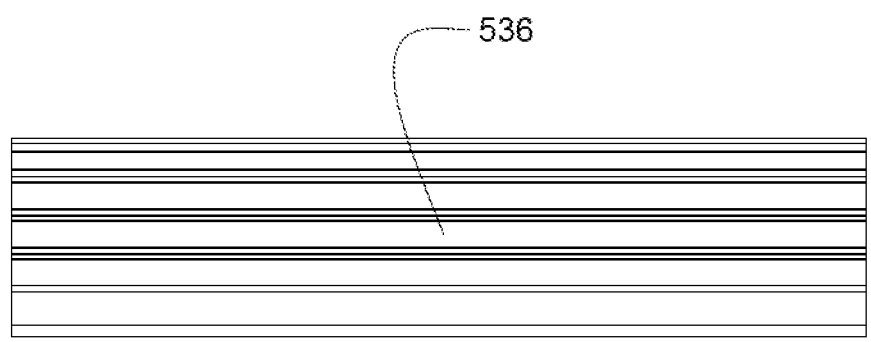
Figure 145A:
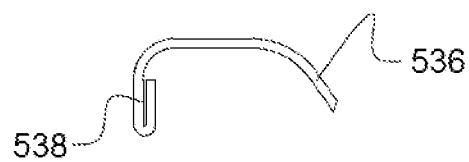
Figure 145B:
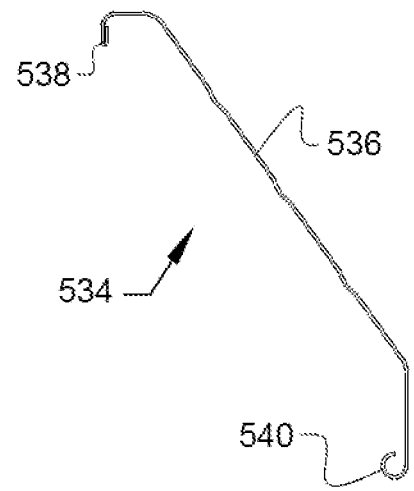
Figure 145C:
Figure 146:
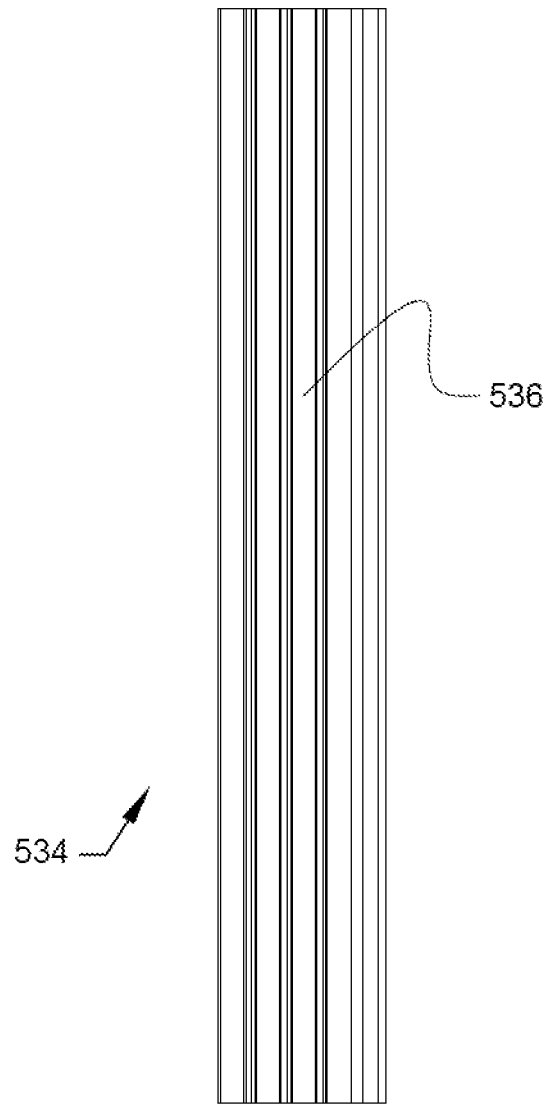
Figure 147:
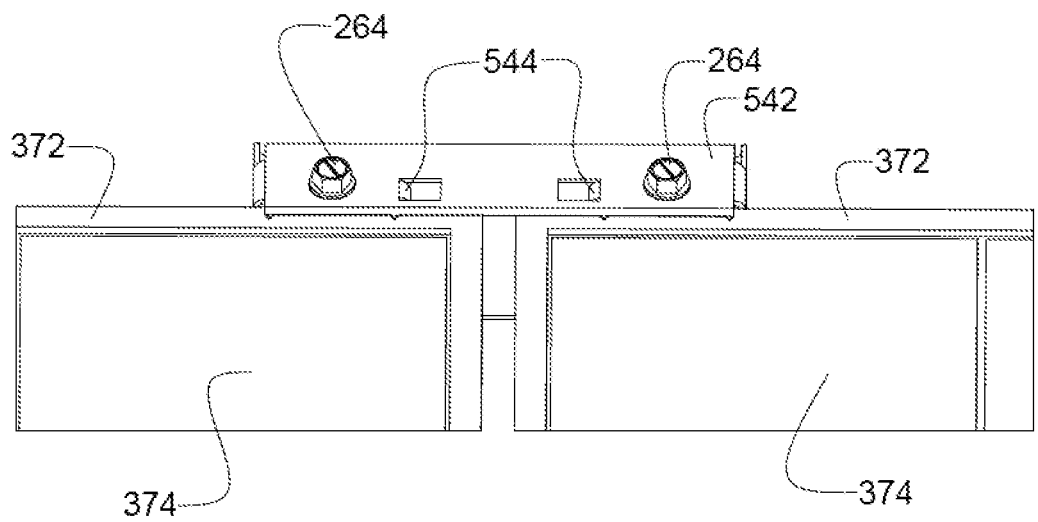
Figure 148:
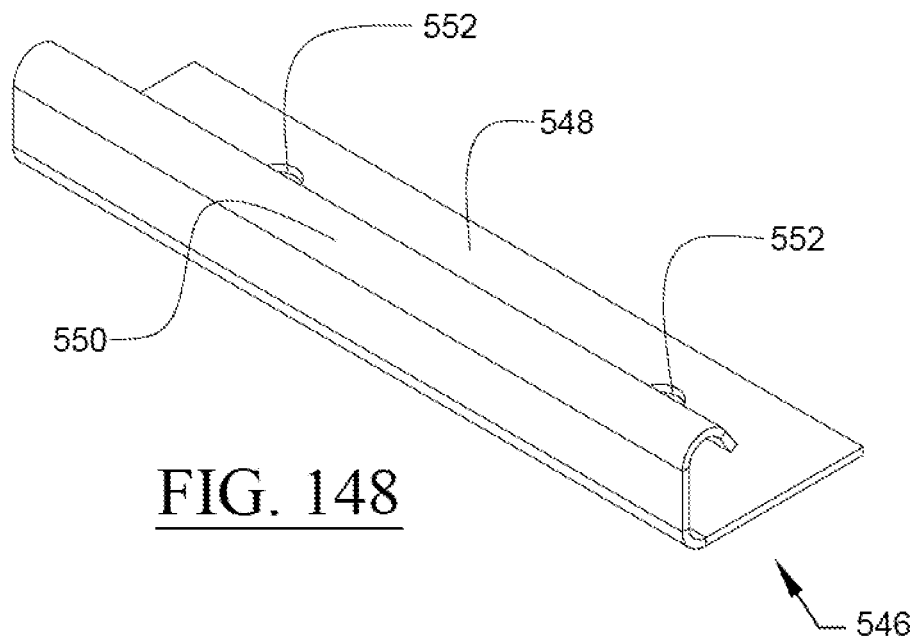
Figure 149:
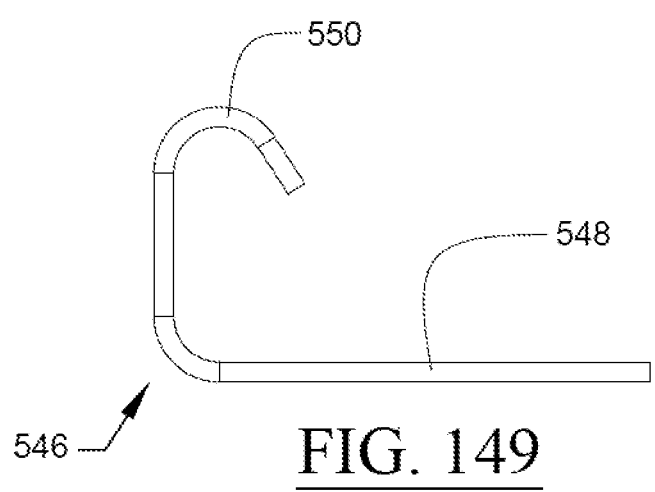
Figure 150:
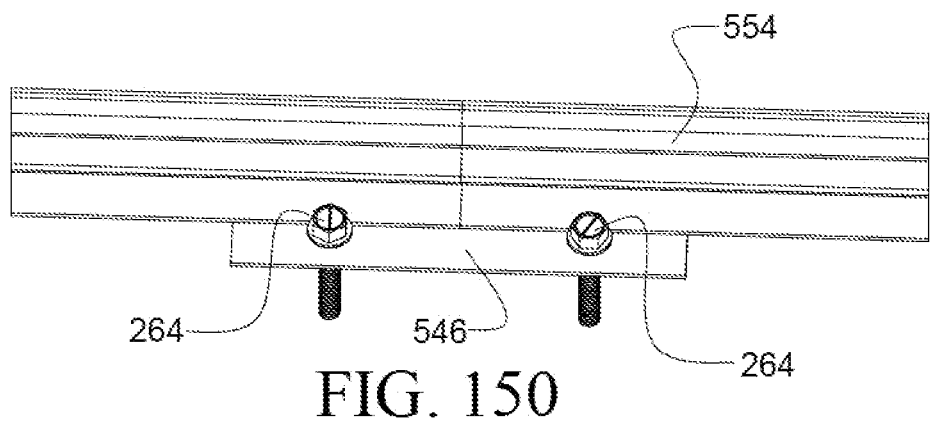
Figure 151:
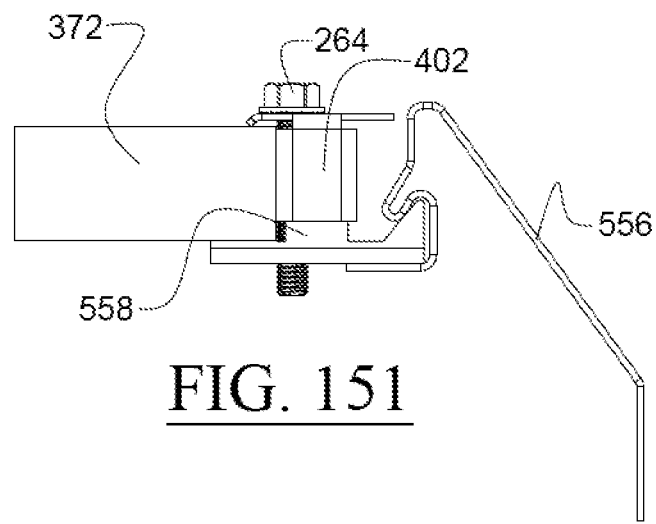
Figure 152:
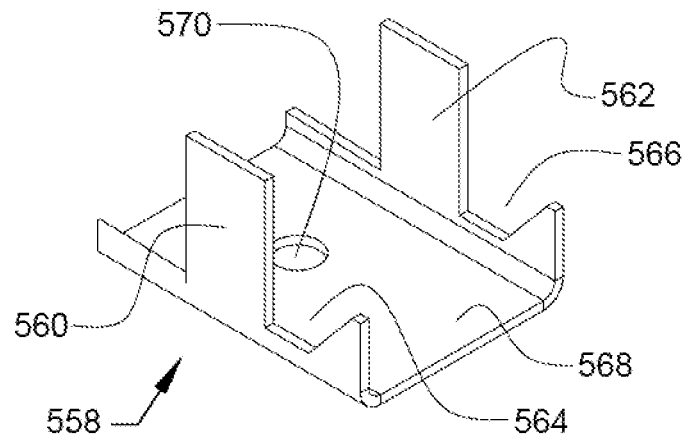
Figure 153:
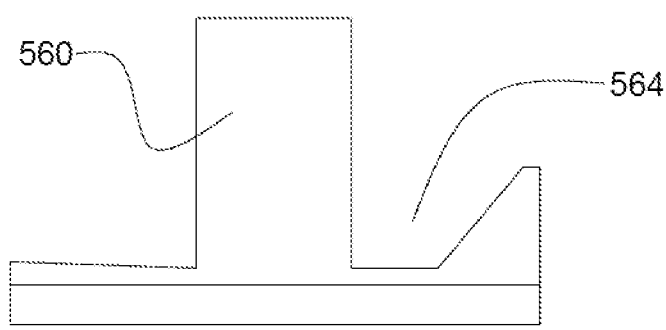
Figure 154:
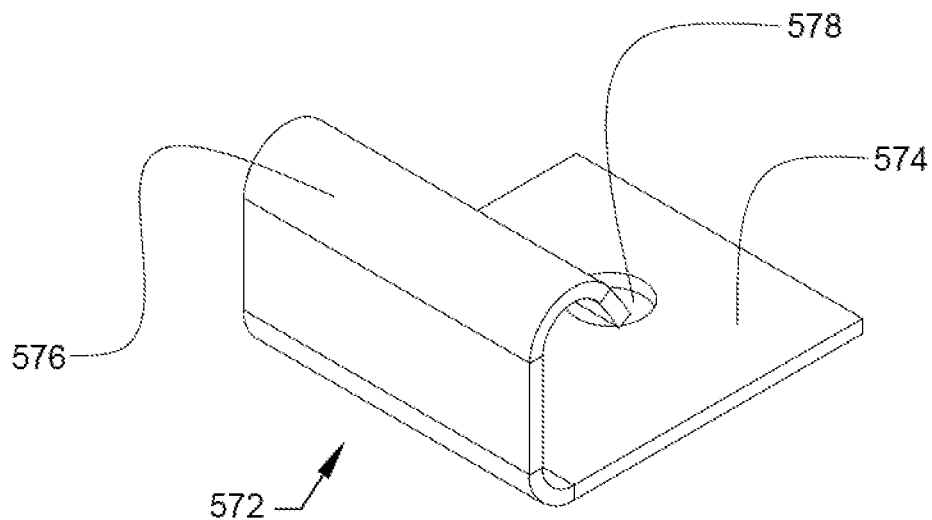
Figure 155:
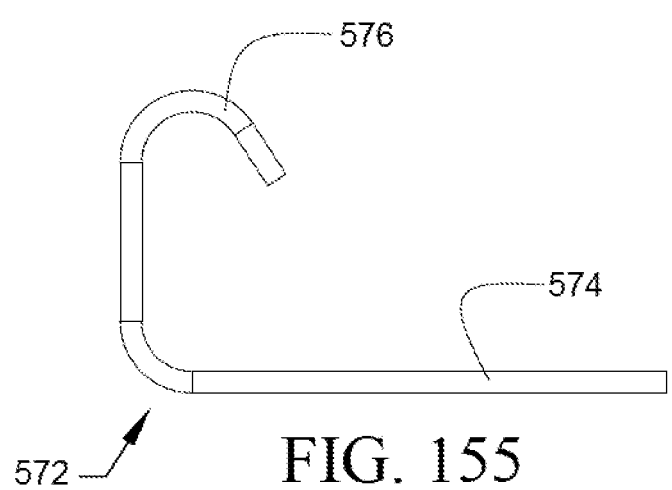
Figure 156:
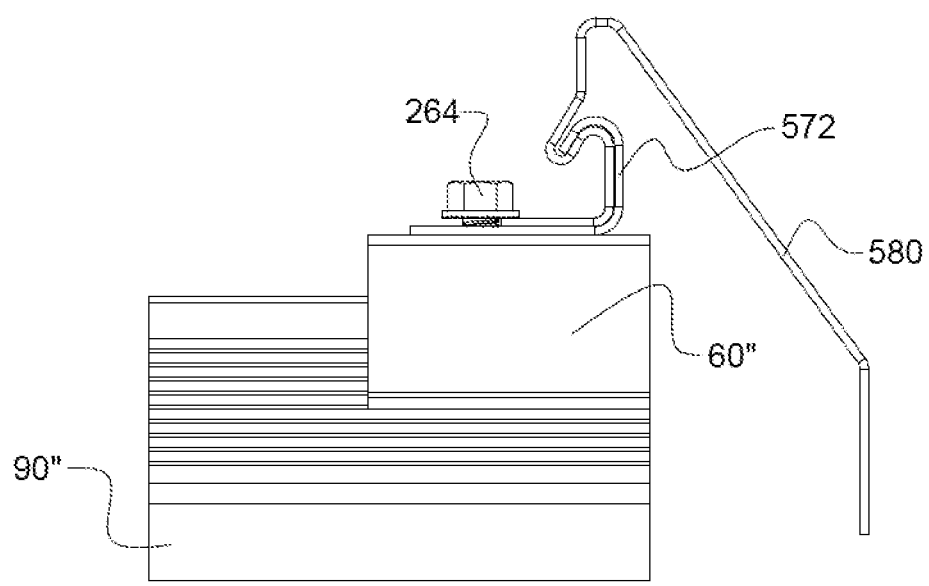
Figure 157:
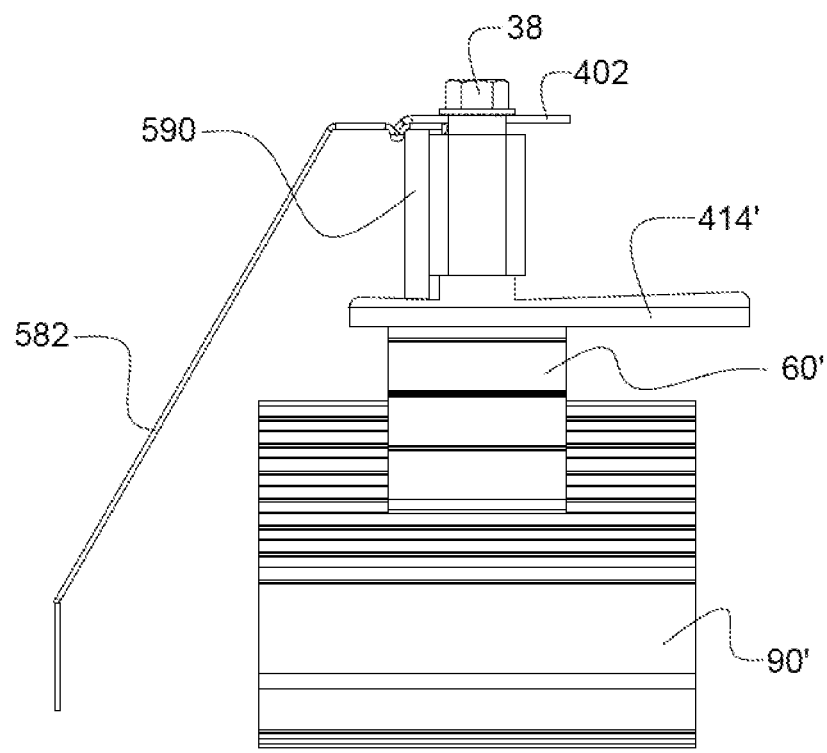
Figure 158:
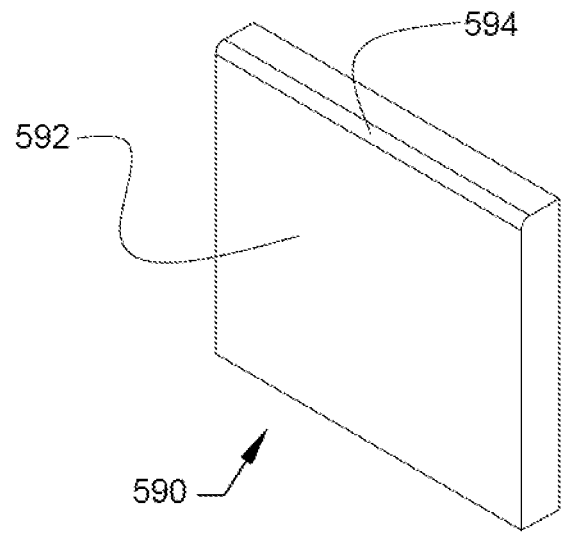
Figure 159:
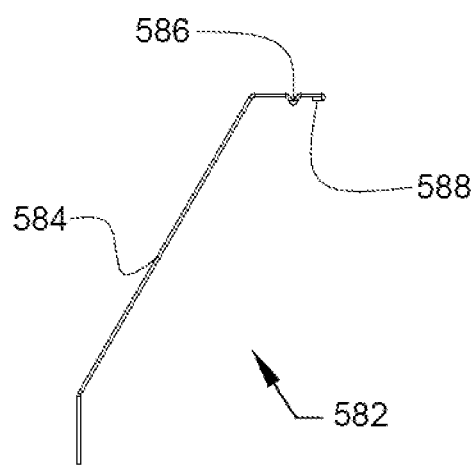
Figure 160:
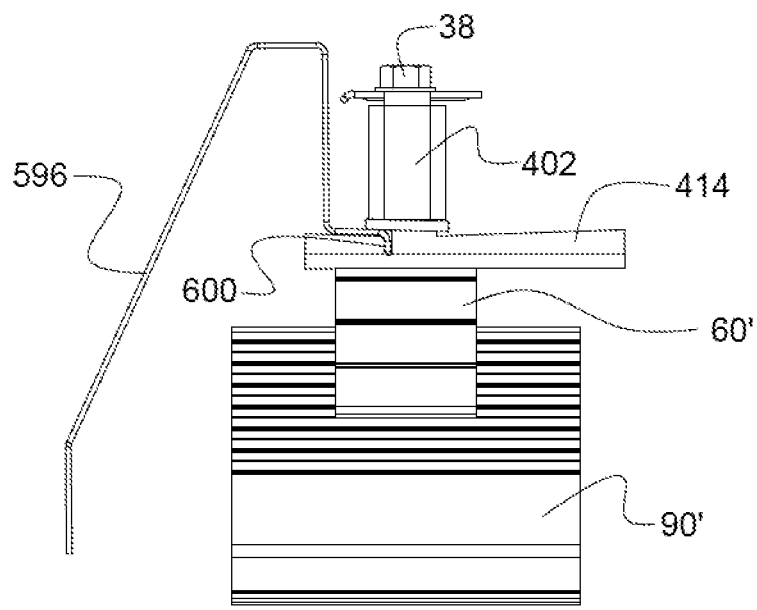
Figure 161:
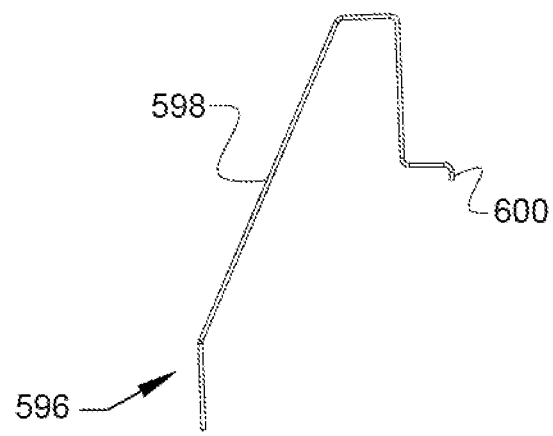
Figure 162:
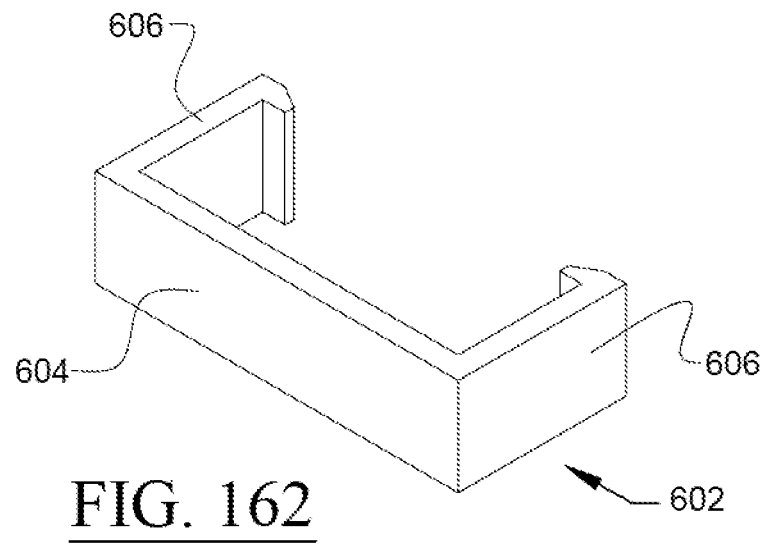
Figure 163:
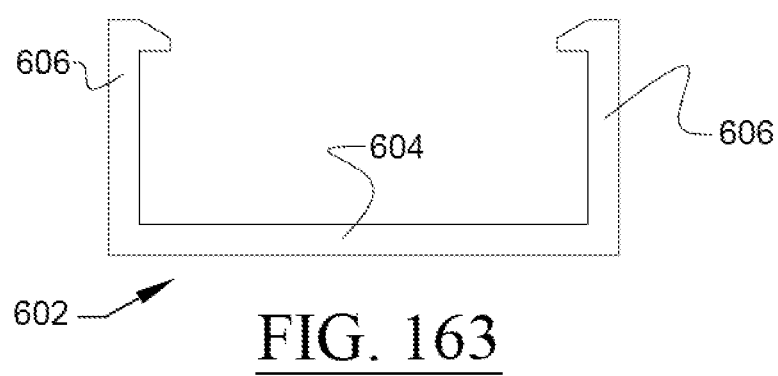
Figure 164:
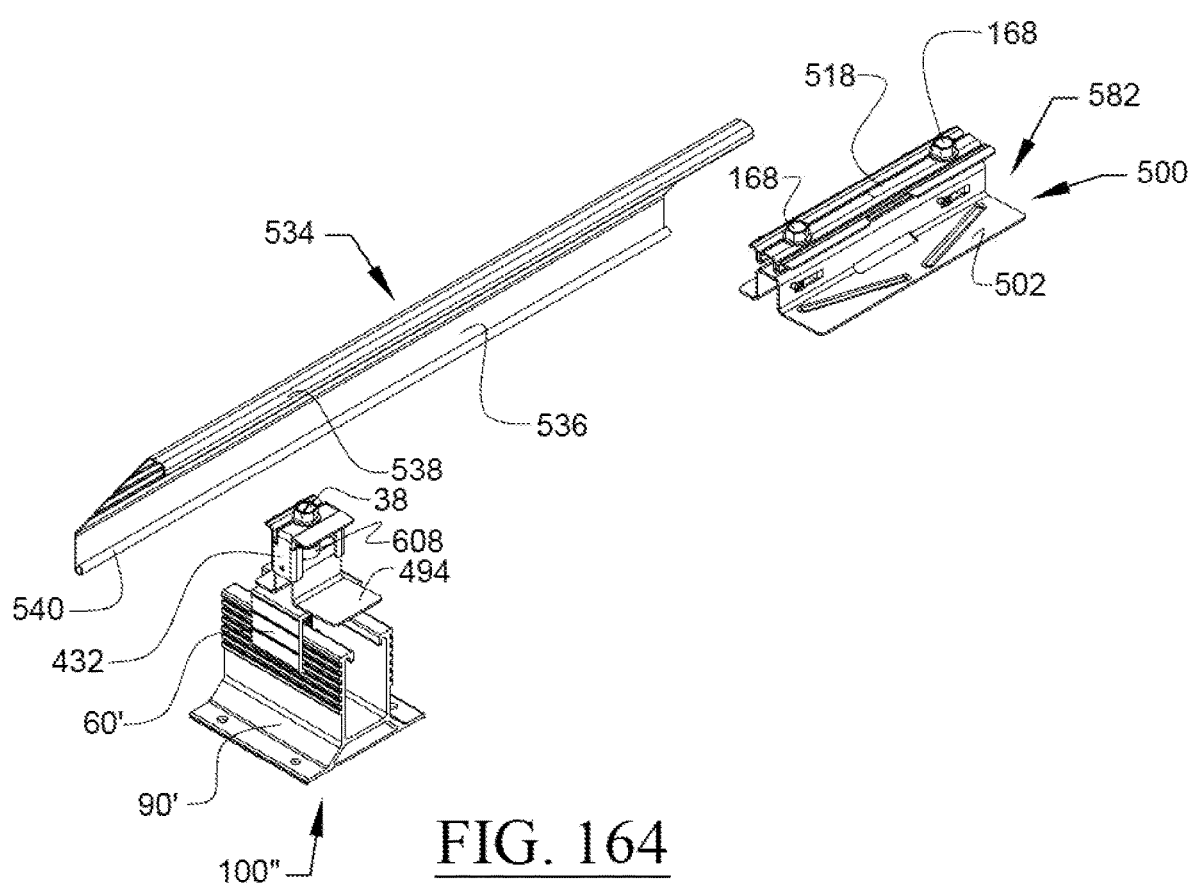
Figure 165:
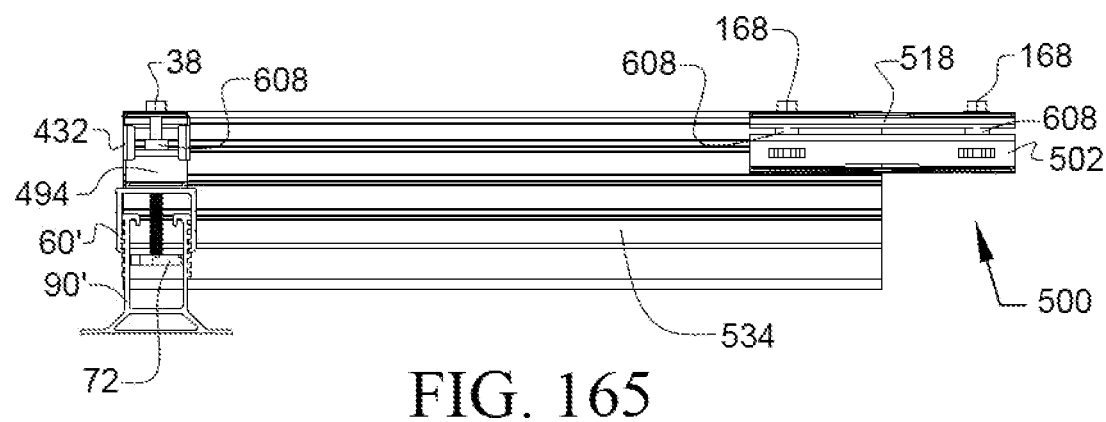
Figure 166:
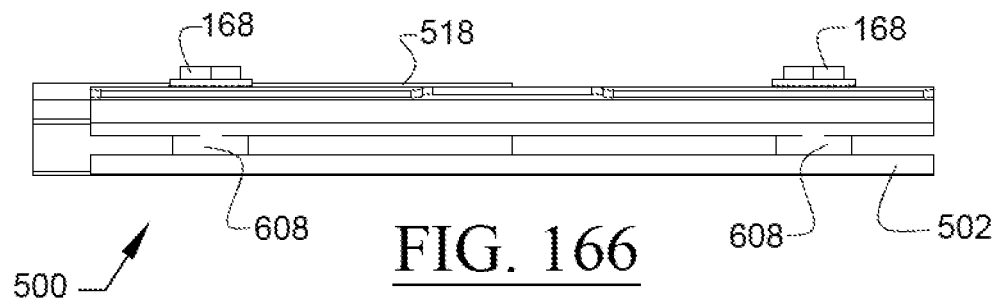
Figure 167:
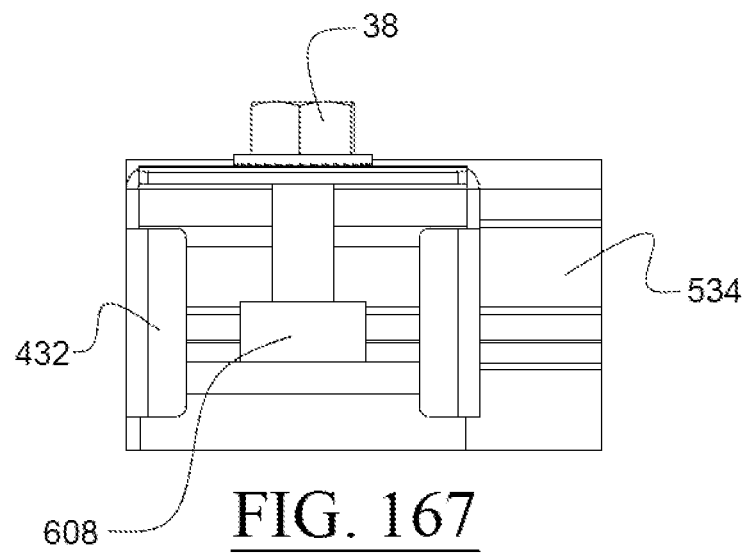
Figure 168:
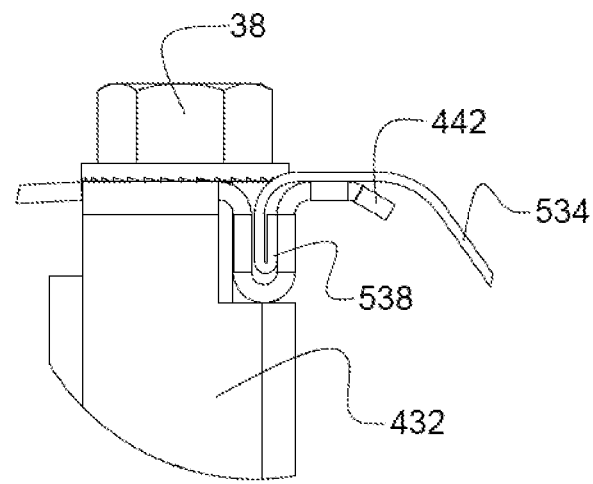
Figure 169:
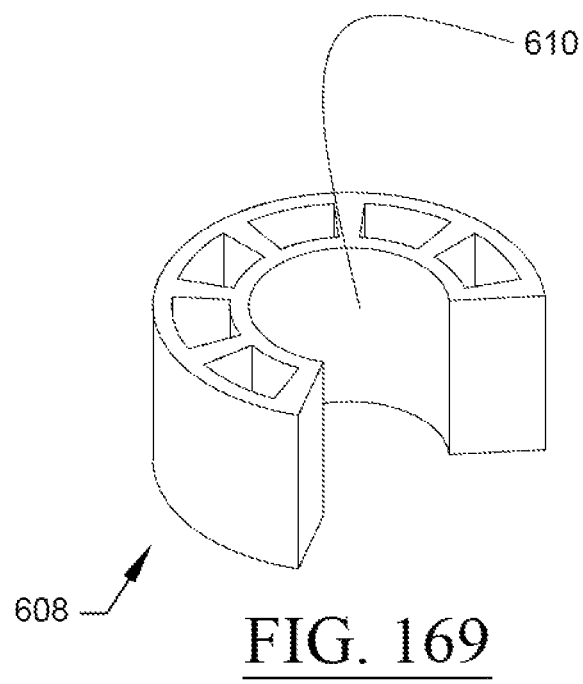
Figure 170:
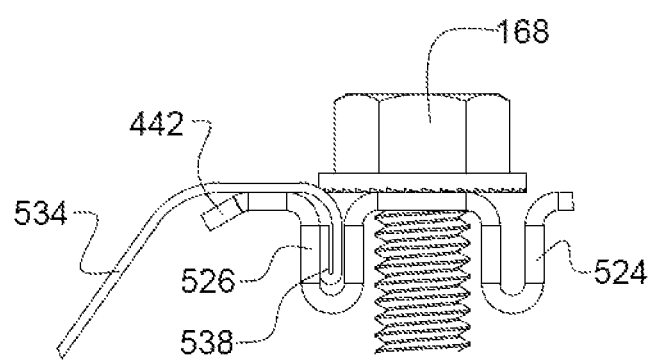
Figure 171:
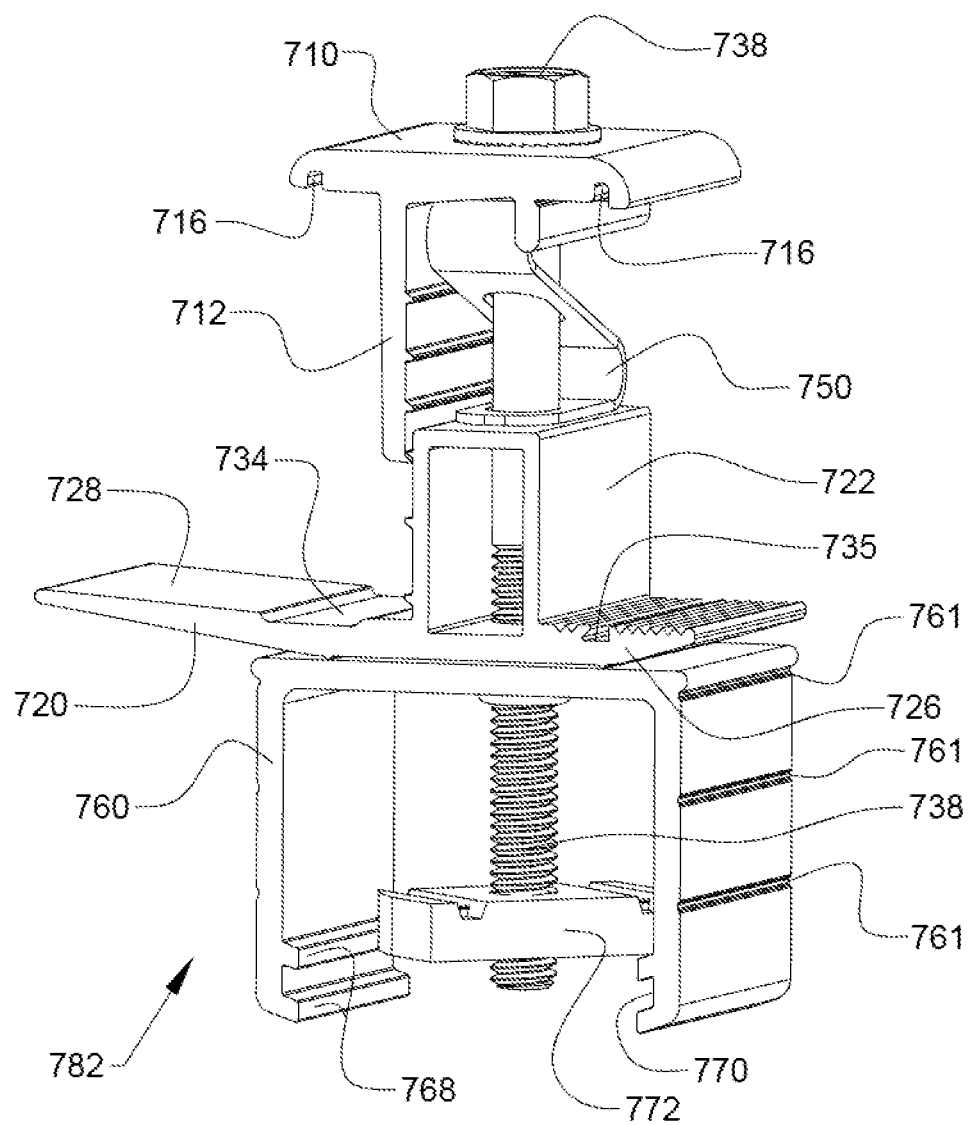
Figure 172:
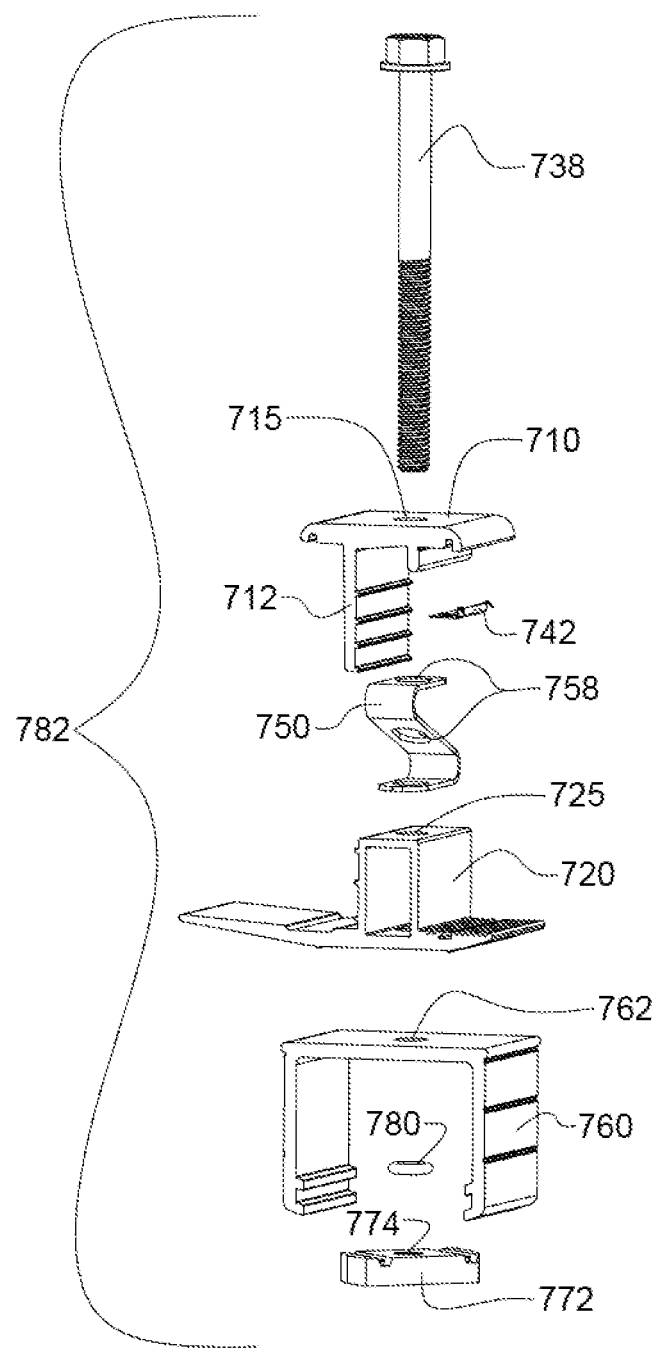
Figure 173:
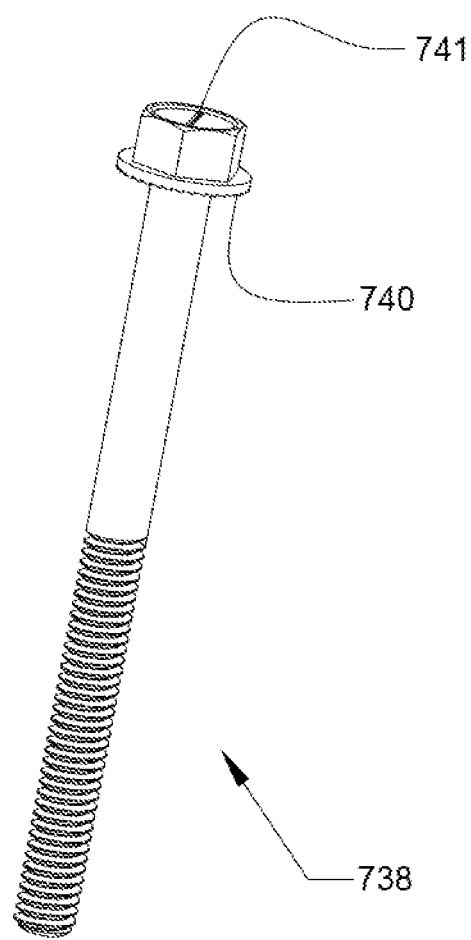
Figure 174:
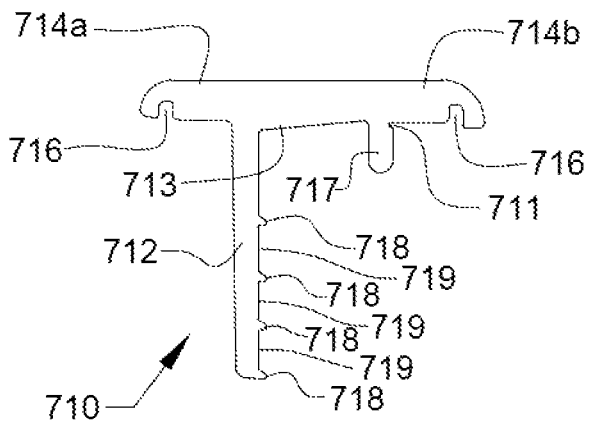
Figure 175:
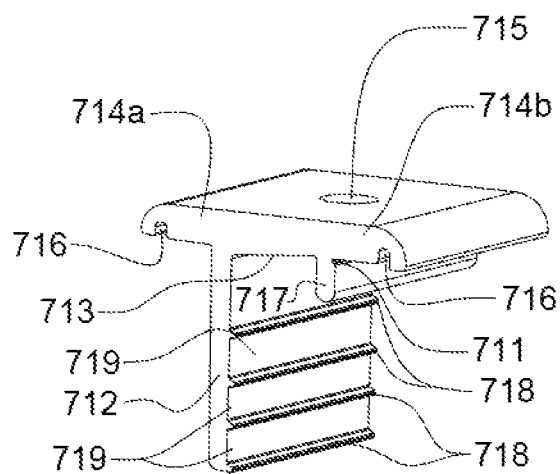
Figure 176:
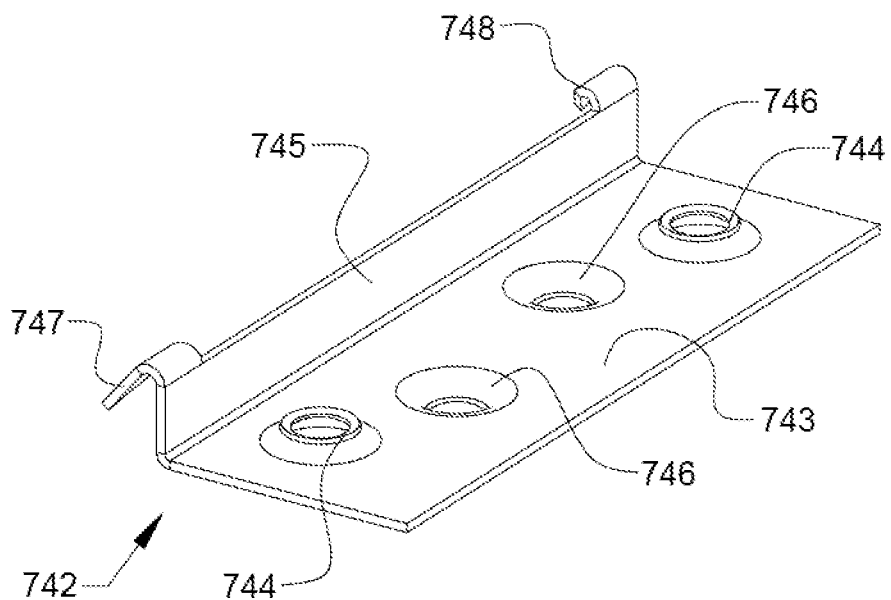
Figure 177:
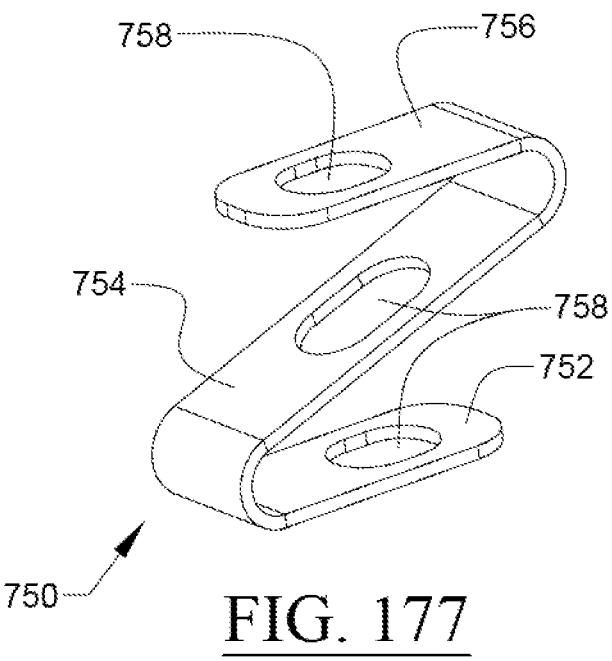
Figure 178:
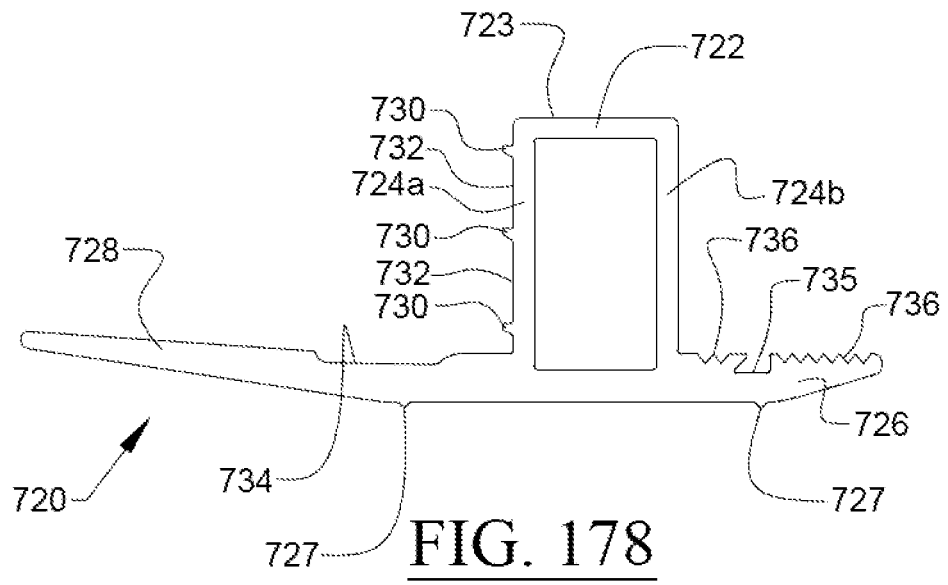
Figure 179:
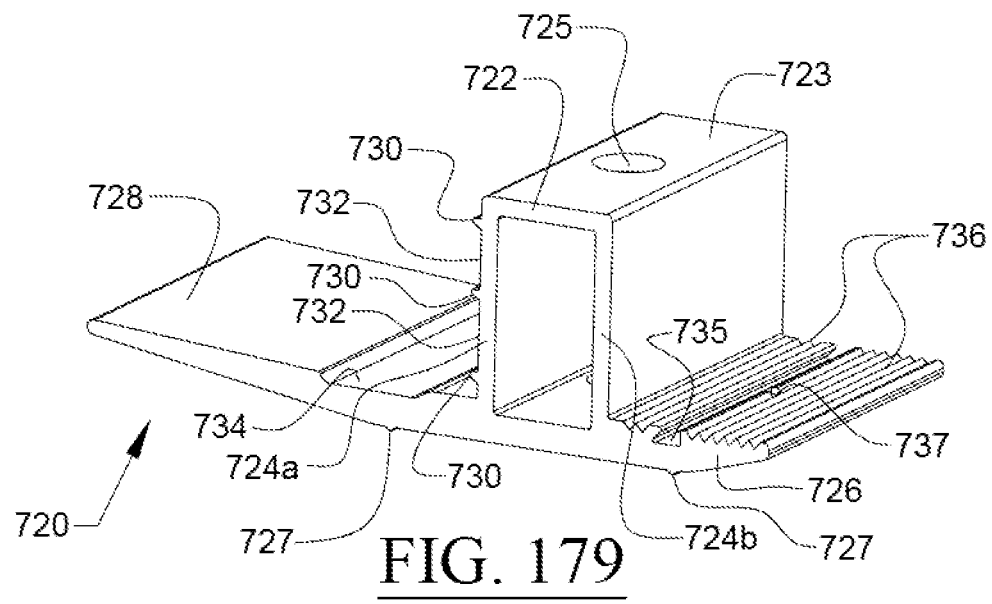
Figure 180:
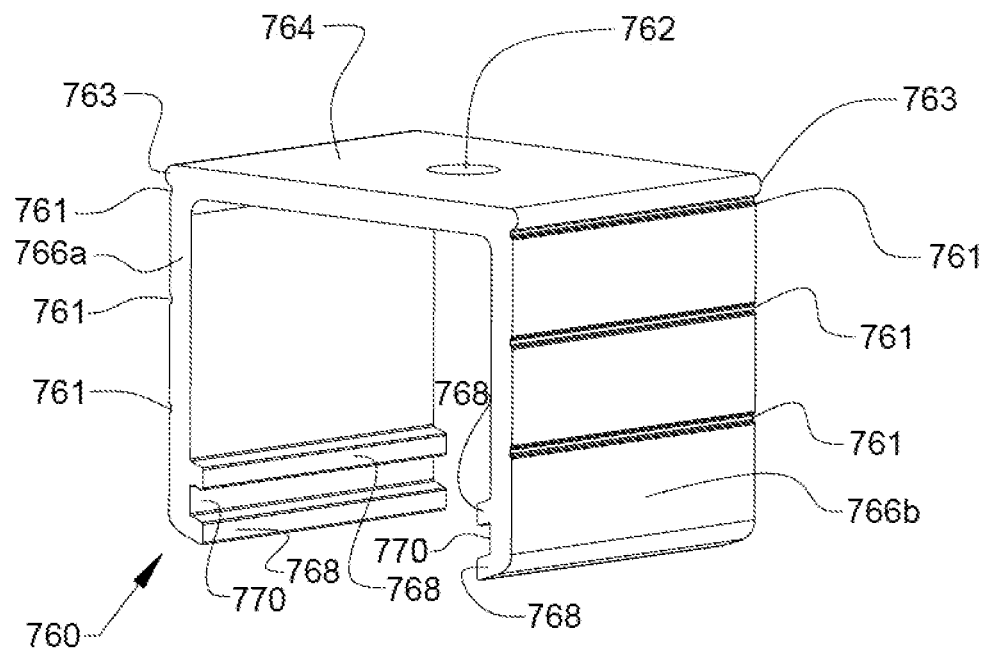
Figure 181:
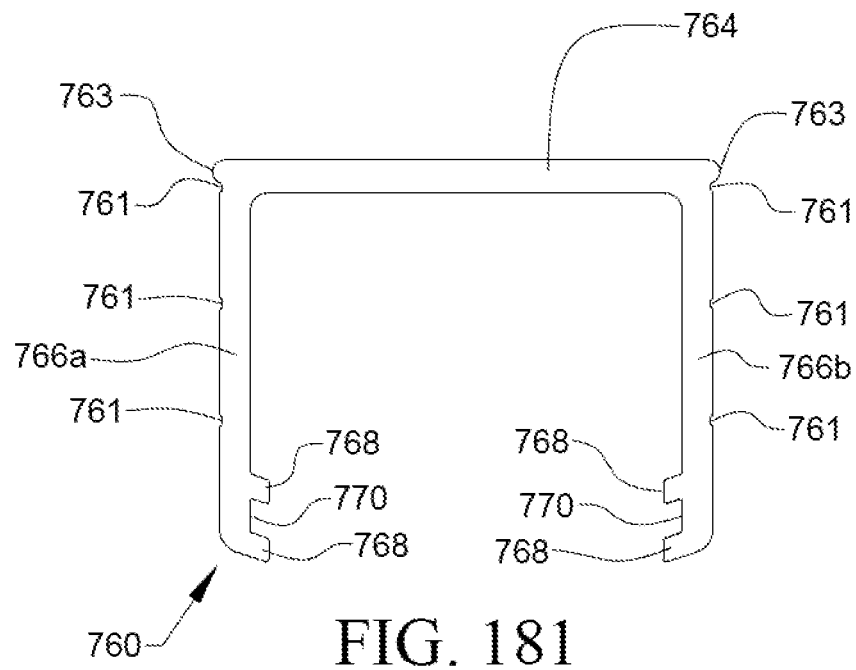
Figure 182:
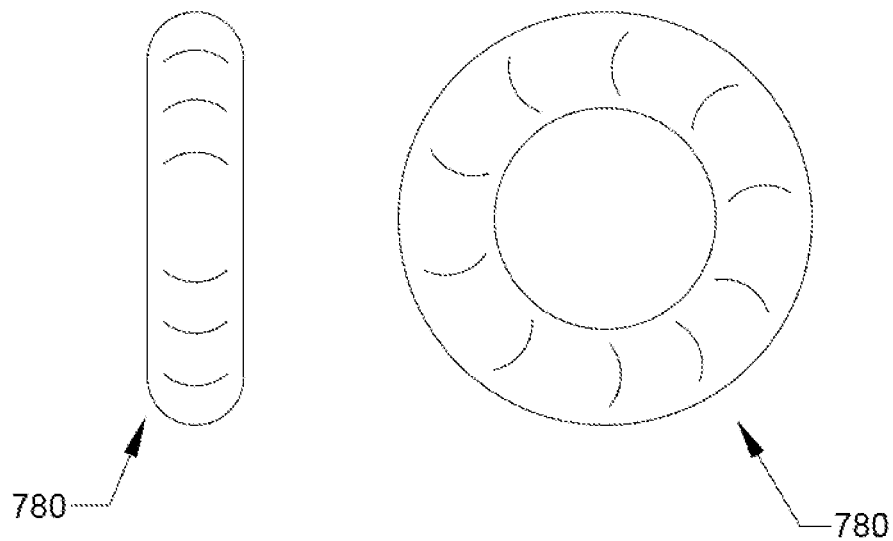
Figure 183:
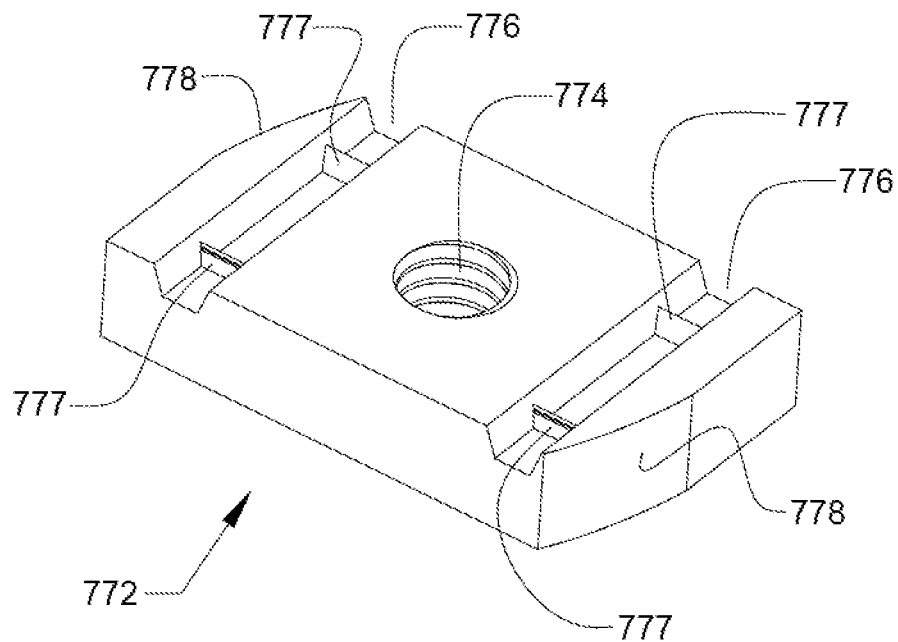
Figure 184:
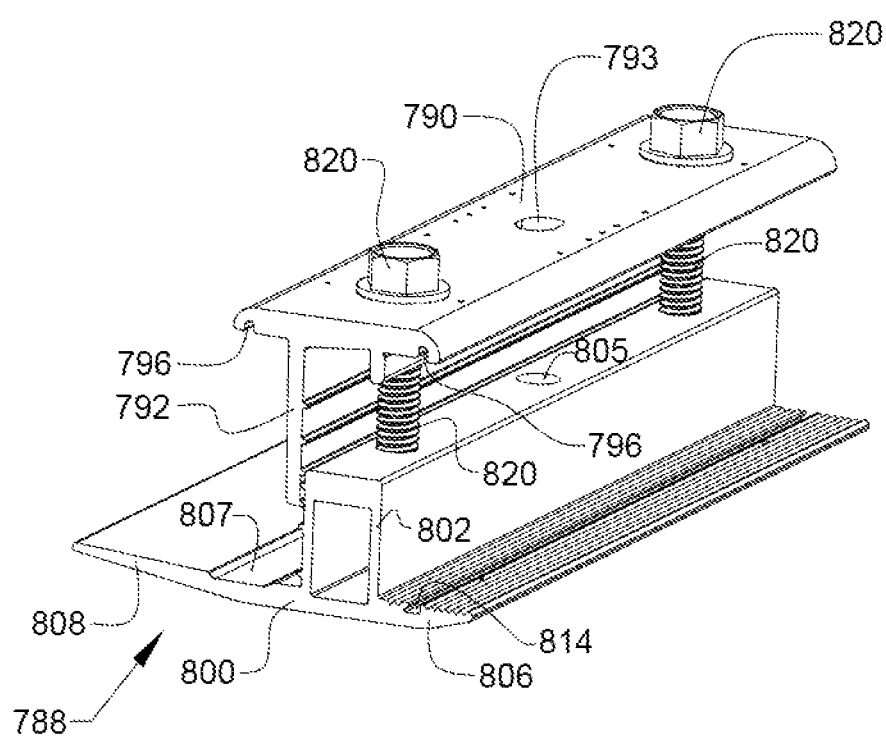
Figure 185:
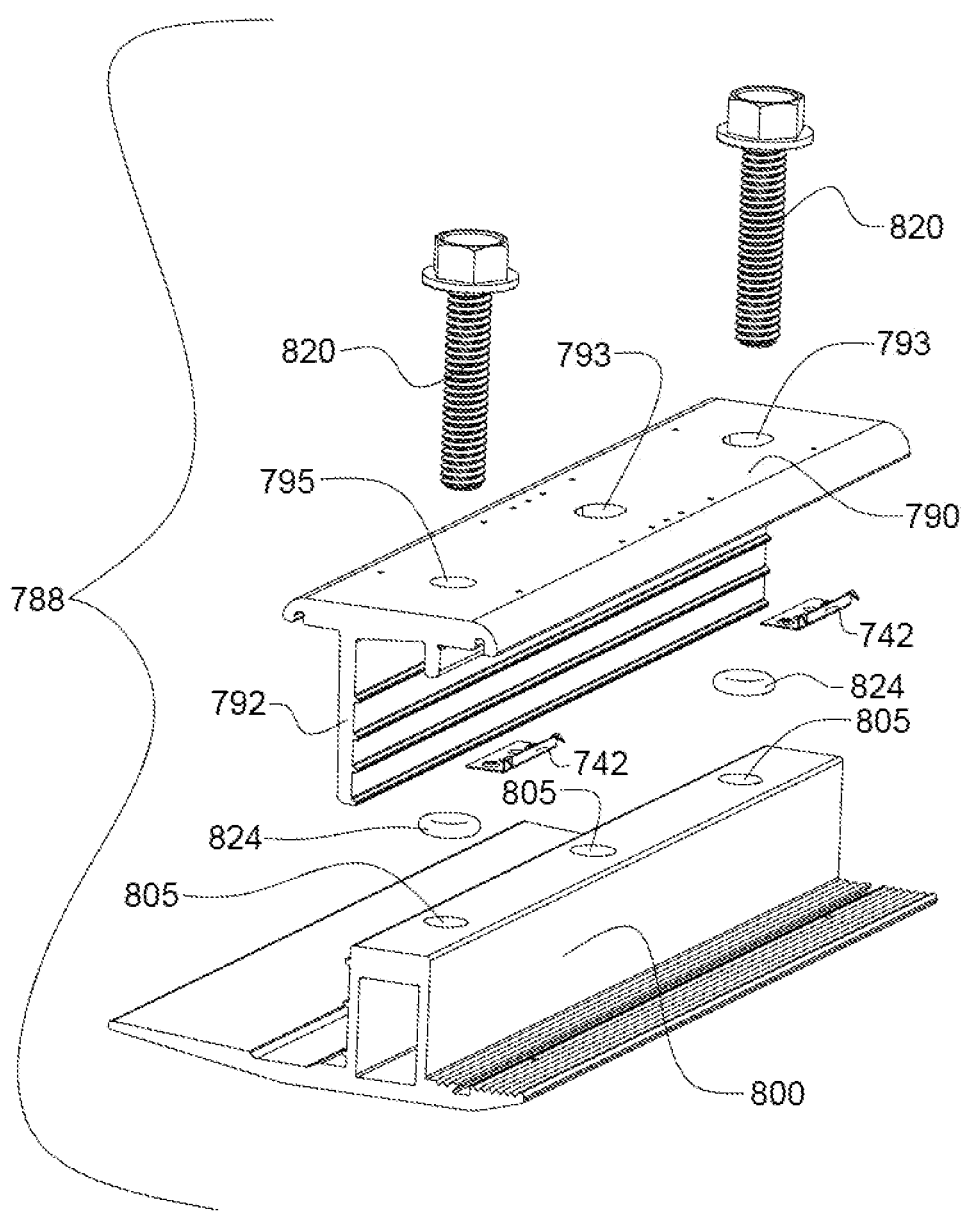
Figure 186:
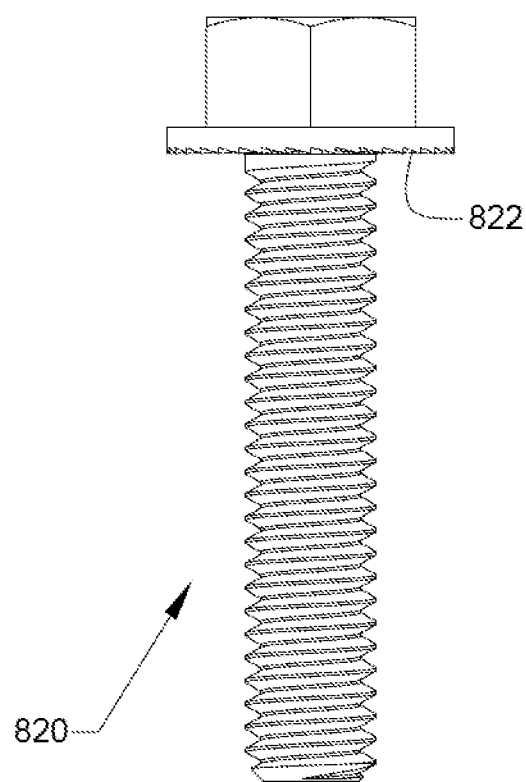
Figure 187:
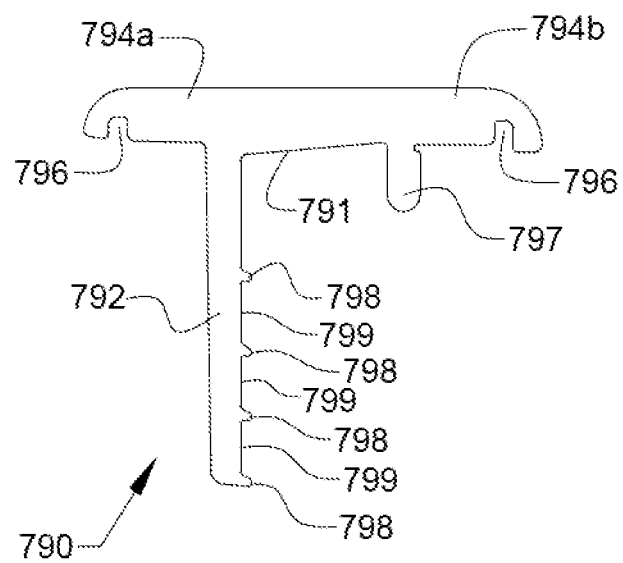
Figure 188:
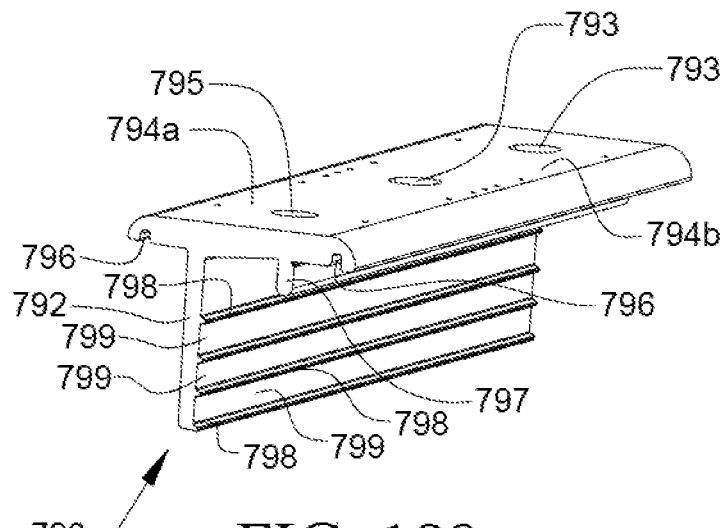
Figure 189:
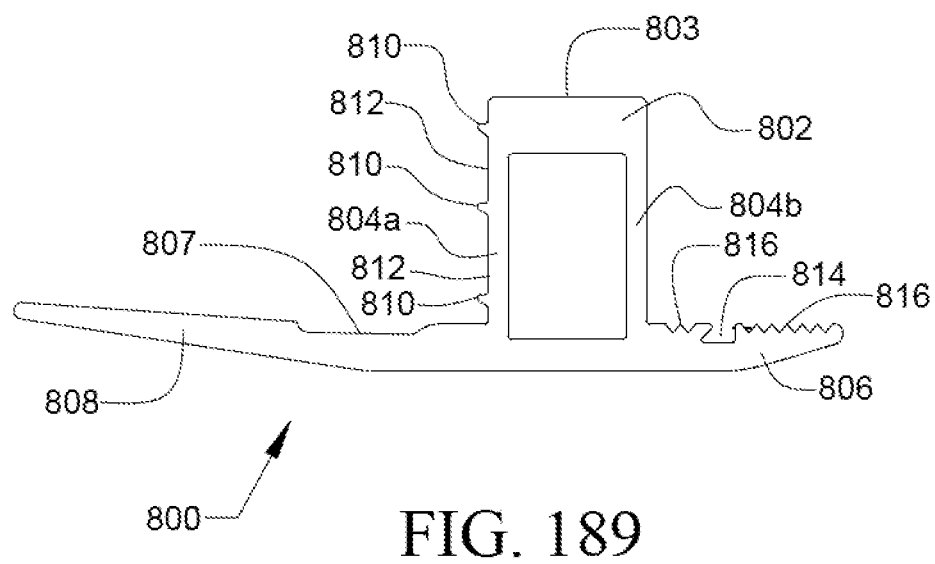
Figure 190:
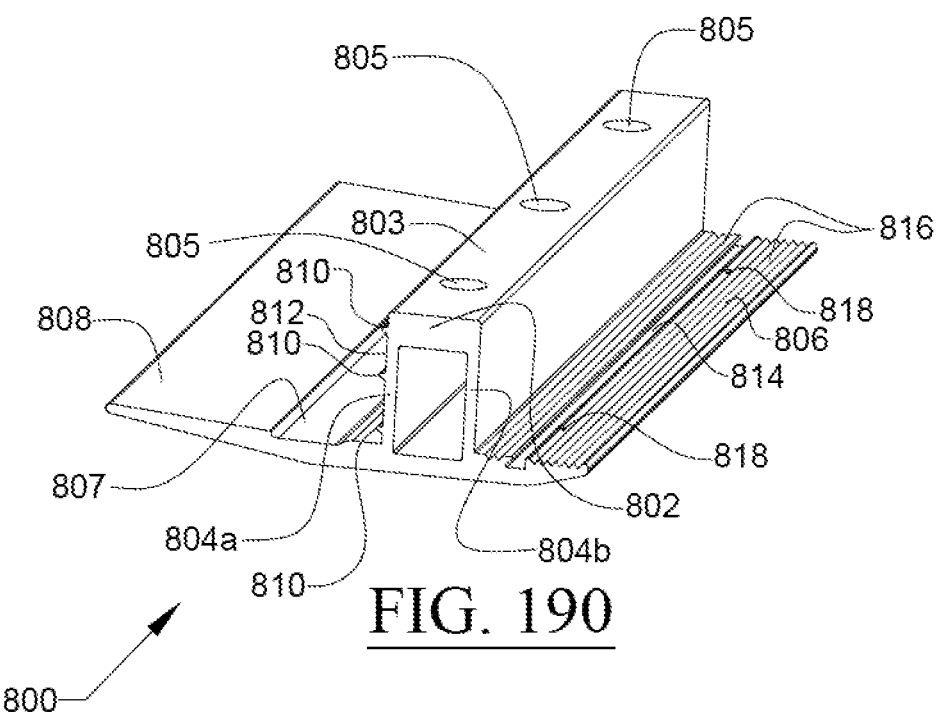
Figure 191:
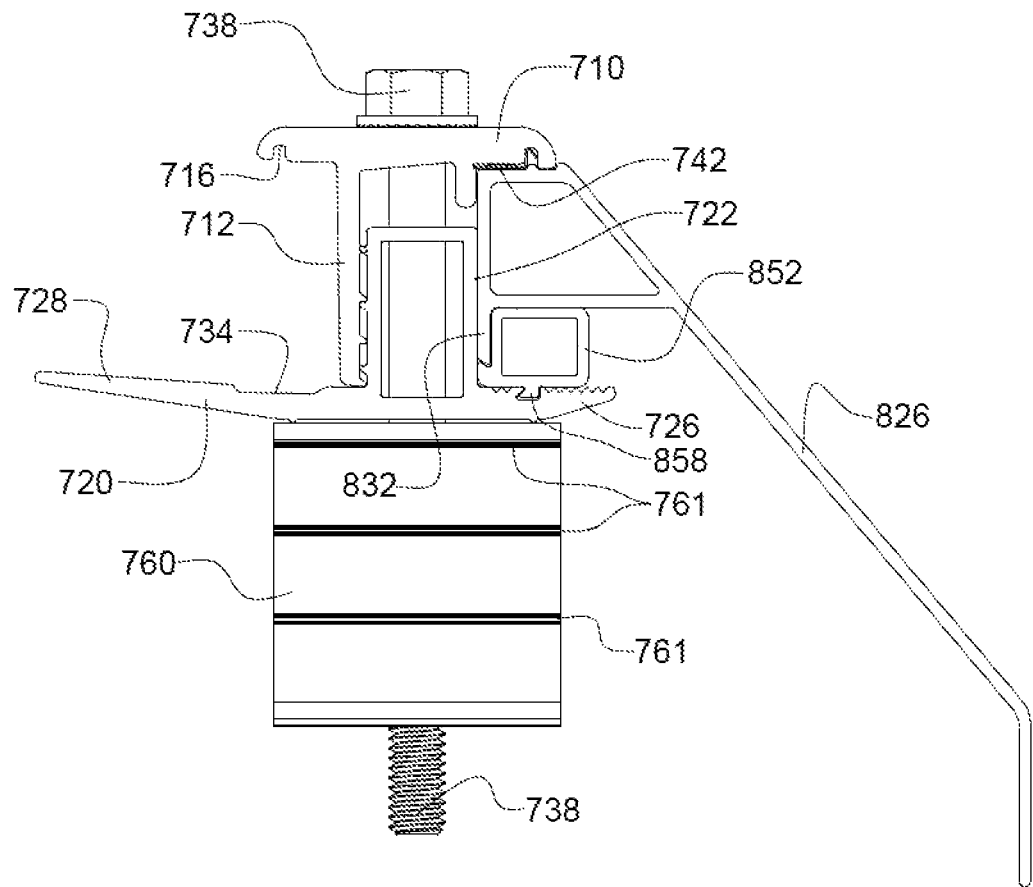
Figure 192:
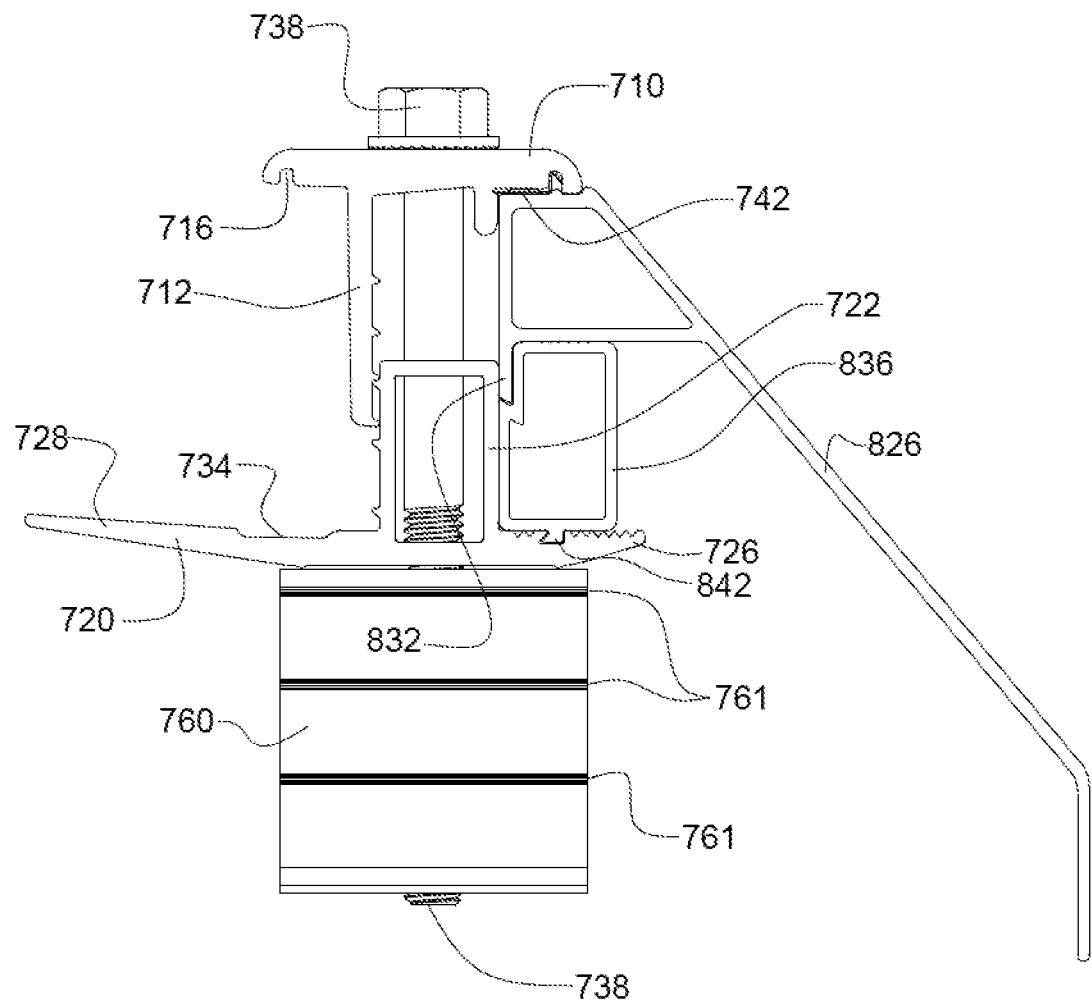
Figure 193:
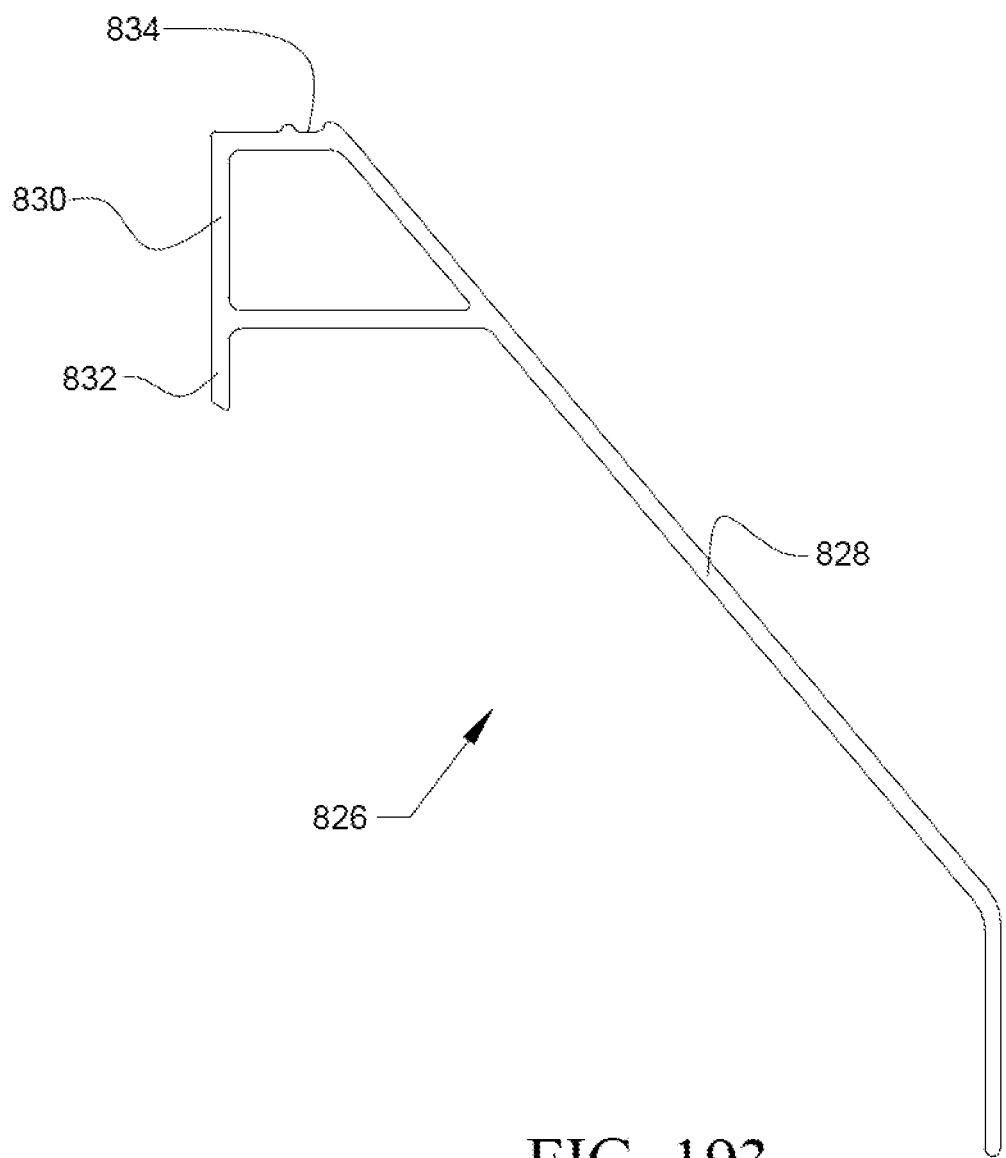
Figure 194:
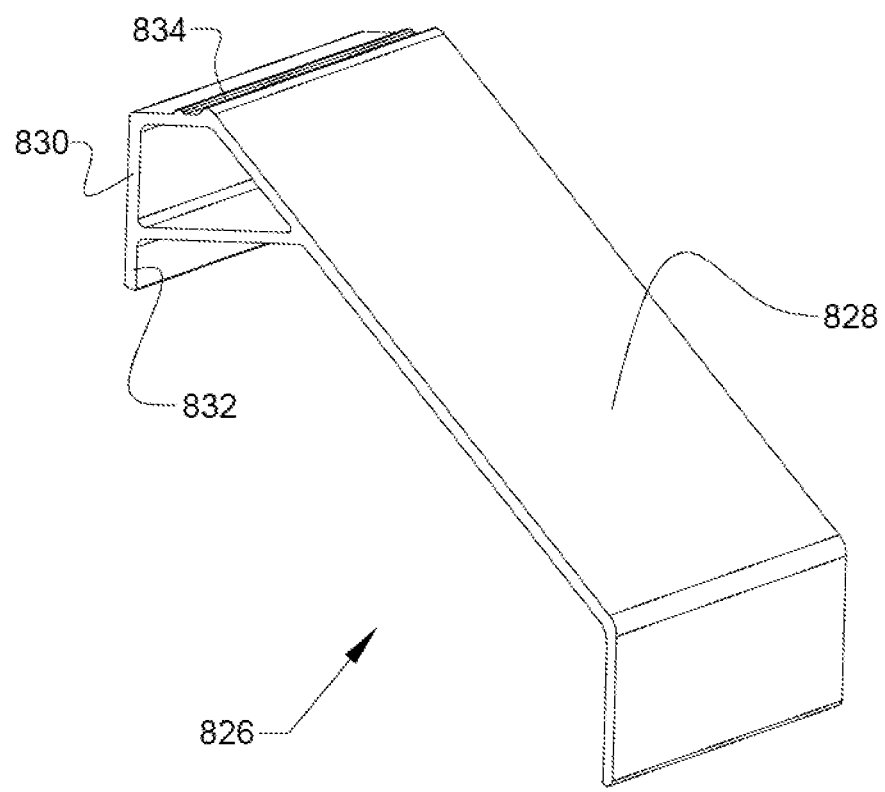
Figure 195:
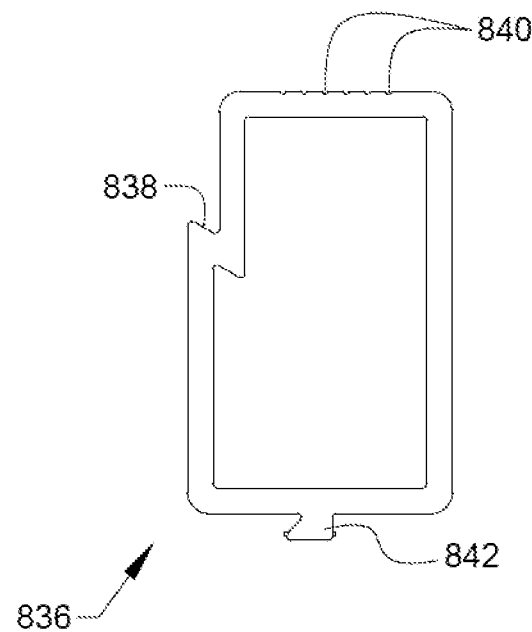
Figure 196:
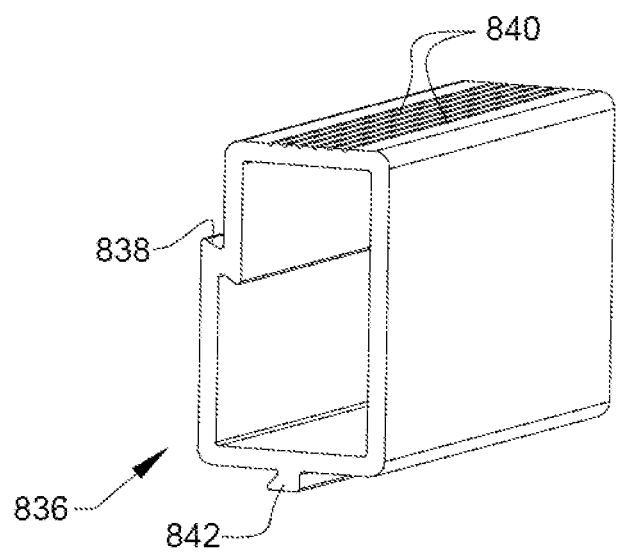
Figure 197:
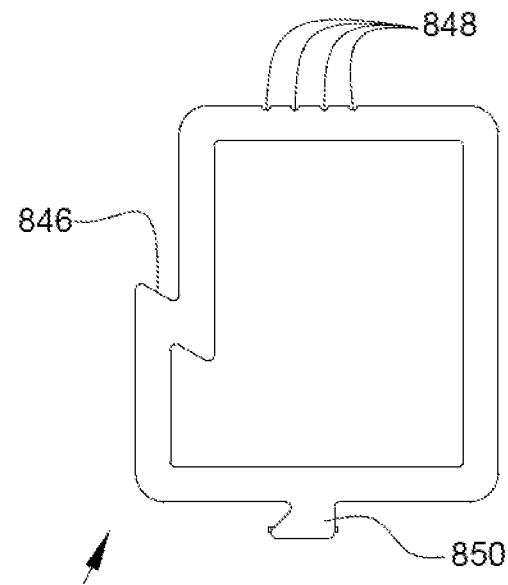
Figure 198:
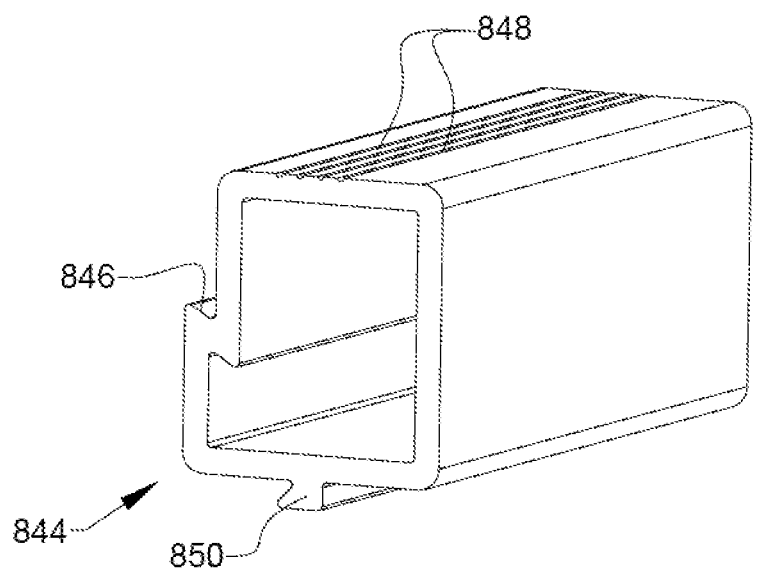
Figure 199:
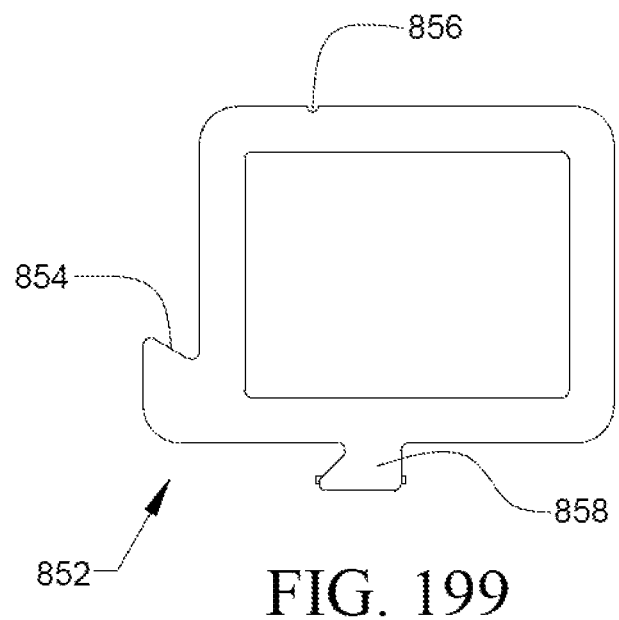
Figure 200:
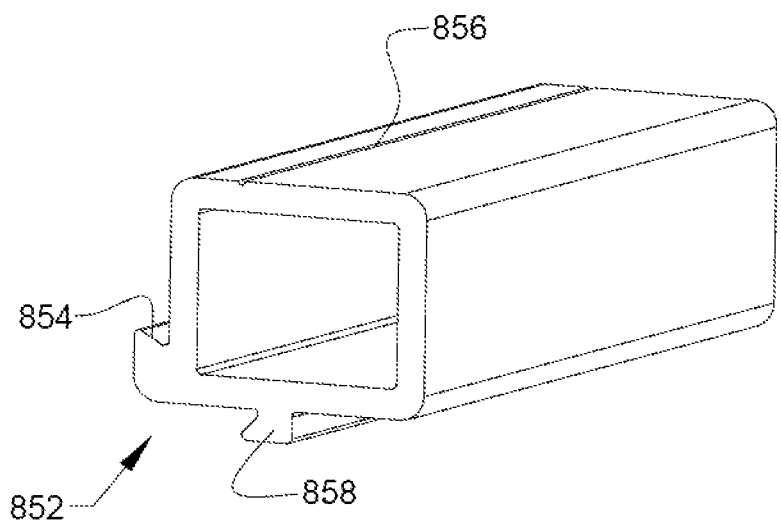

FIG. 126 is a top plan view of the upper clamp member of FIG. 123A;

FIG. 127 is an exploded perspective view of another coupling device, according to another embodiment of the invention;

FIG. 128 is a side view of the coupling device of FIG. 127, wherein the coupling device is in its assembled state;

FIG. 129 is an end view of the coupling device of FIG. 128;

FIG. 130 is a perspective view of the coupling device of FIG. 128;

FIG. 131 is a top plan view of the coupling device of FIG. 128;

FIG. 132 is a perspective view of the lower coupling member of the coupling device of FIG. 127;

FIG. 133 is a top plan view of the lower coupling member of FIG. 132;

FIG. 134 is a side view of the lower coupling member of FIG. 132;

FIG. 135 is an end view of the lower coupling member of FIG. 132;

FIG. 136 is a top plan view of the upper coupling member of the coupling device of FIG. 127;

FIG. 137 is an end view of the upper coupling member of FIG. 136;

FIG. 138 is a side view of the upper coupling member of FIG. 136;

FIG. 139A is a perspective view of the upper coupling member of FIG. 136;

FIG. 139B is an enlarged perspective view of two of the grounding protrusions and the skirt receiving grooves of the upper coupling member illustrated in the perspective view of FIG. 139A (Detail "G");

FIG. 140A is a rear perspective view illustrating a support surface attachment device with the clamp assembly of FIG. 94 together with the coupling device of FIG. 127 and a lower skirt member connected to the support surface attachment device and the coupling device;

FIG. 140B is an enlarged side view illustrating the securement of the skirt member in the skirt receiving groove of the upper clamp member of FIG. 140A;

FIG. 141A is an enlarged side view illustrating the securement of the skirt member in the skirt receiving groove of the upper coupling member of FIG. 140A;

FIG. 141B is a front perspective view of the support surface attachment device, coupling device, and lower skirt member of FIG. 140A;

FIG. 142 is an exploded perspective view of the support surface attachment device, coupling device, and lower skirt member of FIG. 140A, wherein the skirt member has been exploded from the support surface attachment device and the coupling device;

FIG. 143 is a rear perspective view of the lower skirt member illustrated in FIG. 140A;

FIG. 144 is a front view of the lower skirt member of FIG. 143;

FIG. 145A is an enlarged partial end view illustrating the hemmed upper edge portion of the lower skirt member of FIG. 143;

FIG. 145B is an end view of the lower skirt member of FIG. 143;

FIG. 145C is an enlarged partial end view illustrating the curled lower edge portion of the lower skirt member of FIG. 143;

FIG. 146 is a top plan view of the lower skirt member of FIG. 143;

FIG. 147 is a top perspective view illustrating another coupling device joining two adjacent photovoltaic modules to one another, according to another embodiment of the invention;

FIG. 148 is a perspective view of another lower coupling member, according to another embodiment of the invention, wherein the lower coupling member is configured to be used on the row of photovoltaic modules with the lower skirt member;

FIG. 149 is an end view of the lower coupling member of FIG. 148;

FIG. 150 is a top perspective view illustrating the lower coupling member of FIG. 148 joining two adjacent photovoltaic modules to one another;

FIG. 151 is a side view of another clamp assembly, according to another embodiment of the invention, wherein a lower skirt member is shown attached to the clamp assembly;

FIG. 152 is a perspective view of the lower clamp member of the clamp assembly of FIG. 151;

FIG. 153 is a side view of the lower clamp member of FIG. 152;

FIG. 154 is a perspective view of another lower clamp member, according to another embodiment of the invention, the lower clamp member being used for attaching a lower skirt member to a photovoltaic array;

FIG. 155 is a side view of the lower clamp member of FIG. 154;

FIG. 156 is an end view of a lower skirt member attached to a support surface attachment device, wherein the lower clamp member of FIG. 154 is being used to secure the lower skirt member to the support surface attachment device;

FIG. 157 is an end view of a lower skirt member attached to a support surface attachment device, wherein the support surface attachment device comprises a clamp assembly similar to that illustrated in FIG. 89, and wherein a spacer member is being used to hold the clamp assembly open;

FIG. 158 is a perspective view of the spacer member utilized in the assembly of FIG. 157;

FIG. 159 is an end view of the lower skirt member utilized in the assembly of FIG. 157;

FIG. 160 is an end view of a lower skirt member attached to a support surface attachment device, wherein the support surface attachment device comprises the clamp assembly of FIG. 89;

FIG. 161 is an end view of the lower skirt member utilized in the assembly of FIG. 160;

FIG. 162 is a perspective view of another spacer member utilized in the clamp assemblies described herein, according to another embodiment of the invention;

FIG. 163 is a side view of the spacer member of FIG. 162;

FIG. 164 is another exploded perspective view of the support surface attachment device, coupling device, and lower skirt member of FIG. 140A, wherein the skirt member has been exploded from the support surface attachment device and the coupling device;

FIG. 165 is a rear elevational view of the support surface attachment device, coupling device, and lower skirt member of FIG. 164;

FIG. 166 is a side view of the coupling device of FIG. 164, wherein spacer members are provided in the coupling device for holding the coupling device open;

FIG. 167 is an end view of the clamp assembly of FIG. 164 illustrating the spacer member in the clamp assembly for holding the clamp assembly open;

FIG. 168 is an enlarged side view illustrating the securement of the skirt member in the skirt receiving groove of the upper clamp member of FIG. 164;

FIG. 169 is a perspective view of yet another spacer member utilized in the clamp assemblies described herein, according to yet another embodiment of the invention;

FIG. 170 is an enlarged side view illustrating the securement of the skirt member in the skirt receiving groove of the upper coupling member of FIG. 164;

FIG. 171 is a perspective view of yet another clamp assembly of a support surface attachment device of a photovoltaic mounting system, according to yet another embodiment of the invention, wherein the clamp assembly is illustrated in an assembled state;

FIG. 172 is another perspective view of the clamp assembly of the support surface attachment device of FIG. 171, wherein the components of the clamp assembly are shown exploded from one another;

FIG. 173 is a perspective view of a fastener member of the clamp assembly of FIG. 171;

FIG. 174 is a side elevational view of an upper clamp member of the clamp assembly of FIG. 171;

FIG. 175 is a perspective view of the upper clamp member of the clamp assembly of FIG. 171;

FIG. 176 is a perspective view of a bonding clip of the clamp assembly of FIG. 171;

FIG. 177 is a perspective view of a spring member of the clamp assembly of FIG. 171;

FIG. 178 is a side elevational view of a lower clamp member of the clamp assembly of FIG. 171;

FIG. 179 is a perspective view of the lower clamp member of the clamp assembly of FIG. 171;

FIG. 180 is a perspective view of a glider member of the clamp assembly of FIG. 171;

FIG. 181 is a side elevational view of the glider member of the clamp assembly of FIG. 171;

FIG. 182 illustrates a side view and top view of an O-ring of the clamp assembly of FIG. 171;

FIG. 183 is a top perspective view of a strut nut of the clamp assembly of FIG. 171;

FIG. 184 is a perspective view of yet another coupling device of a photovoltaic mounting system, according to yet another embodiment of the invention, wherein the coupling device is illustrated in an assembled state;

FIG. 185 is another perspective view of the coupling device of FIG. 184, wherein the components forming the coupling device are shown exploded from one another;

FIG. 186 is a side view of a fastener member of the coupling device of FIG. 184;

FIG. 187 is an end view of an upper coupling member of the coupling device of FIG. 184;

FIG. 188 is a perspective view of the upper coupling member of the coupling device of FIG. 184;

FIG. 189 is an end view of the lower coupling member of the coupling device of FIG. 184;

FIG. 190 is a perspective view of the lower coupling member of the coupling device of FIG. 184;

FIG. 191 is an end view illustrating the clamp assembly of FIG. 171 together with a skirt member and a skirt spacer member that are secured within the clamp assembly, the skirt spacer member of FIG. 191 being configured to accommodate a first photovoltaic module thickness;

FIG. 192 is an end view illustrating the clamp assembly of FIG. 171 together with the skirt member and another skirt spacer member that are secured within the clamp assembly, the skirt spacer member of FIG. 192 being configured to accommodate a second photovoltaic module thickness;

FIG. 193 is an end view of the skirt member depicted in FIGS. 191 and 192;

FIG. 194 is a perspective view of the skirt member depicted in FIGS. 191 and 192;

FIG. 195 is an end view of a first skirt spacer member configured to accommodate photovoltaic modules having a first thickness;

FIG. 196 is a perspective view of the first skirt spacer member illustrated in FIG. 195;

FIG. 197 is an end view of a second skirt spacer member configured to accommodate photovoltaic modules having a second thickness;

FIG. 198 is a perspective view of the second skirt spacer member illustrated in FIG. 197;

FIG. 199 is an end view of a third skirt spacer member configured to accommodate photovoltaic modules having a third thickness; and FIG. 200 is a perspective view of the third skirt spacer member illustrated in FIG. 199.

Throughout the figures, the same parts are always denoted using the same reference characters so that, as a general rule, they will only be described once.

DETAILED DESCRIPTION OF EMBODIMENTS OF THE INVENTION

Figure 1:
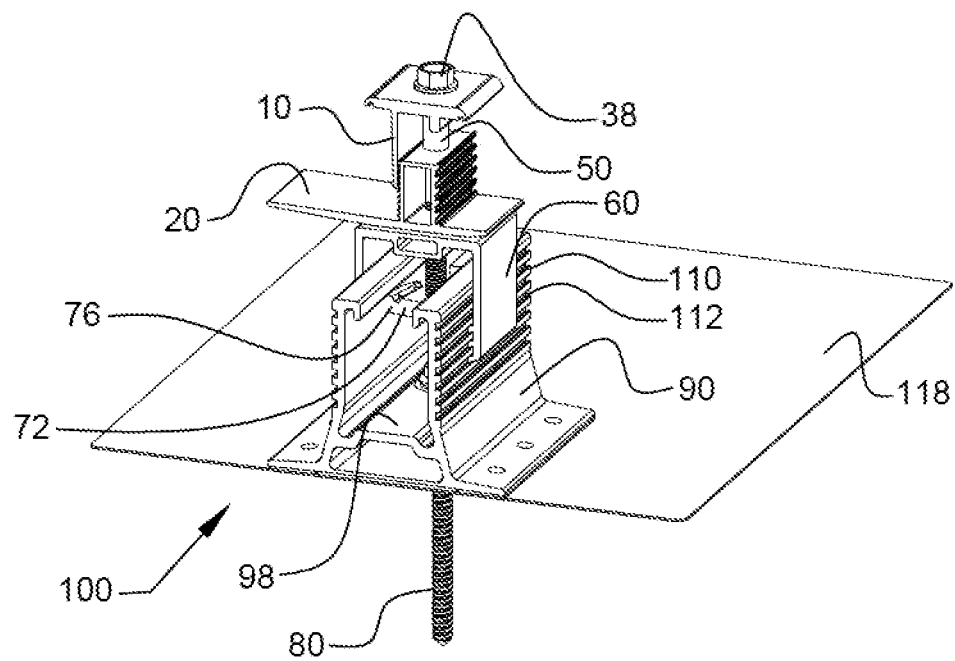
FIG. 1 is a perspective view of a support surface attachment device of a photovoltaic mounting system, according to a first embodiment of the invention, wherein the support surface attachment device is illustrated in an assembled state.
Figure 2:
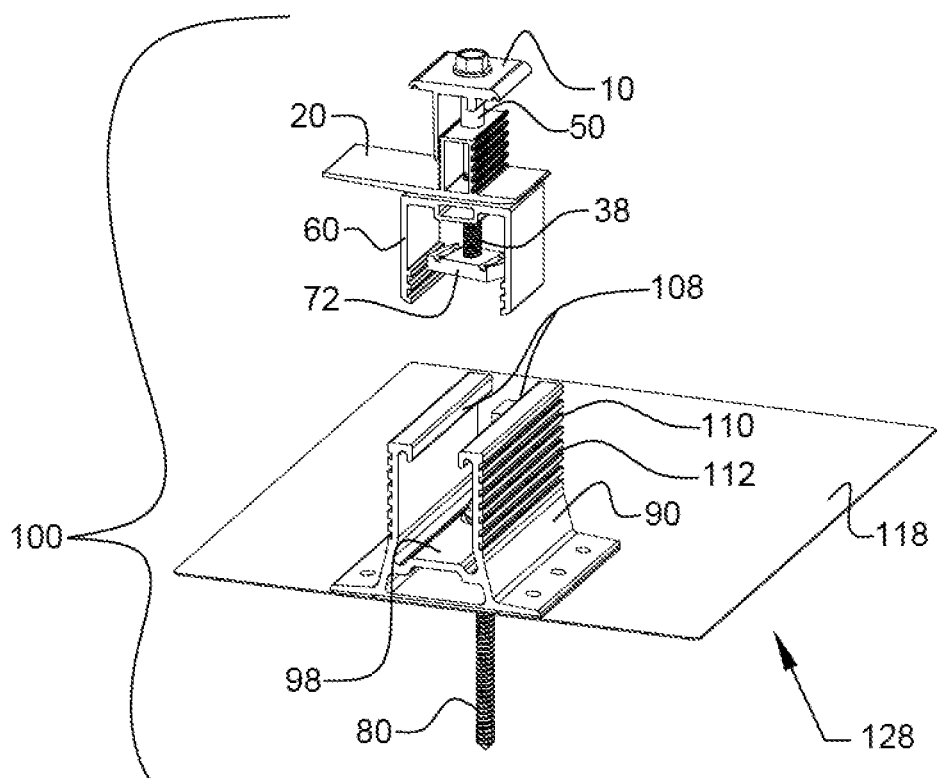
FIG. 2 is another perspective view of the support surface attachment device of FIG. 1, wherein a clamp assembly of the support surface attachment device is shown exploded from a base assembly of the support surface attachment device.

An first illustrative embodiment of the support surface attachment device is seen generally at 100 in FIGS. 1 and 2. In one or more embodiments, a plurality of support surface attachment devices 100 are used to securely attach an array of photovoltaic modules to a support surface (e.g., a sloped building roof). Referring to FIG. 2, it can be seen that support surface attachment device 100 generally comprises a clamp assembly 126 and a base assembly 128. Each of these assemblies 126, 128 will be described in detail hereinafter.

Figure 10:
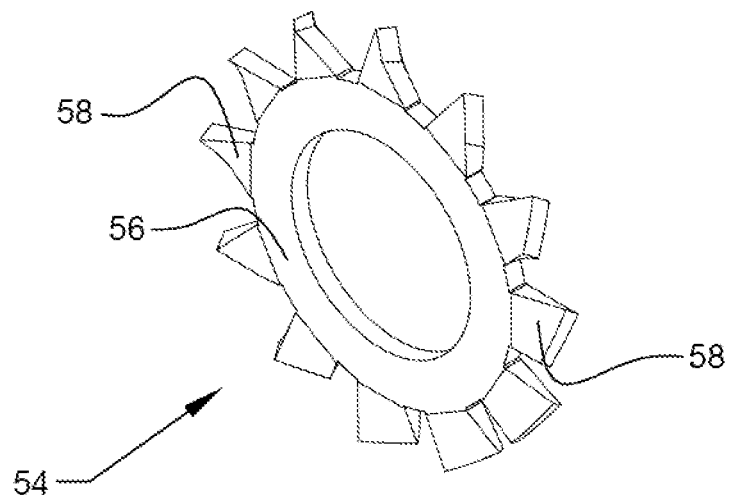
FIG. 10 is a perspective view of a washer of the clamp assembly of FIG. 3.
Figure 11:
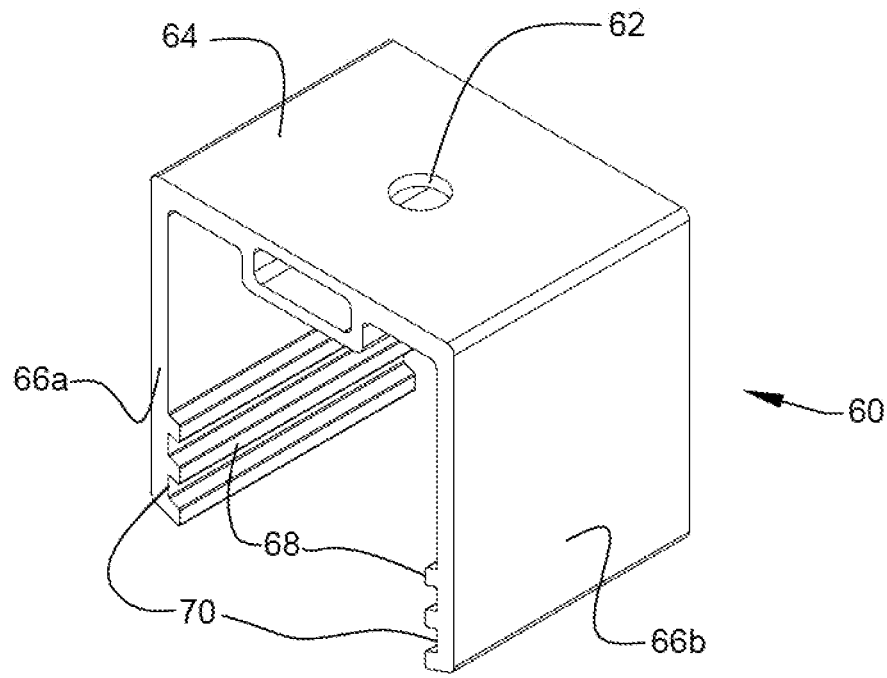
FIG. 11 is a perspective view of a glider member of the clamp assembly of FIG. 3.
Figure 12:
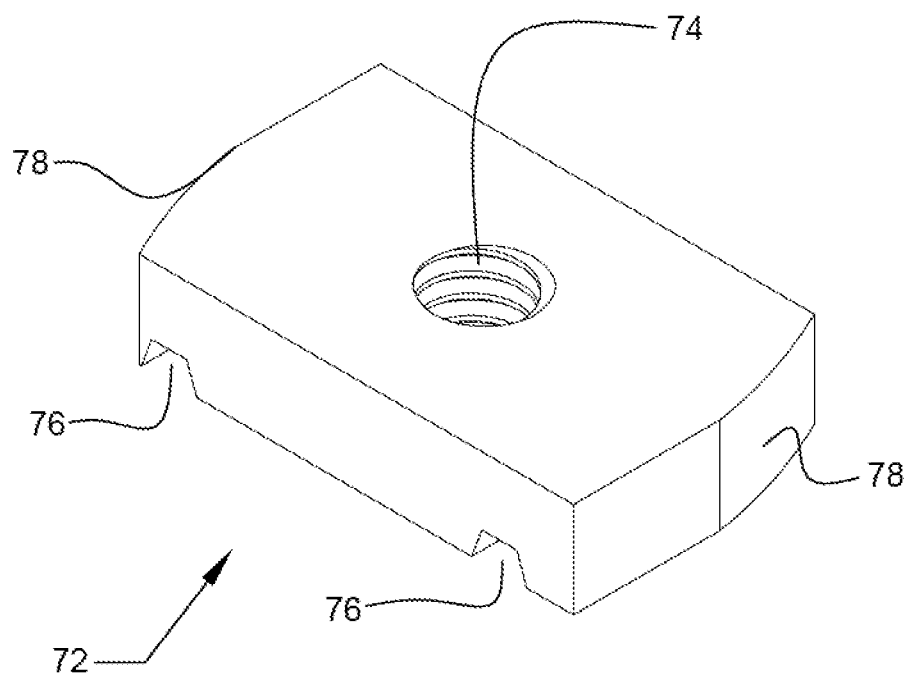
FIG. 12 is a bottom perspective view of a strut nut of the clamp assembly of FIG. 3.
Figure 13:
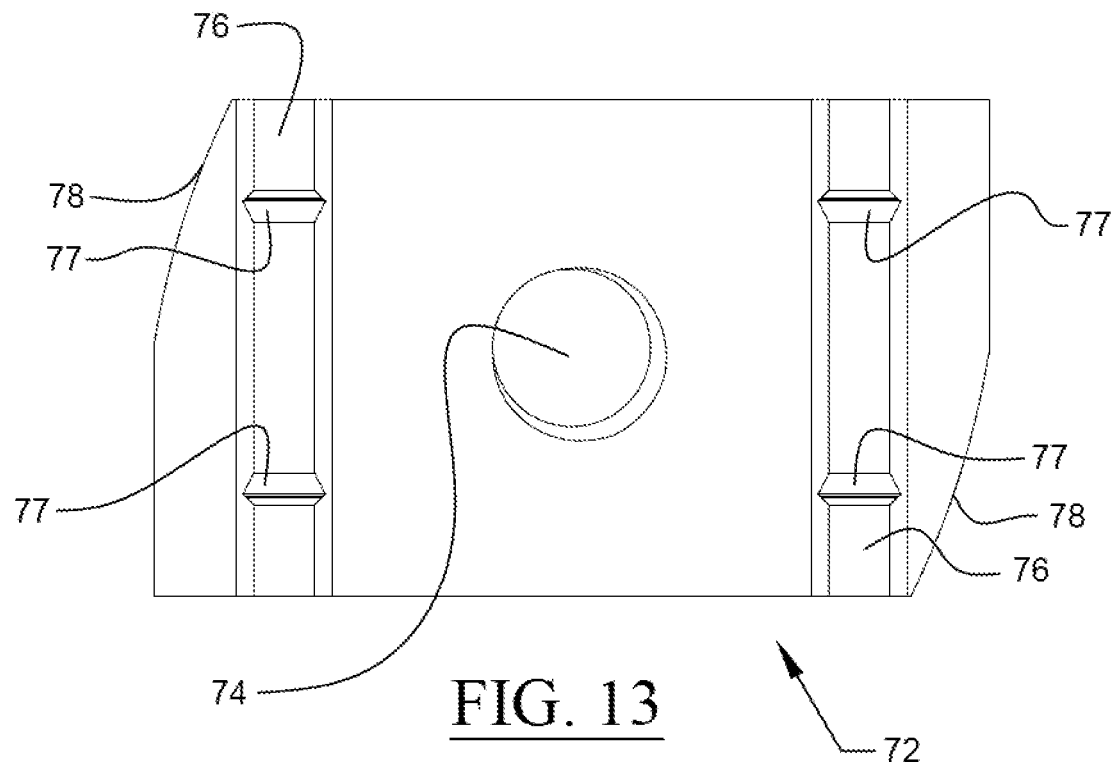
FIG. 13 is a top plan view of the strut nut of FIG. 12.

Initially, with reference to FIGS. 3-13, it can be seen that the illustrative embodiment of the clamp assembly 126 generally includes an upper clamp member 10, a lower clamp member 20, and a glider member 60. As best shown in the assembled view of FIG. 3, the upper clamp member 10, lower clamp member 20, and glider member 60 are connected to one another by means of a threaded fastener member 38 and a strut nut 72. In the illustrated embodiment, the threaded fastener member 38 is in the form of a bolt with a head portion having a serrated flange (refer to FIG. 5). The serrations in the lower surface of the bolt head flange of the threaded fastener member 38 are configured to interferingly engage with the top surface of the upper clamp member 10 (i.e., "dig into" the top surface of the upper clamp member 10). The external threads on the shaft of the threaded fastener member 38 are configured to threadingly engage with the internal threads 74 in the middle of the strut nut 72 (see FIG. 12). As shown in FIGS. 12 and 13, the strut nut 72 has spaced-apart elongate grooves 76 disposed in the top surface thereof that are each configured to receive a respective downturned lip 108 of the base member which will be described hereinafter. In addition, as best shown in the top view of FIG. 13, it can be seen that each of the elongate grooves 76 is provided with two (2) spaced-apart protrusions or teeth 77 disposed therein. The spaced-apart teeth 77 in each groove 76 are configured to interferingly engage with a bottom surface of one of the downturned lips 108 (i.e., "dig into" the bottom surface of one of the downturned lips 108). Also, referring collectively to FIGS. 12 and 13, it can be seen that the strut nut 72 comprises curved sidewall portions 78 arranged diagonally opposite from one another. The curved sidewall portions 78 allow the strut nut 72 to rotate clockwise into position until the flat sidewall portions contact the inside walls of the base member 90.

Figure 3:
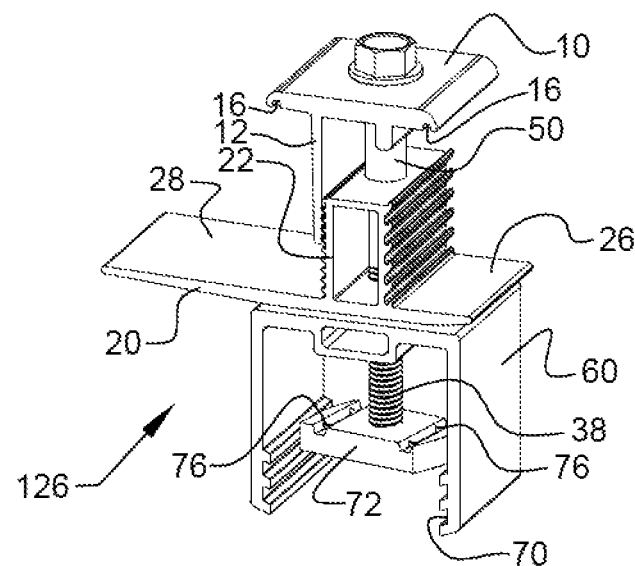
FIG. 3 is a perspective view of the clamp assembly of the support surface attachment device of FIG. 1, wherein the clamp assembly is illustrated in an assembled state.

Referring again to the illustrative embodiment of FIG. 3, it can be seen that the upper clamp member 10 and the lower clamp member 20 of clamp assembly 126 cooperate to clamp one or more photovoltaic modules in place on a support surface. That is, each photovoltaic module is clamped in place either between the first opposed flange portion 14*a* of the upper clamp member 10 and the second outwardly extending ledge 28 of the lower clamp member 20 or between the second opposed flange portion 14*b* of the upper clamp member 10 and the first outwardly extending ledge 26 of the lower clamp member 20, depending on which side of the clamp assembly 126 the photovoltaic module is disposed.

Figure 6:
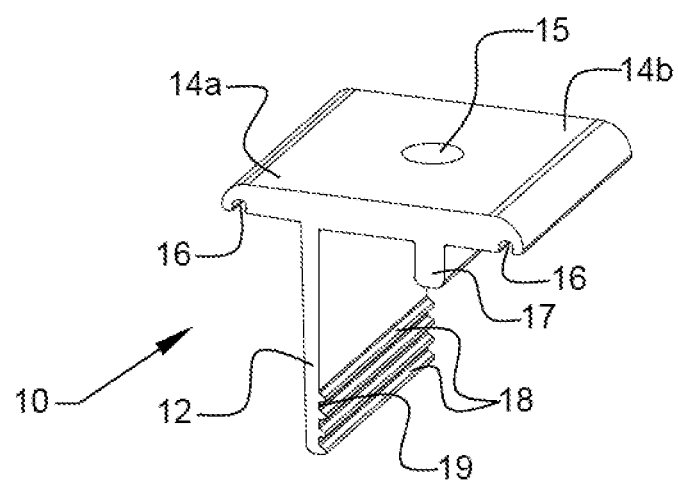
FIG. 6 is a perspective view of an upper clamp member of the clamp assembly of FIG. 3.

Now, with reference to FIG. 6, the structure of the upper clamp member 10 will be described. As shown in this figure, the upper clamp member 10 generally includes a base portion 12 that is attached to the bottom surface of a flange portion 14a, 14b at approximately a degree angle. In this figure, it can be seen that one side surface of base portion 12 comprises a plurality of elongate protrusions or teeth 18 that are each spaced apart from one another by respective elongate grooves 19. As will be described hereinafter, the plurality of elongate protrusions or teeth 18 matingly engage with elongate protrusions or teeth 30 disposed on the first opposed wall portion 24a of the upstanding middle portion 22 of the lower clamp member Referring again to FIG. 6, it can be seen that the flange portion 14a, 14b of the upper clamp member 10 further comprises a fastener aperture 15 for receiving the threaded fastener member 38 and a downwardly protruding member 17 that forms a back surface against which a photovoltaic module rests when disposed in the clamp assembly 126. Also, as shown in FIG. 6, each of the flange portions 14a, 14b includes an elongate groove 16 disposed in the bottom surface thereof. Each of the elongate grooves 16 is configured to receive a trough portion 48 of a respective bonding clip 42 (see FIG. 7) that provides integrated grounding for the photovoltaic module installation. The trough portion 48 of each respective bonding clip 42 is received within its respective elongate groove 16 in a press-fit or interference-fit type mounting arrangement.

Figure 7:
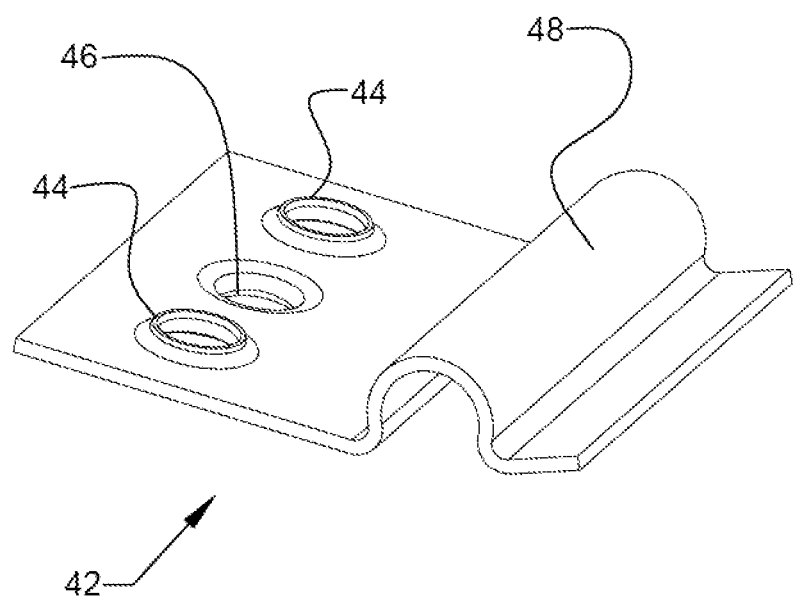
FIG. 7 is a perspective view of a bonding clip of the clamp assembly of FIG. 3.

The bonding or grounding clip 42, which provides integrated grounding for the photovoltaic modules, is illustrated in FIG. 7. The bonding clip 42 generally comprises a plate-like body portion with a trough portion 48 extending laterally across the plate-like body portion and dividing the plate-like body portion into two sections. In FIG. 7, it can be seen that the plate-like body portion includes one or more upwardly protruding annular members 44 and one or more downwardly protruding annular members 46. In particular, in the illustrative embodiment, the upwardly and downwardly protruding annular members 44, 46 are arranged in an alternating sequence (i.e., a first upwardly protruding annular member 44 followed by a downwardly protruding annular member 46, then followed by a second upwardly protruding annular member 44). The upwardly protruding members 44 are designed to pierce the metallic bottom surface of the flange portion 14a, 14b of the upper clamp member 10, while the downwardly protruding annular member 46 is designed to pierce the anodized layer of the photovoltaic module to provide integrated grounding between the photovoltaic modules. To facilitate integrated grounding between the photovoltaic modules, all of the components of the support surface attachment device 100 and the coupling device 130 may be formed from metal.

Figure 9:
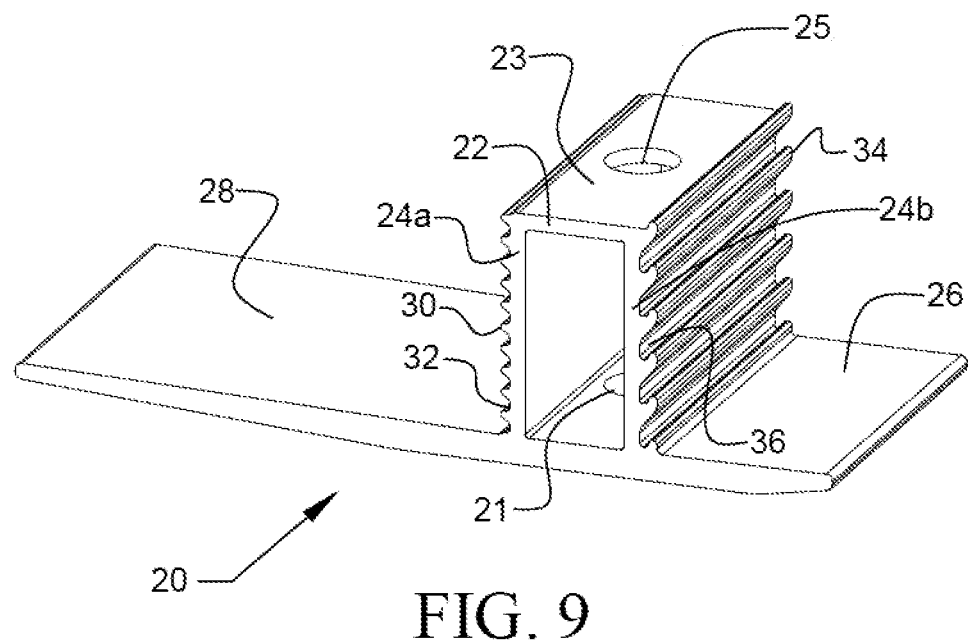
FIG. 9 is a perspective view of a lower clamp member of the clamp assembly of FIG. 3.

Next, turning to FIG. 9, the structure of the lower clamp member 20 will be explained. With reference to this figure, it can be seen that the lower clamp member 20 generally includes an upstanding middle portion 22 with first and second ledge portions 26, 28 extending outwardly from the upstanding middle portion 22. In FIG. 9, it can be seen that the upstanding middle portion 22 of the lower clamp member 20 comprises a lower fastener aperture 21 disposed in a bottom wall portion thereof, and an upper fastener aperture 25 disposed in a top wall portion 23 thereof. Each of these apertures 21, 25 receives the shaft of the threaded fastener member 38. The bottom wall portion and the top wall portion 23 of the upstanding middle portion 22 of the lower clamp member 20 are connected to one another by first and second opposed wall portions 24a, 24b. As shown in FIG. 9, the first opposed wall portion 24a comprises a plurality of elongate protrusions or teeth 30 that are each spaced apart from one another by respective elongate grooves 32. As explained above, the elongate teeth 30 of the first opposed wall portion 24a engage with the elongate teeth 18 of the base portion 12 of the upper clamp member 10. Referring again to FIG. 9, it can be seen that the second opposed wall portion 24b comprises a plurality of elongate hook-shaped upwardly inclined protrusions or teeth 34 that are each spaced apart from one another by respective elongate grooves 36. The hook-shaped teeth 34 on the second opposed wall portion 24b are configured to engage with a wind deflector and/or a mounting skirt for deflecting wind up and over the photovoltaic array and/or improving the aesthetics of the array. Each of the first and second ledge portions 26, 28 of the lower clamp member 20 is configured to accommodate a photovoltaic module frame member resting thereon.

Figure 4:
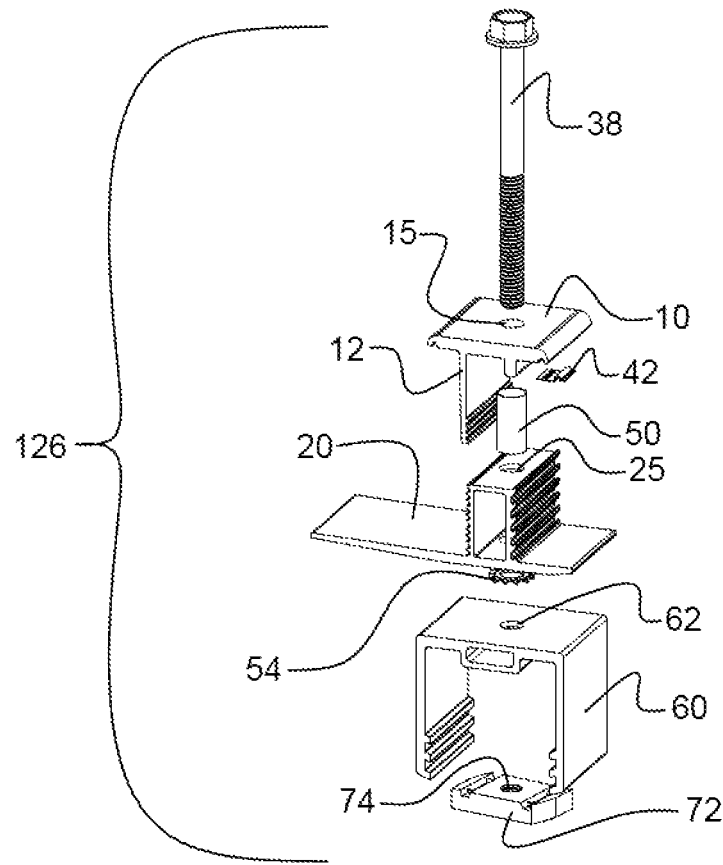
FIG. 4 is another perspective view of the clamp assembly of the support surface attachment device of FIG. 1, wherein the components of the clamp assembly are shown exploded from one another.
Figure 5:
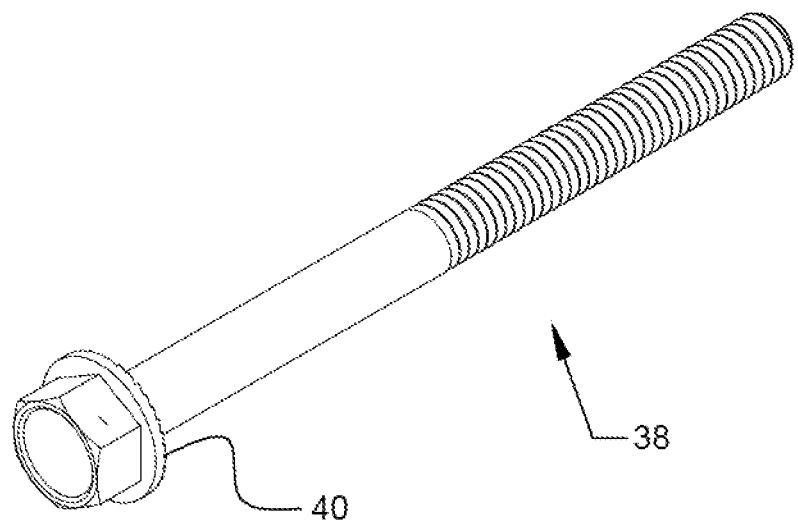
FIG. 5 is a perspective view of a fastener member of the clamp assembly of FIG. 3.

With reference to FIGS. 3, 4, and 9, it can be seen that the second opposed ledge 28 of the lower clamp member 20 is bent slightly upward or is tapered slightly upward at an acute angle. In the installed state, the upwardly tapered ledge 28 of the lower clamp member 20 extends uphill and slightly up and away from the building roof so as to act as a leaf spring that takes up the difference in gap between the uphill clamp opening and the photovoltaic (PV) module thickness, thereby preventing the PV module from rattling and allowing it to be secured into place. In some embodiments, this also creates enough pressure on the upper clamp lip (i.e., first opposed flange portion 14a of upper clamp member 10) to enable a bonding point to function. Advantageously, because the second opposed ledge 28 of the lower clamp member 20 is provided with a slight upward taper (i.e., bowed upwardly), the lower clamp member 20 applies a compressive force against the PV module when it is installed therein. During the installation of each PV module, the PV module is initially disposed at an upward acute angle relative to its one or more southern clamp assemblies 126. Then, each PV module is rotated down until it is generally parallel with the roof surface. As each PV module is rotated downwardly towards the roof surface, the edge portion of the uphill PV module presses down on the upwardly tapered ledge(s) 28 of the lower clamp member(s) 20 so as to apply a downward force on the upwardly tapered ledge 28, thereby ensuring that the PV module is securely engaged with the lower clamp member(s) 20 and the PV module is tightly held in place. In response to the downward force applied by the PV module, the upwardly tapered ledges 28 elastically deforms or yields in a spring-like manner. As a result of the leaf spring design of the upwardly tapered ledge 28, the installer is not required to reach down over the PV module to tighten the fasteners on its one or more southern clamp assemblies 126. An attempt by the installer to tighten the fasteners on the one or more southern clamp assemblies 126 would not be safe, ergonomic, or efficient. The second ledge portion 158 of the lower coupling member 150 may be bent slightly upward or tapered slightly upward at an acute angle in the same manner as that described above for the upwardly tapered ledge 28 of the lower clamp member 20 so that the coupling device 130 is provided with the same functionality that is described above for the clamp assembly 126.

In order to maintain a predetermined spacing distance between the upper and lower clamp members 10, 20, a sleeve member 50 is provided between the clamp members 10, 20 (refer to FIGS. 3 and 4). That is, as best shown in FIG.

Figure 8:
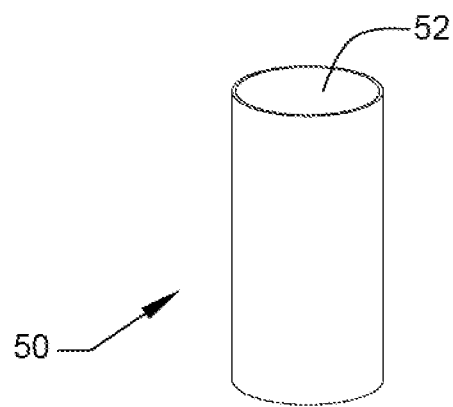
FIG. 8 is a perspective view of a sleeve member of the clamp assembly of FIG. 3.

3, the sleeve member 50 is disposed between the top wall portion 23 of the lower clamp member 20 and the bottom surface of the flange portion 14a, 14b of the upper clamp member 10. Turning to FIG. 8, it can be seen that the sleeve member 50 of the clamp assembly 126 comprises a cylindrical recess 52 extending therethrough for receiving the shaft of the threaded fastener member 38. In an alternative embodiment, a spring may be used rather than the sleeve member 50 to maintain the predetermined spacing distance between the upper and lower clamp members 10, 20.

As best shown in FIG. 3, the lower clamp member 20 is positioned above a glider member 60 that is configured to be adjustably disposed on the upstanding base member 90 in both a horizontal and vertical direction, as will be explained hereinafter. Referring to FIG. 11, it can be seen that the glider member 60 of the clamp assembly 126 comprises a generally inverted, U-shaped profile with a top wall portion 64 and first and second opposed wall portions 66a, 66b extending downwardly from the top wall portion 64. The top wall portion 64 comprises a fastener aperture 62 disposed centrally therein for receiving the shaft of the threaded fastener member 38. In FIG. 11, it can be seen that the inner surfaces of each of the first and second opposed wall portions 66a, 66b comprises a plurality of elongate protrusions or teeth 68 that are each spaced apart from one another by respective elongate grooves 70. The set of teeth 68 on each of the inner surfaces of the opposed wall portions 66a, 66b are designed to engage with respective teeth 110 on opposed upstanding wall portions 104a, 104b of the base member 90. The glider member 60 may be elastically deformable such that it is capable of snapping into place on the top of the base member 90. To permit horizontal adjustability, the glider member 60 is capable of being slid along the length of the base member 90. And, to permit vertical adjustability, the glider member 60 is capable of being moved up and down along a vertical height of the upstanding wall portions 104a, 104b of the base member 90 and selectively engaging certain ones of the teeth 68, 110 with one another.

With reference to FIG. 4, it can be seen that, in the illustrative embodiment, the clamp assembly 126 is further provided with a serrated washer 54 disposed between the lower clamp member 20 and the glider member 60. In FIG. 10, it can be seen that the serrated washer 54 includes an annular body portion 56 with a plurality of diagonally-oriented teeth 58 extending radially outward from the annular body portion 56. The diagonally-oriented teeth 58 of the serrated washer 54 are designed to cut into the adjacent surfaces of the lower clamp member 20 and the glider member 60 so as resist a rotation of the lower clamp member 20 relative to the glider member 60. The serrated washer 54 with the diagonally-oriented teeth 58 is also used to electrically bond the lower clamp member 20 to the glider member 60.

Now, referring to FIGS. 1, 2, 14, and 15, it can be seen that the illustrative embodiment of the base assembly 128 generally includes an upstanding base member 90 and a lower flashing member 118. As best shown in the assembled views of FIGS. 2 and 14, the upstanding base member 90 is connected to the lower flashing member 118 by a threaded fastener member 80. In the illustrated embodiment, the threaded fastener member 80 is in the form of a structural mounting bolt with a head portion 82 and a threaded shaft portion (see FIG. 16). In the illustrated embodiment, each support surface attachment device 100 is secured to a respective one of the roof rafters of a building by means of a structural mounting bolt 80 (e.g., refer to FIG. 1). In one or more embodiments, the structural mounting bolt or screw 80 may be self-drilling so as not to require any predrilled holes in the roof.

Figure 18:
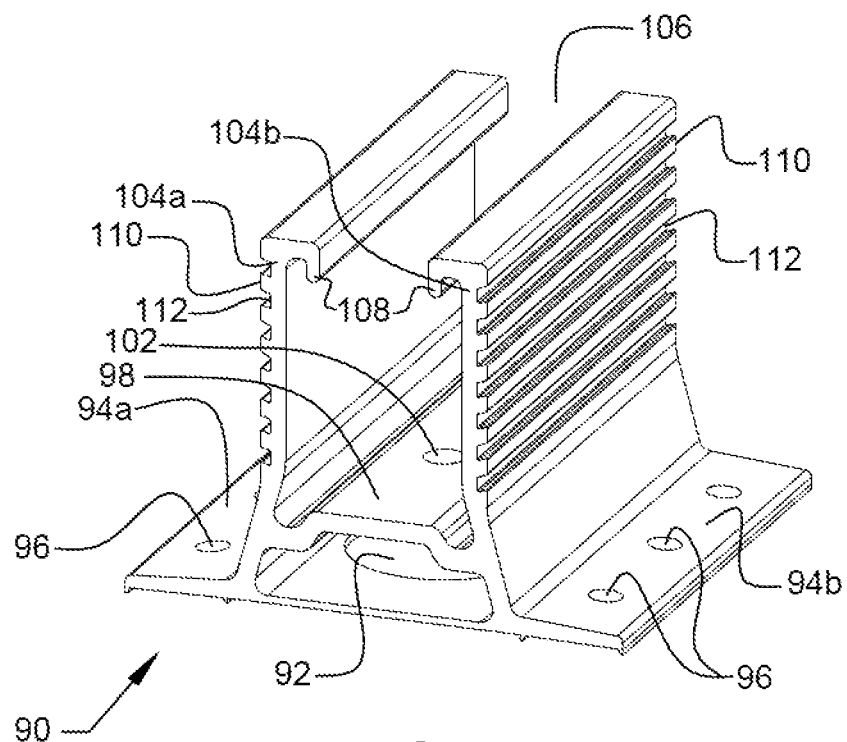
FIG. 18 is a perspective view of an upstanding base member of the base assembly of FIG. 14.

Turning to FIG. 18, the upstanding base member 90 of the base assembly 128 will now be described. As shown in this figure, the upstanding base member 90 generally comprises a base portion with first and second opposed base flange portions 94a, 94b and an elevated shelf portion 98. Two opposed upstanding wall portions 104a, 104b extend upwardly from the base portion of the base member 90. In FIG. 18, it can be seen that each of the opposed base flange portions 94a, 94b comprises a plurality of fastener apertures 96 arranged in a substantially linear configuration along the length thereof. When it is desired to mount the upstanding base member directly to the roof deck, rather than a roof rafter, the base member 90 is secured to the roof deck using fasteners disposed in the fastener apertures 96. The base portion of the base member comprises a centrally disposed aperture 92 for accommodating the raised portion 122 of the flashing member 118 passing therethrough. The elevated shelf portion 98 of the base portion of the base member 90 comprises a fastener aperture 102 disposed therethrough for accommodating the shaft of the threaded fastener member 80. In FIG. 18, it can be seen that the outer surfaces of each of the first and second opposed upstanding wall portions 104a, 104b comprises a plurality of elongate protrusions or teeth 110 that are each spaced apart from one another by respective elongate grooves 112. As described above, the set of teeth 110 on each of the outer surfaces of the opposed wall portions 104a, 104b are designed to engage with the respective teeth 68 on the opposed wall portions 66a, 66b of the glider member 60. Also, as shown in FIG. 18, the opposed wall portions 104a, 104b of the base member 90 cooperate to define an upper elongate slot 106 that accommodates the shaft of the threaded fastener member 38 passing therethrough. Also, each of the opposed wall portions 104a, 104b comprises a downturned lip portion 108 that is received within a respective one of the elongate grooves 76 disposed in the top surface of the strut nut 72.

Figure 17:
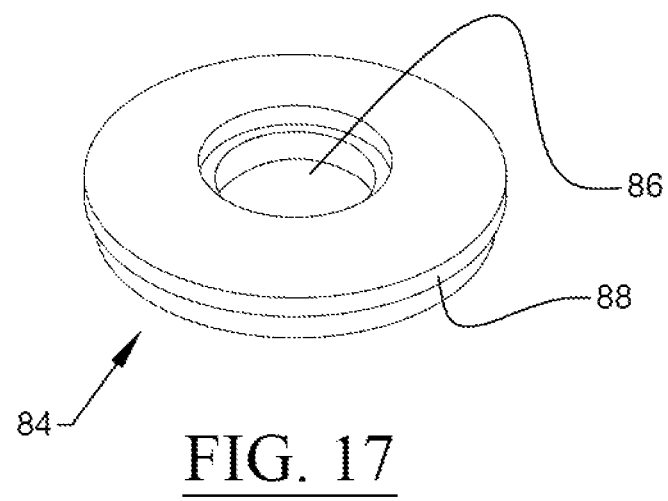
FIG. 17 is a perspective view of an upper sealing washer of the base assembly of FIG. 14.
Figure 19:
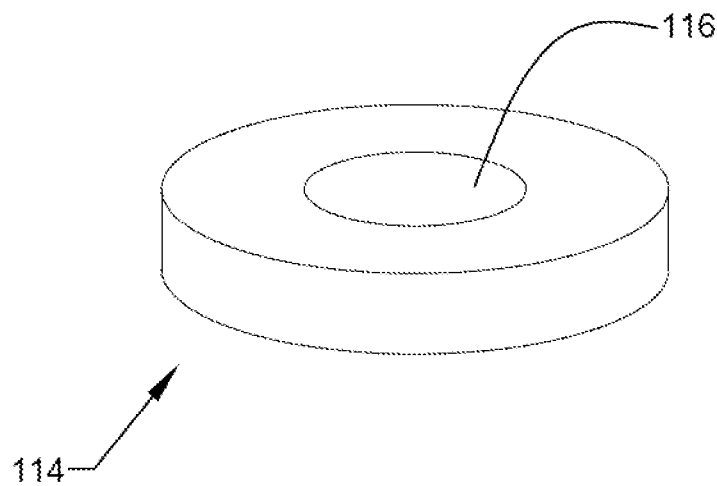
FIG. 19 is a perspective view of a lower sealing washer of the base assembly of FIG. 14.
Figure 20:
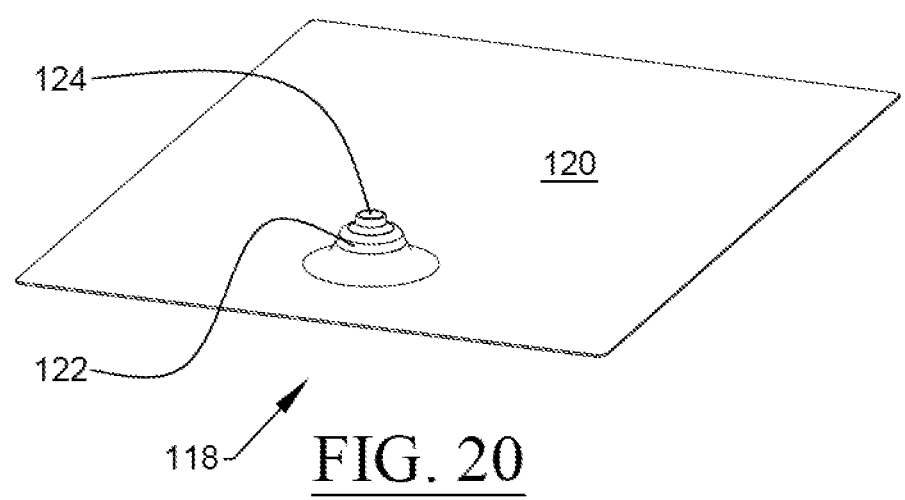
FIG. 20 is a perspective view of a flashing member of the base assembly of FIG. 14.
Figure 21:
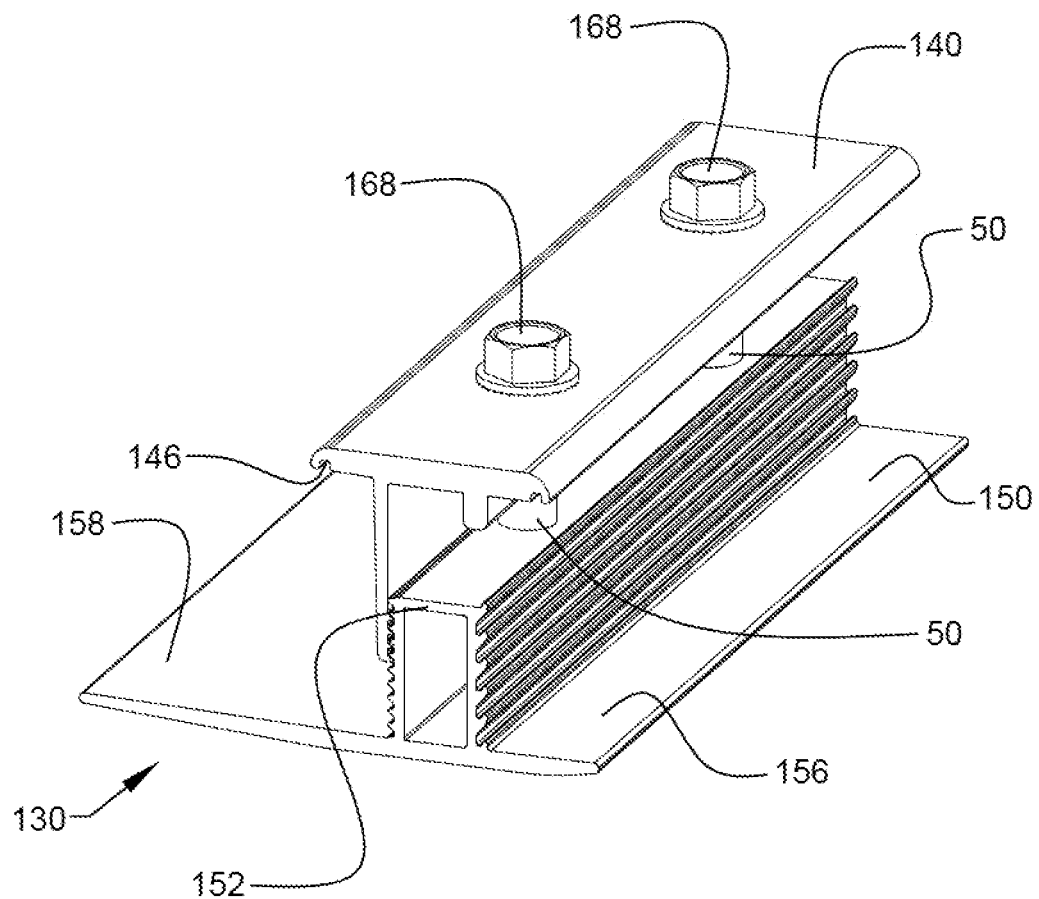
FIG. 21 is a perspective view of a coupling device of a photovoltaic mounting system, according to a first embodiment of the invention, wherein the coupling device is illustrated in an assembled state.
Figure 22:
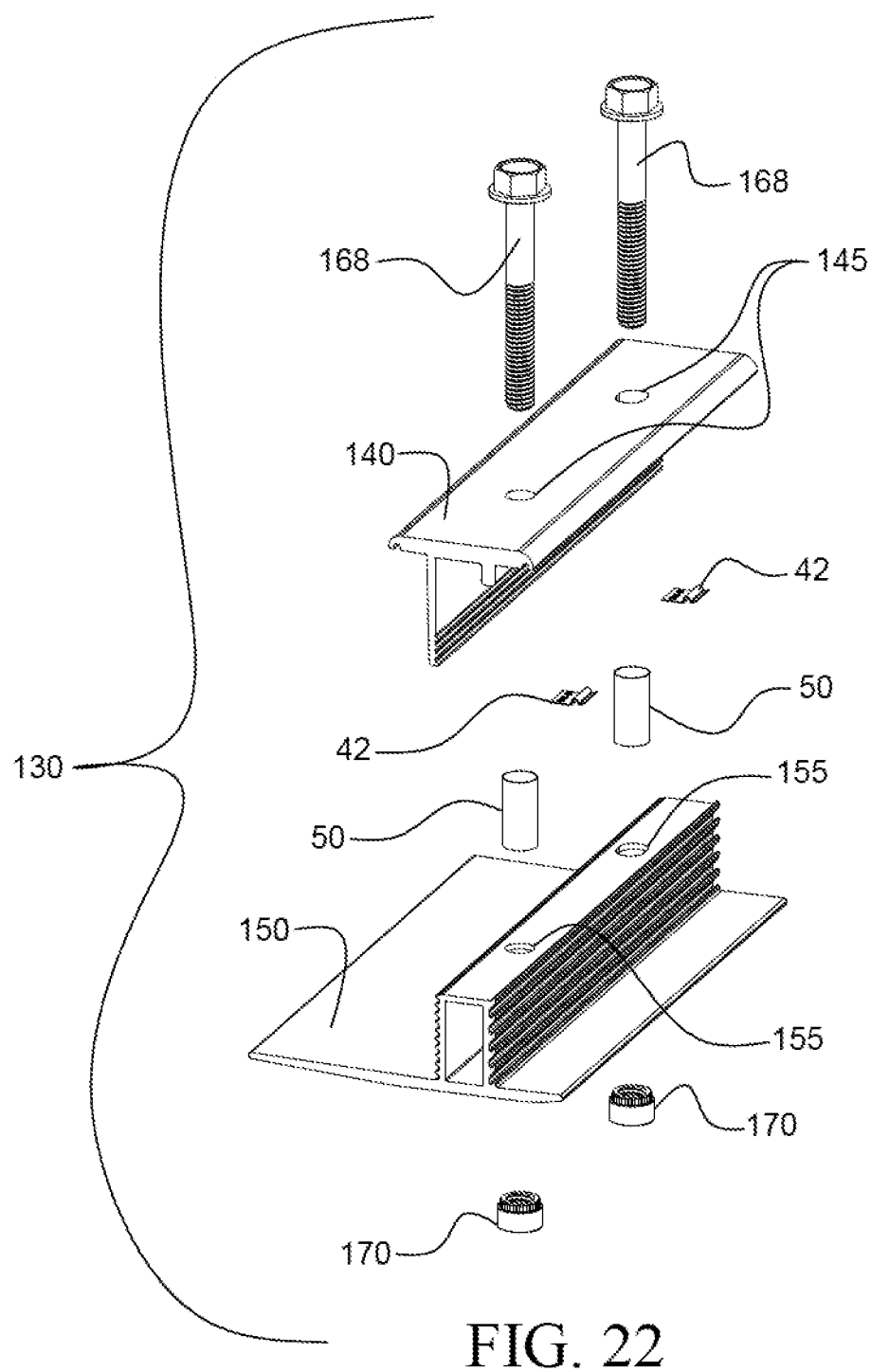
FIG. 22 is another perspective view of the coupling device of FIG. 21, wherein the components forming the coupling device are shown exploded from one another.

With reference primarily to FIG. 20, the flashing member 118 of the base assembly 128 will now be explained. The flashing member 118 helps to maintain the integrity of the building roof by preventing roof leaks. In FIG. 20, it can be seen that the flashing member 118 generally comprises a generally planar body portion 120 and a raised portion or projection 122 that extends upwardly from the generally planar body portion 120 in a generally vertical direction. As best shown in the perspective view of FIG. 20, the raised portion or projection 122 is offset with respect to the center of the generally planar body portion 120 (i.e., the raised portion or projection 122 is disposed to the side of the central point of the generally planar body portion 120). In FIG. 20, it can be seen that the raised portion or projection 122 includes a centrally disposed fastener aperture 124 for receiving the shaft of the structural mounting bolt 80 therein. Advantageously, the raised nature of the protrusion or projection 122 above the remainder of the generally planar body portion 120 of the flashing member 118 substantially prevents any precipitation (i.e., rain water) from entering the structure of the building roof through the fastener aperture 124. In the assembled state of the support surface attachment device 100, in order to further prevent any leaks through the aperture 124 of the flashing member 118, a lower sealing washer 114 (see FIGS. 15 and 19) is provided on the top of the raised portion or projection 122 of the flashing member 118. The lower sealing washer 114 comprises a fastener aperture 116 disposed therein for accommodating the shaft of the structural mounting bolt 80. The lower sealing washer 114 is sandwiched between the raised portion or projection 122 of the flashing member 118 and the bottom surface of the elevated shelf portion 98 of the base member 90 when the base member 90 is disposed on top of the flashing member 118 in the assembled state of the support surface attachment device 100. In addition, in the assembled state, an upper sealing washer 84 is disposed between the bottom surface of the head portion 82 of the bolt 80 and the top surface of the elevated shelf portion 98 of the base member 90 to additionally prevent any leaks through the roof. As shown in FIG. 17, the upper sealing washer 84 comprises a flanged top portion 88 with a fastener aperture 86 disposed through the center thereof for accommodating the shaft of the structural mounting bolt 80. In the assembled state of the support surface attachment device 100, the upper sealing washer 84 is sandwiched between the bottom surface of the bolt head portion 82 and the top surface of the elevated shelf portion 98 of the base member 90. In one exemplary embodiment, the flashing member 118 may be formed from stamped metal, and the upper and lower sealing washers 84, 114 may be formed from a suitable plastic or rubber, such as ethylene propylene diene monomer (EPDM).

Figure 14:
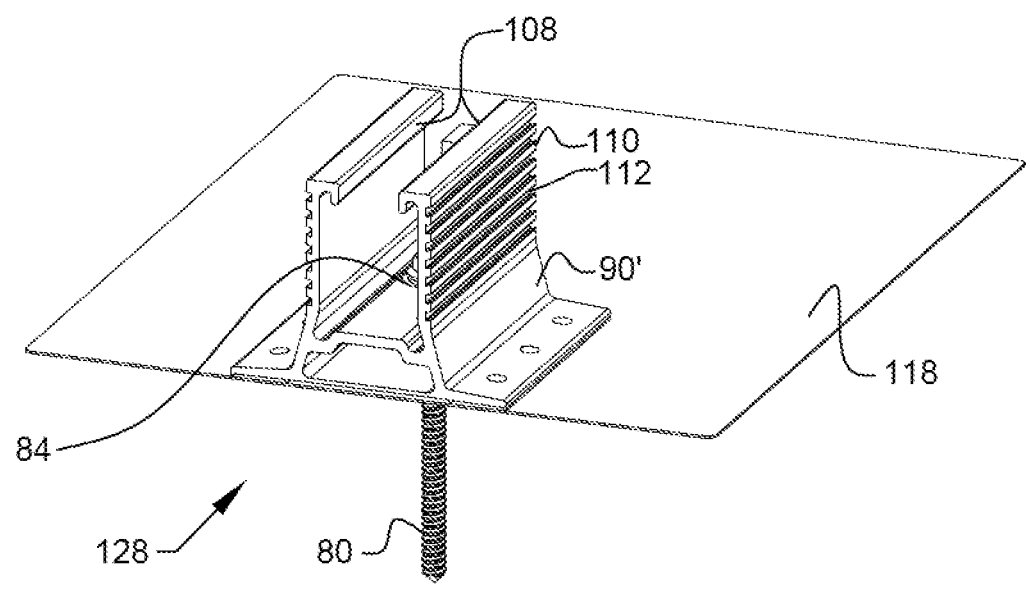
FIG. 14 is a perspective view of the base assembly of the support surface attachment device of FIG. 1, wherein the base assembly is illustrated in an assembled state.
Figure 15:
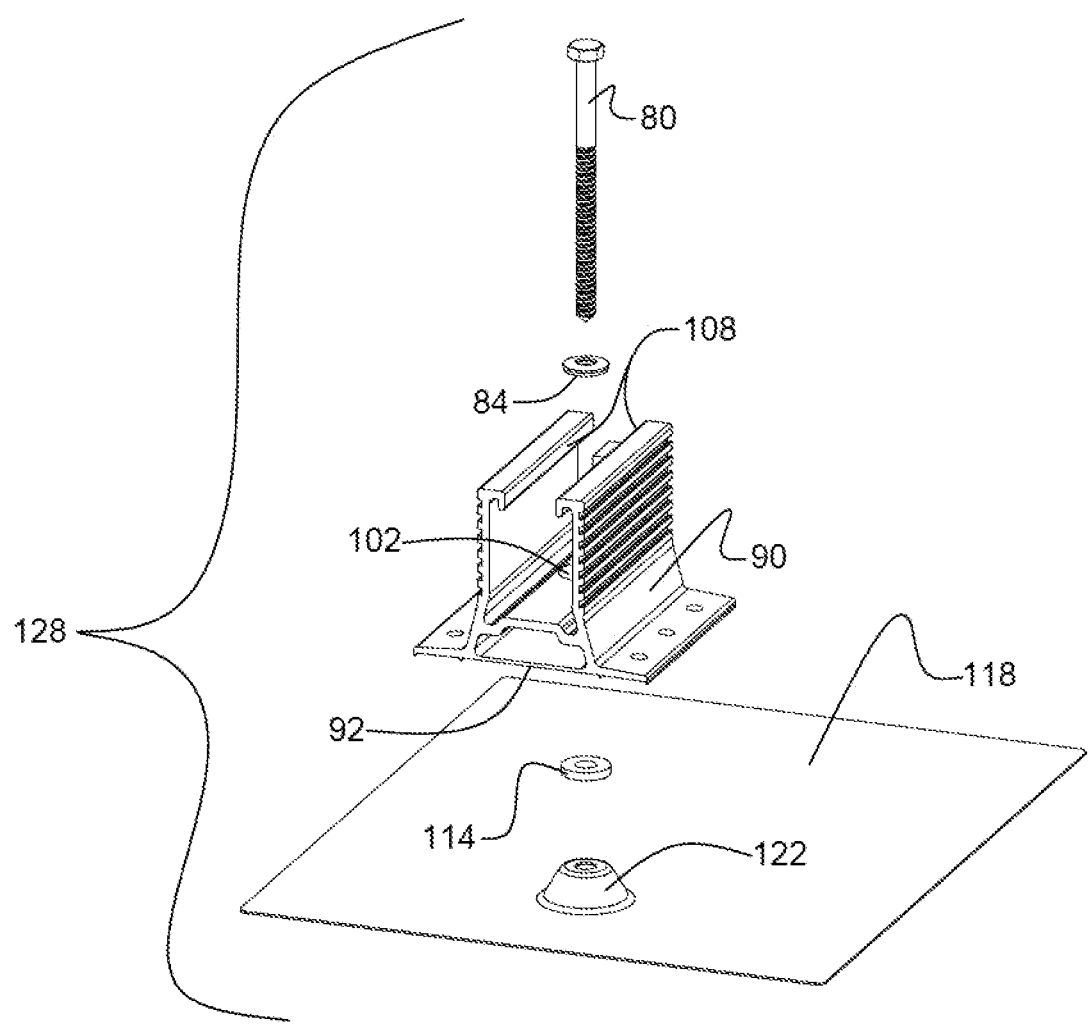
FIG. 15 is another perspective view of the base assembly of the support surface attachment device of FIG. 1, wherein the components of the base assembly are shown exploded from one another.
Figure 16:
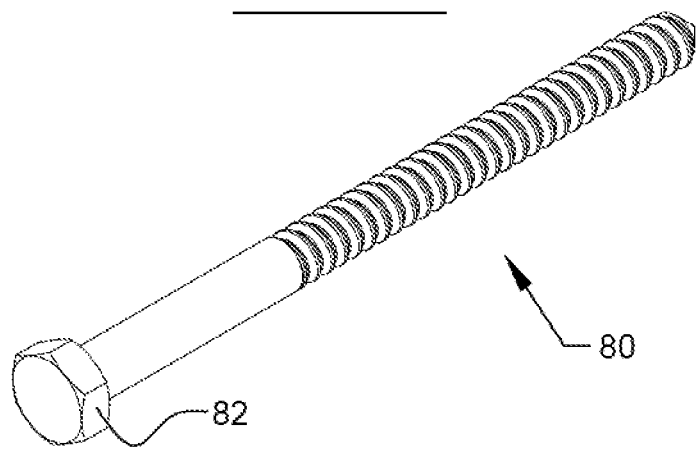
FIG. 16 is a perspective view of a fastener member of the base assembly of FIG. 14.

Advantageously, the design of the flashing member 118 illustrated in FIGS. 14, 15, and 20 results in superior waterproofing because its water seal is elevated above the roof surface (i.e., at the top of the raised portion or projection 122) so that the integrity of the flashing waterproofing is maintained even if the sealing washer 114 would fail. Also, because the flashing member 118 may be formed by stamping, its manufacturing costs are inexpensive. In addition, the configuration of the flashing member 118 allows adjacent flashing members 118 to be readily stacked for compact shipping.

Now, with reference to FIGS. 21-25, it can be seen that the illustrative embodiment of the coupling device or assembly 130 generally includes an upper coupling member 140 secured to a lower coupling member 150. As best shown in the assembled view of FIG. 21 and the exploded view of FIG. 22, the upper coupling member 140 and the lower coupling member 150 are connected to one another by means of one or more threaded fastener members 168 (e.g., two (2) threaded fastener members 168) and one or more respective captive nuts 170 (e.g., two (2) captive nuts 170, one for each threaded fastener member 168). In the illustrated embodiment, each threaded fastener member 168 is in the form of a bolt with a head portion having a serrated flange (e.g., refer to FIG. 21). As described above for the bolts 38, the serrations in the lower surface of the bolt head flange of each threaded fastener member 168 are configured to interferingly engage with the top surface of the upper coupling member 140 (i.e., "dig into" the top surface of the upper coupling member 140). The external threads on the shaft of each threaded fastener member 168 are configured to threadingly engage with the internal threads in the threaded aperture 172 of the captive nut 170 (see FIG. 25).

Figure 23:
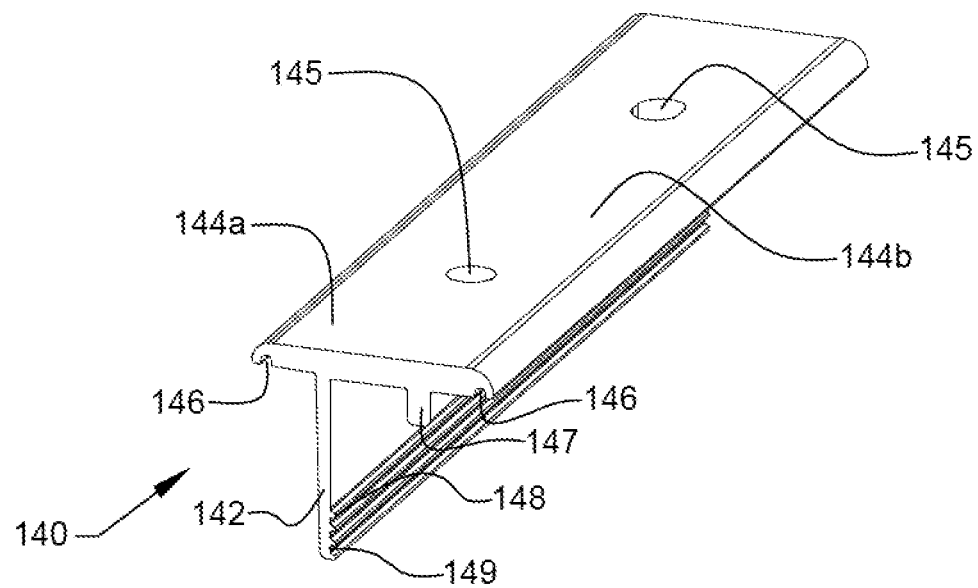
FIG. 23 is a perspective view of an upper coupling member of the coupling device of FIG. 21.

Turning to FIG. 23, the structure of the upper coupling member 140 will be described. As shown in this figure, the upper coupling member 140 generally includes a base portion 142 that is attached to the bottom surface of a flange portion 144a, 144b at approximately a 90 degree angle. In this figure, it can be seen that one side surface of base portion 142 comprises a plurality of elongate protrusions or teeth 148 that are each spaced apart from one another by respective elongate grooves 149. As will be described hereinafter, the plurality of elongate protrusions or teeth 148 matingly engage with elongate protrusions or teeth 160 disposed on the first opposed wall portion 154a of the upstanding middle portion 152 of the lower coupling member 150. Referring again to FIG. 23, it can be seen that the flange portion 144a, 144b of the upper coupling member 140 further comprises a plurality of fastener apertures 145 for receiving respective threaded fastener members 168 and a downwardly protruding member 147 that forms a back surface against which a photovoltaic module rests when disposed in the coupling assembly 130. Also, as shown in FIG. 23, each of the flange portions 144a, 144b includes an elongate groove 146 disposed in the bottom surface thereof. Each of the elongate grooves 146 is configured to receive a trough portion 48 of a respective bonding clip 42 (see FIGS. 7 and 22) that provides integrated grounding for the photovoltaic module installation. The trough portion 48 of each respective bonding clip 42 is received within its respective elongate groove 146 in a press-fit or interference-fit type mounting arrangement.

Figure 24:
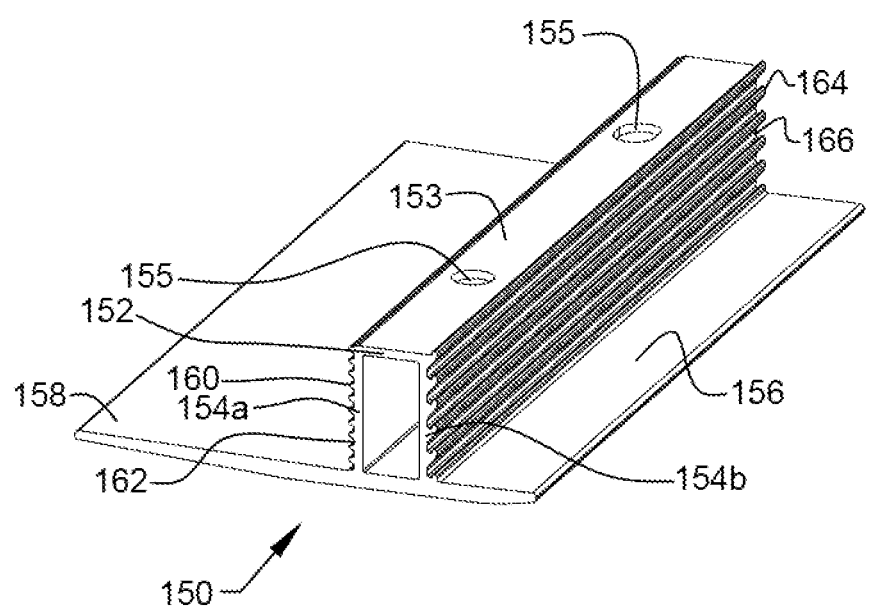
FIG. 24 is a perspective view of a lower coupling member of the coupling device of FIG. 21.
Figure 25:
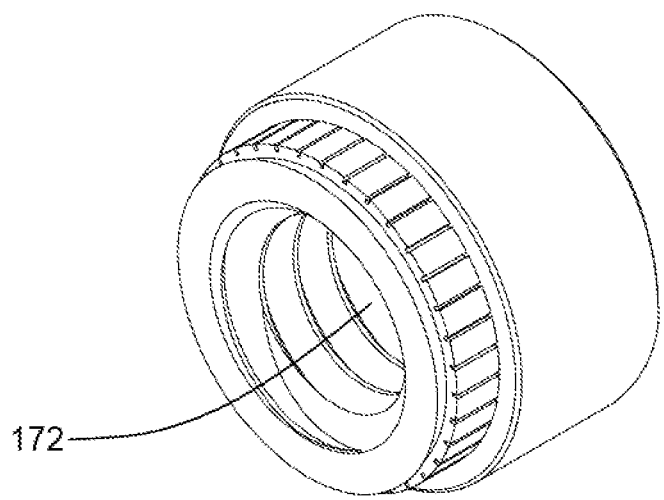
FIG. 25 is a perspective view of a captive nut of the coupling device of FIG. 21.

Next, turning to FIG. 24, the structure of the lower coupling member 150 will be explained. With reference to this figure, it can be seen that the lower coupling member 150 generally includes an upstanding middle portion 152 with first and second ledge portions 156, 158 extending outwardly from the upstanding middle portion 152. In FIG. 24, it can be seen that the upstanding middle portion 152 of the lower coupling member 150 comprises spaced-apart lower fastener apertures disposed in a bottom wall portion thereof, and spaced-apart upper fastener apertures 155 disposed in a top wall portion 153 thereof. Each of these apertures receives a respective shaft of a respective threaded fastener member 168. The bottom wall portion and the top wall portion 153 of the upstanding middle portion 152 of the lower coupling member 150 are connected to one another by first and second opposed wall portions 154a, 154b. As shown in FIG. 24, the first opposed wall portion 154a comprises a plurality of elongate protrusions or teeth 160 that are each spaced apart from one another by respective elongate grooves 162. As explained above, the elongate teeth 160 of the first opposed wall portion 154a engage with the elongate teeth 148 of the base portion 142 of the upper coupling member 140. Referring again to FIG. 24, it can be seen that the second opposed wall portion 154b comprises a plurality of elongate hook-shaped protrusions or teeth 164 that are each spaced apart from one another by respective elongate grooves 166. The hook-shaped teeth 164 on the second opposed wall portion 154b are configured to engage with a wind deflector and/or a mounting skirt for deflecting wind up and over the photovoltaic array and/or improving the aesthetics of the array, as will be described hereinafter. Each of the first and second ledge portions 156, 158 of the lower coupling member 150 is configured to accommodate a photovoltaic module frame member resting thereon.

Figure 26:
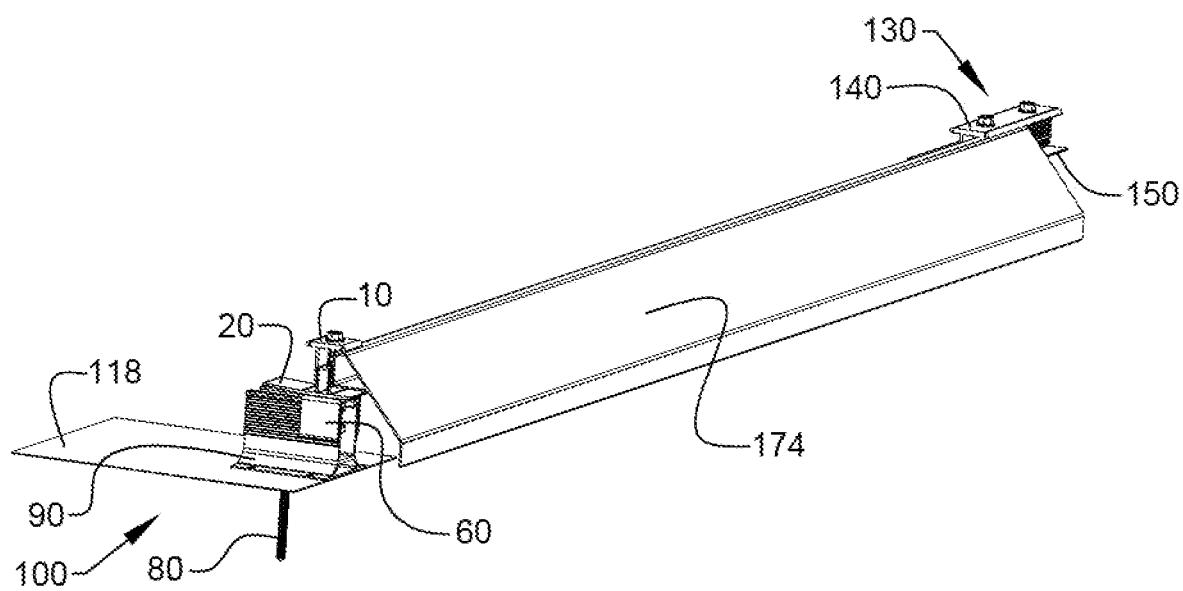
FIG. 26 is a perspective view illustrating the support surface attachment device of FIG. 1 together with the coupling device of FIG. 21 and a lower skirt member connected to the support surface attachment device and the coupling device.
Figure 27:
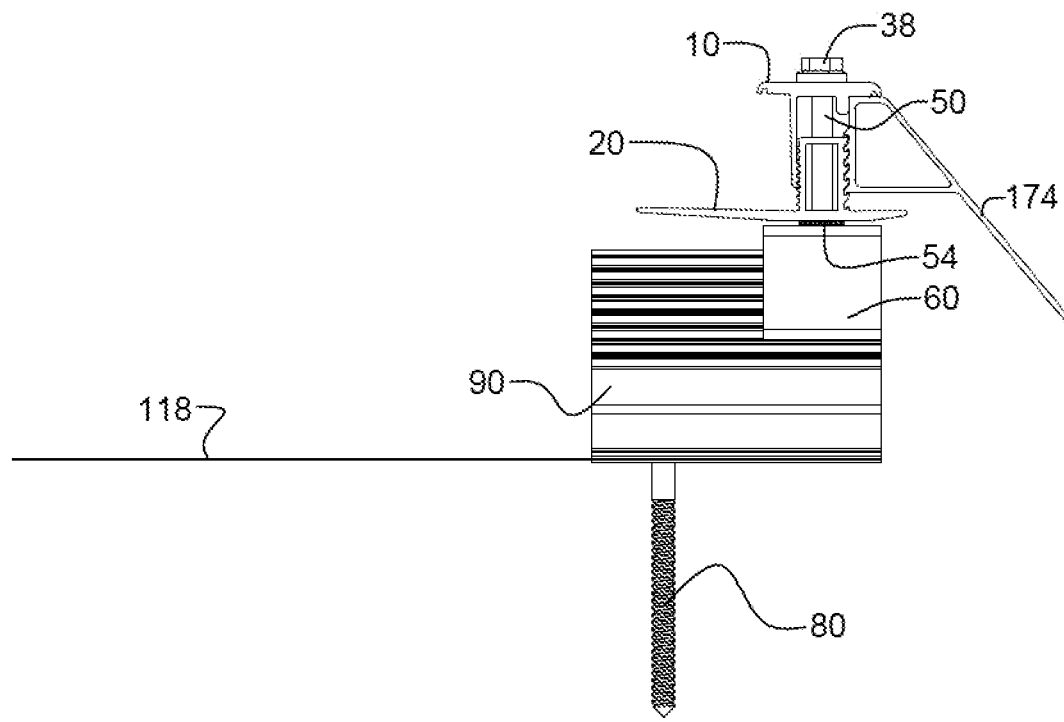
FIG. 27 is an end view of the assembly of FIG. 26, wherein the support surface attachment device and lower skirt member are shown.
Figure 28:
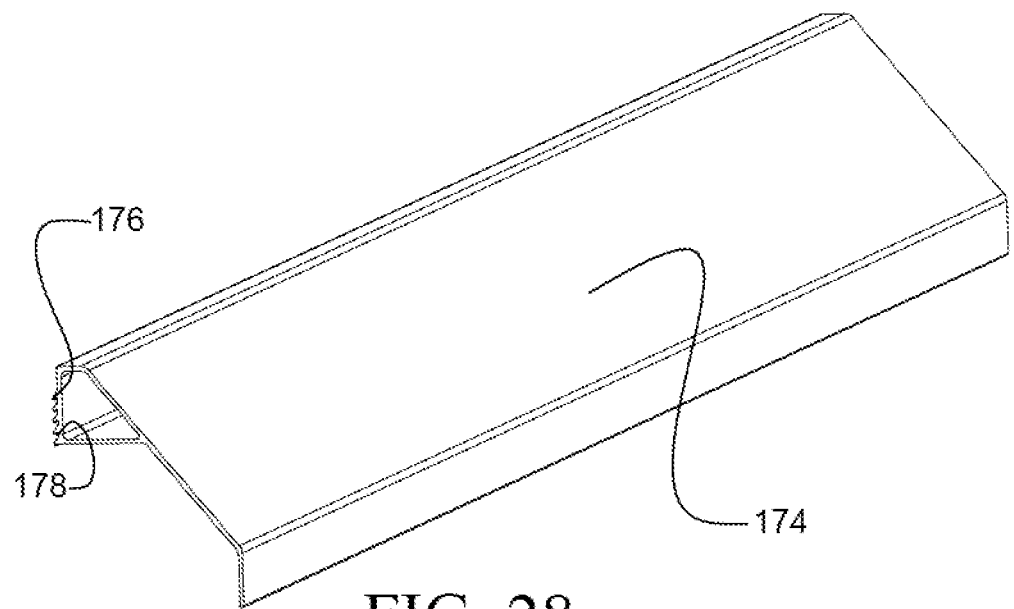
FIG. 28 is a perspective view of a lower skirt member, similar to the lower skirt member illustrated in FIG. 26.

With reference to FIGS. 26-28, a skirt member 174 of the photovoltaic mounting system will be described. Initially, referring to the perspective view of FIG. 26, it can be seen that the skirt member 174 is configured to be located on the southernmost edge of the array of PV modules. The skirt member 174 is supported by spaced-apart support surface attachment devices 100. In particular, as shown in the side view of FIG. 27, the skirt member 174 engages with the upper clamp member 10 and the lower clamp member 20 of the clamp assembly 126 of the support surface attachment device 100. As shown in this figure, the skirt member 174 is clampingly engaged by the upper clamp member 10, and is additionally engaged by the hook-shaped teeth 34 of the lower clamp member 20.

Referring again to FIGS. 27 and 28, the engagement between the skirt member 174 and the lower clamp member 20 will be explained in more detail. As shown in the perspective view of FIG. 28, a backside of the skirt member 174 comprises a plurality of elongate hook-shaped protrusions or teeth 176 that are each spaced apart from one another by respective elongate grooves 178. With reference to the side view of FIG. 27, it can be seen that at least some of the hook-shaped protrusions or teeth 176 of the skirt member 174 matingly engage with at least some of the hook-shaped protrusions or teeth 34 on the lower clamp member 20. This engagement between the hook-shaped protrusions or teeth 34, 176 enables the skirt member 174 to be securely supported on the clamp assembly 126. The hook-shaped protrusions or teeth 164 on the lower coupling member 150 engage with the hook-shaped protrusions or teeth 176 of the skirt member 174 in a manner that is generally the same as that of the hook-shaped protrusions or teeth 34 on the lower clamp member 20. Advantageously, the hook-shaped protrusions or teeth 176, 34 on the skirt member 174 and the lower clamp member 20, respectively, allows the skirt member 174 to be mounted at various heights relative to the lower clamp member 20 so that the skirt member 174 is capable of matching PV modules having more than one height. This is important because the skirt member 174 sets the gap size of the clamp assembly 126 and the coupling assembly 130 on the south row of the PV array to accept the first row of PV modules.

In the perspective view of FIG. 26, it can be seen that the skirt member 174 is configured to cover the exposed downhill edge of the array of PV modules (only one skirt member 174 is shown in FIG. 26). Because the skirt member(s) 174 closes out the south row of PV modules, it improves the aesthetics of the completed photovoltaic array. No clamps or hardware is seen from ground. Airflow around the array is permitted. In one exemplary embodiment, the skirt member 174 may be formed from aluminum. In another exemplary embodiment, the skirt member 174 may be formed from a suitable polymer.

Figure 29:
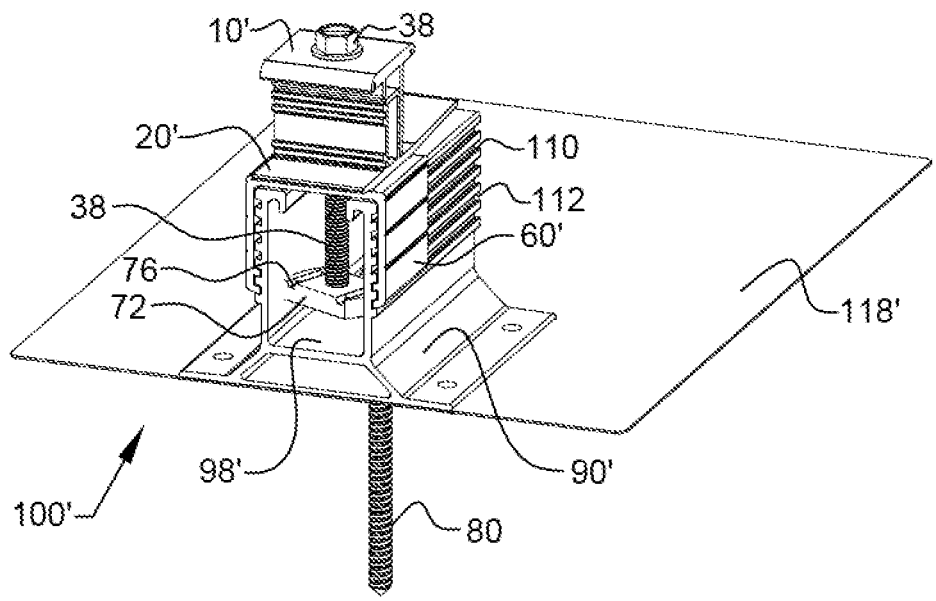
FIG. 29 is a perspective view of a support surface attachment device of a photovoltaic mounting system, according to a second embodiment of the invention, wherein the support surface attachment device is illustrated in an assembled state.

A second illustrative embodiment of a support surface attachment device is seen generally at 100' in FIG. 29. Referring to this figure, it can be seen that, in some respects, the second illustrative embodiment is similar to that of the first illustrative embodiment of the support surface attachment device 100. Moreover, some elements are common to both such embodiments. For the sake of brevity, the elements that the second embodiment of the support surface attachment device has in common with the first embodiment will not be discussed in detail because these components have already been described above.

Figure 43:
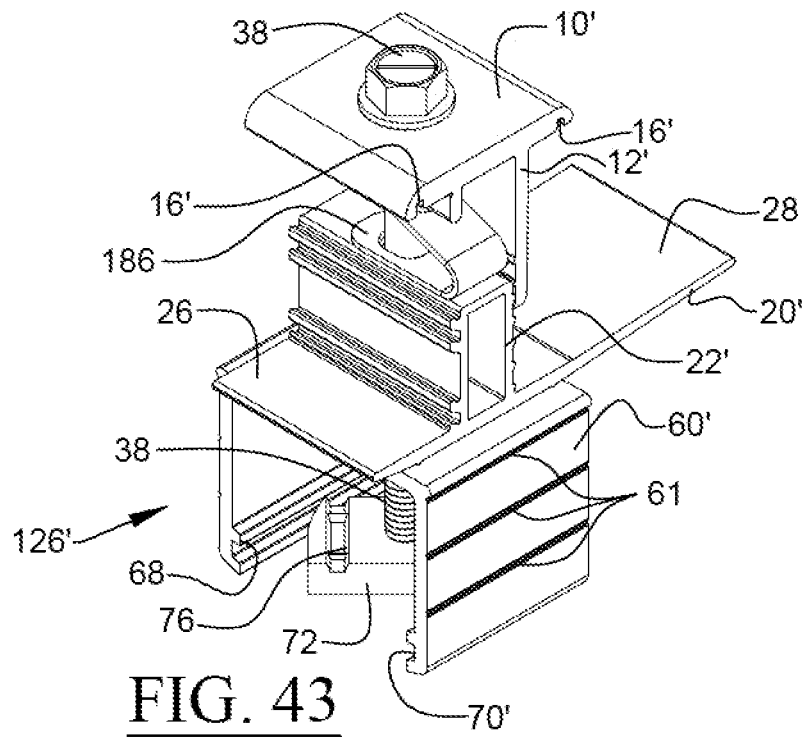
FIG. 43 is a perspective view of the clamp assembly of the support surface attachment device of FIG. 29, wherein the clamp assembly is illustrated in an assembled state.
Figure 44:
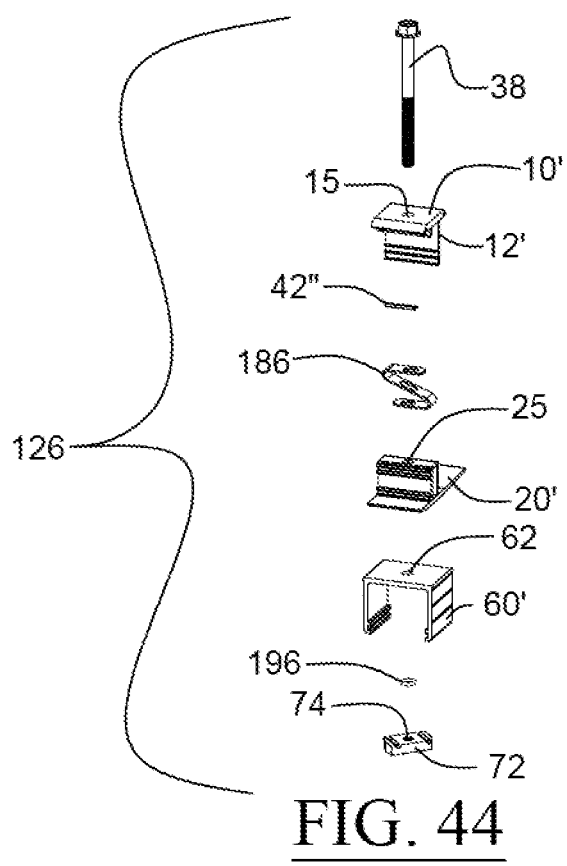
FIG. 44 is an exploded view of the clamp assembly of FIG. 43.

Initially, with reference to FIGS. 43 and 44, it can be seen that the second embodiment of the clamp assembly 126' generally includes an upper clamp member 10', a lower clamp member 20', and a glider member 60'. As best shown in the assembled view of FIG. 43, the upper clamp member 10', lower clamp member 20', and glider member 60' are connected to one another by means of a threaded fastener member 38 and a strut nut 72. As in the first illustrated embodiment, the threaded fastener member 38 is in the form of a bolt with a head portion having a serrated flange 40 (refer to FIG. 5). The strut nut 72 that is used in the second illustrative embodiment is also the same as that utilized in the first illustrative embodiment. As shown in the exploded view of FIG. 44, an O-ring 196 is provided on the shaft of the threaded fastener member 38. The O-ring 196 stabilizes the clamp assembly on the glider member 60' prior to installation.

Figure 30:
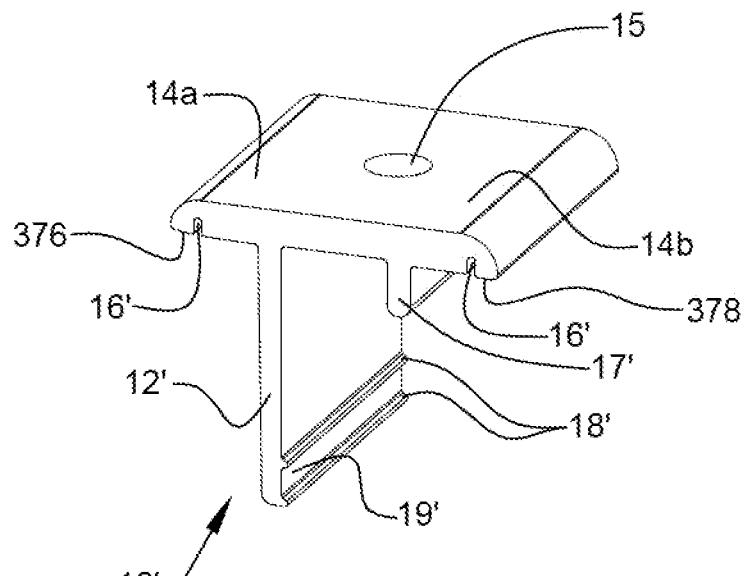
FIG. 30 is a perspective view of an upper clamp member of the clamp assembly of the support surface attachment device of FIG. 29.

Now, with reference to FIG. 30, the structure of the upper clamp member 10' of the second embodiment will be described. Similar to that described above for the first embodiment, the upper clamp member 10' generally includes a base portion 12' that is attached to the bottom surface of a flange portion 14a, 14b at approximately a 90 degree angle. In this figure, it can be seen that one side surface of base portion 12' comprises a pair of elongate protrusions or teeth 18' that are each spaced apart from one another by an elongate groove 19'. As will be described hereinafter, the pair of elongate protrusions or teeth 18' matingly engage with elongate protrusions or teeth 30' disposed on the first opposed wall portion 24a' of the upstanding middle portion 22' of the lower clamp member 20'. Referring again to FIG. 30, it can be seen that the flange portion 14a, 14b of the upper clamp member 10' further comprises a fastener aperture 15 for receiving the threaded fastener member 38 and a downwardly protruding member 17' that forms a back surface against which a photovoltaic module rests when disposed in the clamp assembly 126'. Also, as shown in FIG. 30, each of the flange portions 14a, 14b includes an elongate groove 16' disposed in the bottom surface thereof. Each of the elongate grooves 16' is configured to receive a projection portion 49' of a respective bonding clip 42' (see FIG. 31) that provides integrated grounding for the photovoltaic module installation. The projection portion 49' of each respective bonding clip 42' is received within its respective elongate groove 16' in a press-fit or interference-fit type mounting arrangement. Also, as shown in FIG. 30, the upper clamp member 10' of the clamp assembly comprises a pair of downwardly extending lip portions 376, 378 on opposite sides of the flanged top portion 14a, 14b of the upper clamp member 10'. The first downwardly extending lip portion 376 is shorter than the second downwardly extending lip portion 378 so as to facilitate the one or more photovoltaic modules being pivotably installed into the first side of the clamp assembly (i.e., into the side of clamp assembly with flange portion 14a). As such, the shorter downwardly extending lip portion 376 does not interfere with the minimum gap needed to allow pivoted north side PV module mounting.

Figure 45:
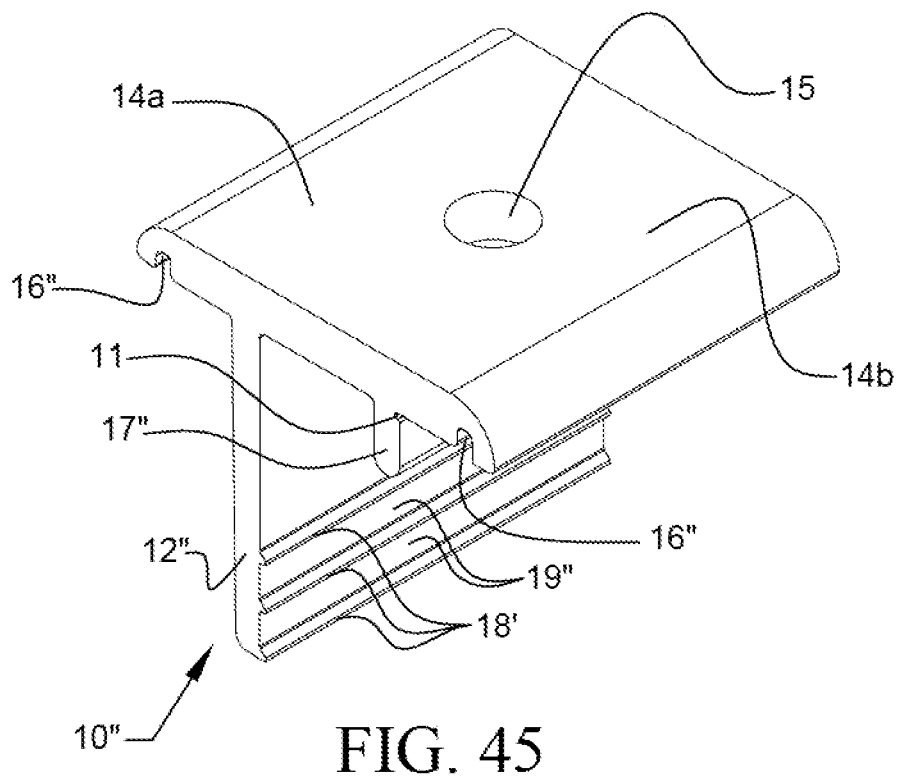
FIG. 45 is a perspective view of an upper clamp member of the clamp assembly of the support surface attachment device, according to an alternative embodiment of the invention.
Figure 46:
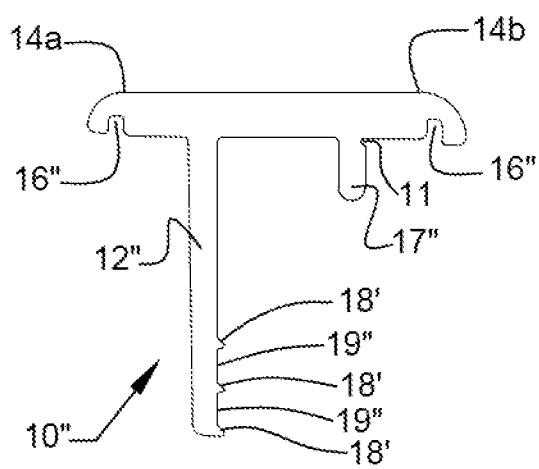
FIG. 46 is a side view of the upper clamp member of FIG. 46.
Figure 75:
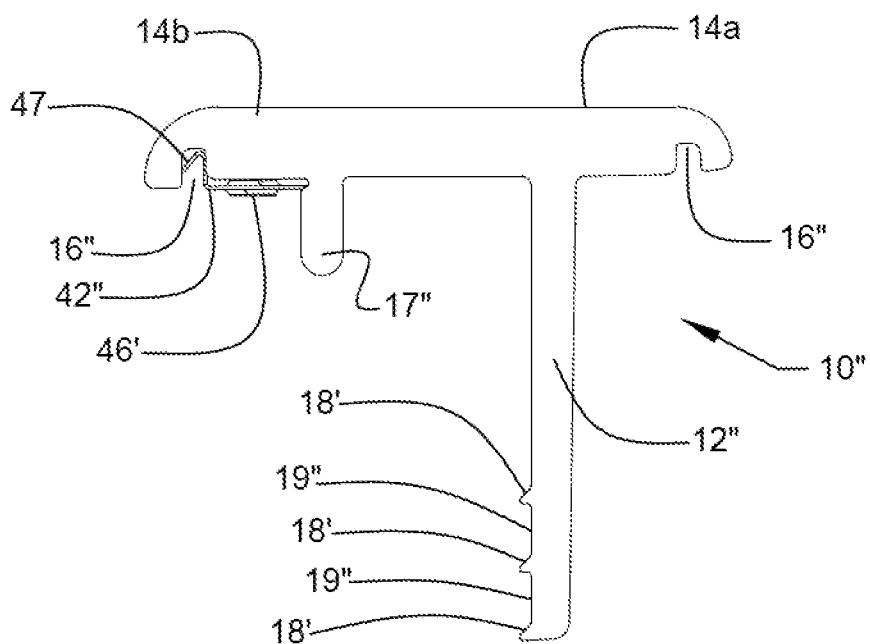
FIG. 75 is a side view of the upper clamp member of FIGS. 45 and 46 together with a bonding clip attached thereto, according to an embodiment of the invention.

A third illustrative embodiment of the upper clamp member 10" is shown in FIGS. 45 and 46. The third embodiment of the upper clamp member 10" is similar in most respects to the second embodiment of the upper clamp member 10' explained above. Like the second embodiment of the upper clamp member 10', the upper clamp member 10" in FIGS. 45 and 46 generally includes a base portion 12" that is attached to the bottom surface of a flange portion 14a, 14b at approximately a 90 degree angle. Although, in FIGS. 45 and 46, it can be seen that the one side of the base portion 12" of the upper clamp member 10" comprises three (3) elongate protrusions or teeth 18' that are each spaced apart from one another by respective elongate grooves 19", rather than the pair of elongate protrusions or teeth 18' described above for the second embodiment. Similar to the upper clamp member 10' of FIG. 30, each of the flange portions 14a, 14b of the upper clamp member 10" of FIGS. 45 and 46 includes an elongate groove 16" disposed in the bottom surface thereof for accommodating a respective bonding clip (e.g., bonding clip 42' in FIG. 31 or bonding clip 42" in FIG. 47). However, unlike the upper clamp member 10' of FIG. 30, the downwardly protruding member 17" of the upper clamp member 10" additionally contains a groove 11 formed in one side thereof for capturing an edge of the bonding clip (e.g., bonding clip 42' in FIG. 31 or bonding clip 42" in FIG. 47), and holding it in place (refer to FIG. 75).

Figure 31:
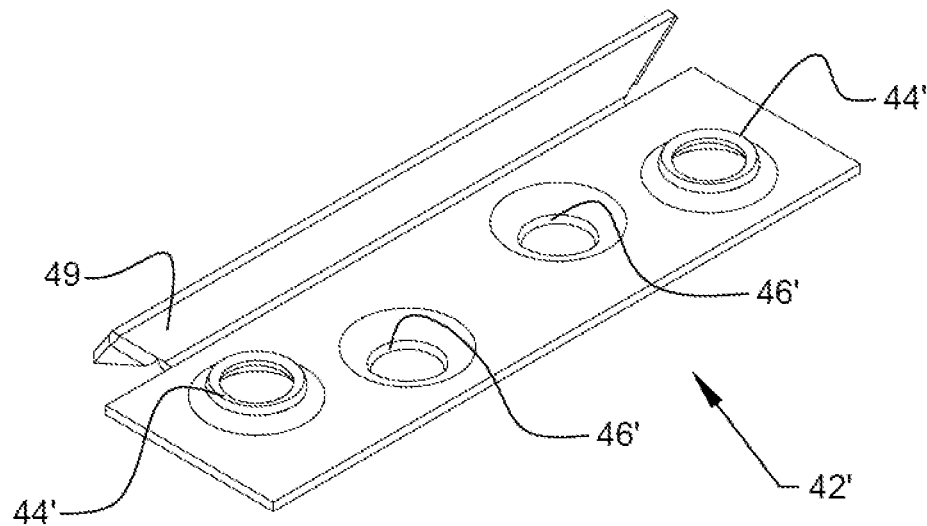
FIG. 31 is a perspective view of a bonding clip of the clamp assembly of the support surface attachment device of FIG. 29.
Figure 47:
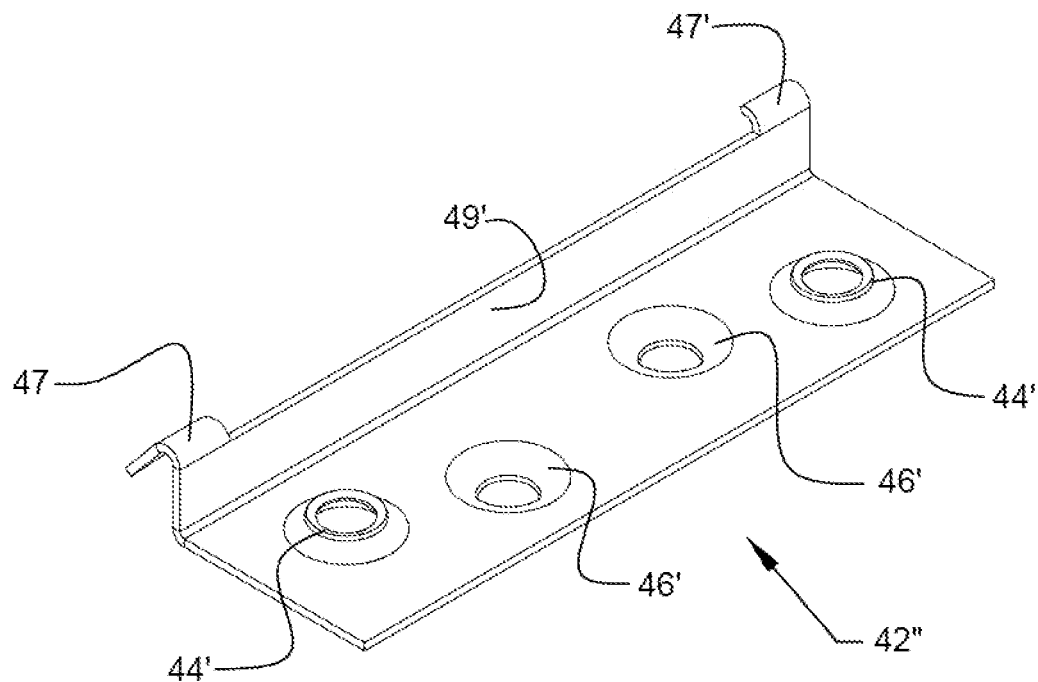
FIG. 47 is a perspective view of a bonding clip, according to an alternative embodiment of the invention.
Figure 81:
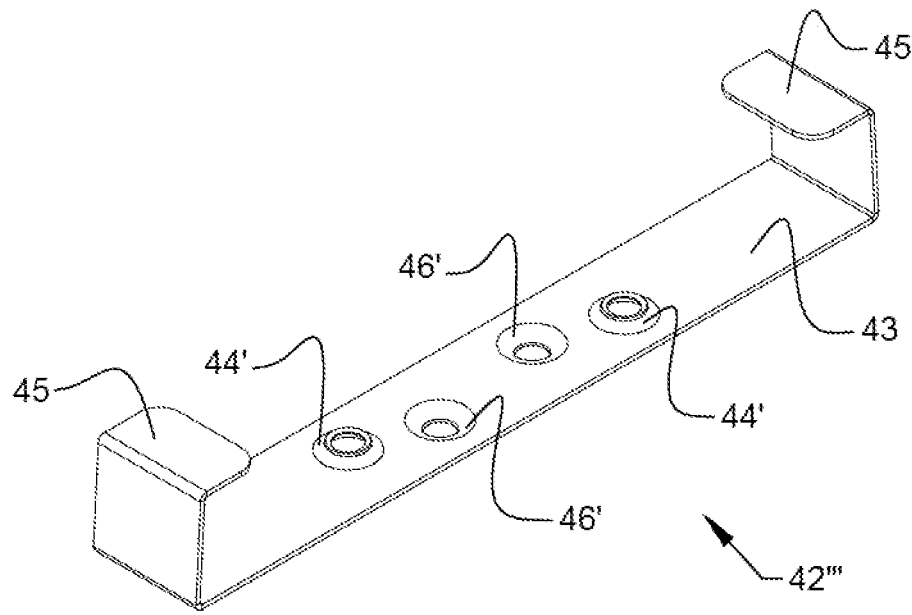
FIG. 81 is a perspective view of a bonding clip, according to another alternative embodiment of the invention.

Additional embodiments of the bonding or grounding clip, which provides integrated grounding for the photovoltaic modules, are illustrated in FIGS. 31, 47, and 81, respectively. Similar to the bonding clip 42 of FIG. 7 described above, the bonding clips 42', 42" of FIGS. 31 and 47 each comprise a plate-like body portion with a plurality of upwardly protruding annular members 44' and a plurality of downwardly protruding annular members 46' formed therein. In particular, in the illustrative embodiments, each of the upwardly protruding annular members 44' is arranged adjacent to a respective opposite end of the plate-like body portion, and the pair of downwardly protruding annular members 46' are disposed between the pair of upwardly protruding annular members 44'. The upwardly and downwardly protruding annular members 44', 46' are also generally arranged in a staggered, non-aligned configuration on the plate-like body portions of the bonding clips 42', 42". As explained above for bonding clip 42, the upwardly protruding members 44 are designed to pierce the metallic bottom surface of the flange portion 14a, 14b of the upper clamp member 10', while the downwardly protruding annular member 46 is designed to pierce the anodized layer of the photovoltaic module to provide integrated grounding between the photovoltaic modules.

Referring to bonding clip 42' in FIG. 31, it can be seen that a projection portion 49 is attached to the plate-like body portion of the bonding clip 42'. The projection portion 49 of the bonding clip 42' engages with a selected one of the elongate grooves 16', 16" in the upper clamp members 10', 10" so as to hold the bonding clip 42' in place. The bonding clip 42" of FIG. 47 also contains a projection portion 49' that is attached to the plate-like body portion of the bonding clip 42". As shown in FIG. 47, the projection portion 49' of the bonding clip 42" comprises a pair of spaced-apart bent over tabs 47, 47', wherein each tab 47, 47' is disposed at an opposite end of the projection portion 49'. Each of the tabs 47, 47' engages with a selected one of the elongate grooves 16', 16" in the upper clamp members 10', 10" in order to hold the bonding clip 42', 42" in place in the clamp assembly 126'. Also, similar to the bonding clips 42, 42', 42", the bonding clip 42''' of FIG. 81 comprises a plate-like body portion 43 with a plurality of upwardly protruding annular members 44' and a plurality of downwardly protruding annular members 46' formed therein. The plate-like body portion 43 of the clip 42''' is not folded over. Like the embodiment of FIGS. 31 and 47, the upwardly and downwardly protruding annular members 44', 46' of the clip 42''' are arranged in a staggered configuration. However, unlike the preceding embodiments of the bonding clip, the clip attachment portions of the bonding clip 42''' of FIG. 81 comprise a pair of flange members 45, each of which is disposed at an opposite end of the clip body portion 43. When the bonding clip 42''' is installed on an object (e.g., upper clamp members 10', 10"), a top portion of each of the pair of flange members 45 (i.e., the top fold of the flange members 45) remains visible to an installer so that an installed condition of the bonding clip 42''' is capable of being verified by the installer. Also, advantageously, the flange members 45 of the bonding clip 42''' allow the clip 42''' to be installed without the need to fully open the clamp assembly (i.e., the installer only needs to open the clamp a small amount). In one or more embodiments, the bonding clip 42''' may be used on the north side of a photovoltaic module row.

Figure 32:
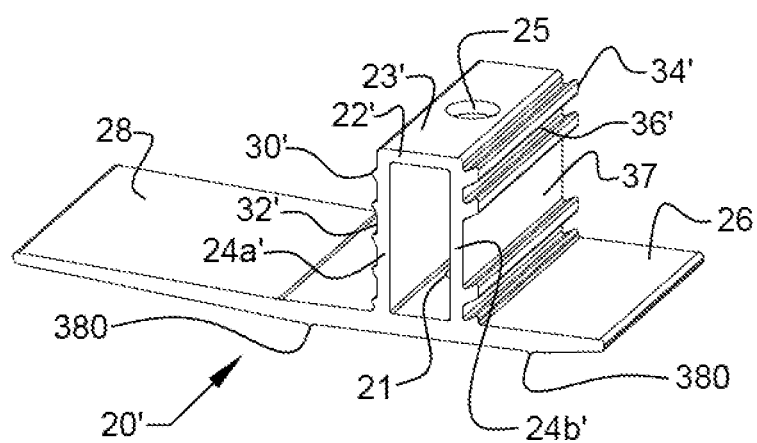
FIG. 32 is a perspective view of a lower clamp member of the clamp assembly of the support surface attachment device of FIG. 29.

Next, turning to FIG. 32, the structure of the second embodiment of the lower clamp member 20' will be explained. Similar to that described above for the lower clamp member 20, it can be seen that the lower clamp member 20' generally includes an upstanding middle portion 22' with first and second ledge portions 26, 28 extending outwardly from the upstanding middle portion 22' (refer to FIG. 32). In FIG. 32, it can be seen that the upstanding middle portion 22 of the lower clamp member 20 comprises a lower fastener aperture 21 disposed in a bottom wall portion thereof, and an upper fastener aperture 25 disposed in a top wall portion 23' thereof. Each of these apertures 21, 25 receives the shaft of the threaded fastener member 38. The bottom wall portion and the top wall portion 23' of the upstanding middle portion 22 of the lower clamp member 20 are connected to one another by first and second opposed wall portions 24a', 24b'. As shown in FIG. 32, the first opposed wall portion 24a' comprises a plurality of elongate protrusions or teeth 30' (e.g., with generally wedge-shaped cross-sections) that are each spaced apart from one another by respective elongate grooves 32'. As explained above, the elongate teeth 30' of the first opposed wall portion 24a' engage with the elongate teeth 18' of the base portion 12' of the upper clamp member 10'. Referring again to FIG. 32, it can be seen that the second opposed wall portion 24b' comprises a plurality of upwardly inclined elongate protrusions or teeth 34' that are spaced apart from one another by elongate grooves 36', 37. More particularly, the upper two (2) protrusions or teeth 34' are spaced apart from one another by the narrow width elongate groove 36', while the upper two (2) protrusions or teeth 34' are spaced apart from a bottom protrusion or tooth 34' disposed near the surface of the second ledge portion 28 by a wide elongate groove 37. The upwardly inclined elongate protrusions or teeth 34' on the second opposed wall portion 24b' are configured to engage with a wind deflector and/or a mounting skirt for deflecting wind up and over the photovoltaic array and/or improving the aesthetics of the array (see e.g., FIG. 72). Advantageously, the upwardly inclined elongate protrusions or teeth 34' allow the skirt to be dropped in at the appropriate height, and once the skirt is secured, the upward facing protrusions or teeth 34' resist torsional detachment from the lower clamp member 20' (e.g., due to ice expansion on the PV array applying a force against the skirt). Each of the first and second ledge portions 26, 28 of the lower clamp member 20 is configured to accommodate a photovoltaic module frame member resting thereon. As described above for the first embodiment of the lower clamp member 20, the second opposed ledge 28 of the lower clamp member 20' is bent slightly upward, or is tapered slightly upward at an acute angle, so as to be capable of performing the same functionality explained above for the lower clamp member 20. In addition, as shown in FIG. 32, the lower clamp member 20' of the clamp assembly comprises a plurality of ridges 380 disposed on a bottom surface thereof. The ridges 380 are configured to increase a frictional engagement between the lower clamp member 20' and the glider member 60' so as prevent the upper and lower clamp members 10', 20' of the clamp assembly from rotating relative to the glider member 60' when the threaded fastener member 38 is tightened by an installer (i.e., the ridges 380 increase the resistance to rotation of the clamp assembly on the glider member 60').

In the illustrated embodiment, one or more of the teeth or serrations 30' on the lower clamp member 20' are configured to engage one or more of the teeth or serrations 18' on the upper clamp member 10' when the threaded fastener 38 is being tightened so as to maintain a minimum gap between the upper clamp member 10' and the lower clamp member 20' for receiving one or more photovoltaic module frames of one or more photovoltaic modules when the one or more photovoltaic modules are pivotably installed into a first side (e.g., north side) of the clamp assembly. In an exemplary embodiment, the clamp assembly 10', 20' is designed to accept 32, 33, 35, 40, 45, and 50 millimeter (mm) PV modules. As such, in the exemplary embodiment, the serrations 18', 30' on the upper and lower clamp members 10', 20' are positioned to engage at the above mentioned dimensions. As the threaded fastener 38 of the clamp is tightened, the downhill side of the clamp contacts a module (e.g., the south side of the clamp), and a torque is applied to the upper clamp member 10' engaging the teeth. This allows the uphill side of the clamp (e.g., the north side of the clamp), to remain open, allowing the next module to slide in from above, and to be pivoted mounted in place.

In order to maintain a predetermined spacing distance between the upper and lower clamp members 10', 20' during PV module installation, a leaf spring member 186 is provided between the clamp members 10', 20' (refer to FIGS. 43 and 44). In an exemplary embodiment, the leaf spring member 186 may be Z-shaped. That is, as best shown in FIG. 43, the leaf spring member 186 is disposed between the top wall portion 23' of the lower clamp member 20' and the bottom surface of the flange portion 14a, 14b of the upper clamp member 10'. During the installation of the PV modules in the PV array, the spring member 186 holds the upper clamp member 10' in place above the lower clamp member 20' so that a PV module can be inserted between the two (2) clamp members 10', 20'. Without the use of the spring member 186, the flange 14a, 14b of the upper clamp member 10' would tend to just rest on the top of the lower clamp member 20', thereby making it very difficult to insert between the two (2) clamp members 10', 20'. In addition, the use of the spring member 186 in the clamp assembly 126' allows the fastener member 38 to be tightened so that the strut nut 72 engages the base and secures the clamp to the base 90' without the clamp being compressed.

Figure 73:
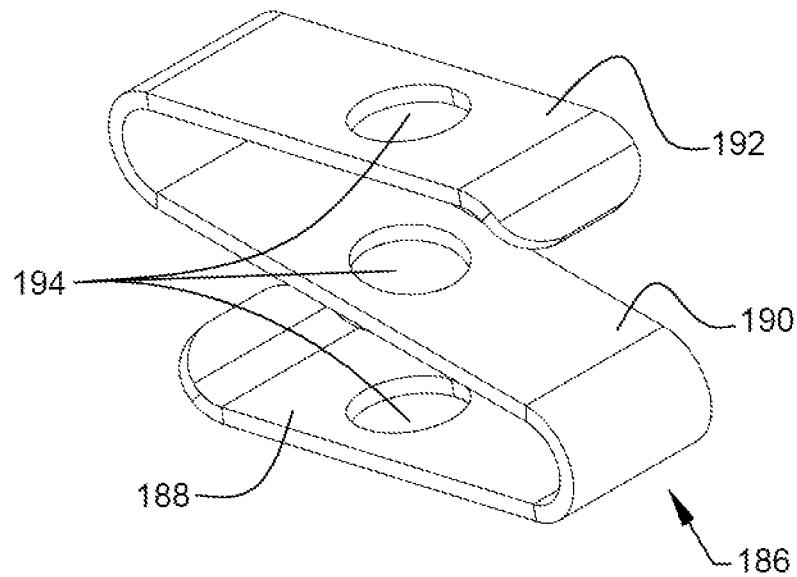
FIG. 73 is a perspective view of a first spring member that may be utilized in the clamp assembly of FIGS. 43 and 44, according to one embodiment of the invention.
Figure 74:
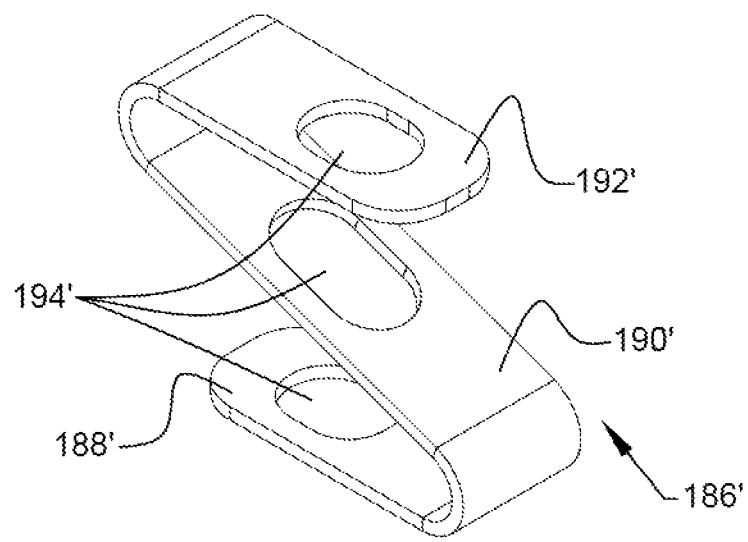
FIG. 74 is a perspective view of a second spring member that may be utilized in the clamp assembly of FIGS. 43 and 44, according to another embodiment of the invention.

Turning to FIG. 73, it can be seen that the leaf spring member 186 of the clamp assembly 126' comprises bottom and top leg portions 188, 192, which are connected to one another by a middle diagonal leg portion 190. Each of the leg portions 188, 190, 192 is provided with a respective fastener aperture 194 disposed therethrough for accommodating the shaft of the threaded fastener member 38. An alternative embodiment of the leaf spring member 186' is depicted in FIG. 74. Like the spring member 186, the leaf spring member 186' of FIG. 74 comprises bottom and top leg portions 188', 192', which are connected to one another by a middle diagonal leg portion 190'. However, it can be seen that the geometry of the leg portions 188', 190', 192' of the spring member 186' of FIG. 74 are slightly different than the leg portions 188, 190, 192 of the spring member 186 (e.g., the outer ends of the bottom and top leg portions 188', 192' are not bent like the bottom and top leg portions 188, 192 of the FIG. 73 embodiment). Also, similar to the spring member 186, each of the leg portions 188, 190, 192 of the spring member 186' in FIG. 74 is provided with a respective fastener aperture 194' disposed therethrough for accommodating the shaft of the threaded fastener member 38. However, it can be seen that the fastener apertures 194' are generally oval-shaped, rather than being circular as in FIG. 73.

Figure 33:
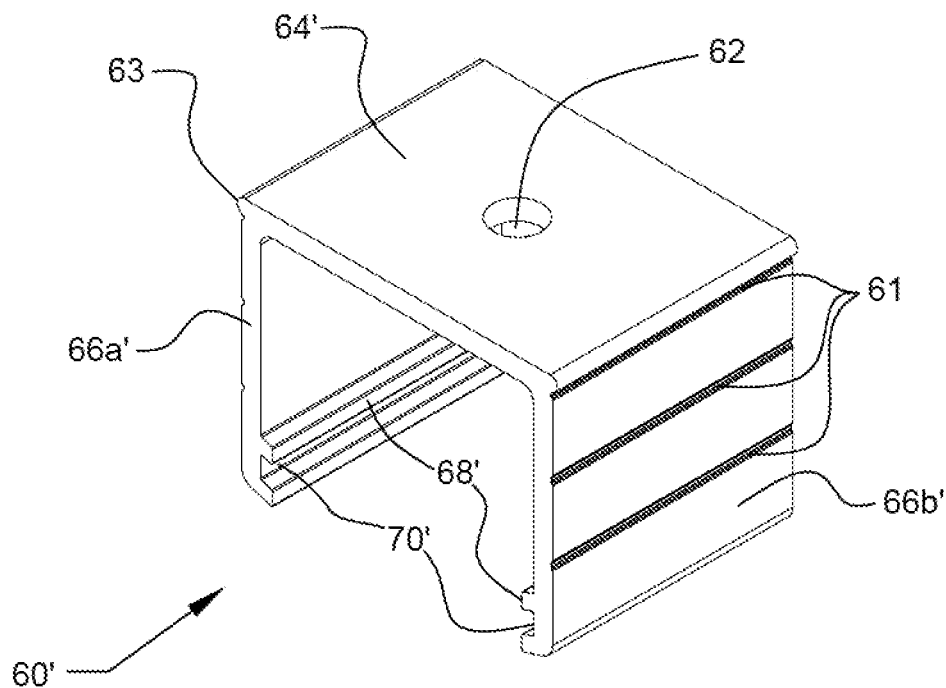
FIG. 33 is a perspective view of a glider member of the clamp assembly of the support surface attachment device of FIG. 29.

As best shown in FIG. 43, the lower clamp member 20' is positioned above a glider member 60' that is configured to be adjustably disposed on the upstanding base member 90' in both a horizontal and vertical direction, similar to that explained above for the glider member 60. Referring to FIG. 33, like the glider member 60 described above, it can be seen that the glider member 60' of the clamp assembly 126' comprises a generally inverted, U-shaped profile with a top wall portion 64' and first and second opposed wall portions 66a', 66b' extending downwardly from the top wall portion 64'. The top wall portion 64' comprises a fastener aperture 62 disposed centrally therein for receiving the shaft of the threaded fastener member 38. In FIG. 33, it can be seen that the inner surfaces of each of the first and second opposed wall portions 66a', 66b' comprises a pair of elongate protrusions or teeth 68' that are spaced apart from one another by a respective elongate groove 70'. The pair of teeth 68' on each of the inner surfaces of the opposed wall portions 66a', 66b' are designed to engage with respective teeth 110 on opposed upstanding wall portions 104a', 104b' of the base member 90'. The glider member 60' may be slid into place on the top of the base member 90' by engaging its teeth 68' with the teeth 110 of the base member 90'. To permit horizontal adjustability, the glider member 60' is capable of being slid along the length of the base member 90'. And, to permit vertical adjustability, the glider member 60' is capable of being adjusted placed along a vertical height of the upstanding wall portions 104a', 104b' of the base member 90' by selectively engaging certain ones of the teeth 68' on the glider member 60' with certain ones of the grooves 112 on the base member 90', and the groove 70' on the glider member 60' with a certain one of the teeth 110 on the base member 90'.

As shown in FIG. 33, the outer sides of the first and second opposed wall portions 66a', 66b' of the glider member 60' are provided with a plurality of generally parallel, visual indicator grooves 61 formed therein (e.g., three (3) visual indicator grooves 61). During the installation of the PV modules, the visual indicator grooves 61 operate as visual indicating bands for positioning the clamp assembly 126' at its desired height (i.e., the visual indicator grooves 61 enable the desired height of the clamp assembly 126' relative to the base member 90' to be more easily obtained by the installer during the PV module installation process). Also, referring again to FIG. 33, it can be seen that opposed protrusions 63 may be provided at the top of the glider member 60' for holding a chalk line (e.g., a string) in place that is used for the alignment of the PV module row on the support surface (e.g., roof). In an illustrative embodiment, the chalk line (e.g., a string) may be received within the topmost one of the grooves 61, and the lower two (2) grooves 61 may be used as visual aid indicators showing the height of the glider member 60' on the upstanding base member 90' (i.e., corresponding to the grooves 61).

Figure 34:
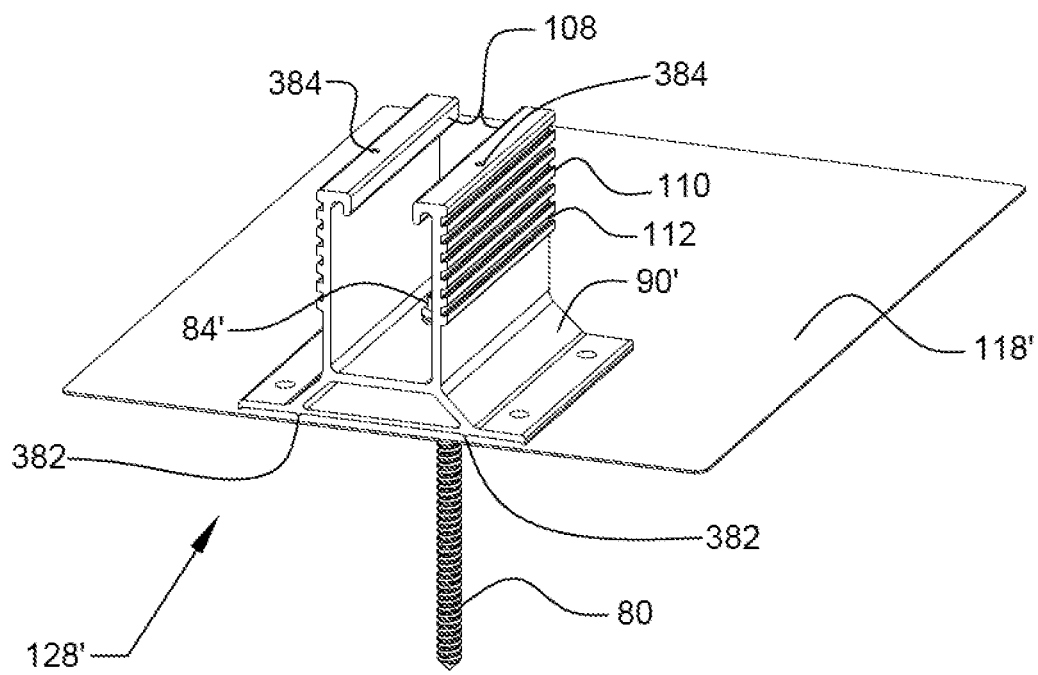
FIG. 34 is a perspective view of the base assembly of the support surface attachment device of FIG. 29, wherein the base assembly is illustrated in an assembled state.

Now, referring to FIGS. 29 and 34, it can be seen that the second illustrative embodiment of the base assembly 128' generally includes an upstanding base member 90' and a lower flashing member 118'. As best shown in the assembled view of FIG. 34, the upstanding base member 90' is connected to the lower flashing member 118' by a threaded fastener member 80. As described above for the first illustrated embodiment, the threaded fastener member 80 of the second embodiment is in the form of a structural mounting bolt with a head portion 82 and a threaded shaft portion (see FIG. 16). In the illustrated embodiment, each support surface attachment device 100' is secured to a respective one of the roof rafters of a building by means of a structural mounting bolt 80 (e.g., refer to FIG. 29).

Figure 35:
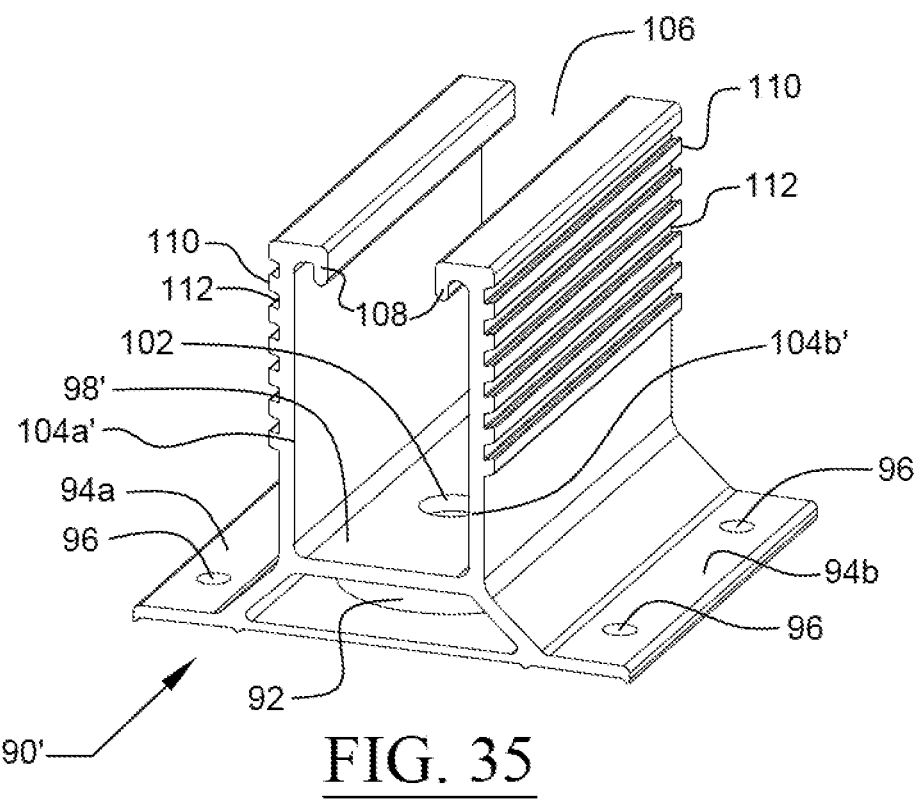
FIG. 35 is a perspective view of an upstanding base member of the base assembly of FIG. 34.

Turning to FIG. 35, the upstanding base member 90' of the base assembly 128' will now be described. As shown in this figure, the upstanding base member 90' generally comprises a base portion with first and second opposed base flange portions 94a, 94b and an elevated shelf portion 98'. Unlike the first embodiment of the upstanding base member 90', the elevated shelf portion 98' of the upstanding base member 90' does not comprise any recesses formed therein. Rather, the elevated shelf portion 98' is a generally planar plate that extends between the two (2) opposed upstanding wall portions 104a', 104b'. In FIG. 35, it can be seen that the opposed upstanding wall portions 104a', 104b' extend upwardly from the base portion of the base member 90'. Also, with reference to FIG. 35, it can be seen that each of the opposed base flange portions 94a, 94b comprises a plurality of fastener apertures 96 arranged in a substantially linear configuration along the length thereof. When it is desired to mount the upstanding base member 90' directly to the roof deck, rather than a roof rafter, the base member 90' is secured to the roof deck using fasteners disposed in the fastener apertures 96. The base portion of the base member 90' comprises a centrally disposed aperture 92 for accommodating the raised portion 122' of the flashing member 118' passing therethrough. The elevated shelf portion 98' of the base portion of the base member 90' comprises a flashing/fastener aperture 102 disposed therethrough for accommodating the top annular portion 125 of the flashing raised portion 122' and the shaft of the threaded fastener member 80 disposed within the flashing annular portion 125 (e.g., see the sectional view in FIG. 78). In FIG. 35, it can be seen that the outer surfaces of each of the first and second opposed upstanding wall portions 104a, 104b comprises a plurality of elongate protrusions or teeth 110 that are each spaced apart from one another by respective elongate grooves 112. As described above, the set of teeth 110 on each of the outer surfaces of the opposed wall portions 104a, 104b are designed to engage with the respective teeth 68' on the opposed wall portions 66a', 66b' of the glider member 60'. Also, as shown in FIG. 35, the opposed wall portions 104a', 104b' of the base member 90' cooperate to define an upper elongate slot 106 that accommodates the shaft of the threaded fastener member 38 passing therethrough. Also, each of the opposed wall portions 104a', 104b' comprises a downturned lip portion 108 that is received within a respective one of the elongate grooves 76 disposed in the top surface of the strut nut 72. Turning to FIG. 34, it can be seen that a bottom surface of the upstanding base member 90' may include a plurality of ridges 382 disposed thereon. The ridges 382 are configured to increase a frictional engagement between the upstanding base member 90' and the flashing member 118' so as prevent the upstanding base member 90' from rotating relative to the flashing member 118' when a base fastener member 80 is tightened by an installer (i.e., the ridges 382 slightly deform the flashing member 118' when the base member 90' is tightened against the flashing so as to resist the turning of the base member 90' relative to the flashing member 118'). Also, the ridges 382 disposed on the bottom surface of the upstanding base member 90' are additionally configured to capture and hold sealing tape (e.g., butyl tape) when the upstanding base member 90' is mounted directly against the support surface (e.g., directly against a roof deck in deck-mounted installation). Referring again to FIG. 34, it can be seen that a top surface of the upstanding base member 90' may include a plurality of visual installation guide marks 384 configured to facilitate an installation of one or more rows of the one or more photovoltaic modules (e.g., to facilitate the accurate setting of the south row in the PV module array).

Figure 37:
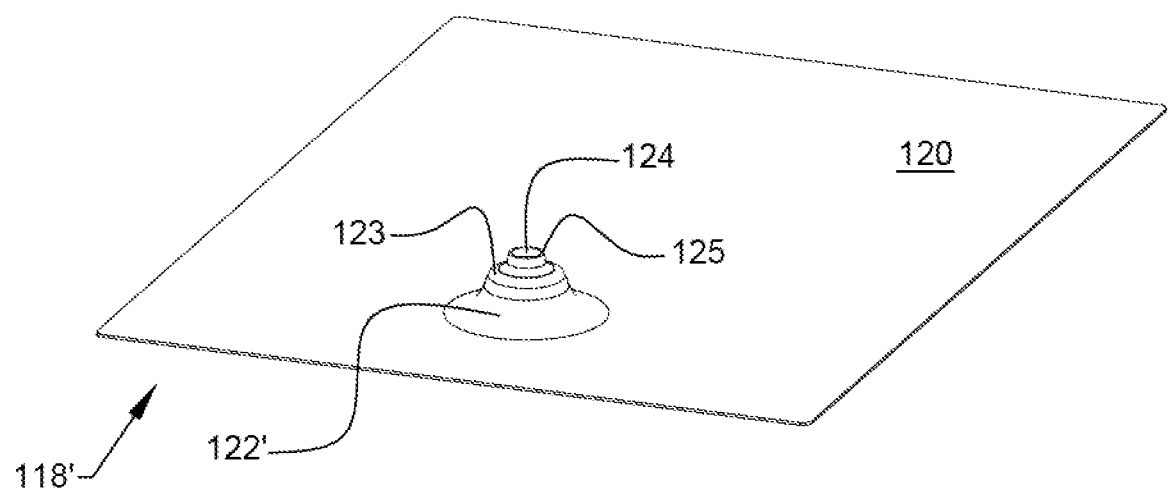
FIG. 37 is a perspective view of a flashing member of the base assembly of FIG. 34.

With reference primarily to FIG. 37, the flashing member 118' of the base assembly 128' will now be explained. Like the flashing member 118 described above, the flashing member 118' helps to maintain the integrity of the building roof by preventing roof leaks. In FIG. 37, it can be seen that the flashing member 118' generally comprises a generally planar body portion 120' and a raised portion or projection 122' that extends upwardly from the generally planar body portion 120' in a generally vertical direction. As best shown in the perspective view of FIG. 37, the raised portion or projection 122' is offset with respect to the center of the generally planar body portion 120' (i.e., the raised portion or projection 122' is disposed to the side of the central point of the generally planar body portion 120'). In FIG. 37, it can be seen that the raised portion or projection 122' includes a centrally disposed fastener aperture 124 for receiving the shaft of the structural mounting bolt 80 therein. As shown in FIG. 37, the flashing raised portion 122' further includes a generally horizontal ledge portion 123 that extends radially inward towards the fastener aperture 124, and annular collar portion 125 that extends upwardly from the ledge portion 123 of the flashing raised portion 122'. As shown in the sectional view of FIG. 78, the bottom surface of the elevated shelf portion 98' of the base member 90' is disposed adjacent to the flashing ledge portion 123 in the assembled state of the base assembly 128', while the upstanding, annular collar portion 125 of the flashing raised portion 122' extends through the flashing/fastener aperture 102 in the base shelf portion 98' to help maintain the integrity of the building roof. As described above for the flashing member 118, the raised nature of the protrusion or projection 122' above the remainder of the generally planar body portion 120' of the flashing member 118' substantially prevents any precipitation (i.e., rain water) from entering the structure of the building roof through the fastener aperture 124. In the assembled state of the support surface attachment device 100', in order to further prevent any leaks through the aperture 124 of the flashing member 118', an upper sealing washer 84' (see FIGS. 76-78) is provided on the top of the annular collar portion 125 of the flashing raised portion 122' of the flashing member 118'.

Figure 78:
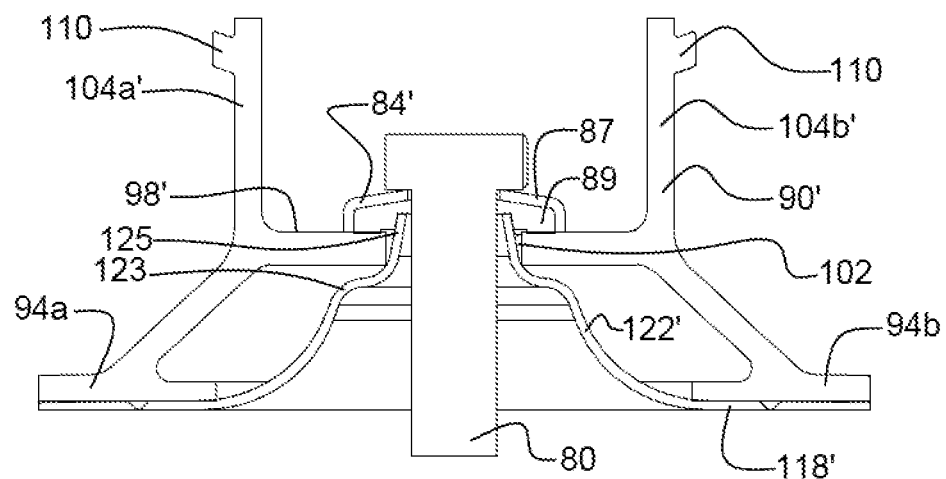
FIG. 78 is a partial sectional view cut through the base assembly of FIGS. 34, wherein sealing engagement between the base member and the flashing member is shown.

In the illustrated embodiment of FIG. 78, when the upstanding base member 90' of the base assembly is assembled with the flashing member 118', a top surface of the circumferential ledge portion 123 of the raised portion 122' of the flashing member 118' is configured to regulate a height of the top annular portion 125 of the raised portion 122' of the flashing member 118' so that a top rim of the top annular portion 125 of the raised portion 122' does not protrude substantially above a top surface of the elevated shelf 98' of the upstanding base member 90'. That is, in the illustrative embodiment, when the base member 90' contacts the flashing member 118', the top annular portion 125 protrudes a small predetermined distance above the top surface of the elevated shelf 98'. The interface between the base member 90' and the flashing member 118' dictates the height of the flashing protruding above the base web or shelf 98', and it prevents the over compression of the sealing member 89 of the sealing washer 84'. The large radius at the base of the raised portion 122' of the flashing member 118' is designed to flex to accommodate various roof conditions further increasing the uniformity of sealing interface.

Figure 76:
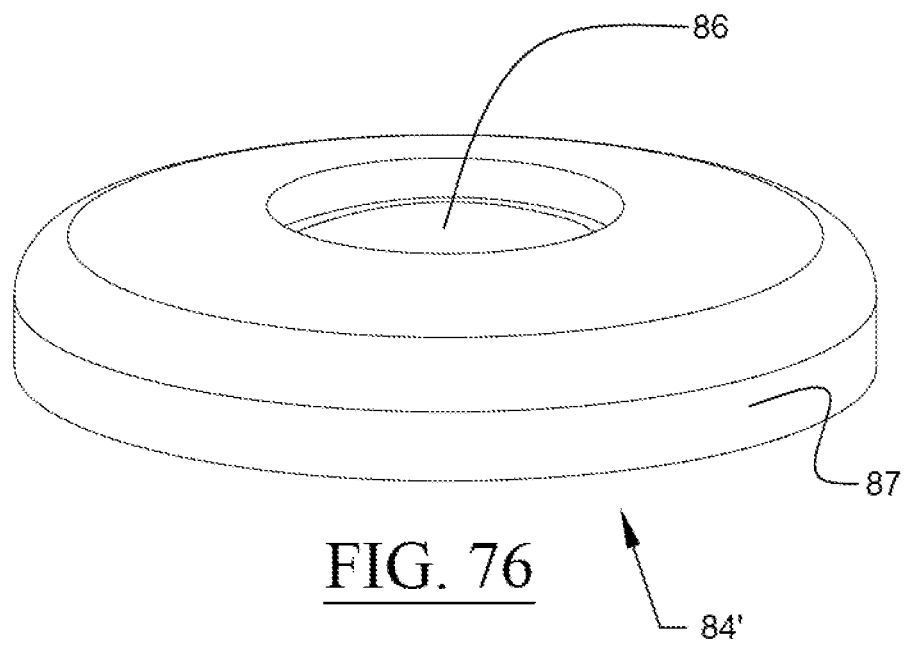
FIG. 76 is a perspective view of an upper sealing washer of the base assembly of FIGS. 34 and 78, according to an embodiment of the invention.
Figure 77:
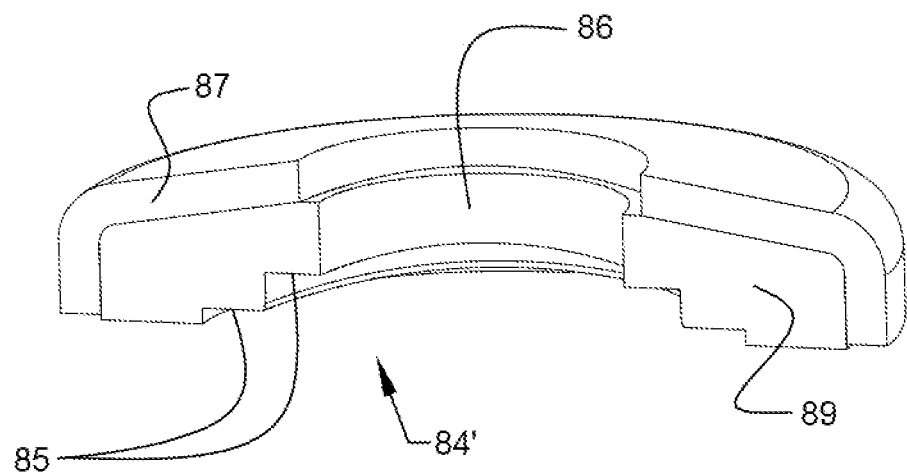
FIG. 77 is a sectional view cut through the upper sealing washer of FIG. 76.

With combined reference to FIGS. 76-78, it can be seen that the upper sealing washer 84' comprises a fastener aperture 86 disposed therethrough for accommodating the shaft of the structural mounting bolt 80. The upper sealing washer 84' is disposed between the bottom surface of the head portion 82 of the bolt 80 and the top surface of the elevated shelf portion 98' of the base member 90' to additionally prevent any leaks through the roof. As shown in FIGS. 76-78, the upper sealing washer 84' comprises a top outer portion 87 and a bottom inner portion 89 disposed within, and underneath the top outer portion 87. In one exemplary embodiment, the top outer portion 87 of the upper sealing washer 84' may be formed from stainless steel and the bottom inner portion 89 of the upper sealing washer 84' may be formed from a suitable plastic or rubber, such as ethylene propylene diene monomer (EPDM). In one or more embodiments, the upper sealing washer 84' is a cup washer that is configured to control the type and/or amount of washer compression so that, when compressed by the tightening of the bolt 80, the EPDM inner portion 89 of the washer 84' will not enter into the annular gap between the outer surface of the flashing annular collar portion 125 and the inner circular wall of the flashing/fastener aperture 102 in the base shelf portion 98' of the base member 90'. That is, the compression of the upper sealing washer 84' is regulated so as to seal around the outer sidewall of the flashing annular collar portion 125, but not enter the annular gap between the flashing annular collar portion 125 and the inner circular wall of the flashing/fastener aperture 102, thereby creating an efficient waterproof seal for the base assembly 128'.

As best shown in the illustrative embodiment of FIG. 77, the bottom inner portion 89 of the upper sealing washer 84' may comprise a stepped and/or upwardly tapered bottom surface 85 so as to tightly engage the top rim of the flashing annular collar portion 125, and to prevent the EPDM inner portion 89 of the washer 84' from entering the fastener aperture 124 in the flashing member 118' (see FIGS. 37 and 78).

Advantageously, the design of the flashing member 118' illustrated in FIGS. 34, 37, and 78 results in superior waterproofing because its water seal is elevated above the roof surface (i.e., at the top of the raised portion or projection 122') so that the integrity of the flashing waterproofing is maintained. Also, because the flashing member 118' may be formed by stamping, its manufacturing costs are inexpensive. In addition, the configuration of the flashing member 118' allows adjacent flashing members 118' to be readily stacked for compact shipping.

Figure 36:
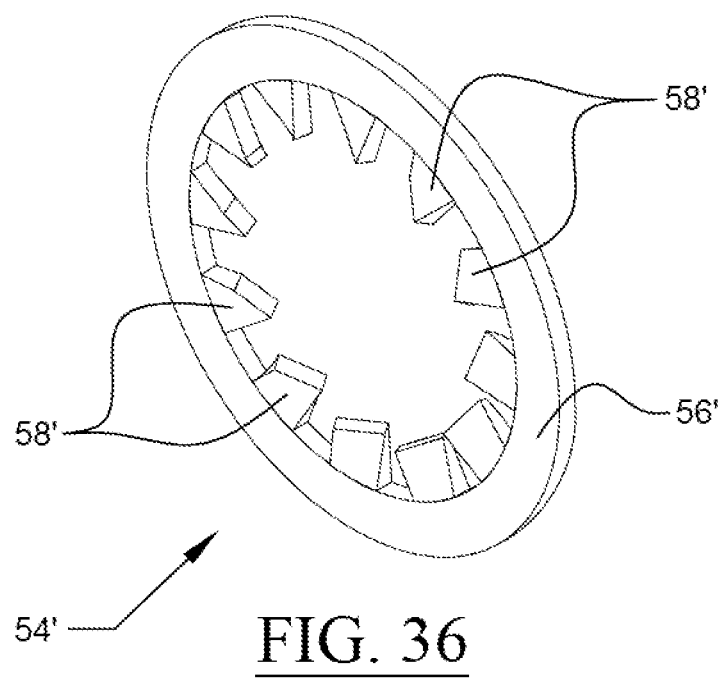
FIG. 36 is a perspective view of a washer of the clamp assembly of the support surface attachment device of FIG. 29.

With reference to FIG. 36, in the illustrative embodiment, the base assembly 128' may be further provided with a serrated washer 54' disposed between the ledge portion 123 of the flashing raised portion 122' and the bottom surface of the elevated shelf portion 98' of the base member 90' when the base member 90' is disposed on top of the flashing member 118' in the assembled state of the support surface attachment device 100'. The serrated washer 54' is used for electrically grounding the base assembly 128' by creating a current path between the base member 90' and the flashing member 118'. In FIG. 36, it can be seen that the serrated washer 54' includes an outer annular body portion 56' with a plurality of diagonally-oriented teeth 58' extending radially inward from the outer annular body portion 56'. The diagonally-oriented teeth 58' of the serrated washer 54' are designed to cut into the adjacent surfaces of the base member 90' and the flashing member 118' so as to provide an electrical grounding path between the two components so that the two components are electrically bonded to one another.

Figure 40:
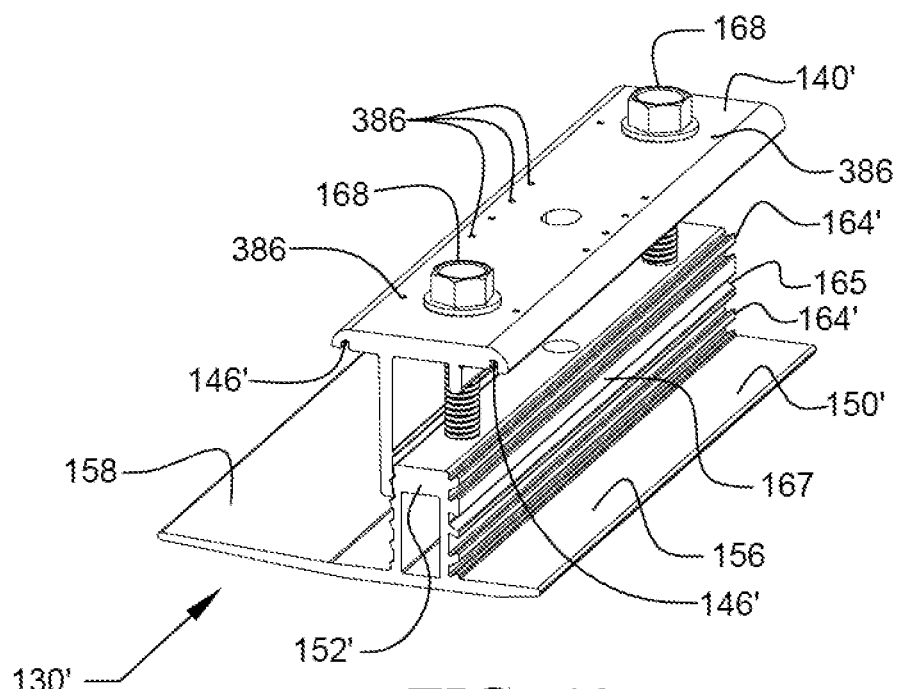
FIG. 40 is a perspective view of a coupling device of a photovoltaic mounting system, according to a second embodiment of the invention, wherein the coupling device is illustrated in an assembled state.
Figure 41:
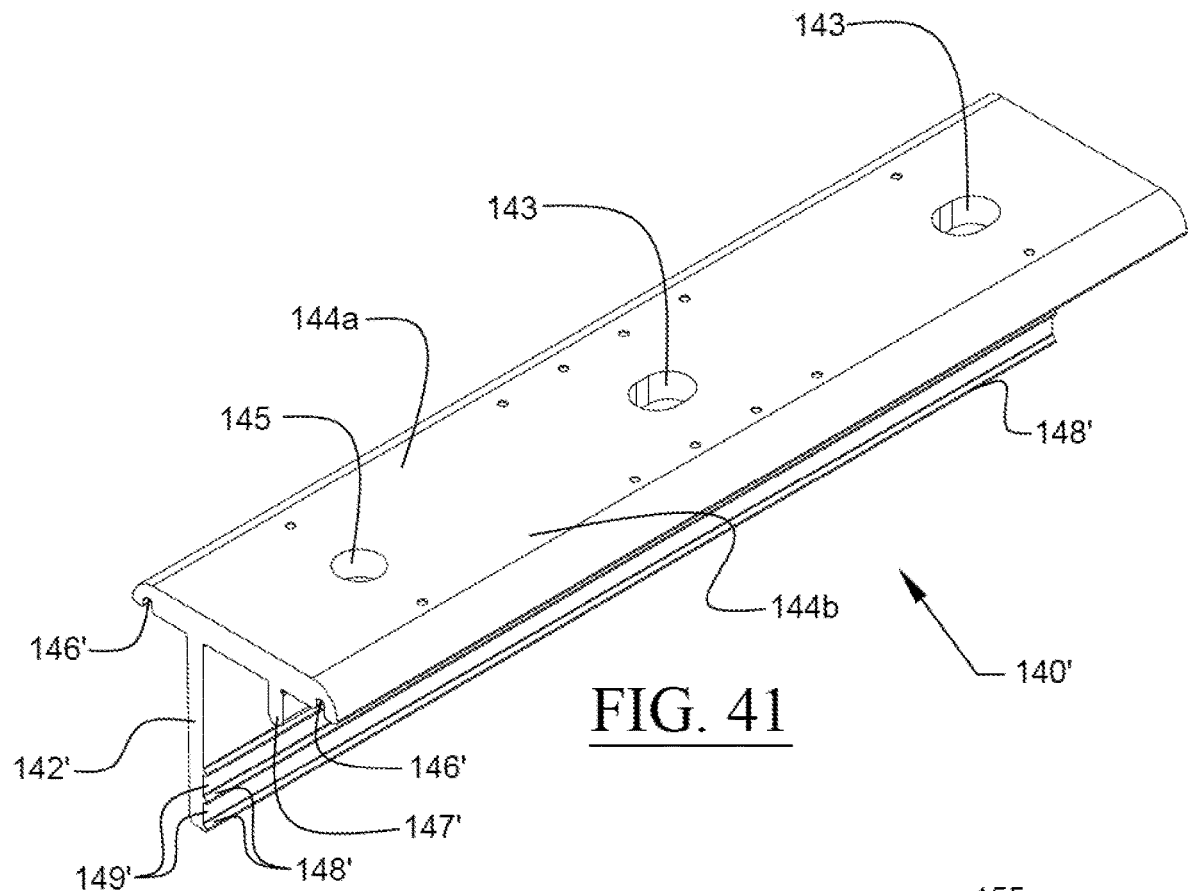
FIG. 41 is a perspective view of an upper coupling member of the coupling device of FIG. 40.
Figure 42:
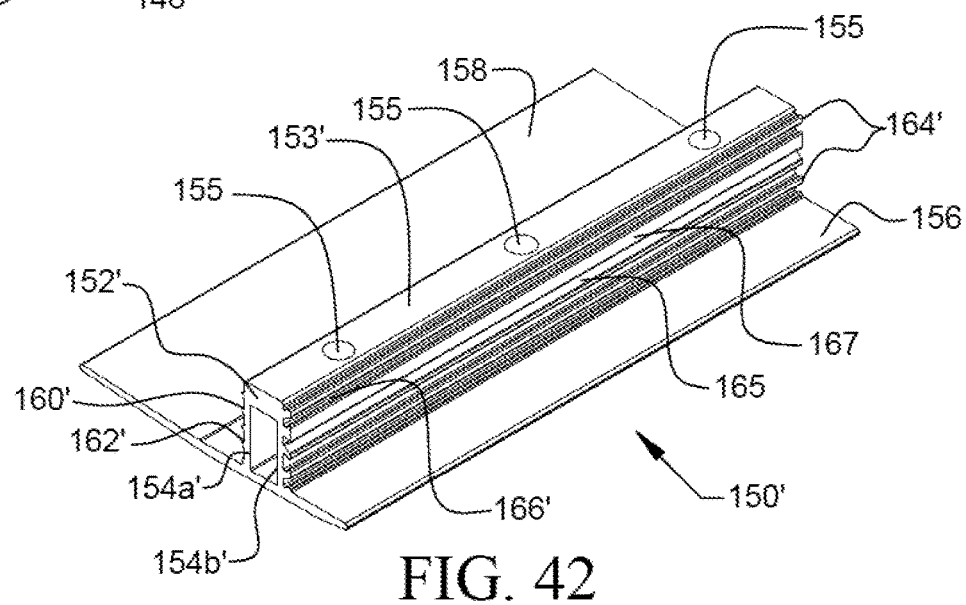
FIG. 42 is a perspective view of a lower coupling member of the coupling device of FIG. 40.

Now, with reference to FIGS. 40-42, it can be seen that, like the coupling assembly 130 described above, the second illustrative embodiment of the coupling assembly 130' generally includes an upper coupling member 140' secured to a lower coupling member 150'. As best shown in the assembled view of FIG. 40, the upper coupling member 140' and the lower coupling member 150' are connected to one another by means of one or more threaded fastener members 168 (e.g., two (2) threaded fastener members 168) and one or more respective captive nuts 170 (e.g., two (2) captive nuts 170, one for each threaded fastener member 168). In the illustrated embodiment, each threaded fastener member 168 is in the form of a bolt with a head portion having a serrated flange (e.g., refer to FIG. 40).

Turning to FIG. 41, the structure of the upper coupling member 140' will be described. As shown in this figure, the upper coupling member 140' generally includes a base portion 142' that is attached to the bottom surface of a flange portion 144a, 144b at approximately a 90 degree angle. In this figure, it can be seen that one side surface of base portion 142' comprises a plurality of elongate protrusions or teeth 148' that are each spaced apart from one another by respective elongate grooves 149'. As will be described hereinafter, the plurality of elongate protrusions or teeth 148' matingly engage with elongate protrusions or teeth 160' disposed on the first opposed wall portion 154a' of the upstanding middle portion 152' of the lower coupling member 150'. Referring again to FIG. 41, it can be seen that the flange portion 144a, 144b of the upper coupling member 140 further comprises a plurality of fastener apertures 143, 145 for receiving respective threaded fastener members 168 and a downwardly protruding member 147' that forms a back surface against which a photovoltaic module rests when disposed in the coupling assembly 130. In the illustrative embodiment of FIG. 41, it can be seen that each of fastener apertures 143 has a generally oval shape, while the fastener apertures 145 has a generally circular shape. Also, as shown in FIG. 41, each of the flange portions 144a, 144b includes an elongate groove 146' disposed in the bottom surface thereof. Each of the elongate grooves 146' is configured to receive one or more projection portions 49, 49' of the bonding clip 42', 42" that provides integrated grounding for the photovoltaic module installation. The projection portion 49, 49' of each bonding clip 42', 42" is received within its respective elongate groove 146' in a press-fit or interference-fit type mounting arrangement. Turning to FIG. 41, it can be seen that a top surface of flanged portion 144a, 144b of the upper coupling member 140' may include a plurality of visual installation guide marks 386 to indicate locational limits of mounting the one or more photovoltaic modules within the coupling device 130' (i.e., location limits of mounting against the PV modules).

Next, turning to FIG. 42, the structure of the lower coupling member 150' will be explained. With reference to this figure, it can be seen that the lower coupling member 150' generally includes an upstanding middle portion 152' with first and second ledge portions 156, 158 extending outwardly from the upstanding middle portion 152'. In FIG. 42, it can be seen that the upstanding middle portion 152' of the lower coupling member 150' comprises spaced-apart lower fastener apertures disposed in a bottom wall portion thereof, and spaced-apart upper fastener apertures 155 disposed in a top wall portion 153' thereof. Each of these apertures receives a respective shaft of a respective threaded fastener member 168. The bottom wall portion and the top wall portion 153' of the upstanding middle portion 152' of the lower coupling member 150' are connected to one another by first and second opposed wall portions 154a', 154b'. As shown in FIG. 42, the first opposed wall portion 154a' comprises a plurality of elongate protrusions or teeth 160' that are each spaced apart from one another by respective elongate grooves 162'. As explained above, the elongate teeth 160' of the first opposed wall portion 154a' engage with the elongate teeth 148' of the base portion 142' of the upper coupling member 140'. Referring again to FIG. 42, it can be seen that the second opposed wall portion 154*b*' comprises a plurality of elongate upwardly inclined protrusions or teeth 164', one or more elongate downwardly inclined protrusions or teeth 165, and one or more elongate V-shaped protrusions or teeth 167. As shown in FIG. 42, the protrusions or teeth 164', 165, 167 are spaced apart from one another by elongate grooves 166'. The protrusions or teeth 164', 165, 167 on the second opposed wall portion 154*b*' of the base portion 142' of the lower coupling member 150' are configured to engage with a wind deflector and/or a mounting skirt for deflecting wind up and over the photovoltaic array and/or improving the aesthetics of the array, as will be described hereinafter. Each of the first and second ledge portions 156, 158 of the lower coupling member 150 is configured to accommodate a photovoltaic module frame member resting thereon. As shown in FIG. 42, the protrusions or teeth 164', 165, 167 of the lower coupling member 150' comprise a plurality of mating protrusions or teeth 164', 165, 167 disposed in alternating upward and downward orientations so that the coupling device 130' is capable of remaining in engagement with the skirt member 174" prior to the threaded fastening members 168 being tightened by an installer. For example, in one or more embodiments, the coupling device 130' is initially slid on the skirt member 174" by the installer, and once slid on, the coupling device 130' will stay in place and the installer can take his or her hand off the coupling device 130'. The alternating protrusions or teeth 164', 165, 167 of the lower coupling member 150' allow the coupling device 130' to stay in place on the skirt member 174".

In the illustrated embodiment, one or more of the teeth or serrations 160' on the lower coupling member 150' are configured to engage one or more of the teeth or serrations 148' on the upper coupling member 140' when the threaded fasteners 168 are being tightened so as to maintain a minimum gap between the upper coupling member 140' and the lower coupling member 150' for receiving one or more photovoltaic module frames of one or more photovoltaic modules when the one or more photovoltaic modules are pivotably installed into a first side (e.g., north side) of the coupling assembly 130'. In an exemplary embodiment, the coupling assembly 130' is designed to accept 32, 33, 35, 40, 45, and 50 millimeter (mm) PV modules. As such, in the exemplary embodiment, the serrations 148', 160' on the upper and lower coupling members 140', 150' are positioned to engage at the above mentioned dimensions. As the threaded fasteners 168 of the coupling are tightened, the downhill side of the coupling contacts a module (e.g., the south side of the coupling), and a torque is applied to the upper coupling member 140' engaging the teeth. This allows the uphill side of the coupling (e.g., the north side of the coupling), to remain open, allowing the next module to slide in from above, and to be pivoted mounted in place.

Figure 38:
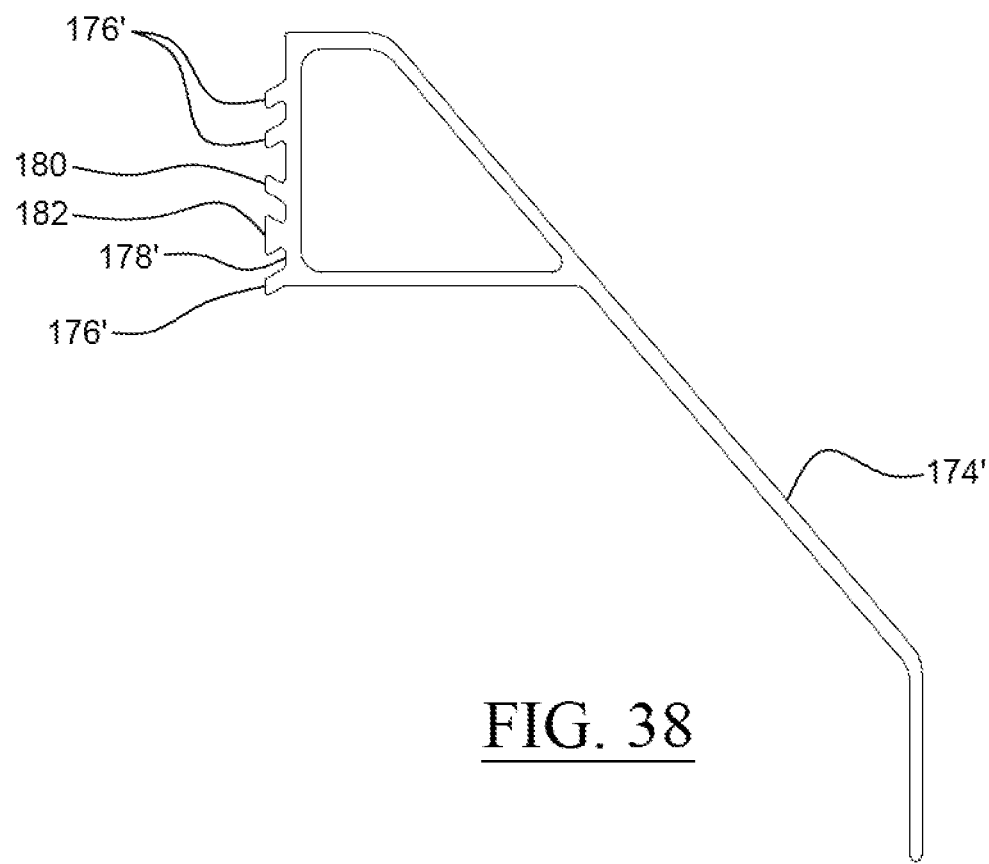
FIG. 38 is an end view of a lower skirt member, according to another embodiment of the invention.
Figure 39:
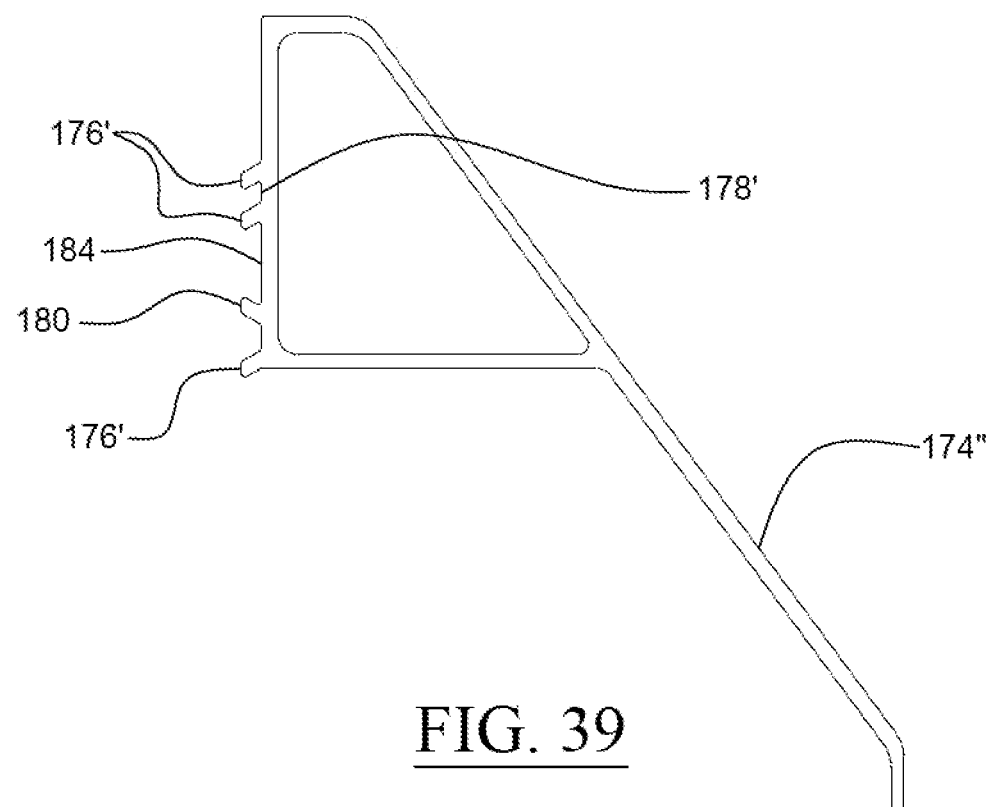
FIG. 39 is an end view of a lower skirt member, similar to the lower skirt member illustrated in FIG. 38, according to yet another embodiment of the invention.
Figure 72:
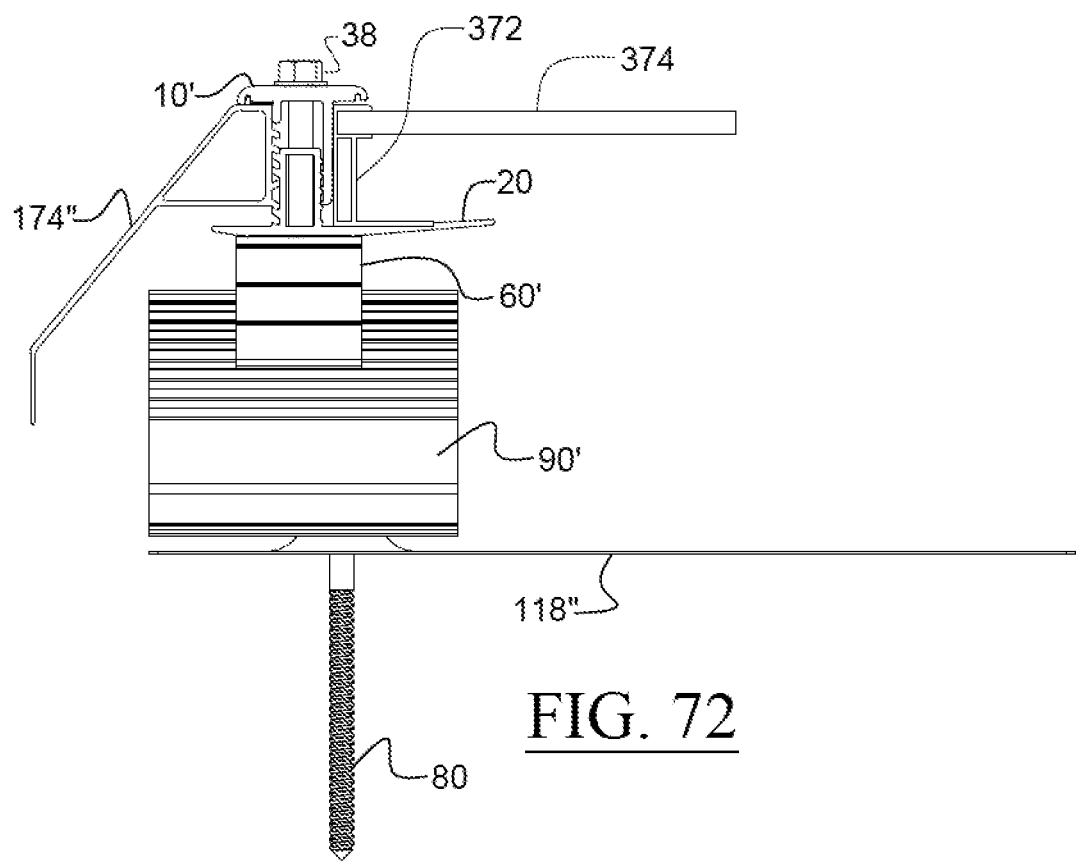
FIG. 72 is an end view illustrating the support surface attachment device of FIG. 29 together with a lower skirt member connected to the support surface attachment device, according to an embodiment of the invention.

With reference to FIGS. 38, 39, and 72, additional embodiments of the lower skirt member 174', 174" of the photovoltaic mounting system will be described. Initially, referring to the end view of FIG. 72, it can be seen that the skirt member 174', 174" is configured to be located on the southernmost edge of the array of PV modules. The skirt member 174', 174" is supported by spaced-apart support surface attachment devices 100'. In particular, as shown in the end view of FIG. 72, the skirt member 174" engages with the upper clamp member 10' and the lower clamp member 20' of the clamp assembly 126' of the support surface attachment device 100'. As shown in this figure, the skirt member 174" is clampingly engaged by the upper clamp member 10', and is additionally engaged by the teeth 34' of the lower clamp member 20' (e.g., on the south side of the clamp). FIG. 72 also illustrates the photovoltaic module frame 372 of the photovoltaic module 374 engaged with the side of the clamp assembly 10', 20' that is opposite to the side on which the skirt member 174" is engaged (e.g., the north side).

Figure 85:
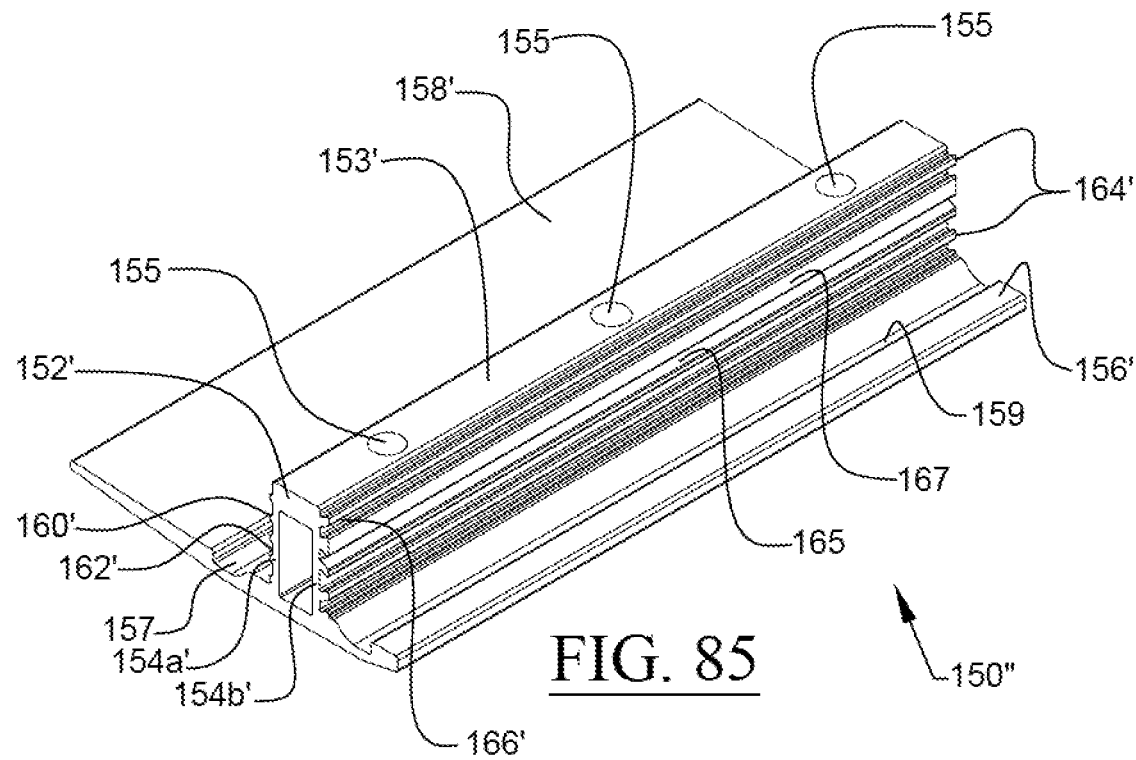
FIG. 85 is a perspective view of a lower coupling member of a coupling device, according to an alternative embodiment.

Now, with reference to FIG. 85, an alternative of a lower coupling member 150''' will be described. The lower coupling member 150''' of FIG. 85 is similar in most respects to the lower coupling member 150' of FIG. 42 explained above. Although, unlike the lower coupling member 150', the first and second ledge portions 156', 158' of the lower coupling member 150''' are provided with respective drainage troughs 157, 159 formed therein for draining water from one or more photovoltaic modules that incorporate a module drainage feature.

Referring again to FIGS. 39 and 72, the engagement between the skirt member 174" and the lower clamp member 20' will be explained in more detail. As shown in the end view of FIG. 39, a backside of the skirt member 174" comprises a plurality of downwardly-directed protrusions or teeth 176' and one or more upwardly-directed protrusions or teeth 180 that are spaced apart from one another by elongate grooves or gaps 178', 184. More particularly, the upper two (2) protrusions or teeth 176' are spaced apart from one another by the narrow width elongate groove 178', while the pair of upper protrusions or teeth 176' are spaced apart from upwardly-directed protrusion or tooth 180 by a wide elongate groove or gap 184. With reference to the end view of FIG. 72, it can be seen that at least some of the protrusions or teeth 176', 180 of the skirt member 174" matingly engage with at least some of the protrusions or teeth 34' on the lower clamp member 20'. This engagement between the protrusions or teeth 34', 176', 180 enables the skirt member 174" to be securely supported on the clamp assembly 126'. The protrusions or teeth 164' on the lower coupling member 150' engage with the protrusions or teeth 176', 180 of the skirt member 174''' in a manner that is generally the same as that of the protrusions or teeth 34' on the lower clamp member 20'. Advantageously, the protrusions or teeth 176', 180, 34' on the skirt member 174" and the lower clamp member 20', respectively, allows the skirt member 174" to be mounted at various heights relative to the lower clamp member 20' so that the skirt member 174' is capable of matching the height of many different PV modules. This is important because then the skirt member 174" sets the gap size of the clamp assembly 126' and the coupling assembly 130' on the south row of the PV array to accept the first row of PV modules.

Another embodiment of the skirt member 174' is illustrated in FIG. 38. The skirt member 174' of FIG. 38 is similar in many respects to the skirt member 174" of FIG. 39 that was described above. However, unlike the skirt member 174", the skirt member 174' of FIG. 38 additionally comprises a V-shaped protrusions or tooth 182 disposed on the backside of the skirt member 174'. As shown in this figure, the V-shaped protrusions or tooth 182 is disposed between the bottommost downwardly-directed protrusion or tooth 176' and the upwardly-directed protrusion or tooth 180. The skirt member 174' of FIG. 38 is designed to be used with a PV array comprising PV modules with specific heights, while the skirt member 174" of FIG. 39 is designed to be used with a PV array comprised of PV modules of different heights. Advantageously, the upwardly-directed protrusions or teeth 34' on the lower clamp member 20', and the downwardly-directed protrusion or teeth 176' on the skirt members 174', 174", allow the skirt members 174', 174" to be dropped into the clamp assemblies 126' from the side, thereby greatly facilitating the installation of the PV array by obviating the need to slide the skirt members 174', 174" into the clamp assemblies 126' from the end of the PV array. The skirt members 174', 174" are able to be slid into the coupling assemblies 130 without difficulty during the installation of the PV array.

Figure 48:
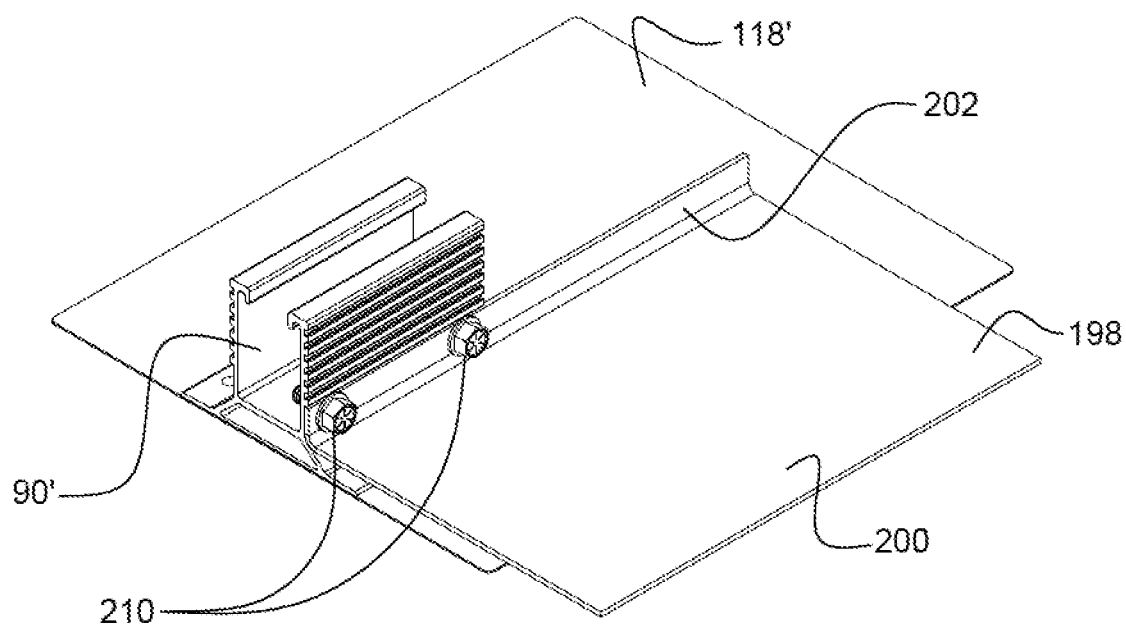
FIG. 48 is a perspective view of a junction box bracket attached to a base member, according to one embodiment of the invention.

Now, with reference to FIGS. 48-71 79, and 80, various accessories of the sloped roof solar panel mounting system will be described. Initially, turning to FIGS. 48-50, the junction box bracket 198, 198' will be explained. In the PV array, the junction box bracket 198, 198' holds a junction box where PV module wires terminate at the end of the array. The junction box bracket 198, 198' may be provided with pre-drilled holes or self-drilling/self-tapping screws may be used. A first embodiment of the junction box bracket 198 is shown in FIG. 48. In FIG. 48, it can be seen that the junction box bracket 198 comprises a base portion 200 and a flange portion 202, which is disposed at approximately a ninety (90) degree angle relative to the base portion 200. The flange portion 202 of the junction box bracket 198 is attached to the base member 90' by a plurality of fasteners 210. To facilitate the installation of the junction box bracket 198, the fasteners 210 may be self-drilling and/or self-tapping type fasteners (i.e., self-drilling/self-tapping bolts or screws).

Figure 49:
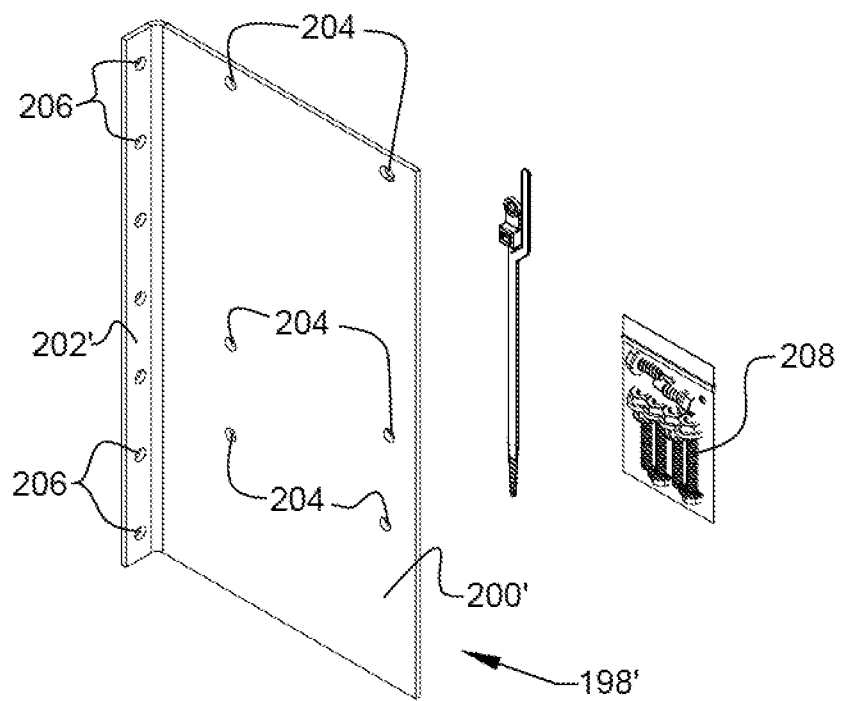
FIG. 49 is a perspective view of a junction box bracket kit, according to another embodiment of the invention.
Figure 50:
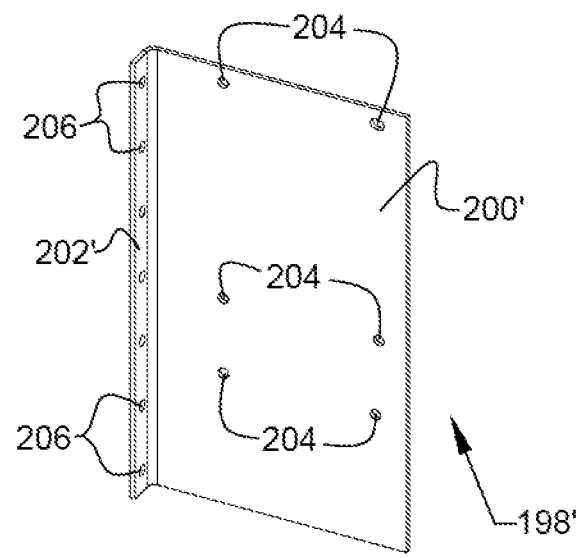
FIG. 50 is a perspective view of the junction box bracket of the junction box bracket kit of FIG. 49.
Figure 51:
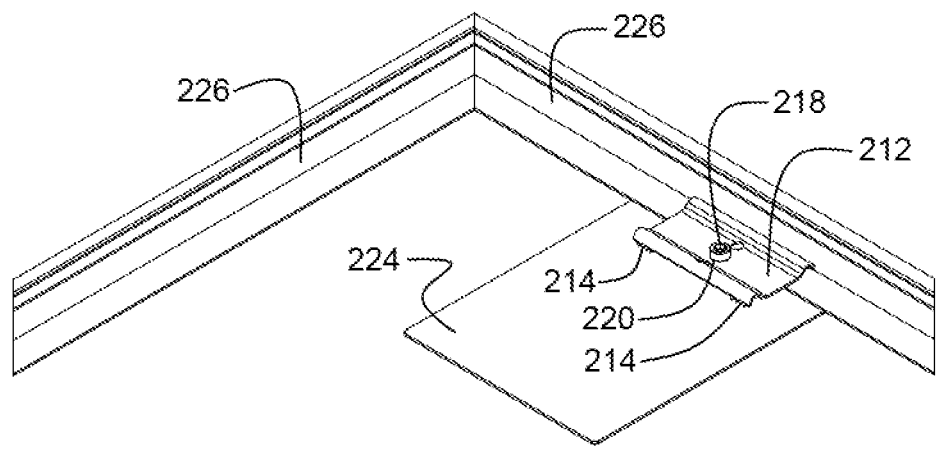
FIG. 51 is a perspective view of a micro-inverter mounting plate attached to the frame of a photovoltaic module by a power accessory bracket assembly, according to an embodiment of the invention.
Figure 52:
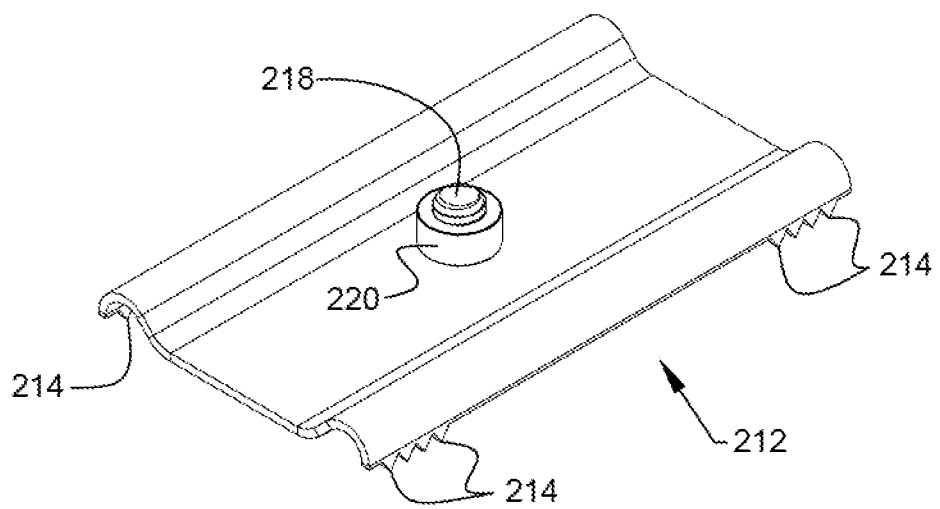
FIG. 52 is a perspective view of the power accessory bracket assembly of FIG. 51, wherein the power accessory bracket assembly is in an assembled state.
Figure 53:
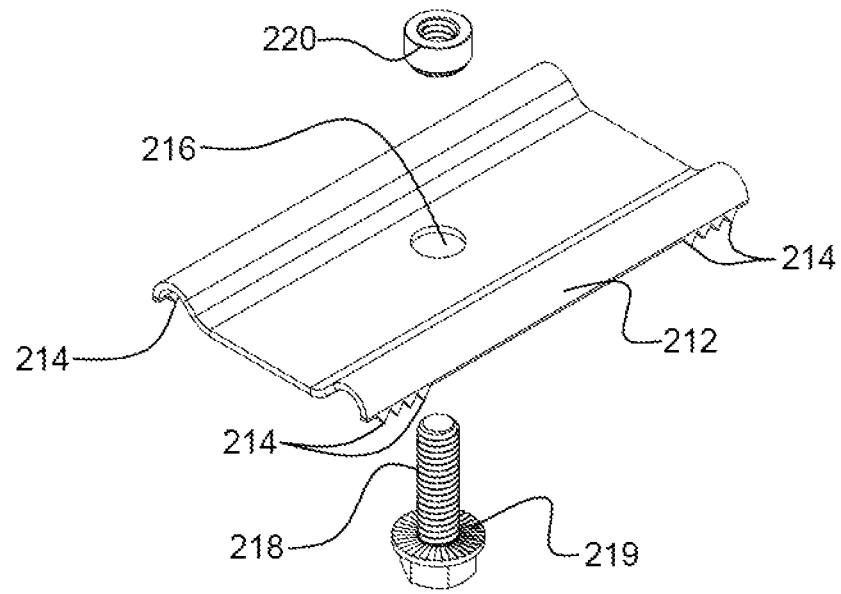
FIG. 53 is an exploded view of the power accessory bracket assembly of FIG. 52.

Like the first embodiment of the junction box bracket 198, the second embodiment of the junction box bracket 198' illustrated in FIGS. 49 and 50 also comprises a base portion 200' and a flange portion 202' that is oriented at a substantially ninety (90) degree angle relative to the base portion 200'. However, as shown in these two figures, the base portion 200' of the junction box bracket 198' may be predrilled with a plurality of apertures 204 for mounting the junction box thereto. Also, the flange portion 202' of the junction box bracket 198' may be predrilled with a plurality of apertures 206 disposed along the length thereof for securing the junction box bracket 198' to the base member 90'. In addition, as shown in FIG. 49, the junction box bracket 198' may be provided with prepackaged fasteners 208 for mounting the junction box to the junction box bracket 198' and/or for mounting the junction box bracket 198' to the base member 90'.

Figure 79:
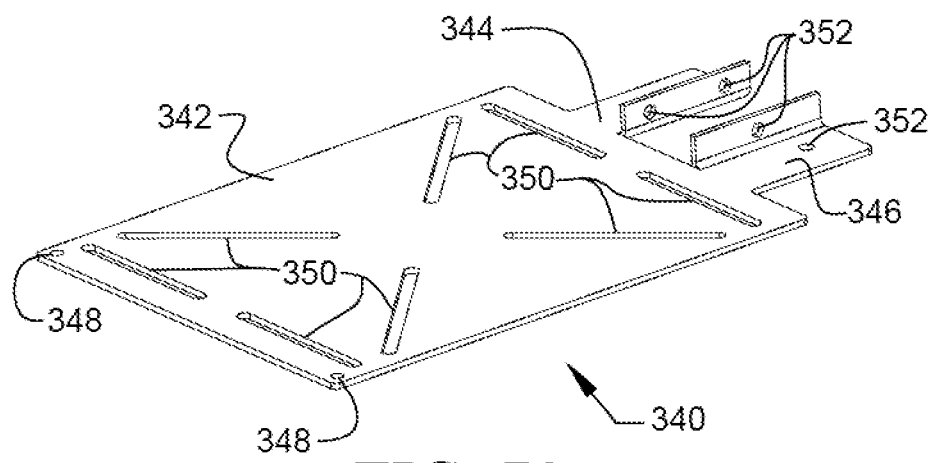
FIG. 79 is a perspective view of a junction box bracket, according to yet another embodiment of the invention.
Figure 80:
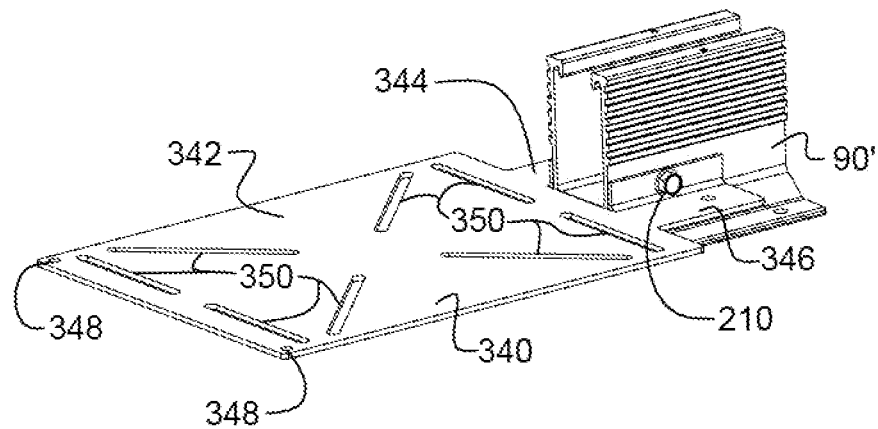
FIG. 80 is a perspective view of the junction box bracket of FIG. 79 attached to a base member.

A third embodiment of the junction box bracket is illustrated in FIGS. 79 and 80. Unlike the junction box brackets 198, 198' of FIGS. 48-50, the junction box bracket 340 in FIGS. 79 and 80 is in the form of a center-mounted junction box bracket. That is, the junction box bracket 340 is configured to be center-mounted on the base member 90'. In FIGS. 79 and 80, it can be seen that the junction box bracket 340 generally comprises a plate-like base portion 342, a first flange portion 344, and a second flange portion 346 spaced apart from the first flange portion 344. The first and second flange portions 344, 346 extend from one side of the plate-like base portion 342 of the junction box bracket 340, and together define a slot for receiving a cross-sectional portion of the base portion 90' therein. As shown in these two figures, the plate-like base portion 342 of the junction box bracket 340 comprises a plurality of apertures 348 and a plurality of elongate slots 350 disposed therethrough for attaching a wide variety of different junction boxes to the junction box bracket 340. Also, the first and second flange portions 344, 346 of the junction box bracket 340 may be predrilled with a plurality of apertures 352 disposed therethrough for accommodating fasteners that secure the junction box bracket 340 to the base member 90'. The aperture 352 mounted in the horizontal portion of the second flange portion 346 in FIGS. 79 and 80 may be used for mounting a grounding lug.

Figure 84:
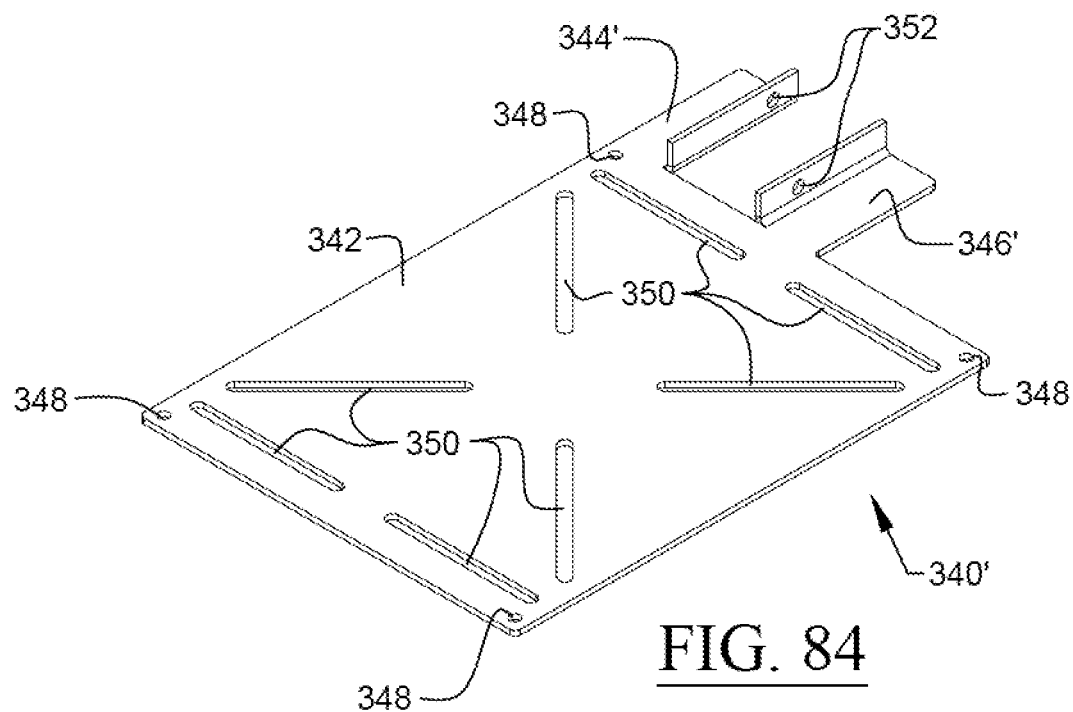
FIG. 84 is a perspective view of a junction box bracket, according to still another embodiment of the invention.

A fourth embodiment of the junction box bracket is illustrated in FIG. 84. Unlike the junction box bracket 340 of FIGS. 79 and 80, the junction box bracket 340' in FIG. 84 is in the form of an offset-mounted junction box bracket. That is, the first and second flange portions 344', 346' of the junction box bracket 340' are offset from a center position of the bracket base portion 342 in a widthwise direction of the bracket base portion 342 so as to facilitate a connection of one or more wires to the junction box (or other electrical accessory mounted on the bracket base portion 342) without the upstanding base member 90' of the base assembly 128' interfering with a routing of the one or more wires.

Figure 54:
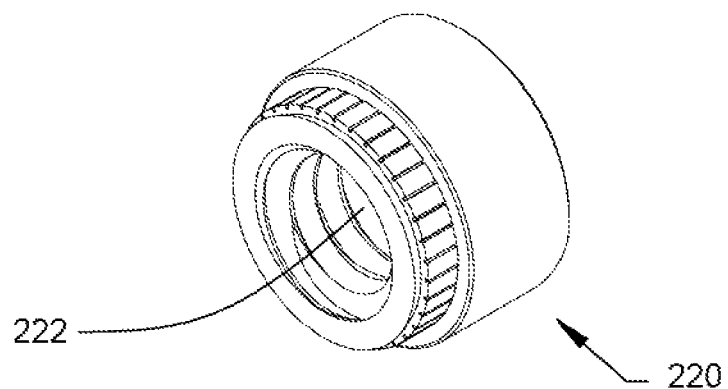
FIG. 54 is a perspective view of a captive nut of the power accessory bracket assembly of FIG. 52.
Figure 55:
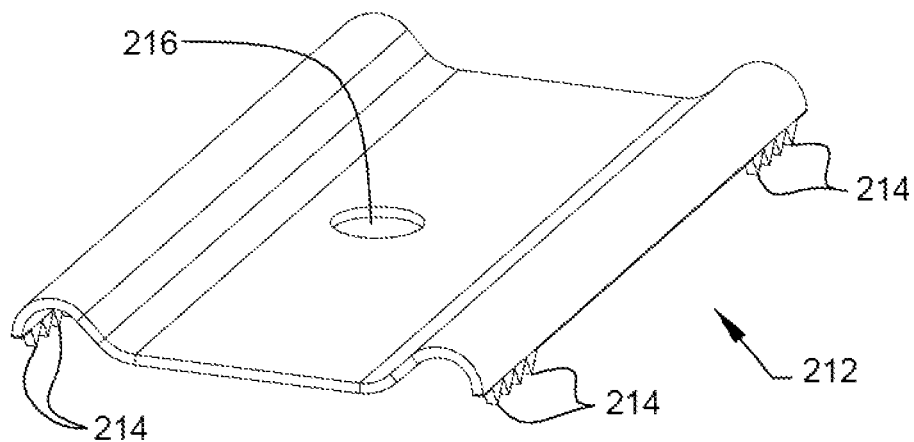
FIG. 55 is a perspective view of a power accessory bracket of the power accessory bracket assembly of FIG. 52.
Figure 56:
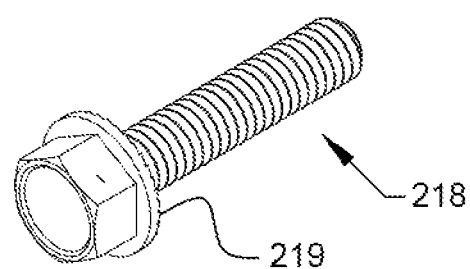
FIG. 56 is a perspective view of a threaded fastener member of the power accessory bracket assembly of FIG. 52.
Figure 57:
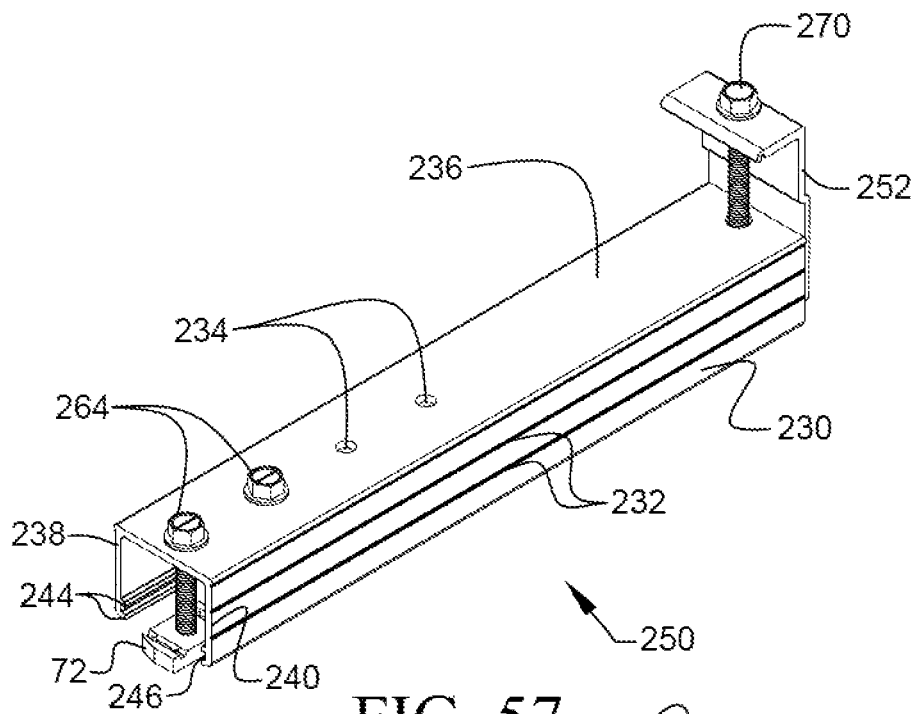
FIG. 57 is a perspective view of a north row extension assembly, according to an embodiment of the invention.

Next, with reference to FIGS. 51-56, the power accessory bracket 212 will be described. As shown in the perspective view of FIG. 51, the power accessory bracket 212 is used to mount a power accessory (such as a micro-inverter or optimizer) to the aluminum frame 226 of the photovoltaic (PV) module. The teeth 214 on the underside of the power accessory bracket 212 electrically connect the bracket to the aluminum frame 226 of the PV module (see FIGS. 51 and 52). With combined reference to FIGS. 51, 52, and 53, it can be seen that the micro-inverter mounting plate 224 is attached to the power accessory bracket 212 by means of a threaded fastener 218 (e.g., a bolt) and a captive nut 220 that threadingly engages with the fastener 218. As shown in FIG. 54, the captive nut 220 has a threaded aperture 222 that receives the shaft of the threaded fastener 218. During the assembly of the components, the captive nut 220 is pressed into the central aperture 216 of the power accessory bracket 212. In FIG. 56, it can be seen that threaded fastener 218, like the threaded fastener member 38 described above, is provided with a head portion having a serrated flange 219 for electrical grounding/bonding purposes.

Figure 58:
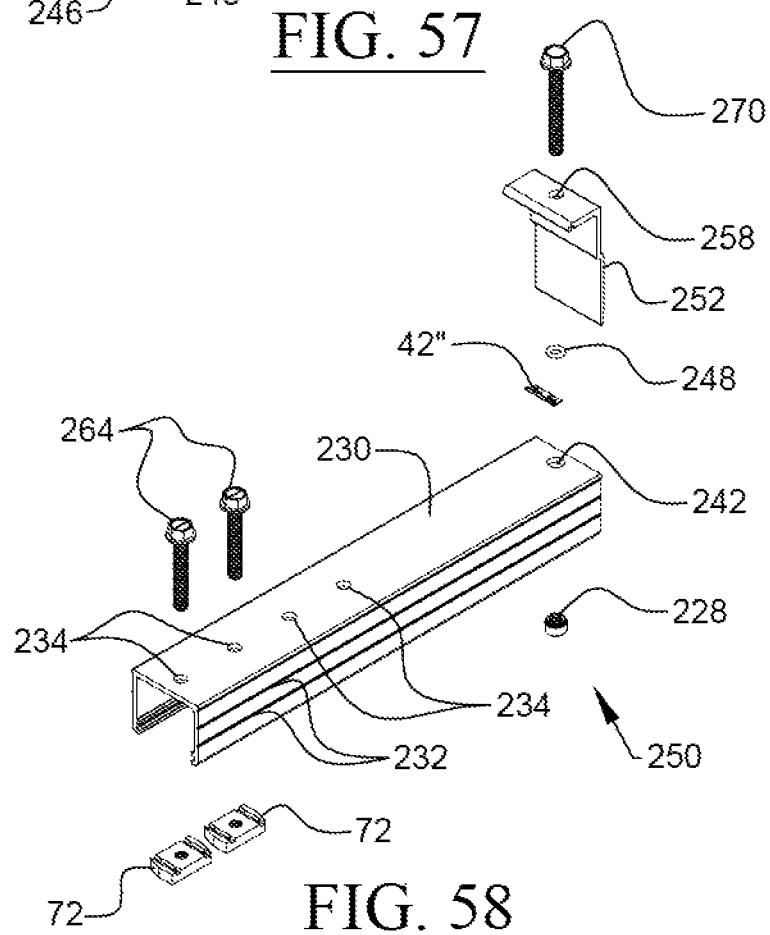
FIG. 58 is an exploded view of the north row extension assembly of FIG. 57.
Figure 59:
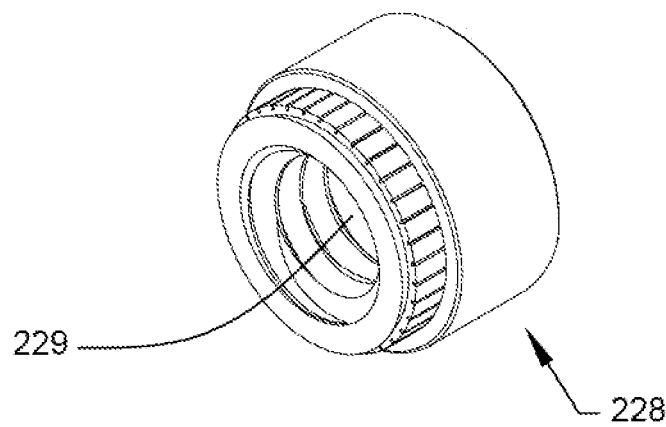
FIG. 59 is a perspective view of a captive nut of the north row extension assembly of FIG. 57.
Figure 62:
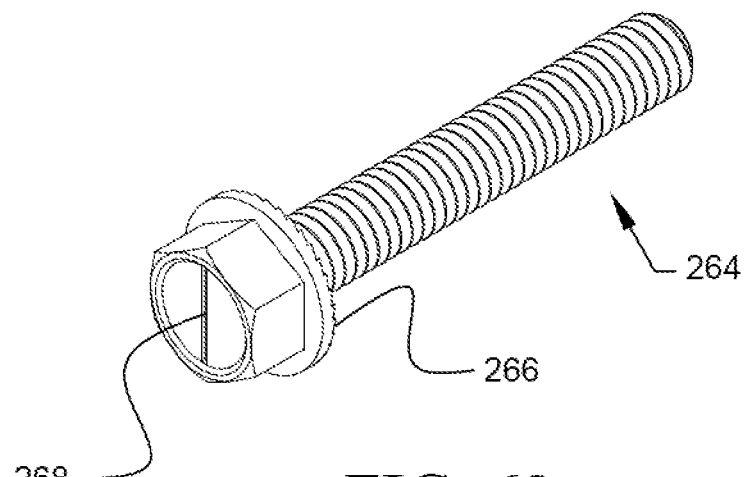
FIG. 62 is a perspective view of a strut fastener member of the north row extension assembly of FIG. 57.

Turning to FIGS. 57-63, the north row extension assembly 250 of the PV array mounting system will be explained. Initially, with reference to FIGS. 57 and 58, it can be seen that the illustrative embodiment of the north row extension assembly 250 generally includes a north row extension member 230 and an upper end clamp member 252. As best shown in the assembled view of FIG. 57, the upper end clamp member 252 and the north row extension member 230 are connected to one another by means of a threaded fastener member 270 and a captive nut 228. Similar to the threaded fastener member 38 described above, the threaded fastener member 270 is in the form of a bolt with a head portion having a serrated flange 272 (refer to FIG. 61). As shown in FIG. 59, the captive nut 228 has a threaded aperture 229 that receives the shaft of the threaded fastener 270. The north row extension assembly 250 attaches to a base member 90' of the PV array mounting system by means of a pair of threaded fastener members 264 that threadingly engage with respective strut nuts 72. A pair of threaded fastener members 264 and corresponding strut nuts 72 are used for securing the north row extension assembly 250 to the base member 90', rather than just a single threaded fastener member 264 and strut nut 72, in order to provide added stability. Like the end clamp threaded fastener 270, the threaded fastener member 264 of the illustrative embodiment is in the form of a bolt with a head portion having a serrated flange 266 (refer to FIG. 62). Also, as shown in FIG. 62, the top surface of the head portion of the threaded fastener member 264 is provided with a visual indicator line 268 formed therein for indicating the orientation of the strut nut 72 that is threadingly engaged with the threaded fastener member 264. The north row extension assembly 250 is used when a clamp located at or near the peak of the roof is desired and it would be difficult or not possible to install a flashing at that location because there are not enough shingle courses up-roof of the location to allow the flashing to be installed. As a result, the flashing member 118' is required to be placed under a shingle course that is two courses down from the peak of the roof. The north row extension assembly 250 operates as a cantilevered mounting arm for securing the north row edge of the PV module array.

Figure 63:
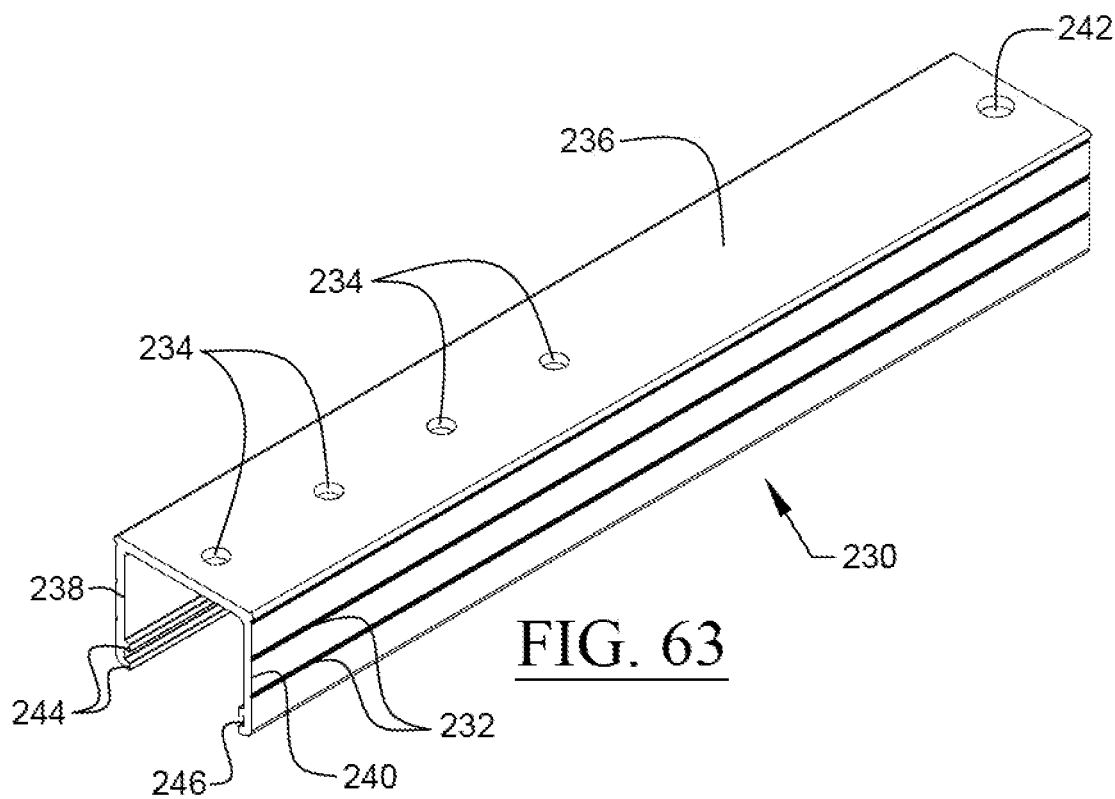
FIG. 63 is a perspective view of a north row extension member of the north row extension assembly of FIG. 57.

Now, with reference primarily to FIG. 63, the structure of the north row extension member 230 of the north row extension assembly 250 will be described. As shown in FIG. 63, like the glider member 60' described above, it can be seen that the north row extension member 230 comprises a generally inverted, U-shaped profile with a top wall portion 236 and first and second opposed wall portions 238, 240 extending downwardly from the top wall portion 236. The top wall portion 236 comprises a plurality of spaced-apart fastener apertures 234 disposed near a first longitudinal end thereof for receiving the strut nut fastener members 264 described above, and a single fastener aperture 242 disposed near the second, opposite longitudinal end thereof for receiving the end clamp fastener 270. The plurality of spaced-apart fastener strut apertures 234 advantageously permits the locations of the strut nut fastener members 264 to be adjusted. In FIG. 63, it can be seen that the inner surfaces of each of the first and second opposed wall portions 238, 240 comprises a pair of elongate protrusions or teeth 244 that are spaced apart from one another by a respective elongate groove 246. The pair of teeth 244 on each of the inner surfaces of the opposed wall portions 238, 240 are designed to engage with respective teeth 110 on opposed upstanding wall portions 104a', 104b' of the base member 90'. The north row extension member 230 may be slid into place on the top of the base member 90' by engaging its teeth 244 with the teeth 110 of the base member 90'. To permit horizontal adjustability, the north row extension member 230 is capable of being slid along the length of the base member 90'. And, to permit vertical adjustability, the north row extension member 230 is capable of being adjustably placed along a vertical height of the upstanding wall portions 104a', 104b' of the base member 90' by selectively engaging certain ones of the teeth 244 on the north row extension member 230 with certain ones of the grooves 112 on the base member 90', and the groove 246 on the north row extension member 230 with a certain one of the teeth 110 on the base member 90'.

As best shown in FIG. 63, the outer sides of the first and second opposed wall portions 238, 240 of the north row extension member 230 are provided with a plurality of generally parallel, visual indicator grooves 232 formed therein (e.g., three (3) visual indicator grooves 232). During the installation of the PV modules, the visual indicator grooves 232 operate as visual indicating bands for positioning the north row extension member 230 at its desired height (i.e., the visual indicator grooves 232 enable the desired height of the north row extension member 230 relative to the base member 90' to be more easily obtained by the installer during the PV module installation process).

Figure 60:
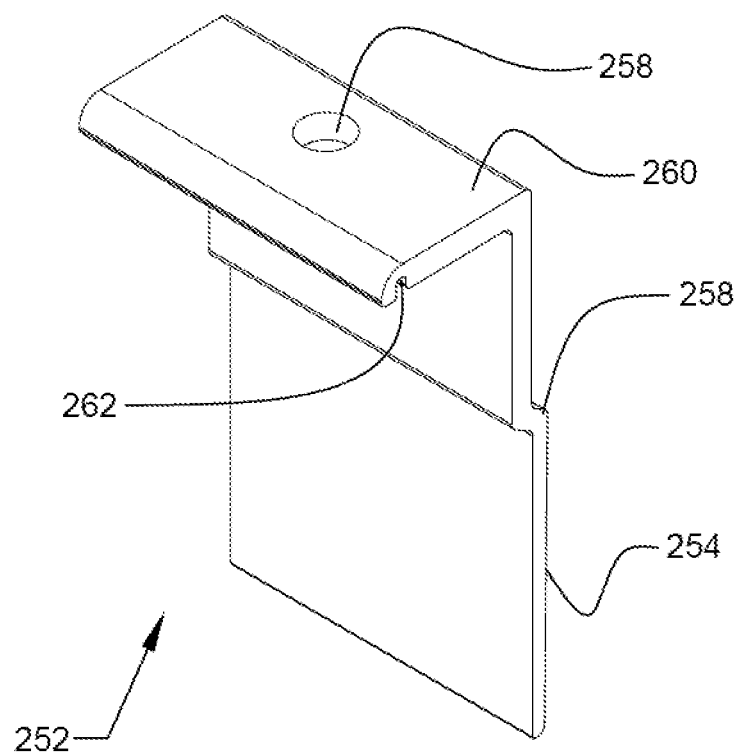
FIG. 60 is a perspective view of an upper end clamp member of the north row extension assembly of FIG. 57.
Figure 61:
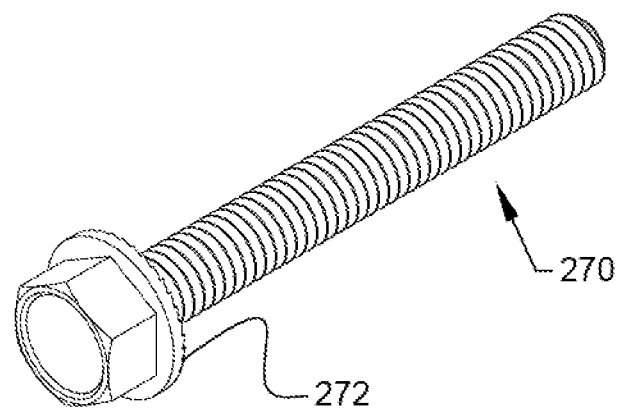
FIG. 61 is a perspective view of an end clamp fastener member of the north row extension assembly of FIG. 57.

Next, turning to FIG. 60, the structure of the upper end clamp member 252 will be explained. The upper end clamp member 252 secures the north edge of the PV module in the PV array. As shown in this figure, the upper end clamp member 252 generally includes a vertical body portion 254 that is attached to a horizontal flange portion 260 at approximately a 90 degree angle. In this figure, it can be seen that vertical body portion 254 of the upper end clamp member 252 has an offset 256 formed therein. Referring again to FIG. 60, it can be seen that the flange portion 260 of the upper end clamp member 252 further comprises a fastener aperture 258 for receiving the threaded fastener member 270. Also, as shown in FIG. 60, the flange portion 260 includes an elongate groove 262 disposed in the bottom surface thereof. The elongate groove 262 of the upper end clamp member 252 is configured to receive a projection portion 49' of a respective bonding clip 42" (see FIG. 58) that provides integrated grounding for the photovoltaic module installation. The projection portion 49' of the bonding clip 42" is received within the elongate groove 262 of upper end clamp member 252 in a press-fit or interference-fit type mounting arrangement.

Figure 82:
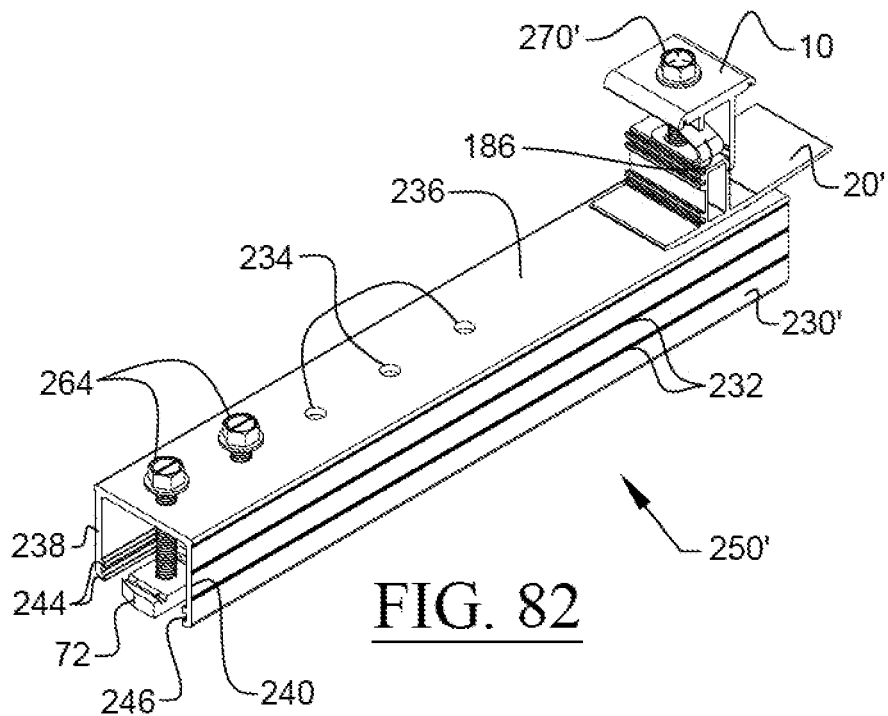
FIG. 82 is a perspective view of a north row extension assembly, according to an alternative embodiment of the invention.
Figure 83:
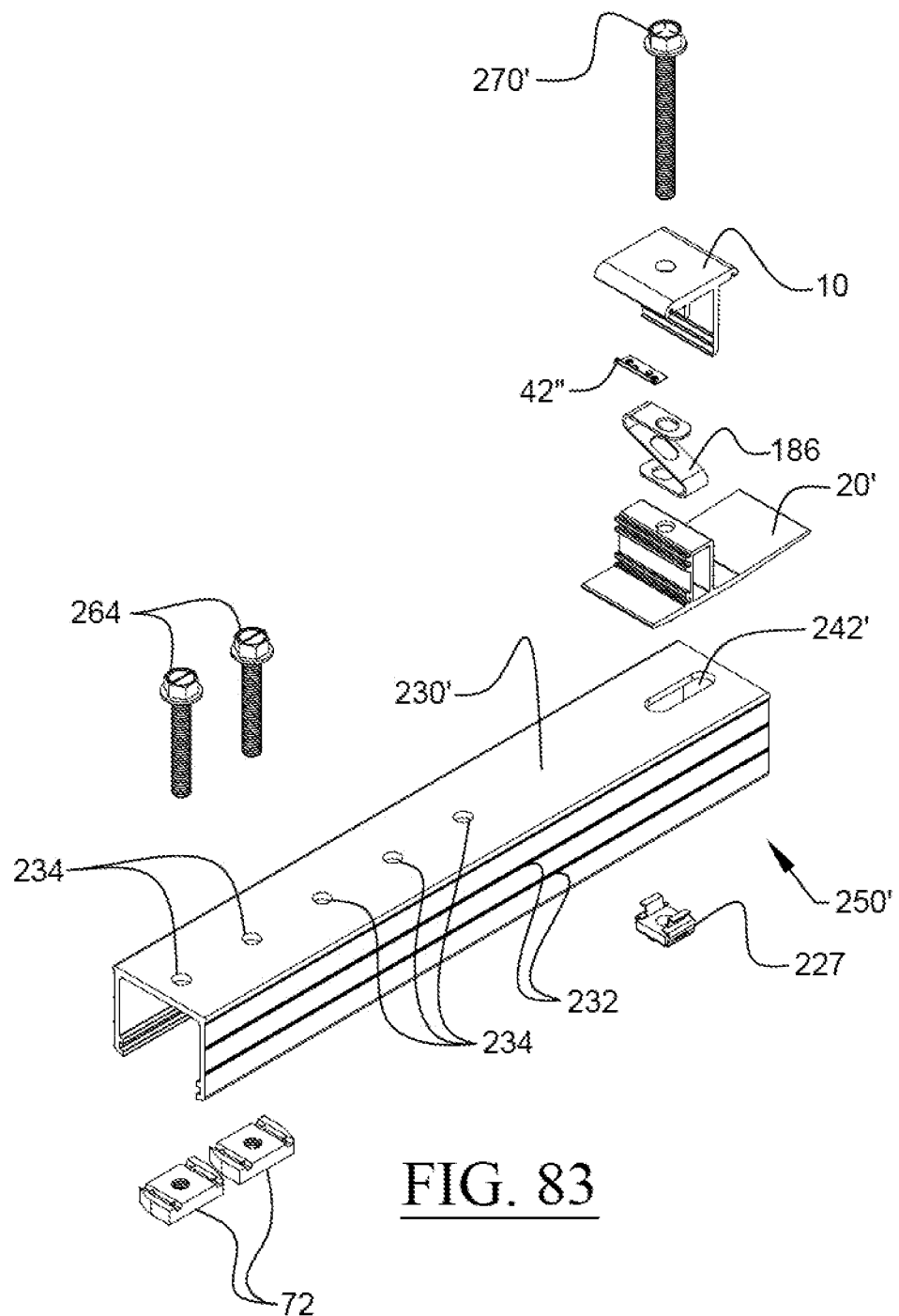
FIG. 83 is an exploded view of the north row extension assembly of FIG. 82.

Turning to FIGS. 82 and 83, an alternative embodiment of the north row extension assembly 250' of the PV array mounting system will be described. The north row extension assembly 250' of FIGS. 82 and 83 is similar in many respect to the north row extension assembly 250 explained above. However, unlike the north row extension assembly 250 of FIG. 57, the north row extension assembly 250' utilizes a clamp assembly comprising the upper clamp member 10 and the lower clamp member 20' described above, rather than the upper end clamp member 252. In a similar manner to that described above for the support surface attachment device 100', the clamp members 10, 20' are used to secure one or more photovoltaic modules to the north row extension assembly 250'. Turning again to FIGS. 82 and 83, it can be seen that the north row extension member 230' of the north row extension assembly 250' is slightly different that the north row extension member 230 described above. For example, the north row extension member 230' contains a greater number of spaced-apart fastener apertures 234 than the north row extension member 230, and the north row extension member 230' contains an elongated slot 242' for receiving the clamp fastener 270', rather than a circular aperture 242. Rather than being provided with the captive nut 228 at the distal end thereof, the clamp fastener 270' is provided with a modified strut nut 227 for securing the clamp assembly to the north row extension member 230'.

Referring to the exploded view of FIG. 58, the O-ring member 248 of the north row extension assembly 250 is used to maintain a predetermined spacing distance or gap between the flange portion 260 of the upper end clamp member 252 and the top wall portion 236 of the north row extension member 230. In other words, the O-ring member 248 is used to hold upper end clamp member 252 open so that a PV module may be more easily inserted between the flange portion 260 of the upper end clamp member 252 and the top wall portion 236 of the north row extension member 230 during the installation of the PV module array on the roof.

Figure 64:
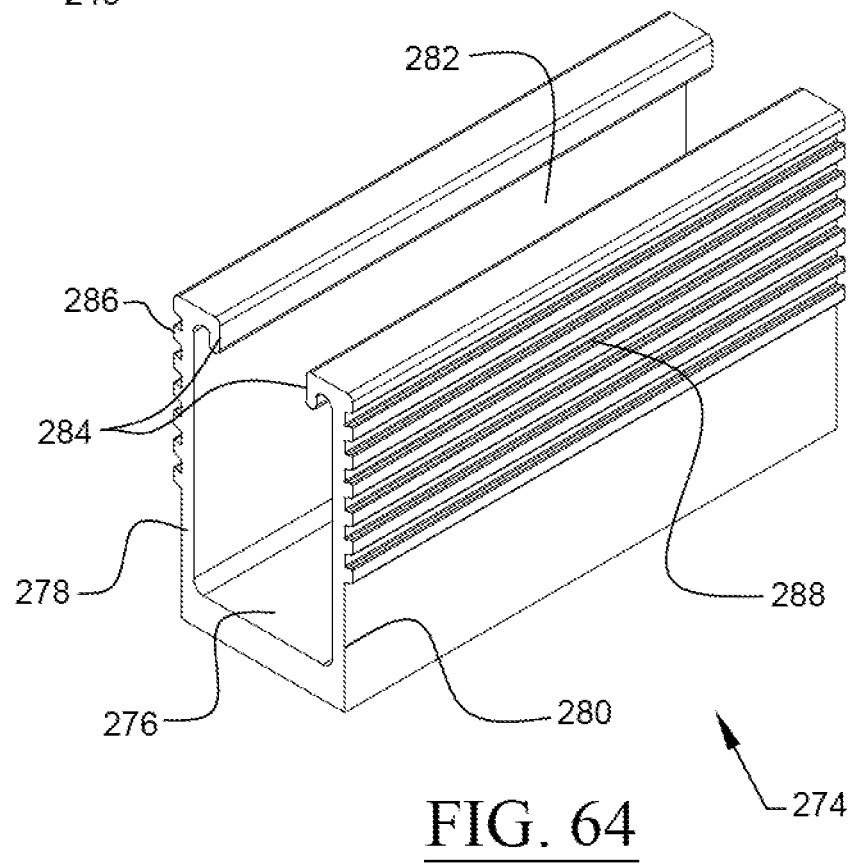
FIG. 64 is a perspective view of an upstanding tile base member, according to an embodiment of the invention.

An embodiment of an upstanding tile base member 274 is illustrated in FIG. 64. The upstanding tile base member 274 of FIG. 64 is configured to be attached to a PV tile mounting solution (such as a tile replacement bracket or a tile hook). The tile base member 274 is capable of being used in any location within the array. Referring to FIG. 64, it can be seen that the upstanding tile base member 274 generally comprises a base portion 276 and a pair of opposed first and second upstanding wall portions 278, 280 extending upwardly from the base portion 276 of the upstanding tile base member 274. In FIG. 64, it can be seen that the outer surfaces of each of the first and second opposed upstanding wall portions 278, 280 comprises a plurality of elongate protrusions or teeth 286 that are each spaced apart from one another by respective elongate grooves 288. The set of teeth 286 on each of the outer surfaces of the opposed wall portions are designed to engage with the respective teeth 68' on the opposed wall portions 66a', 66b' of the glider member

60'. Also, as shown in FIG. 64, the opposed wall portions 278, 280 of the upstanding tile base member 274 cooperate to define an upper elongate slot 282 that accommodates the shaft of the threaded fastener member 38 passing therethrough. Also, each of the opposed wall portions 278, 280 comprises a downturned lip portion 284 that is received within a respective one of the elongate grooves 76 disposed in the top surface of the strut nut 72.

Figure 87:
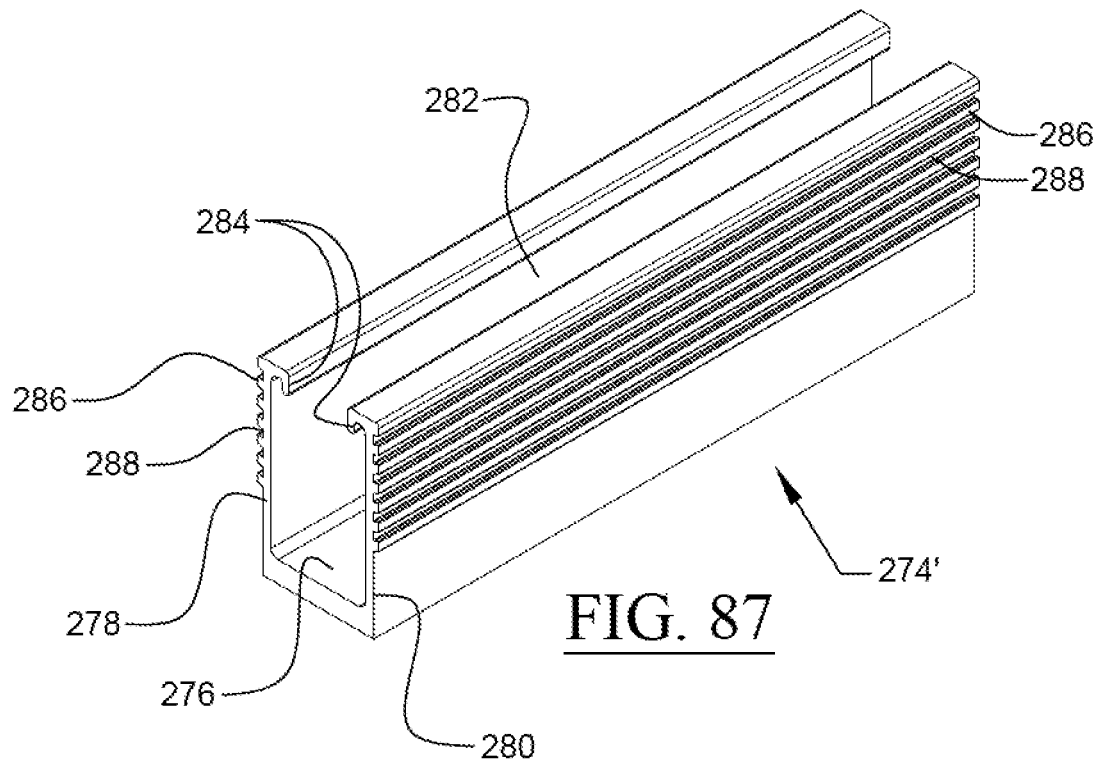
FIG. 87 is a perspective view of an upstanding tile base member, according to an alternative embodiment of the invention.

An alternative embodiment of the upstanding tile base member is shown in FIG. 87. The upstanding tile base member 274' of FIG. 87 is similar in most respects to the upstanding tile base member 274 described above. However, as shown in FIG. 87, the upstanding tile base member 274' has a longer profile length as compared to the base member 274 of FIG. 64.

Figure 65:
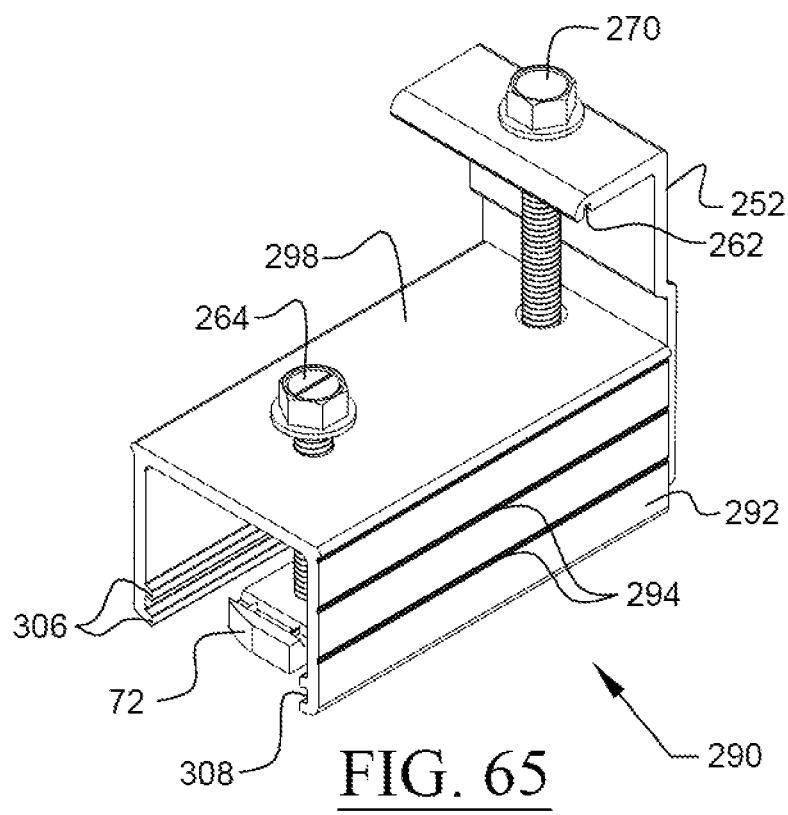
FIG. 65 is a perspective view of a south row mounting assembly, according to an embodiment of the invention.
Figure 66:
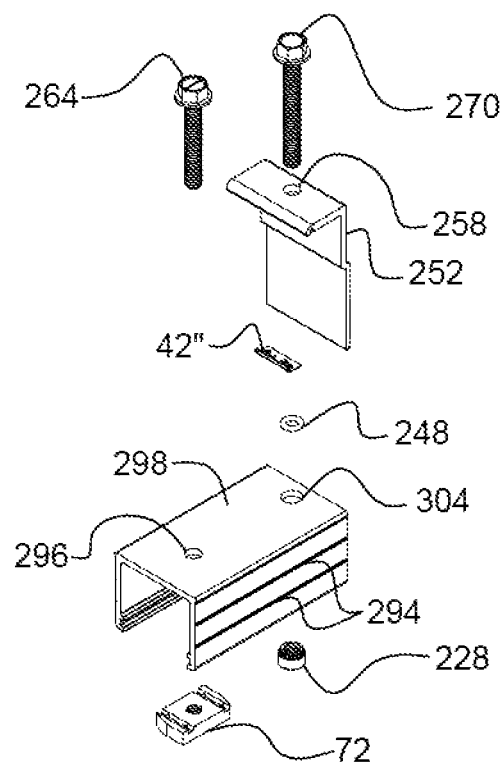
FIG. 66 is an exploded view of the south row mounting assembly of FIG. 65.
Figure 67:
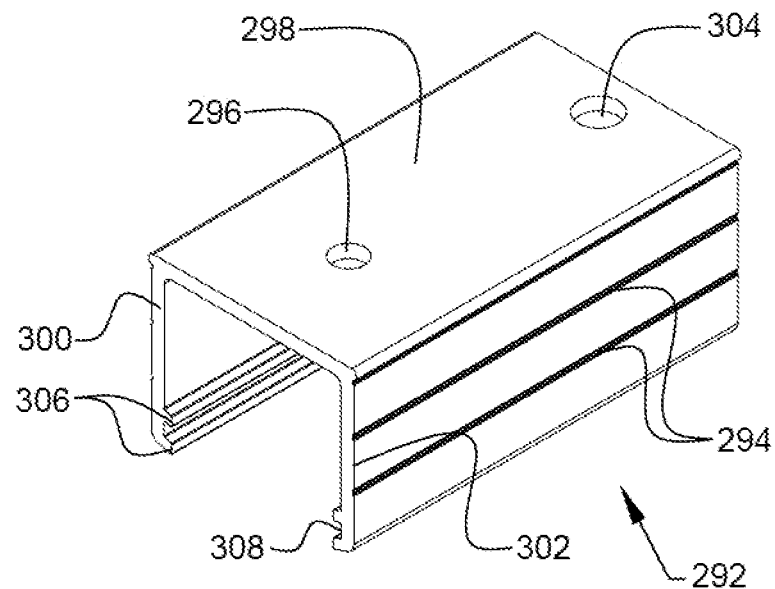
FIG. 67 is a perspective view of an elongated glider member of the south row mounting assembly of FIG. 65.
Figure 68:
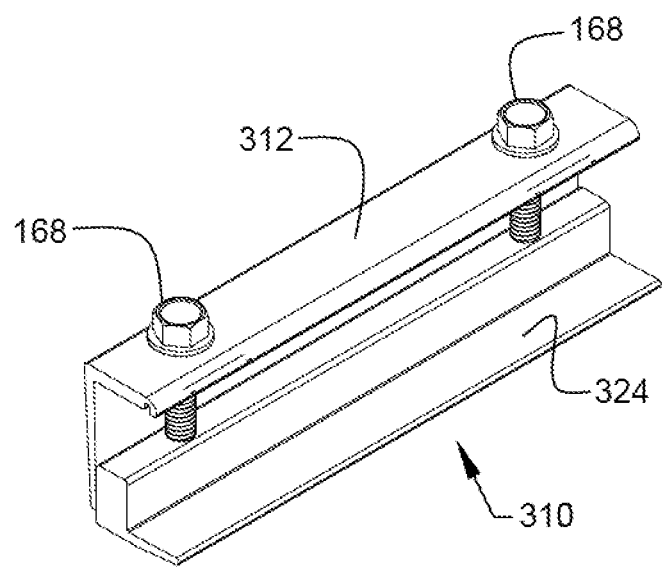
FIG. 68 is a perspective view of a south row coupling assembly of a photovoltaic mounting system, according to an embodiment of the invention, wherein the coupling assembly is illustrated in an assembled state.

Turning to FIGS. 65-67, the south row mounting assembly 290 of the PV array mounting system will be explained. Initially, with reference to FIGS. 65 and 66, it can be seen that the illustrative embodiment of the south row mounting assembly 290 generally includes an elongated glider member 292 and an upper end clamp member 252. As best shown in the assembled view of FIG. 65 and the exploded view of FIG. 66, the upper end clamp member 252 and the elongated glider member 292 are connected to one another by means of a threaded fastener member 270 and a captive nut 228. The south row mounting assembly 290 attaches to a base member 90' of the PV array mounting system by means of a threaded fastener member 264 that threadingly engages with a strut nut 72. The south row mounting assembly 290 may be used on the south edge of the PV module array in lieu of the double clamp assembly 126' and the skirt member 174', 174". From an aesthetic standpoint, the south row mounting assembly 290 may be used as an alternative to the skirt member 174', 174".

Now, with reference primarily to FIG. 67, the structure of the elongated glider member 292 of the south row mounting assembly 290 will be described. As shown in FIG. 67, like the glider member 60' described above, it can be seen that the elongated glider member 292 comprises a generally inverted, U-shaped profile with a top wall portion 298 and first and second opposed wall portions 300, 302 extending downwardly from the top wall portion 298. The top wall portion 236 comprises a first fastener aperture 296 disposed near a first longitudinal end thereof for receiving the strut nut fastener member 264 described above, and a second fastener aperture 304 disposed near the second, opposite longitudinal end thereof for receiving the end clamp fastener 270. In FIG. 67, it can be seen that the inner surfaces of each of the first and second opposed wall portions 300, 302 comprises a pair of elongate protrusions or teeth 306 that are spaced apart from one another by a respective elongate groove 308. The pair of teeth 306 on each of the inner surfaces of the opposed wall portions 300, 302 are designed to engage with respective teeth 110 on opposed upstanding wall portions 104a', 104b' of the base member 90'. The elongated glider member 292 may be slid into place on the top of the base member 90' by engaging its teeth 306 with the teeth 110 of the base member 90'. To permit horizontal adjustability, the elongated glider member 292 is capable of being slid along the length of the base member 90'. And, to permit vertical adjustability, the elongated glider member 292 is capable of being adjustably placed along a vertical height of the upstanding wall portions 104a', 104b' of the base member 90' by selectively engaging certain ones of the teeth 306 on the elongated glider member 292 with certain ones of the grooves 112 on the base member 90', and the groove 308 on the elongated glider member 292 with a certain one of the teeth 110 on the base member 90'.

As best shown in FIG. 67, the outer sides of the first and second opposed wall portions 300, 302 of the elongated glider member 292 are provided with a plurality of generally parallel, visual indicator grooves 294 formed therein (e.g., three (3) visual indicator grooves 294). During the installation of the PV modules, the visual indicator grooves 294 operate as visual indicating bands for positioning the south row mounting assembly 290 at its desired height (i.e., the visual indicator grooves 294 enable the desired height of the south row mounting assembly 290 relative to the base member 90' to be more easily obtained by the installer during the PV module installation process). Because the upper end clamp member 252 of the south row mounting assembly 290 is generally the same as that described above for the north row extension assembly 250, in the interest of brevity, it will not be described again in conjunction with the south row mounting assembly 290.

Referring to the exploded view of FIG. 66, the O-ring member 248 of the south row mounting assembly 290 performs the same functionality as described above for the north row extension assembly 250. That is, the O-ring member 248 is used to hold upper end clamp member 252 open so that a PV module may be more easily inserted between the flange portion 260 of the upper end clamp member 252 and the top wall portion 298 of the south row mounting assembly 290 during the installation of the PV module array on the roof.

Figure 70:
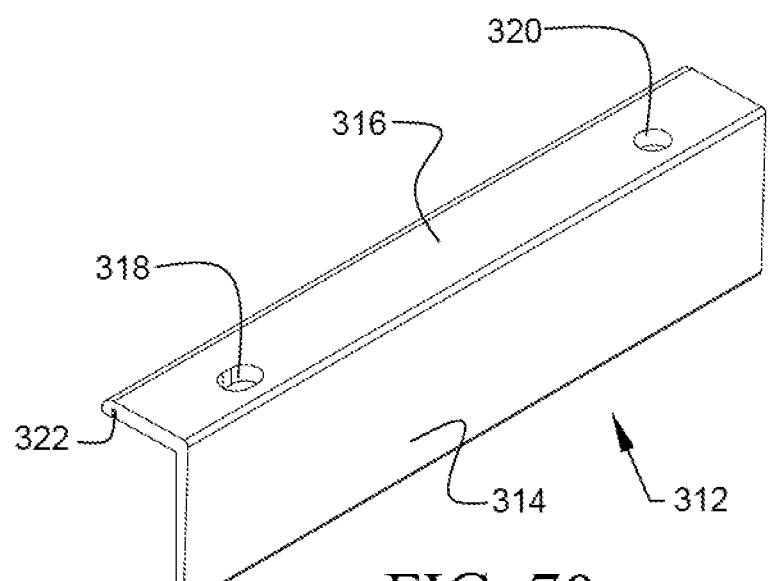
FIG. 70 is a perspective view of an upper coupling member of the south row coupling assembly of FIG. 68.
Figure 71:
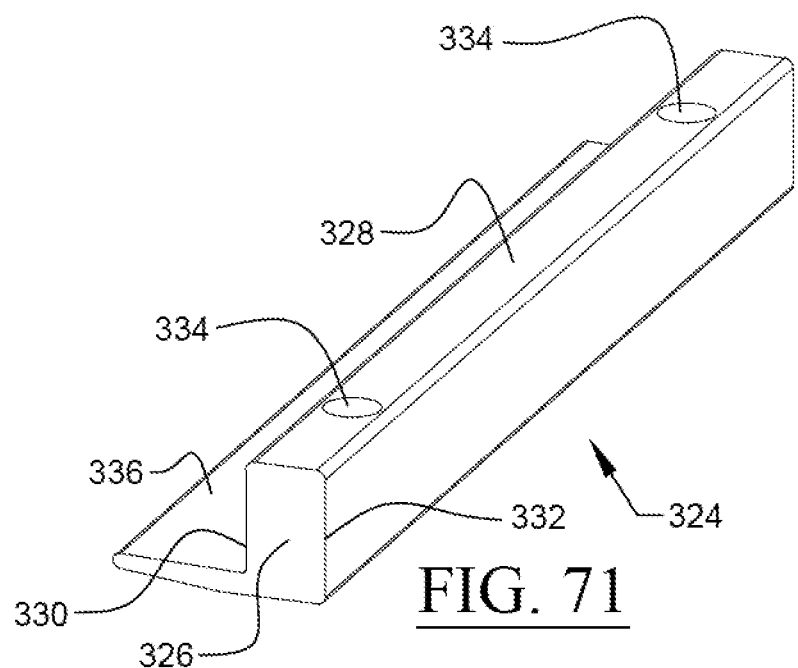
FIG. 71 is a perspective view of an lower coupling member of the south row coupling assembly of FIG. 68.

Next, referring to FIGS. 68-71, the south row, single-sided coupling assembly 310 of the PV array mounting system will be explained. Similar to the coupling assemblies 130, 130' described above, south row coupling assembly 310 generally includes an upper coupling member 312 secured to a lower coupling member 324. As best shown in the assembled view of FIG. 68, the upper coupling member 312 and the lower coupling member 324 are connected to one another by means of one or more threaded fastener members 168 (e.g., two (2) threaded fastener members 168) and one or more respective captive nuts 170 (e.g., two (2) captive nuts 170, one for each threaded fastener member 168). In the illustrated embodiment, each threaded fastener member 168 is in the form of a bolt with a head portion having a serrated flange (e.g., refer to FIG. 68). The south row coupling assembly 310 may be used on the south edge of the PV module array when the south row mounting assembly 290 is used in lieu of providing the skirt member 174', 174" on the south row. As shown in FIGS. 70 and 71, unlike the coupling assembly 130' described above, the upper and lower coupling members 312, 324 of the skirtless coupling assembly 310 do not comprise any mating teeth or protrusions disposed thereon.

Turning to FIG. 70, the structure of the upper coupling member 312 of the south row coupling assembly 310 will be described. As shown in this figure, the upper coupling member 312 generally includes a vertical body portion 314 that is attached to a horizontal flange portion 316 at approximately a 90 degree angle. Referring again to FIG. 70, it can be seen that the flange portion 316 of the upper coupling member 312 further comprises a plurality of fastener apertures 318, 320 for receiving respective threaded fastener members 168. In the illustrative embodiment of FIG. 70, it can be seen that the first fastener aperture 318 has a generally oval shape, while the second fastener aperture 320 has a generally circular shape. Also, as shown in FIG. 70, the flange portion 316 includes an elongate groove 322 disposed in the bottom surface thereof. The elongate groove 316 is configured to receive one or more projection portions 49, 49' of the bonding clip 42', 42" that provides integrated grounding for the photovoltaic module installation (see e.g., FIG. 69). The projection portion 49, 49' of the bonding clip 42', 42" is received within the elongate groove 316 in a press-fit or interference-fit type mounting arrangement.

Next, turning to FIG. 72, the structure of the lower coupling member 324 of the south row coupling assembly 310 will be explained. With reference to this figure, it can be seen that the lower coupling member 324 generally includes an upstanding portion 326 with a ledge portion 336 extending outwardly from one side of the upstanding portion 326. In FIG. 71, it can be seen that the upstanding portion 326 of the lower coupling member 324 comprises spaced-apart threaded fastener apertures 334 disposed therethrough. Each of these apertures 334 receives a respective shaft of a respective threaded fastener member 168. The upstanding portion 326 of the lower coupling member 324 further comprises a top wall portion 328 and first and second opposed wall portions 330, 332 extending downwardly from the top wall portion 328. The ledge portion 336 of the lower coupling member 324 is configured to accommodate a photovoltaic module frame member resting thereon (i.e., a frame member of a south row PV module).

Figure 69:
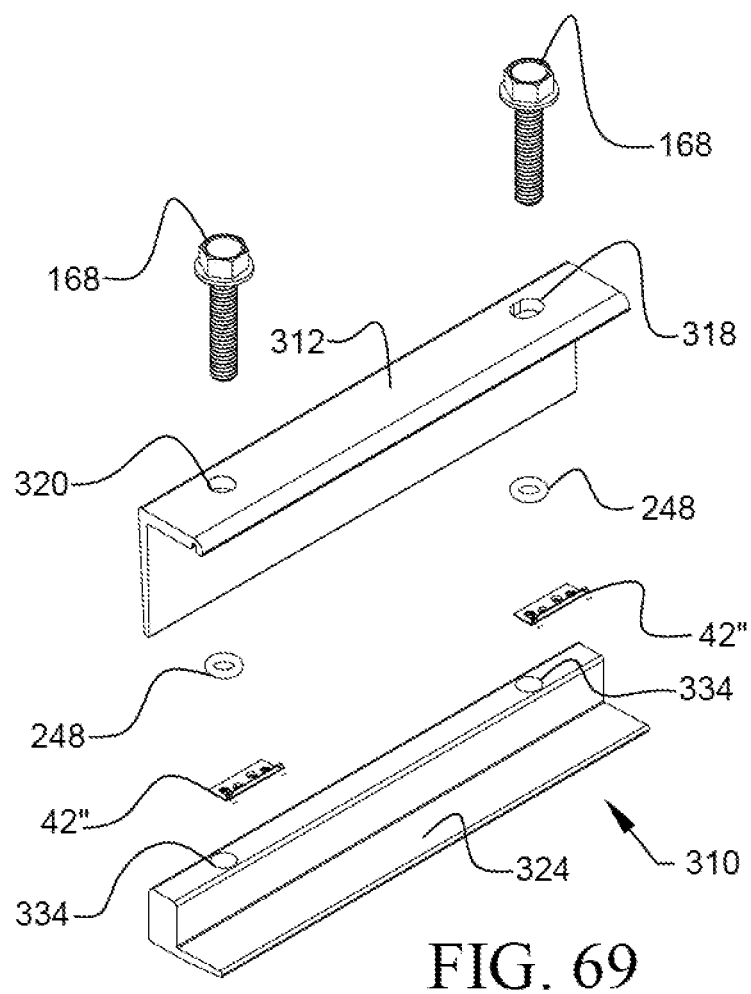
FIG. 69 is an exploded view of the south row coupling assembly of FIG. 68.

Referring to the exploded view of FIG. 69, the O-ring member 248 of the south row coupling assembly 310 performs generally the same functionality as described above for the north row extension assembly 250 and the south row mounting assembly 290. That is, the O-ring member 248 is used to hold upper coupling member 312 open so that a PV module may be more easily inserted between the flange portion 316 of the upper coupling member 312 and the ledge portion 336 of the lower coupling member 324 during the installation of the PV module array on the roof.

Figure 86:
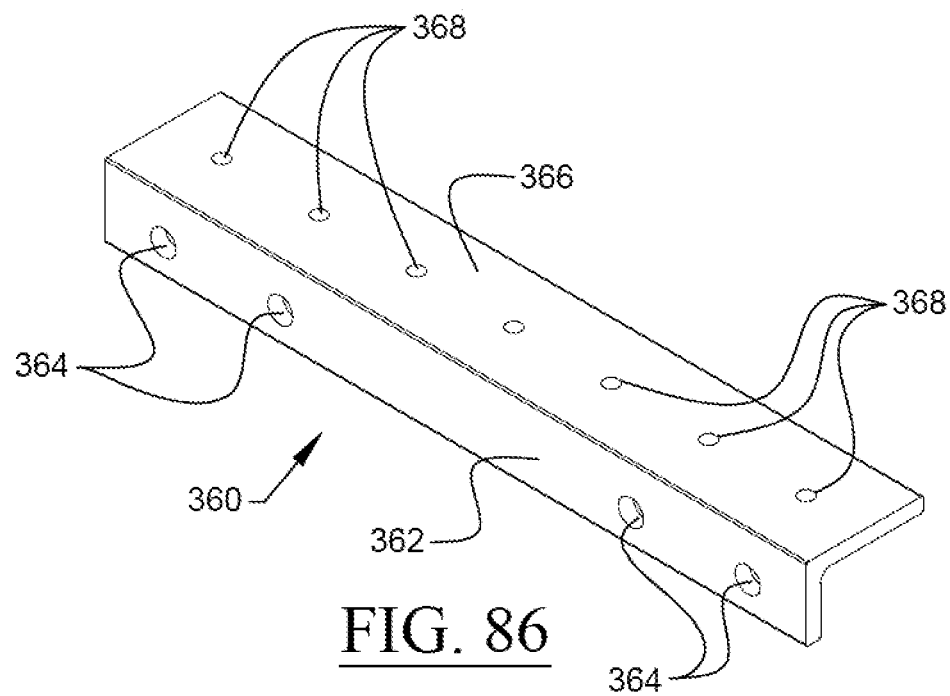
FIG. 86 is a perspective view of a conduit mounting member, according to an embodiment of the invention.

Now, turning to FIG. 86, an illustrative embodiment of a conduit mounting member 360 will be described. The conduit mounting member 360 is configured to couple electrical conduit of a photovoltaic system to an upstanding base member 90' of a base assembly 128'. The conduit mounting member 360 is configured to mount a conduit strap or other conduit holding device such that conduit of a photovoltaic system can be mounted to the conduit mounting member 360. As shown in FIG. 86, the conduit mounting member 360 includes a generally vertical securement portion 362 comprising a plurality of spaced-apart mounting apertures 364 for attaching the conduit mounting member 360 to the upstanding base member 90' (e.g., by using one or more tek screws). The conduit mounting member 360 further comprises a generally horizontal conduit mounting portion 366 connected to the generally vertical securement portion 362. The conduit mounting portion 366 comprises a plurality of spaced-apart securement apertures 368 for attaching the electrical conduit to the conduit mounting member 360 (e.g., by using a conduit strap). As shown in the illustrative embodiment of FIG. 86, the conduit mounting member 360 resembles the shape of angle iron flange, wherein the generally vertical securement portion 362 is disposed generally transversely relative to the horizontal conduit mounting portion 366.

Figure 88:
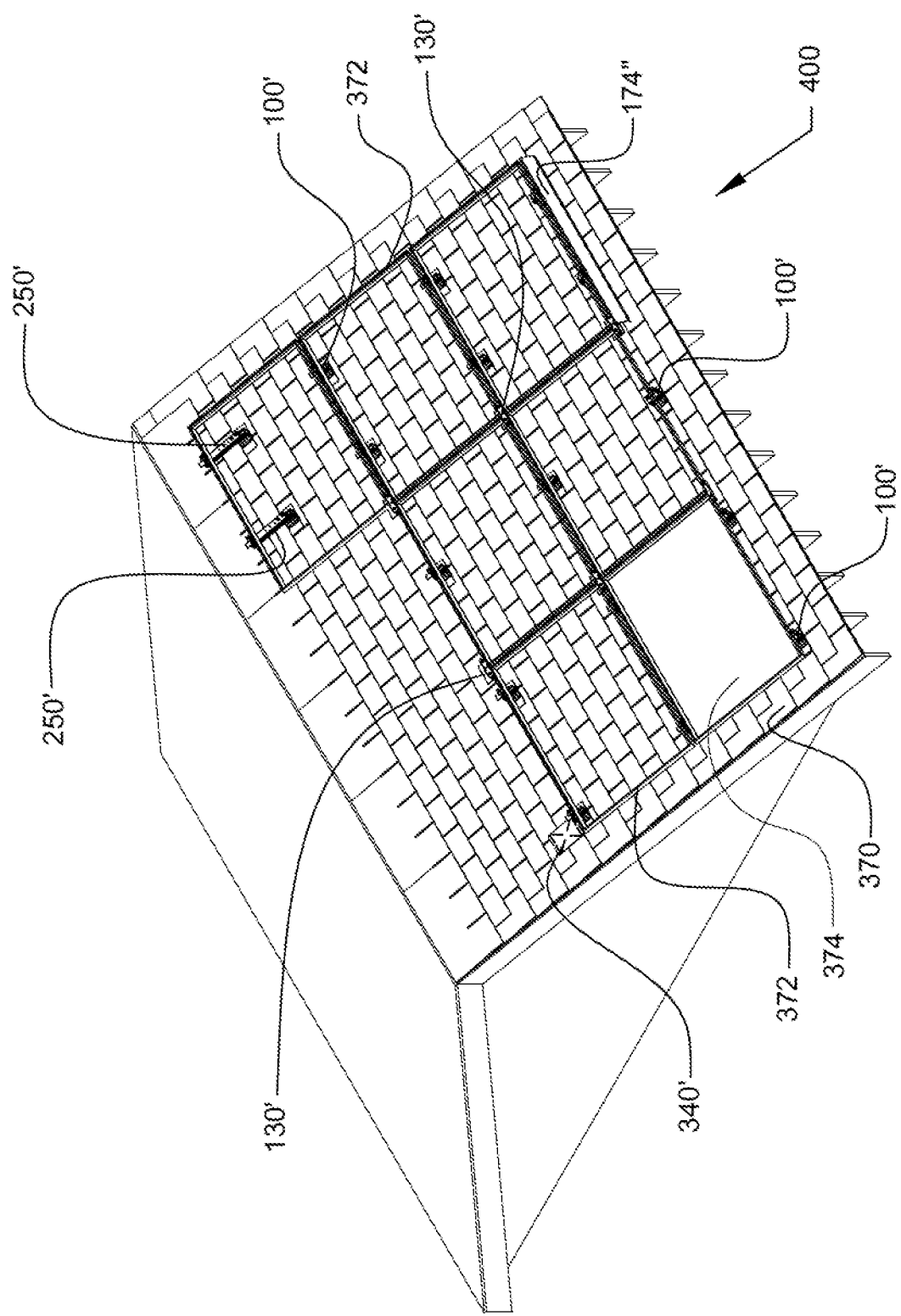
FIG. 88 is a perspective view of the illustrative mounting system described herein being used to secure an array of photovoltaic modules to a sloped roof.

Turning to FIG. 88, an illustrative photovoltaic system 400 utilizing the constituent mounting system components described herein is shown. FIG. 88 illustrates a roof-mounted photovoltaic (PV) system or array according to an embodiment of the present invention. The illustrated photovoltaic system or array includes an array of solar panels or PV modules 374 mounted to a pitched or sloped support surface in the form of a building rooftop 370 by a mounting system. For clarity of illustration of the mounting components, the photovoltaic module frames 372 are primarily shown in FIG. 88 rather than the full modules 374, with one exemplary full PV module 374 illustrated in the south row. In FIG. 88, there are three (3) rows of PV modules 374 illustrated for exemplary purposes, each of the first two rows having three (3) PV modules 374 disposed therein, and the third row (i.e., the north row) having only one PV modules 374 disposed therein. The illustrated mounting system includes a plurality of support surface attachment devices 100' that secure the photovoltaic module frames 372 to the building rooftop 370. The PV array illustrated in FIG. 88 has each of the rectangular-shaped PV modules 374 oriented in a landscape orientation, that is, with the longest axis of the PV modules extending in a lateral or side-to-side direction which is typically the east-west direction. It is noted, however, that the PV modules can alternatively be oriented by the support surface attachment devices 100' in a portrait orientation, that is, with the longest axis of the PV modules extending in a forward-rearward direction which is typically the south-north direction. With reference again to FIG. 88, it can be seen that the illustrated mounting system also includes a plurality of coupling devices 130' that rigidly fasten a plurality of PV modules 374 to one another. As shown in FIG. 88, the coupling devices 130' connect the corners of adjacent PV modules 374 together. Also, an exemplary section of a skirt member 174" is depicted on the south edge of the PV array in FIG. 88. On the north edge of the PV array in FIG. 88, north row extension assemblies 250' are shown supporting the north side of a photovoltaic module frame 372 in a cantilevered manner. As explained above, the north row extension assemblies 250' advantageously allows an additional north row of PV modules to be installed in the array at or near the ridge/peak of the 370 where support surface attachment devices 100' are unable to be accommodated on the north sides of the PV modules (e.g., because shingle courses are unable to be loosened in roof ridge area). Referring again to FIG. 88, it can be seen that a junction box bracket 340' is mounted to the upstanding base member 90' of the support surface attachment devices 100' of the leftmost PV module in the second row of the PV module array to support a junction box or other electrical accessory of the photovoltaic system.

Another illustrative embodiment of a clamp assembly is seen generally at 126" in FIGS. 89-93. Referring to these figures, it can be seen that, in some respects, the illustrative embodiment of FIGS. 89-93 is similar to that of the preceding embodiments of the clamp assembly. Moreover, some elements are common to all of these embodiments. For the sake of brevity, the elements that the embodiment of the clamp assembly of FIGS. 89-93 has in common with the preceding embodiments will not be discussed in detail because these components have already been described above.

Figure 92:
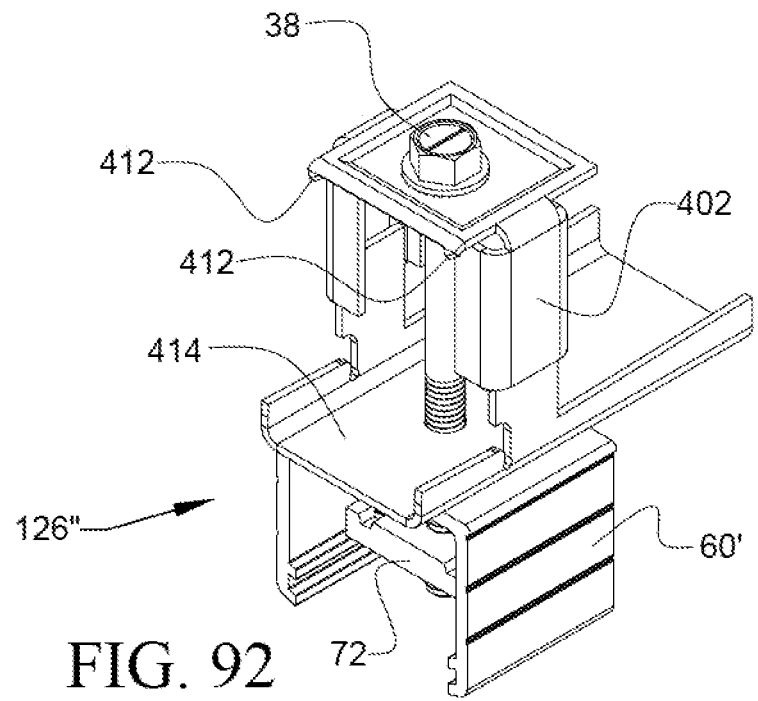
FIG. 92 is a perspective view of the clamp assembly of FIG. 90.
Figure 93:
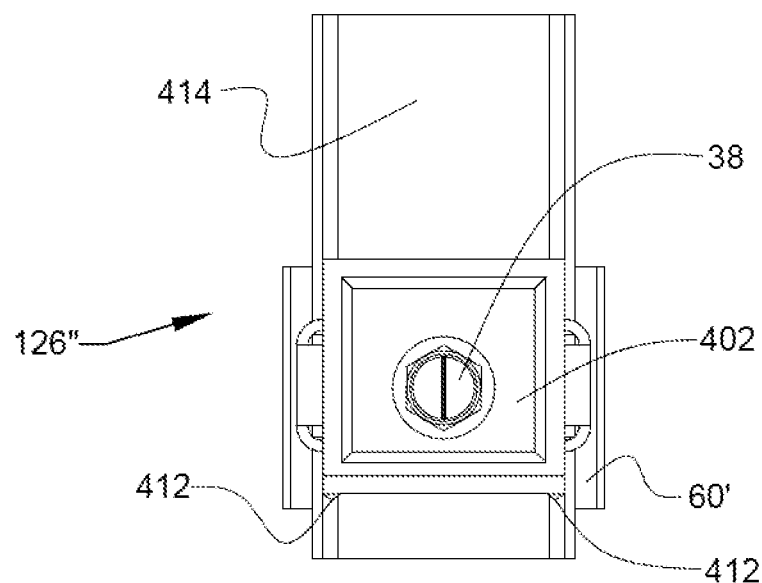
FIG. 93 is a top plan view of the clamp assembly of FIG. 90.

Initially, with reference to FIGS. 89 and 92, it can be seen that the illustrative clamp assembly 126" generally includes an upper clamp member 402, a lower clamp member 414, and a glider member 60' to engage with the base assembly. Also, as shown in FIGS. 89 and 92, the upper clamp member 402, lower clamp member 414, and the glider member 60' are connected to one another by means of a threaded fastener member 38 and a strut nut 72. The threaded fastener member 38 and strut nut 72 are the same as those described above in conjunction with the preceding embodiments. In addition, as shown in the exploded view of FIG. 89, like the embodiment of FIG. 44 described above, an O-ring 196 is provided on the shaft of the threaded fastener member 38 to stabilize the clamp assembly on the glider member 60' prior to installation.

Figure 107A:
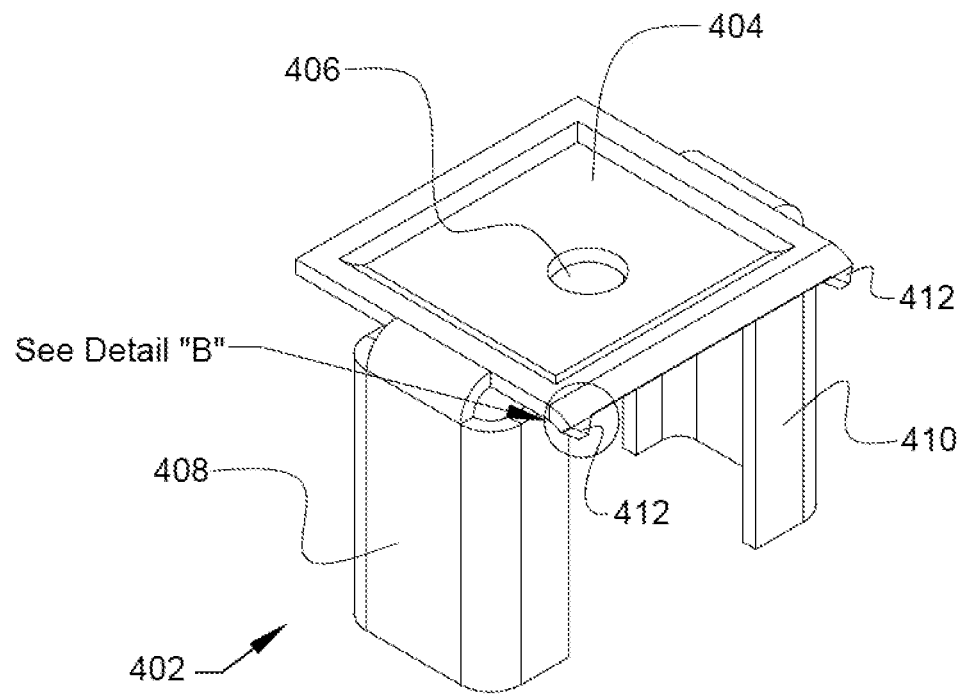
FIG. 107A is a perspective view of the upper clamp member of the clamp assembly of FIG. 89.
Figure 107B:
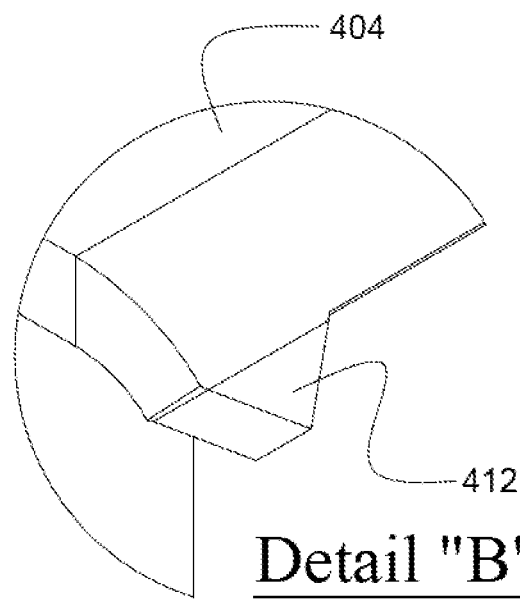
FIG. 107B is an enlarged perspective view of one of the grounding protrusions of the upper clamp member illustrated in the perspective view of FIG. 107A (Detail "B")
Figure 108:
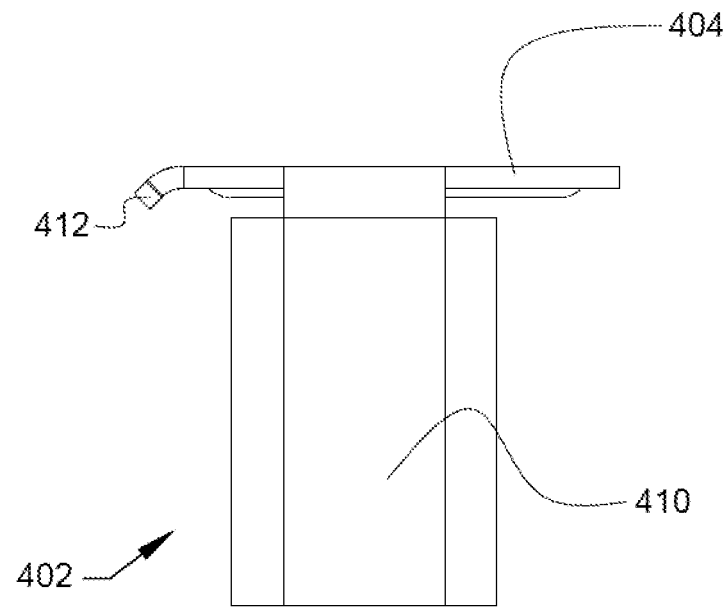
FIG. 108 is a side view of the upper clamp member of FIG. 107A.
Figure 109:
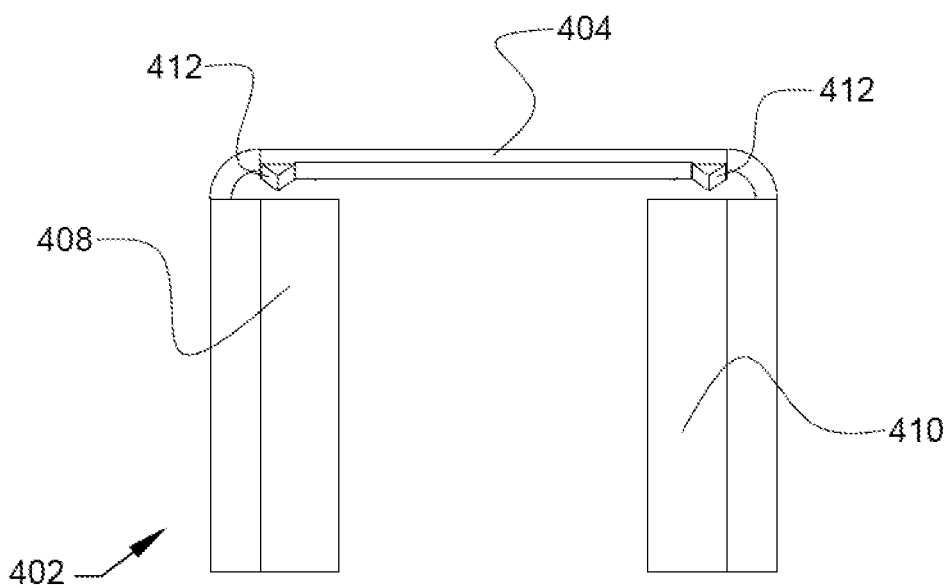
FIG. 109 is an end view of the upper clamp member of FIG. 107A.
Figure 110:
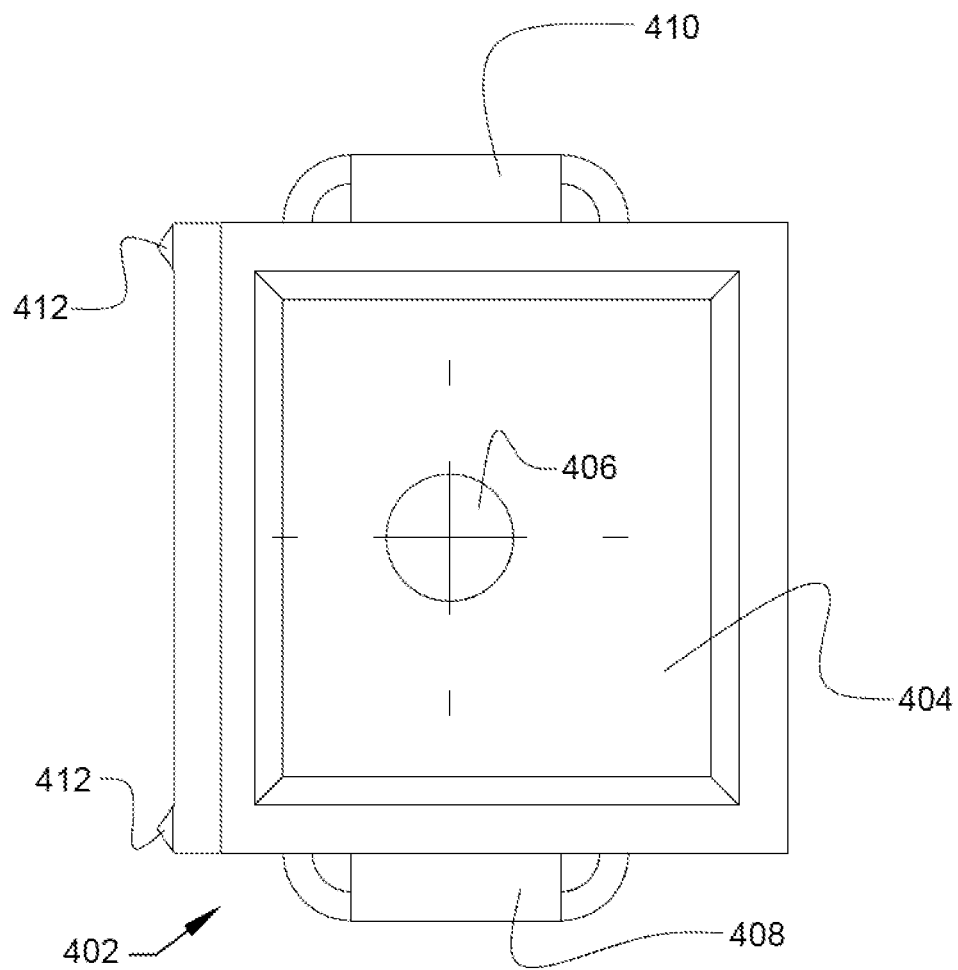
FIG. 110 is a top plan view of the upper clamp member of FIG. 107A.

Now, with reference to FIGS. 107A-110, the structure of the upper clamp member 402 of the clamp assembly in the embodiment of FIGS. 89-93 will be described. Referring initially to the perspective view of FIG. 107A, it can be seen that the upper clamp member 402 generally includes a pair of spaced-apart downwardly extending portions 408, 410 that are attached to a top clamp portion 404. In the illustrative embodiment, each of the downwardly extending portions 408, 410 has a generally U-shaped cross-section, while the top clamp portion 404 comprises a central plate portion with a peripheral lip disposed therearound. Referring again to FIGS. 107A and 110, it can be seen that the top clamp portion 404 of the upper clamp member 402 further comprises a fastener aperture 406 for receiving the threaded fastener member 38. Also, as best shown in FIGS. 107A and 108, the top clamp portion 404 of the upper clamp member 402 forms a pair of oppositely disposed flange portions for engaging the top surfaces of one or more photovoltaic modules. The first oppositely disposed flange portion of the top clamp portion 404 is shorter than the second oppositely disposed flange portion. Like the preceding embodiments described above, the upper clamp member 402 enables the one or more photovoltaic modules to be pivotably installed into the first side of the clamp assembly (e.g., into the side of clamp assembly with the short flange portion). In addition, as best illustrated in FIGS. 107A and 107B, the shorter flange portion of the top clamp portion 404 of the upper clamp member 402 comprises integrated grounding means, which are configured to provide integrated grounding between adjacent photovoltaic modules. More particularly, in the illustrative embodiment, with reference to FIGS. 107A and 107B, the integrated grounding means of the upper clamp member 402 comprises two spaced-apart grounding protrusions or teeth 412. The downwardly inclined, pointed grounding protrusions or teeth 412 are designed to pierce the anodized layer of the photovoltaic module to provide integrated grounding between the photovoltaic modules. To facilitate integrated grounding between the photovoltaic modules, all of the components of the support surface attachment device and the coupling device may be formed from metal.

Figure 103:
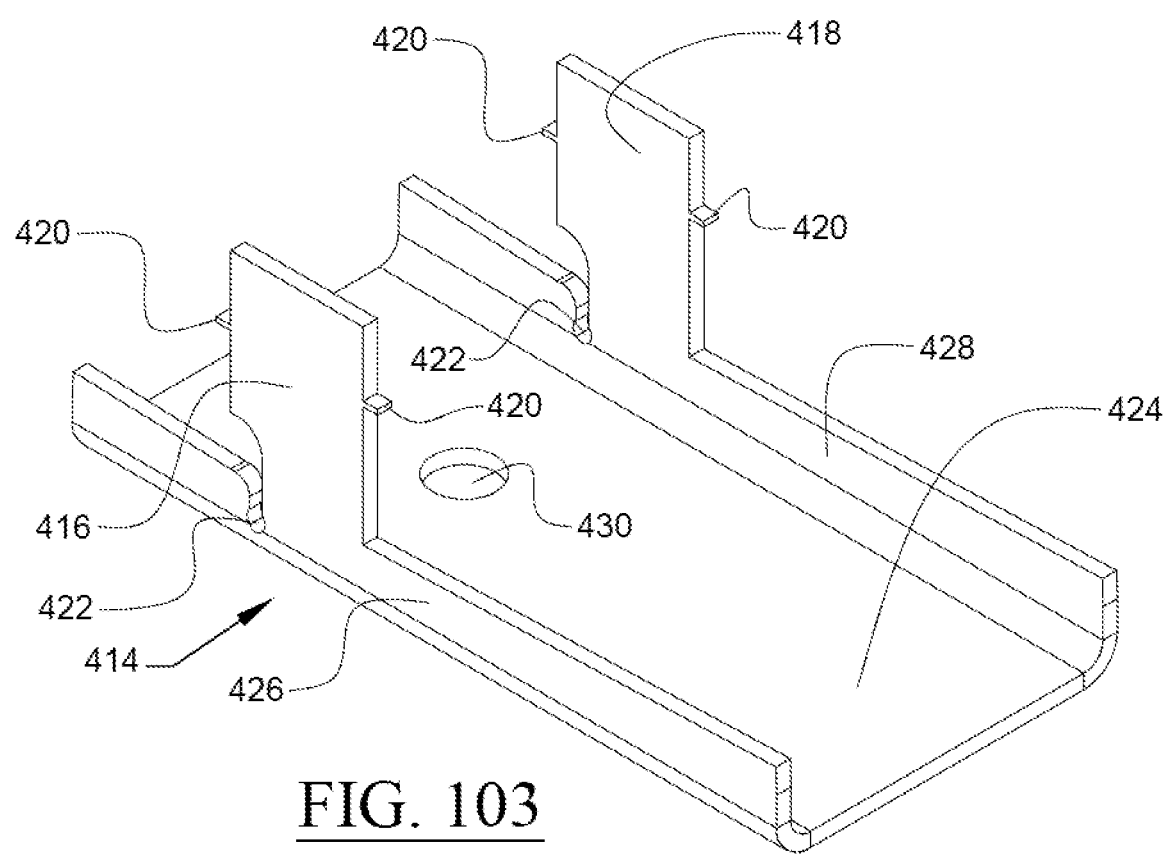
FIG. 103 is a perspective view of the lower clamp member of the clamp assembly of FIG. 89.
Figure 104A:
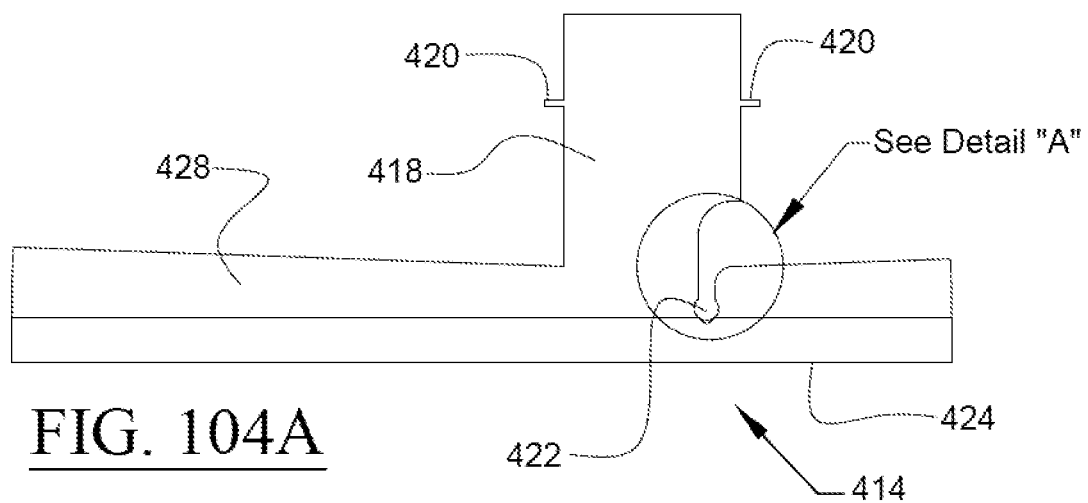
FIG. 104A is a side view of the lower clamp member of FIG. 103.
Figure 104B:
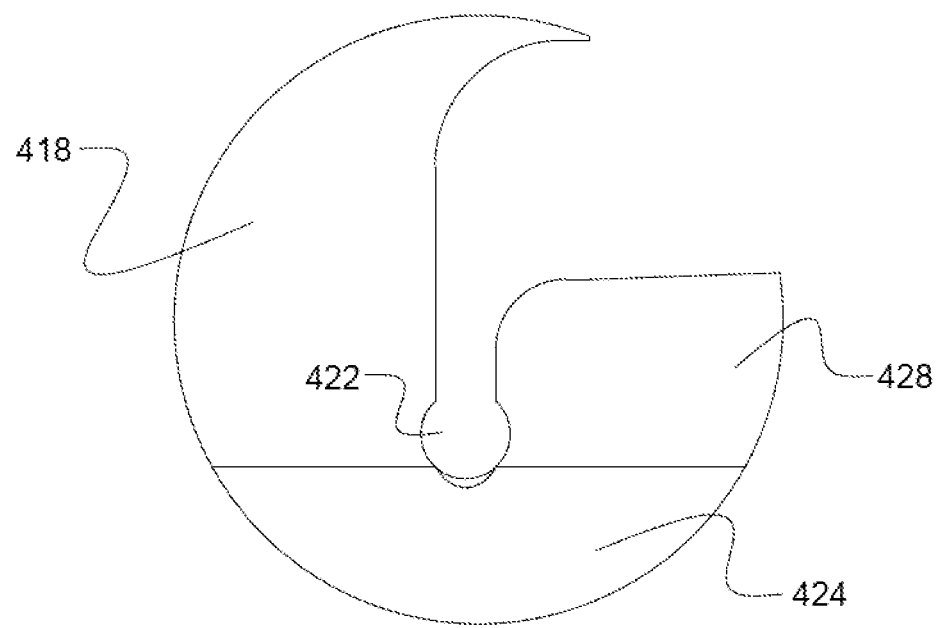
FIG. 104B is an enlarged perspective view of the skirt receiving notch of the lower clamp member illustrated in the side view of FIG. 104A (Detail "A")
Figure 105:
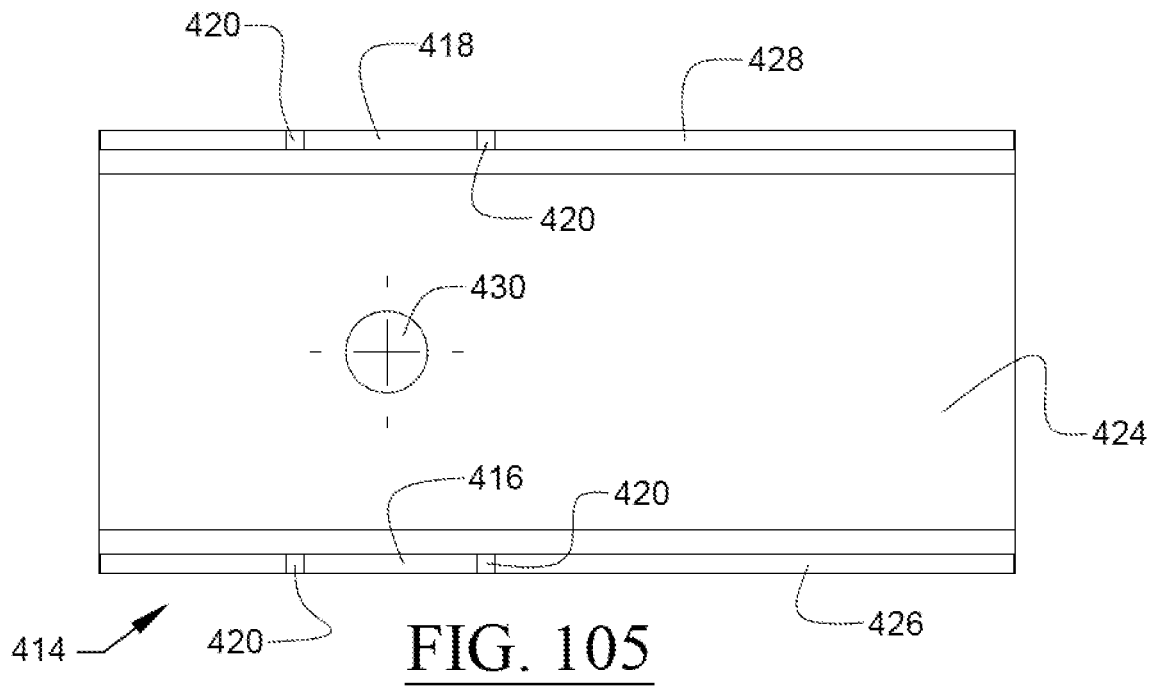
FIG. 105 is a top plan view of the lower clamp member of FIG. 103.
Figure 106:
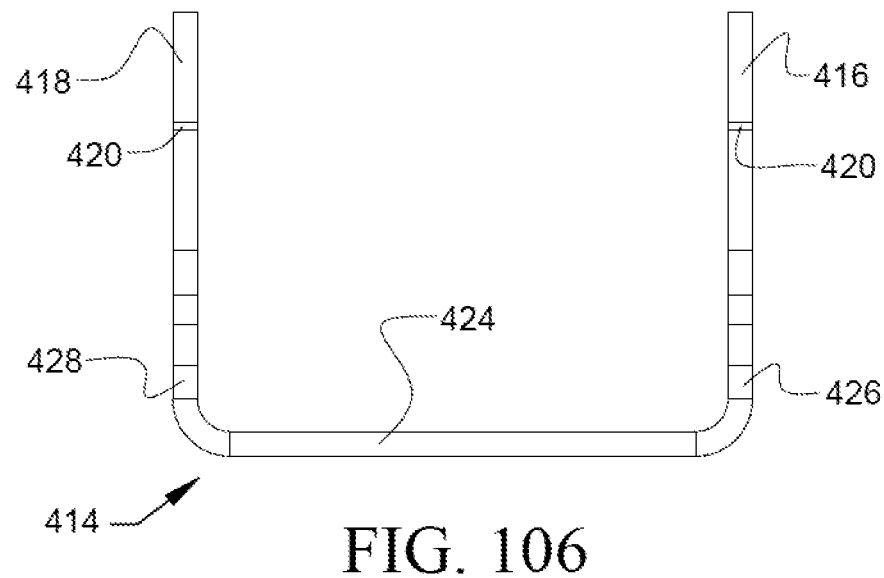
FIG. 106 is an end view of the lower clamp member of FIG. 103.

Next, turning to FIGS. 103-106, the structure of the lower clamp member 414 of the clamp assembly embodiment of FIGS. 89-93 will be explained. Referring initially to the perspective view of FIG. 103, it can be seen that the lower clamp member 414 generally includes a pair of spaced-apart upwardly extending portions 416, 418 that are attached to a base portion 424. In FIG. 103, it can be seen that the base portion 424 of the lower clamp member 414 comprises a fastener aperture 430 disposed therethrough. The fastener aperture 430 receives the shaft of the threaded fastener member 38. Also, as best shown in FIG. 103, the base portion has a generally U-shaped cross-section with oppositely disposed first and second upturned edges 426, 428. As best shown in the side view of FIG. 104A, the base portion 424 of the lower clamp member 414 has two ledge portions, each of which is disposed on a respective opposite side of the upwardly extending portions 416, 418. Each of the ledge portions of the base portion 424 of the lower clamp member 424 is configured to accommodate a photovoltaic module frame member resting thereon. Similar to that described above for the preceding embodiments of the lower clamp member, the upturned edges 426, 428 that form the opposed lateral sides of the clamp ledge portions each are tapered slightly upward at an acute angle (see FIGS. 103 and 104A, so as to be capable of performing the same functionality explained above for the lower clamp members 20, 20' (i.e., the ability for an installer to pivot the north row of PV modules into place). As shown in FIGS. 103 and 104A, in the illustrative embodiment, the spaced-apart upwardly extending portions 416, 418 are in the form of first and second vertical walls. In the illustrative embodiment, each of the upwardly extending portions 416, 418 of the lower clamp member 414 comprises a pair of oppositely disposed, outwardly extending protrusions 420. The outwardly extending protrusions 420 are configured to facilitate the holding open of the panel receiving gap of the clamp assembly during the installation of the photovoltaic modules. In the illustrative embodiment, the outwardly extending protrusions 420 are further configured to be deformed and/or severed from the remainder of the upwardly extending portion 416, 418 of the lower clamp member 414 when the fastener member 38 of the clamp assembly is tightened (i.e., the outwardly extending protrusions 420 are in the form of breakaway protrusions). As best shown in FIGS. 103, 104A, and 104B, a skirt receiving notch 422 is provided next to each of the upwardly extending portions 416, 418 of the lower clamp member 414. The skirt receiving notches 422 are configured to receive a downturned edge portion 600 of a skirt member 596 (see FIGS. 160 and 161). As shown in FIG. 161, the skirt member 596 comprises a body portion 598 with the downturned edge portion 600 disposed on the north side of the body portion 598.

In the illustrative embodiment of the clamp assembly described above, the spaced-apart downwardly extending portions 408, 410 of the upper clamp member 402 are configured to engage with the upwardly extending portions 416, 418 of the lower clamp member 414 so as to hold open the panel receiving gap of the clamp assembly for facilitating an insertion of the one or more photovoltaic modules after the fastener member 38 of the clamp assembly has been partially tightened (i.e., to allow for the universal setting of the clamp).

Yet another illustrative embodiment of a clamp assembly is seen generally at 126''' in FIGS. 94-98. Referring to these figures, it can be seen that, in some respects, the illustrative embodiment of FIGS. 94-98 is similar to that of the preceding embodiments of the clamp assembly. Moreover, some elements are common to all of these embodiments. For the sake of brevity, the elements that the embodiment of the clamp assembly of FIGS. 94-98 has in common with the preceding embodiments will not be discussed in detail because these components have already been described above.

Figure 98:
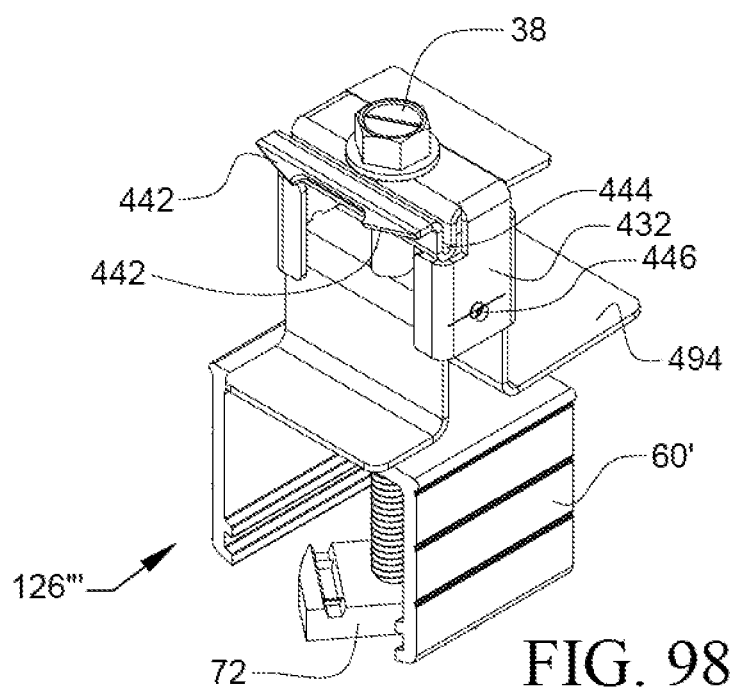
FIG. 98 is a perspective view of the clamp assembly of FIG. 95.

Initially, with reference to FIGS. 94 and 98, it can be seen that the illustrative clamp assembly 126''' generally includes an upper clamp member 432, a lower clamp member 494, and a glider member 60' to engage with the base assembly. Also, as shown in FIGS. 94 and 98, the upper clamp member 432, lower clamp member 494, and the glider member 60' are connected to one another by means of a threaded fastener member 38 and a strut nut 72. The threaded fastener member 38 and strut nut 72 are the same as those described above in conjunction with the preceding embodiments.

Figure 123B:
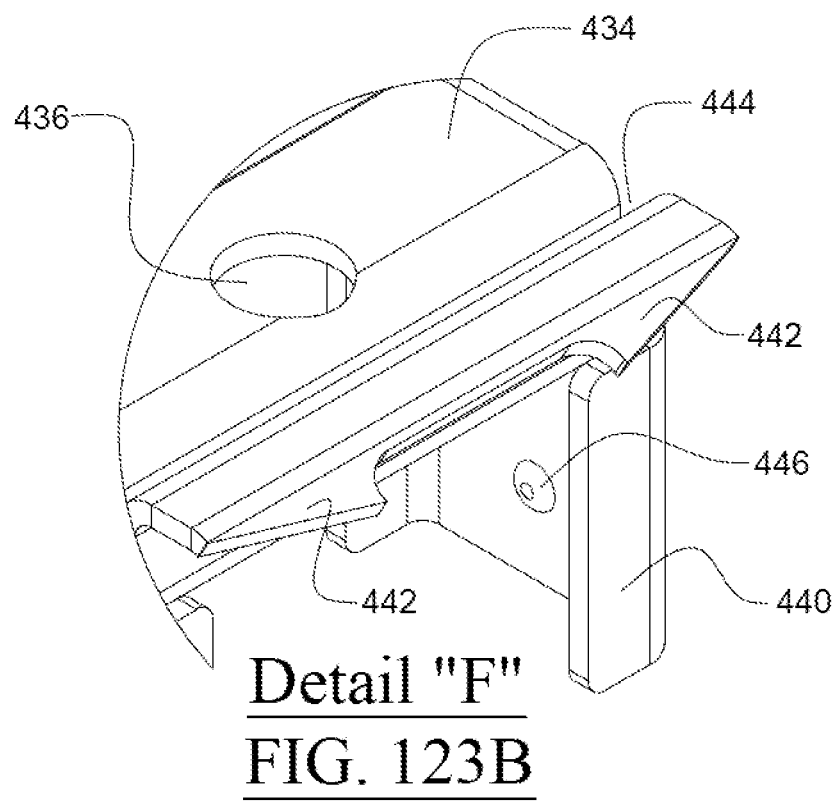
Figure 124:
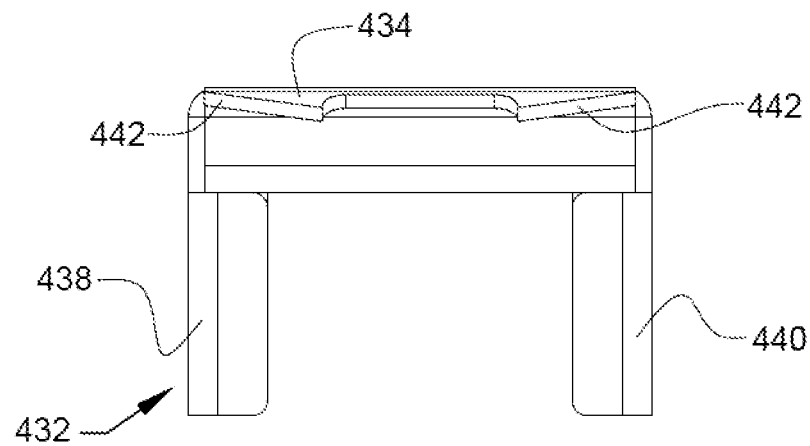
Figure 125:
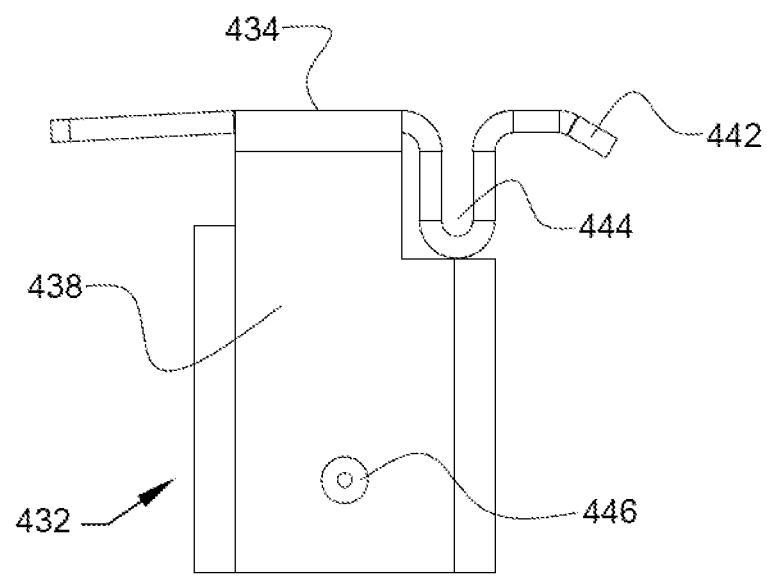

Now, with reference to FIGS. 123A-126, the structure of the upper clamp member 432 of the clamp assembly embodiment of FIGS. 94-98 will be described. Referring initially to the perspective view of FIG. 123A, it can be seen that the upper clamp member 432 generally includes a pair of spaced-apart downwardly extending portions 438, 440 that are attached to a top clamp portion 434. In the illustrative embodiment, each of the downwardly extending portions 438, 440 has a generally U-shaped cross-section, while the top clamp portion 434 comprises a middle plate portion with oppositely disposed flanged portions. Referring again to FIGS. 123A and 126, it can be seen that the top clamp portion 434 of the upper clamp member 432 further comprises a fastener aperture 436 for receiving the threaded fastener member 38. Also, as best shown in FIGS. 123A and 125, the top clamp portion 434 of the upper clamp member 432 forms a pair of oppositely disposed flange portions for engaging the top surfaces of one or more photovoltaic modules. The first oppositely disposed flange portion of the top clamp portion 434 is shorter than the second oppositely disposed flange portion. Like the preceding embodiments described above, the upper clamp member 432 enables the one or more photovoltaic modules to be pivotably installed into the first side of the clamp assembly (e.g., into the side of clamp assembly with the short flange portion). In addition, as best illustrated in FIGS. 123A and 123B, the shorter flange portion of the top clamp portion 434 of the upper clamp member 432 comprises integrated grounding means, which are configured to provide integrated grounding between adjacent photovoltaic modules. More particularly, in the illustrative embodiment, with reference to FIGS. 123A and 123B, the integrated grounding means of the upper clamp member 432 comprises two spaced-apart grounding protrusions or teeth 442. The downwardly inclined, pointed grounding protrusions or teeth 442 are designed to pierce the anodized layer of the photovoltaic module to provide integrated grounding between the photovoltaic modules. To facilitate integrated grounding between the photovoltaic modules, all of the components of the support surface attachment device and the coupling device may be formed from metal.

Referring again to FIGS. 123A and 123B, it can be seen that each of the downwardly extending portions 438, 440 of the upper clamp member 432 has a dimple 446 formed in a vertical side surface thereof. The dimples 446 of the upper clamp member 432 are configured to facilitate the holding open of the panel receiving gap of the clamp assembly. In the illustrative embodiment, as best shown in FIGS. 123A and 125, the top clamp portion 434 of the upper clamp member 432 further comprises a hemmed portion that forms a skirt receiving groove 444. The skirt receiving groove 444 is configured to receive a downwardly extending hemmed upper edge portion 538 of a skirt member 534 (see FIG. 168). As shown in FIG. 168, once the hemmed upper edge portion 538 of a skirt member 534 is inserted into the skirt receiving groove 444 of the upper clamp member 432, the skirt member 534 is secured to the clamp assembly by means of the head of the fastener member 38 (i.e., the head of the fastener member 38 presses down on the top surface of the skirt member 534).

Figure 99:
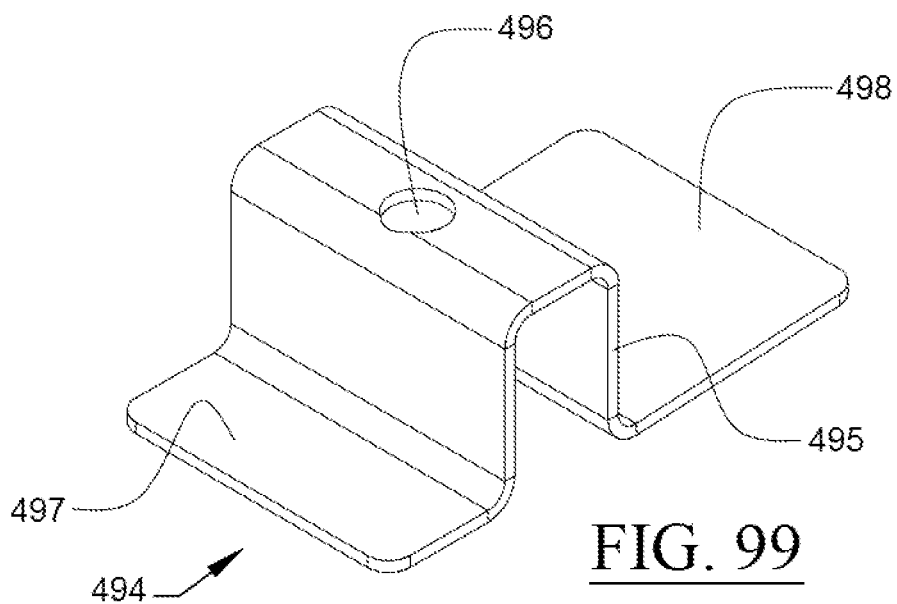
FIG. 99 is a perspective view of the lower clamp member of the clamp assembly of FIG. 94.
Figure 100:
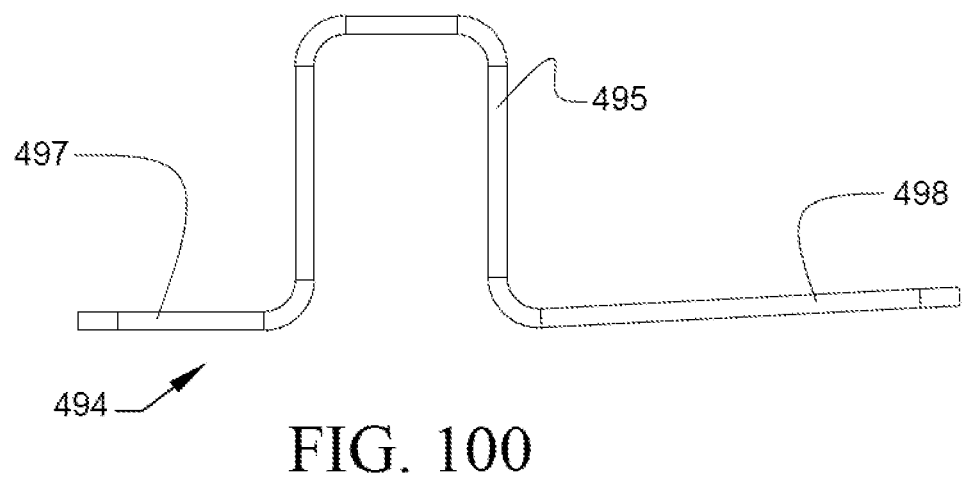
FIG. 100 is a side view of the lower clamp member of FIG. 99.
Figure 101:
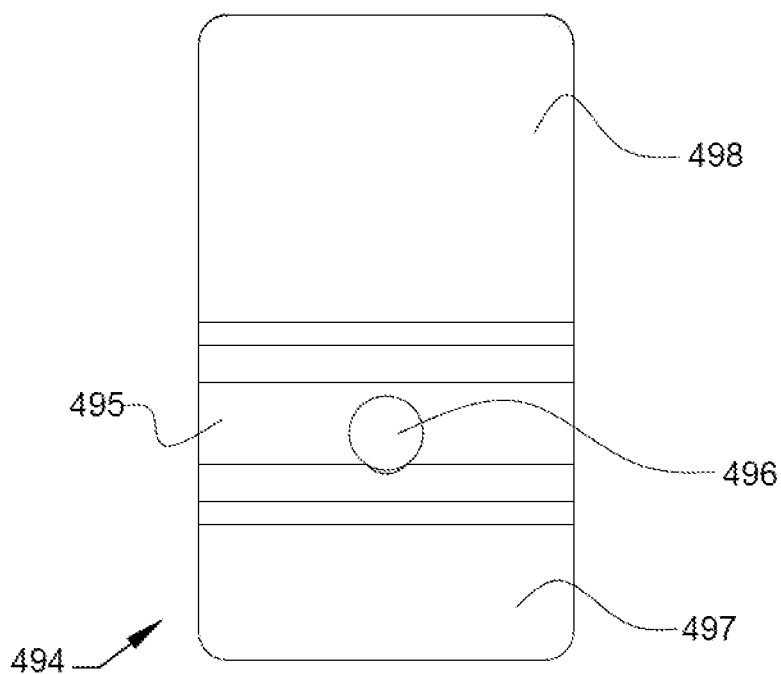
FIG. 101 is a top plan view of the lower clamp member of FIG. 99.
Figure 102:
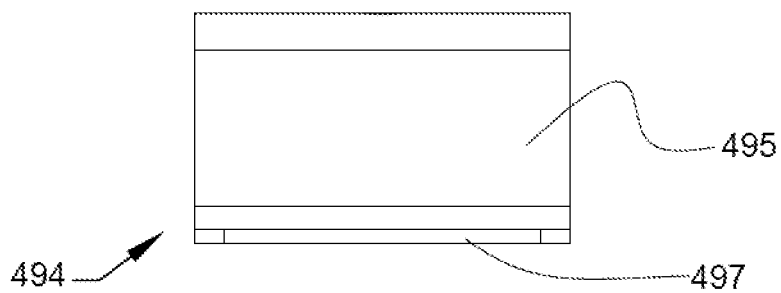
FIG. 102 is an end view of the lower clamp member of FIG. 99.

Next, turning to FIGS. 99-102, the structure of the lower clamp member 494 of the clamp assembly embodiment of FIGS. 94-98 will be explained. Similar to that described above for the lower clamp members 20, 20', it can be seen that the lower clamp member 494 generally includes an upstanding middle portion 495 with first and second ledge portions 497, 498 extending outwardly from the upstanding middle portion 495 (refer to FIGS. 99 and 100). In FIGS. 99 and 101, it can be seen that the upstanding middle portion 495 of the lower clamp member 494 comprises a fastener aperture 496 disposed centrally therethrough. The fastener aperture 496 receives the shaft of the threaded fastener member 38. As shown in FIGS. 99 and 100, the upstanding middle portion 495 of the lower clamp member 494 comprises a top wall portion with aperture 496 that is connected to first and second opposed vertical wall portions. Each of the first and second ledge portions 497, 498 of the lower clamp member 494 is configured to accommodate a photovoltaic module frame member resting thereon. As described above for the preceding embodiments of the lower clamp member 20, 20', the second opposed ledge 498 of the lower clamp member 494 is bent slightly upward, or is tapered slightly upward at an acute angle, so as to be capable of performing the same functionality explained above for the lower clamp members 20, 20' (i.e., the ability for an installer to pivot the north row of PV modules into place).

In the illustrative embodiment of the clamp assembly described above, the spaced-apart downwardly extending portions 438, 440 of the upper clamp member 432 are configured to engage with opposite sides of the upstanding middle portion 495 of the lower clamp member 494 so as to hold open the panel receiving gap of the clamp assembly for facilitating an insertion of the one or more photovoltaic modules after the fastener member 38 of the clamp assembly has been partially tightened (i.e., to allow for the universal setting of the clamp).

Advantageously, the panel receiving gap defined by the upper and lower clamp members 402, 414 and 432, 494 of the clamp assemblies described above is continuously adjustable by a user within the range between approximately 32 millimeters and approximately millimeters so as to accommodate any photovoltaic module thickness within that range. That is, the clamp assemblies are capable of accommodating any photovoltaic module thickness between 32 millimeters and 50 millimeters, such as but not limited to, photovoltaic module thicknesses of 32 millimeters, 35 millimeters, 40 millimeters, 45 millimeters, and 46 millimeters. In the illustrative embodiment, the panel receiving gap defined by the upper and lower clamp members 402, 414 and 432, 494 of the clamp assemblies is not limited to incremental adjustment, rather it is continuously adjustable between 32 millimeters and 50 millimeters. In addition, the clamp assemblies with the upper and lower clamp members 402, 414 and 432, 494 are capable of being rotated 360 degrees relative to the base assembly of the support surface attachment device so as to accommodate various photovoltaic module mounting arrangements (e.g., the clamp members 402, 414 and 432, 494 could be rotated 90 degrees to accommodate a side mounting arrangement on the photovoltaic module). Further, the clamp assemblies with the upper and lower clamp members 402, 414 and 432, 494 are capable of being interchangeably used with or without a skirt member of a photovoltaic array (i.e., the same clamps can be used for both the middle rows of the array and the north and south rows of the array). The south row of the array with the skirt member does not require a different type of clamp for the skirt member. Also, advantageously, the clamp assemblies with the upper and lower clamp members 402, 414 and 432, 494 allow for the use of a universal skirt (i.e., it is unnecessary to use different skirts for different photovoltaic module heights).

Figure 111A:
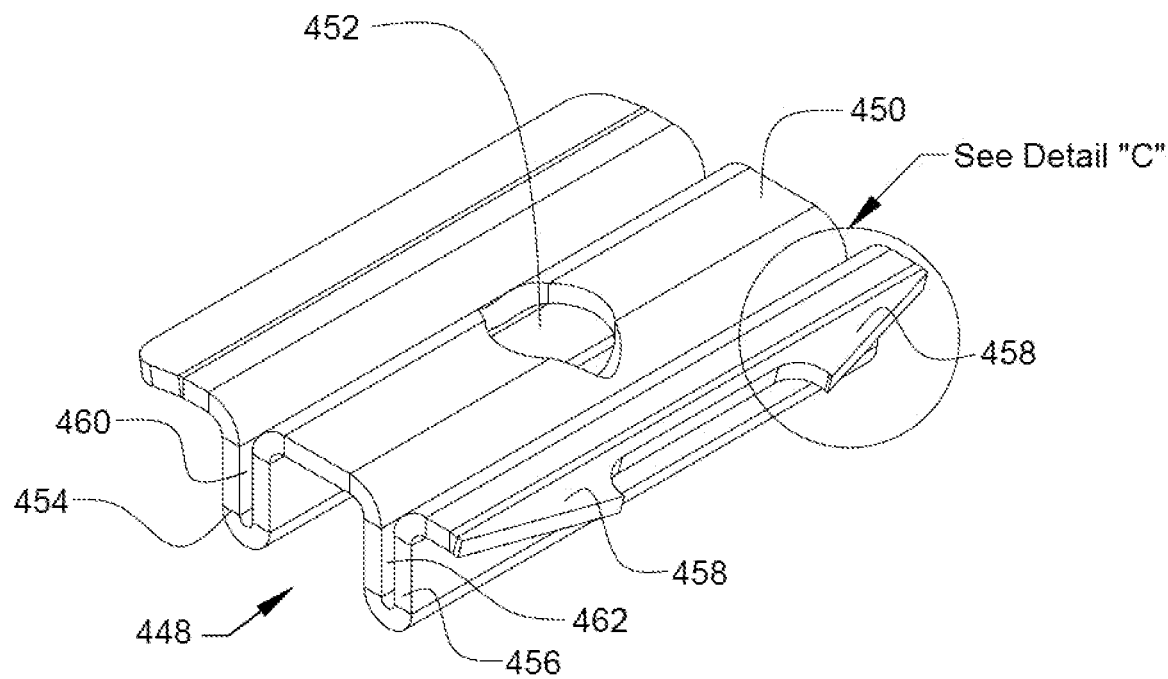
FIG. 111A is a perspective view of another upper clamp member used in conjunction with the clamp assemblies described herein, according to another embodiment of the invention.
Figure 111B:
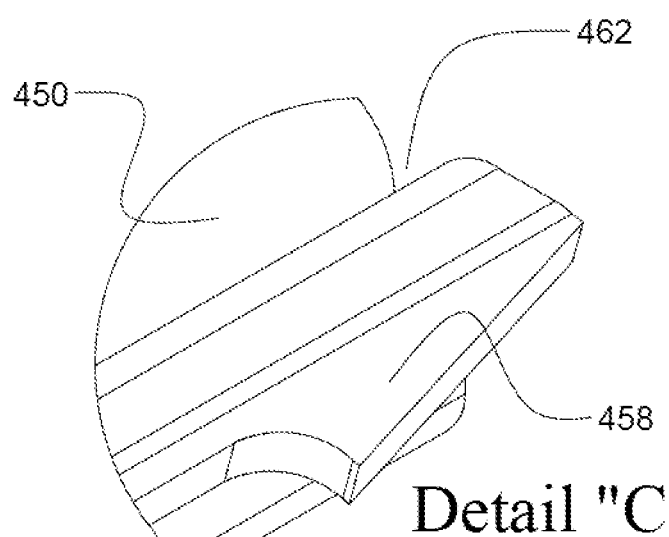
FIG. 111B is an enlarged perspective view of one of the grounding protrusions of the upper clamp member illustrated in the perspective view of FIG. 111A (Detail "C")
Figure 112:
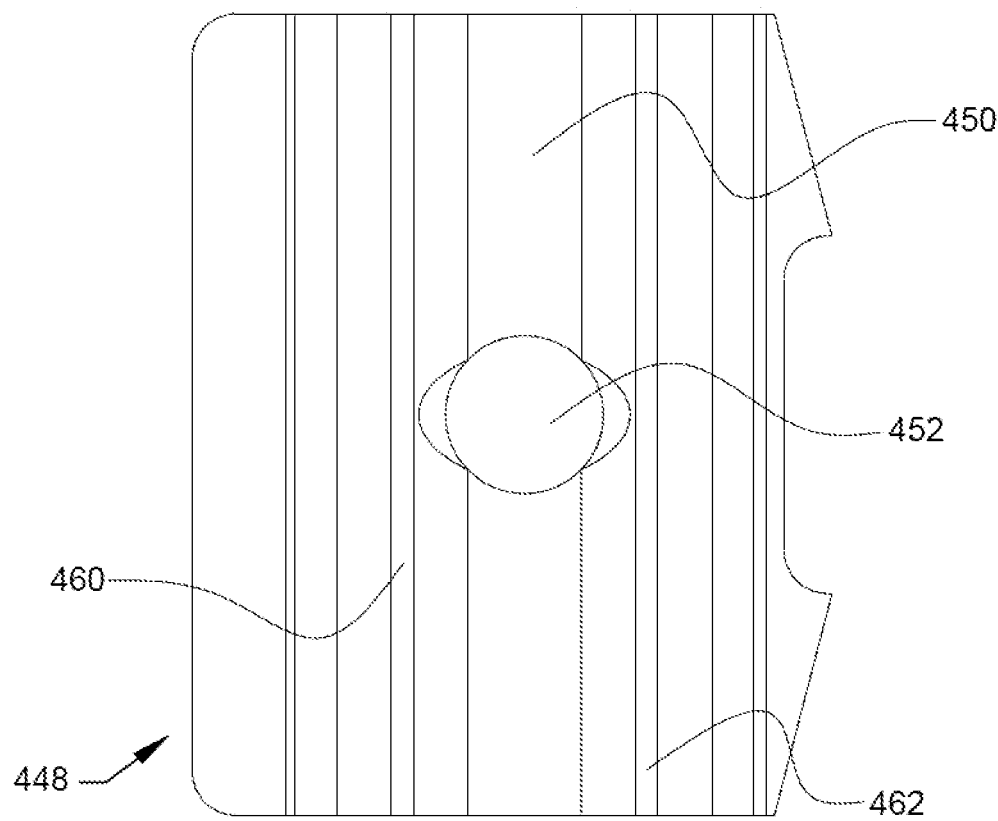
FIG. 112 is a top plan view of the upper clamp member of FIG. 111A.
Figure 113:
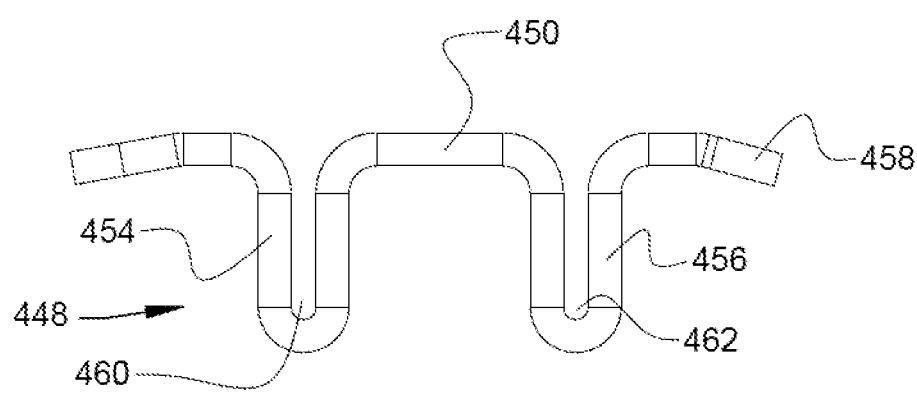
FIG. 113 is a side view of the upper clamp member of FIG. 111A.
Figure 114:
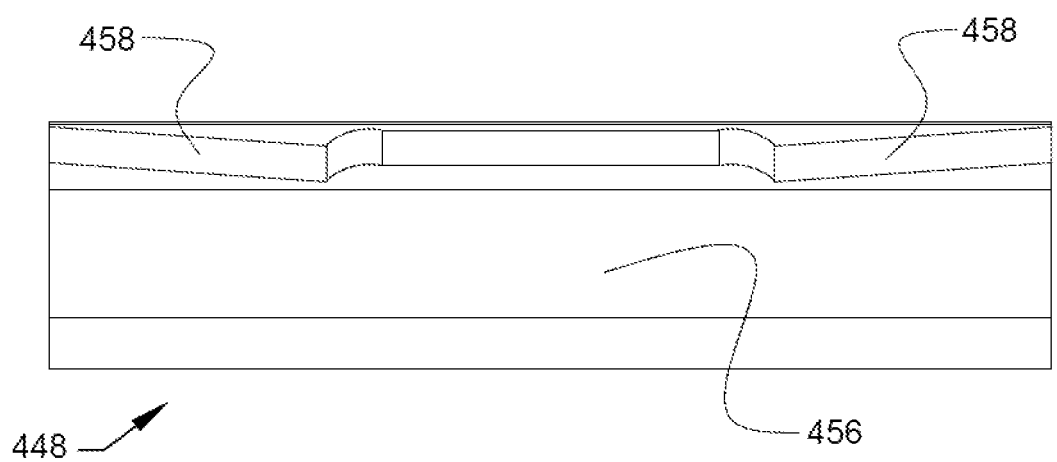
FIG. 114 is an end view of the upper clamp member of FIG. 111A.

Additional illustrative embodiments of the upper clamp member of the clamp assembly are depicted in FIGS. 111A-114, 115A-118, and 119A-122. These additional upper clamp members may also be used in conjunction with the support surface attachment device described herein. Initially, referring to the upper clamp member 448 illustrated in FIGS. 111A-114, it can be seen that the upper clamp member 448 generally includes a top clamp portion 450 with first and second hemmed skirt channel portions 454, 456 formed therein. Referring again to FIGS. 111A and 112, it can be seen that the top clamp portion 450 of the upper clamp member 448 further comprises a fastener aperture 452 for receiving the threaded fastener member 38. In FIG. 113, it can be seen that each skirt channel portion 454, 456 forms a respective skirt receiving groove 460, 462. Each of the skirt receiving grooves 460, 462 is configured to receive a downwardly extending hemmed upper edge portion of a skirt member. That is, the upper clamp member 448 may be rotated 180 degrees, and still be capable of receiving a skirt member. As described above for the upper clamp member 432, once the hemmed upper edge portion of a skirt member 534 is inserted into one of the skirt receiving grooves 460, 462 of the upper clamp member 448, the skirt member is secured to the clamp assembly by means of the head of the fastener member 38 (i.e., the head of the fastener member 38 presses down on the top surface of the skirt member). Also, like the top clamp portion 434 of the upper clamp member 432 described above, top clamp portion 450 of the upper clamp member 448 forms a pair of oppositely disposed flange portions for engaging the top surfaces of one or more photovoltaic modules. In addition, like the top clamp portion 434 of the upper clamp member 432, one of the flange portions of the top clamp portion 450 of the upper clamp member 448 comprises integrated grounding means, which are configured to provide integrated grounding between adjacent photovoltaic modules. More particularly, in the illustrative embodiment, with reference to FIGS. 111A and 111B, the integrated grounding means of the upper clamp member 448 comprises two spaced-apart grounding protrusions or teeth 458. The downwardly inclined, pointed grounding protrusions or teeth 458 are designed to pierce the anodized layer of the photovoltaic module to provide integrated grounding between the photovoltaic modules.

Figure 115A:
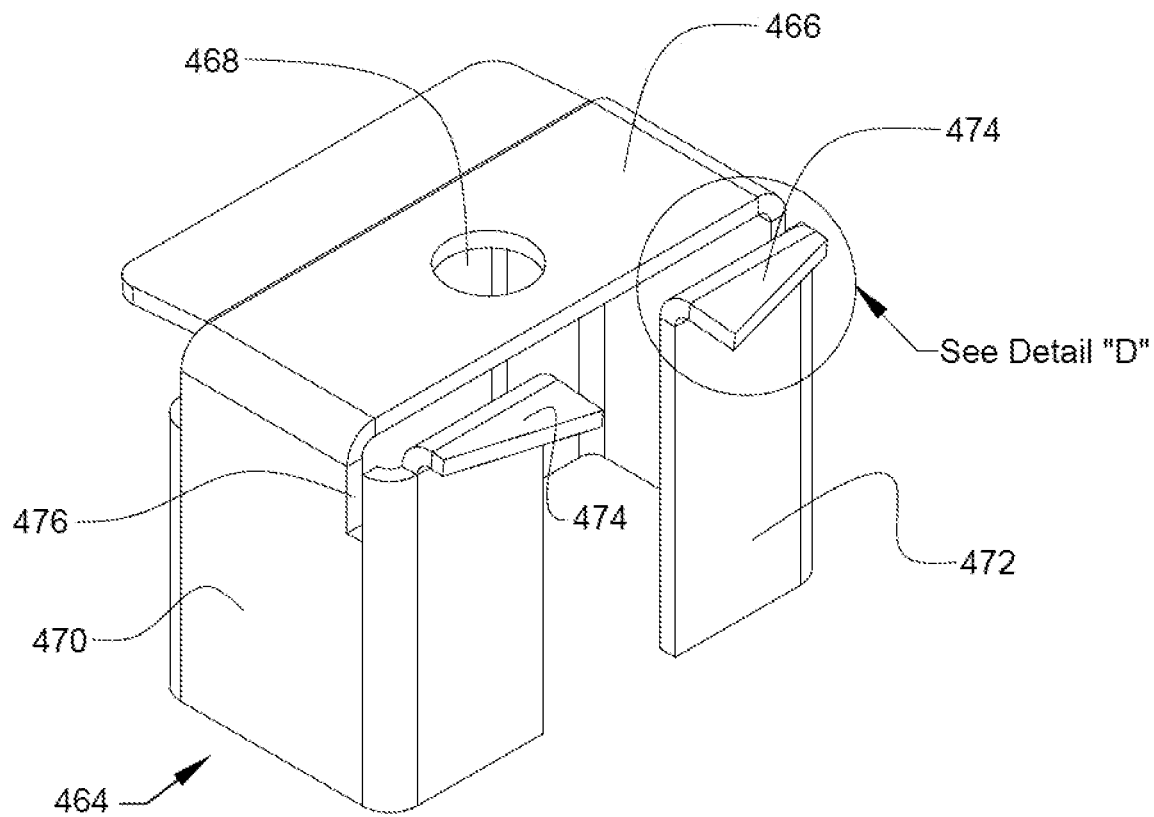
FIG. 115A is a perspective view of yet another upper clamp member used in conjunction with the clamp assemblies described herein, according to yet another embodiment of the invention.
Figure 115B:
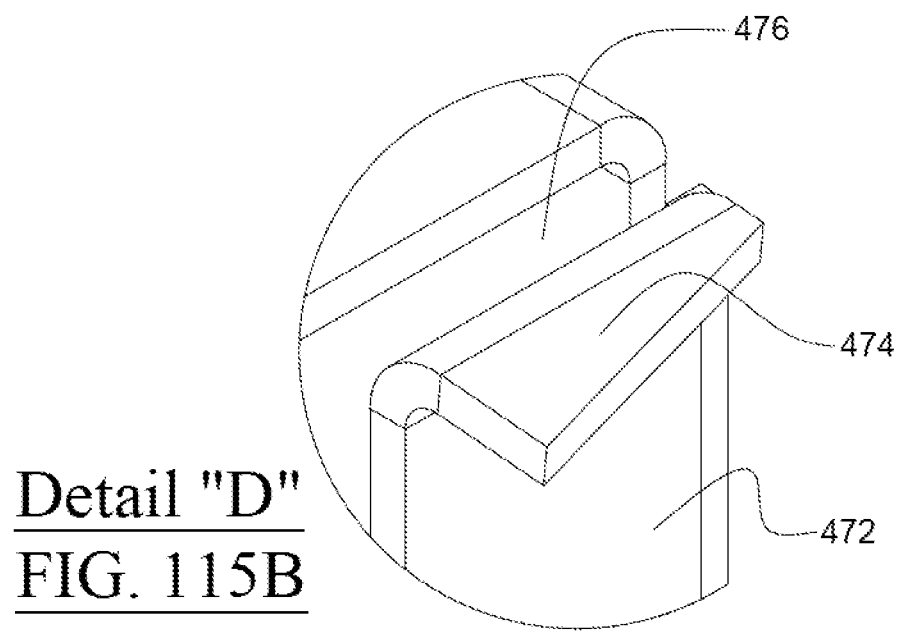
FIG. 115B is an enlarged perspective view of one of the grounding protrusions and the skirt receiving groove of the upper clamp member illustrated in the perspective view of FIG. 115A (Detail "D")
Figure 116:
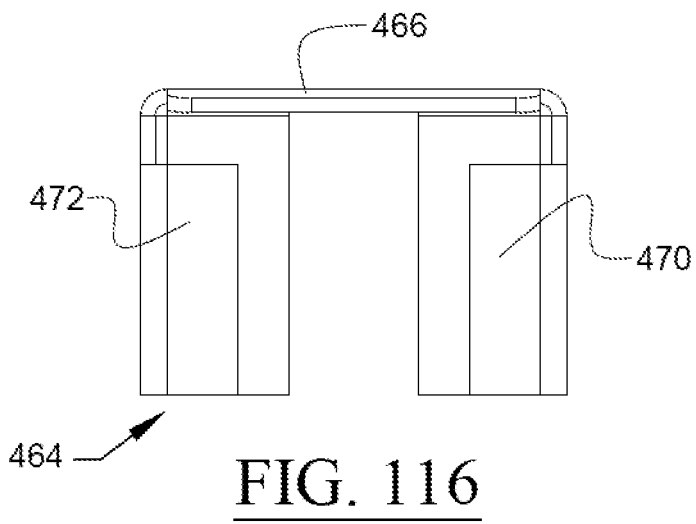
Figure 117:
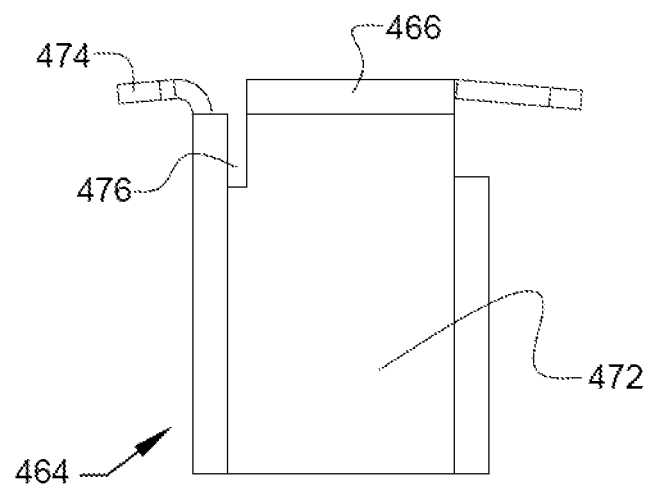
Figure 118:
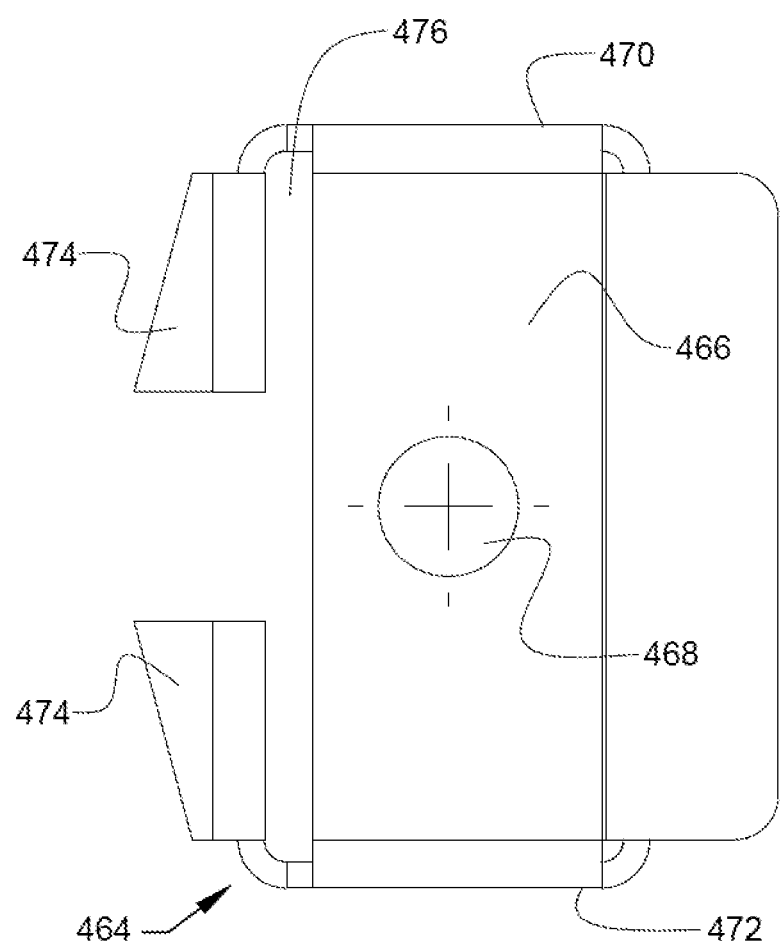

Next, with reference to FIGS. 115A-118, it can be seen that the upper clamp member 464 is similar in many respects to the upper clamp member 432 described above. Referring initially to the perspective view of FIG. 115A, it can be seen that, like the upper clamp member 432, the upper clamp member 464 generally includes a pair of spaced-apart downwardly extending portions 470, 472 that are attached to a top clamp portion 466. In the illustrative embodiment, each of the downwardly extending portions 470, 472 has a generally U-shaped cross-section, while the top clamp portion 466 comprises a middle plate portion with oppositely disposed flanged portions. Referring again to FIGS. 115A and 118, it can be seen that the top clamp portion 466 of the upper clamp member 464 further comprises a fastener aperture 468 for receiving the threaded fastener member 38. Also, as best shown in FIGS. 115A and 117, the top clamp portion 466 of the upper clamp member 464 forms a pair of oppositely disposed flange portions for engaging the top surfaces of one or more photovoltaic modules. The first oppositely disposed flange portions of the top clamp portion 466 are shorter than the second oppositely disposed flange portion. Like the preceding embodiments described above, the upper clamp member 464 enables the one or more photovoltaic modules to be pivotably installed into the first side of the clamp assembly (e.g., into the side of clamp assembly with the short flange portion). In addition, as best illustrated in FIGS. 115A and 115B, the shorter flange portions of the top clamp portion 466 of the upper clamp member 464 comprises integrated grounding means, which are configured to provide integrated grounding between adjacent photovoltaic modules. More particularly, in the illustrative embodiment, with reference to FIGS. 115A and 115B, the integrated grounding means of the upper clamp member 464 comprises two spaced-apart grounding protrusions or teeth 474. The downwardly inclined, pointed grounding protrusions or teeth 474 are designed to pierce the anodized layer of the photovoltaic module to provide integrated grounding between the photovoltaic modules. Similar to the top clamp portion 434 of the upper clamp member 432, the top clamp portion 466 of the upper clamp member 464 comprises a skirt receiving slot 476 that is configured to receive a downwardly extending hemmed upper edge portion of a skirt member.

Figure 119A:
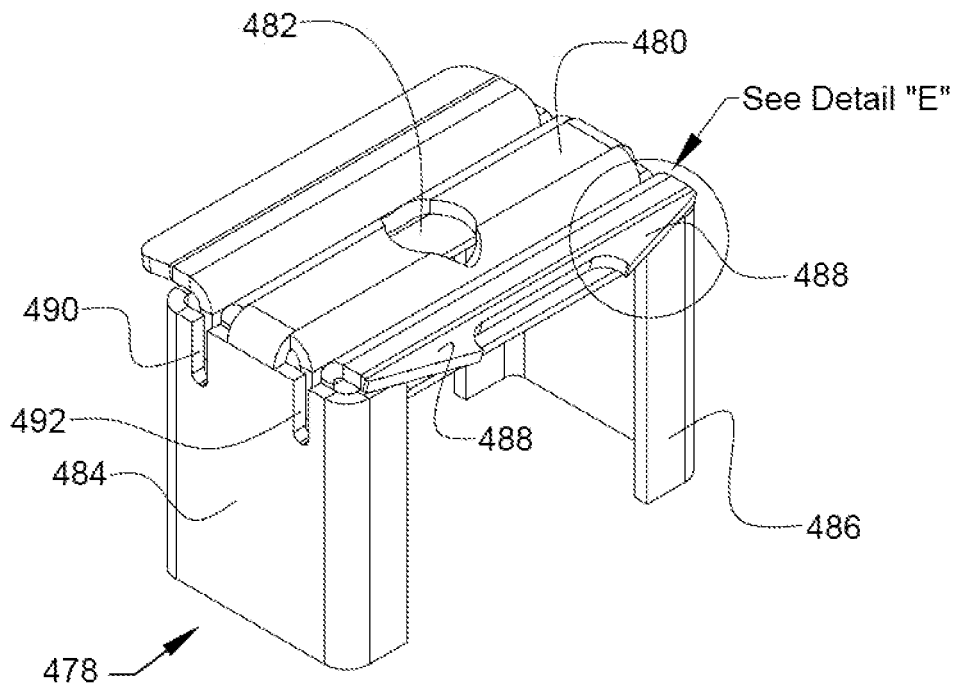
Figure 119B:
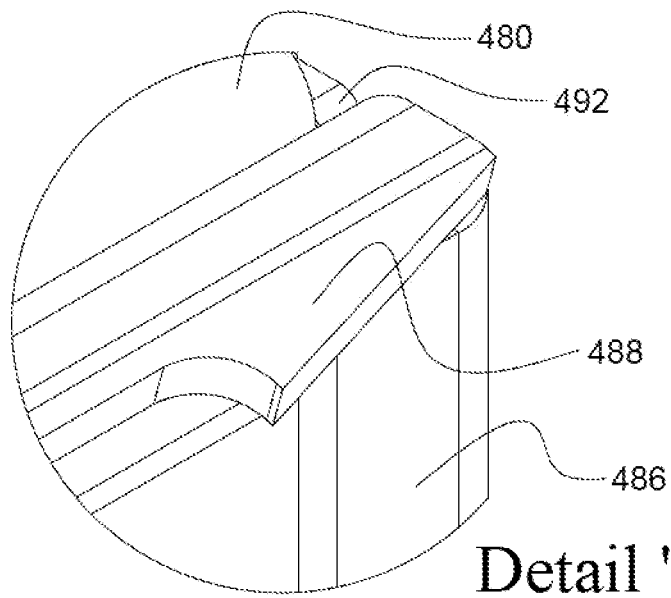
Figure 120:
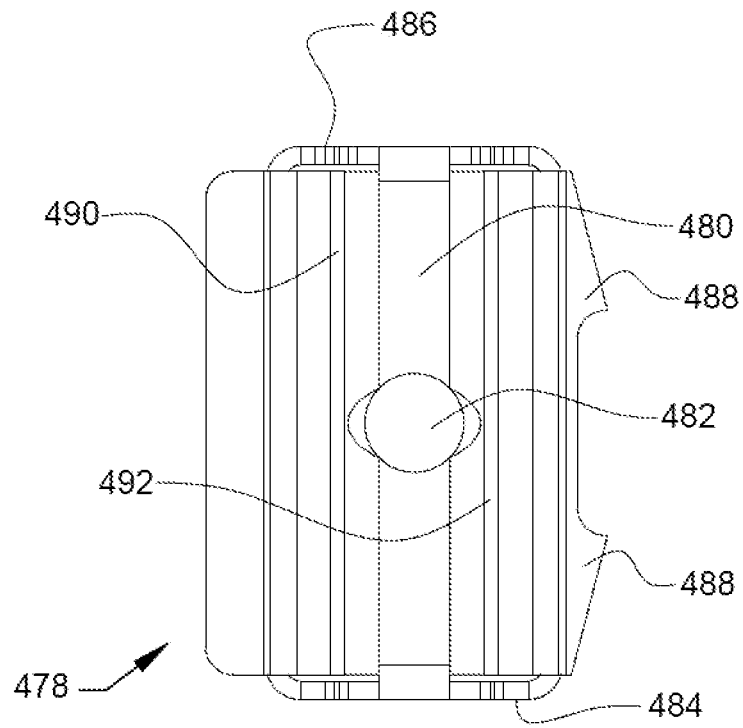
Figure 121:
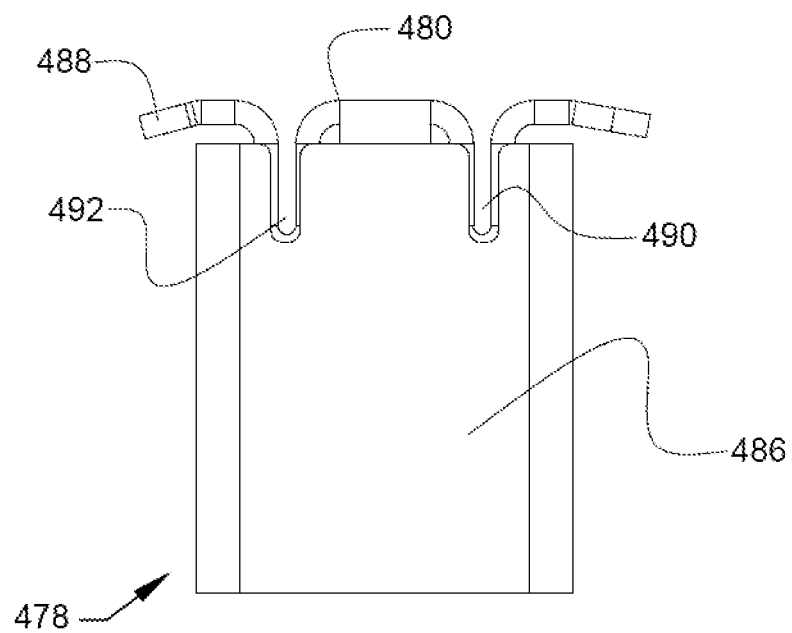
Figure 122:
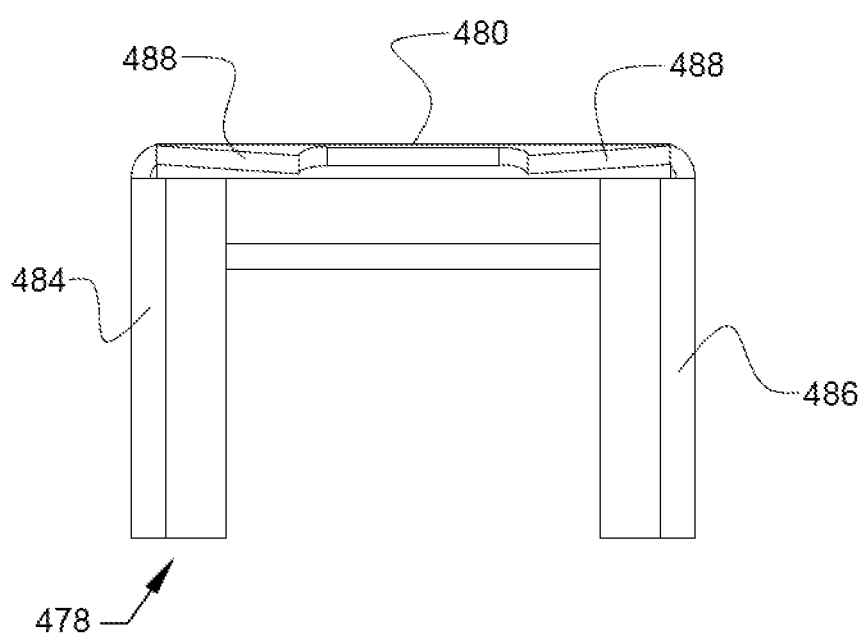

Now, referring to FIGS. 119A-122, it can be seen that the upper clamp member 478 has similar features to the upper clamp members 432, 448 described above. Referring initially to the perspective view of FIG. 119A, it can be seen that, like the upper clamp member 432, the upper clamp member 478 generally includes a pair of spaced-apart downwardly extending portions 484, 486 that are attached to a top clamp portion 480. In the illustrative embodiment, each of the downwardly extending portions 484, 486 has a generally U-shaped cross-section, while the top clamp portion 480 comprises a middle portion with oppositely disposed flanged portions. Referring again to FIGS. 119A and 120, it can be seen that the top clamp portion 480 of the upper clamp member 478 further comprises a fastener aperture 482 for receiving the threaded fastener member 38. Also, as best shown in FIGS. 119A and 121, the top clamp portion 480 of the upper clamp member 478 forms a pair of oppositely disposed flange portions for engaging the top surfaces of one or more photovoltaic modules. Like the preceding embodiments described above, the upper clamp member 478 enables the one or more photovoltaic modules to be pivotably installed into the first side of the clamp assembly. Also, similar to the upper clamp member 448, it can be seen that the top clamp portion 480 further comprises first and second hemmed skirt channel portions formed therein (see FIGS. 119A and 121). Referring again to FIGS. 119A and 121, it can be seen that each skirt channel portion forms a respective skirt receiving groove 490, 492. Each of the skirt receiving grooves 490, 492 is configured to receive a downwardly extending hemmed upper edge portion of a skirt member. That is, like the upper clamp member 448 described above, the upper clamp member 478 may be rotated 180 degrees, and still be capable of receiving a skirt member. As described above for the upper clamp members 432, 448, once the hemmed upper edge portion of a skirt member is inserted into one of the skirt receiving grooves 490, 492 of the upper clamp member 478, the skirt member is secured to the clamp assembly by means of the head of the fastener member 38 (i.e., the head of the fastener member 38 presses down on the top surface of the skirt member). Also, like the top clamp portion 450 of the upper clamp member 448 described above, top clamp portion 480 of the upper clamp member 478 forms a pair of oppositely disposed flange portions for engaging the top surfaces of one or more photovoltaic modules. In addition, like the top clamp portion 450 of the upper clamp member 448, one of the flange portions of the top clamp portion 480 of the upper clamp member 478 comprises integrated grounding means, which are configured to provide integrated grounding between adjacent photovoltaic modules. More particularly, in the illustrative embodiment, with reference to FIGS. 119A and 119B, the integrated grounding means of the upper clamp member 478 comprises two spaced-apart grounding protrusions or teeth 488. The downwardly inclined, pointed grounding protrusions or teeth 488 are designed to pierce the anodized layer of the photovoltaic module to provide integrated grounding between the photovoltaic modules.

Turning to FIGS. 127-131, it can be seen that, like the coupling assemblies 130, 130' described above, the illustrative embodiment of the coupling assembly 500 in FIGS. 127-131 generally includes an upper coupling member 518 secured to a lower coupling member 502. As best shown in the assembled view of FIG. 130, the upper coupling member 518 and the lower coupling member 502 are connected to one another by means of one or more threaded fastener members 168 (e.g., two (2) threaded fastener members 168). In the illustrated embodiment, each threaded fastener member 168 is in the form of a bolt with a head portion having a serrated flange (e.g., refer to FIG. 129).

Now, with reference to FIGS. 136-139B, the structure of the upper coupling member 518 will be described. Initially, as best shown in the perspective view of FIG. 139A, the upper coupling member 518 generally includes a top coupling portion 520 with first and second hemmed skirt channel portions 524, 526 formed therein. Referring to FIGS. 136 and 139A, it can be seen that the top coupling portion 520 of the upper coupling member 518 further comprises a plurality of fastener apertures 522 for receiving respective threaded fastener members 168 (e.g., two spaced-apart fastener apertures 522). In FIG. 137, it can be seen that each skirt channel portion 524, 526 forms a respective skirt receiving groove 530, 532. Each of the skirt receiving grooves 530, 532 is configured to receive a downwardly extending hemmed upper edge portion of a skirt member. That is, the upper coupling member 518 may be rotated 180 degrees, and still be capable of receiving a skirt member. Similar to that described above for the upper clamp members, once the hemmed upper edge portion 538 of a skirt member 534 is inserted into one of the skirt receiving grooves 530, 532 of the upper coupling member 518, the skirt member 534 is secured to the coupling assembly 500 by means of the heads of the fastener members 168 (i.e., the head of the fastener member 168 presses down on the top surface of the skirt member 534—see FIG. 170). Also, like the top clamp portions of the upper clamp members described above, top coupling portion 520 of the upper coupling member 518 forms a pair of oppositely disposed flange portions for engaging the top surfaces of one or more photovoltaic modules. In addition, like the top clamp portions of the upper clamp members, one of the flange portions of the top coupling portion 520 of the upper coupling member 518 comprises integrated grounding means, which are configured to provide integrated grounding between adjacent photovoltaic modules. More particularly, in the illustrative embodiment, with reference to FIGS. 139A and 139B, the integrated grounding means of the upper coupling member 518 comprises a plurality of grounding protrusions or teeth 528 (e.g., two pairs of spaced-apart grounding teeth 528). The downwardly inclined, pointed grounding protrusions or teeth 528 are designed to pierce the anodized layer of the photovoltaic module to provide integrated grounding between the photovoltaic modules.

Next, turning to FIGS. 132-135, the structure of the lower coupling member 502 will be explained. Similar to that described above for the lower clamp member 494, it can be seen that the lower coupling member 502 generally includes an upstanding middle portion 504 with first and second ledge portions 512, 514 extending outwardly from the upstanding middle portion 504 (refer to FIGS. 132 and 135). In FIGS. 132 and 133, it can be seen that the upstanding middle portion 504 of the lower coupling member 502 comprises a plurality of threaded fastener apertures 506 disposed centrally therein (e.g., two spaced-apart fastener apertures 506). Each threaded fastener aperture 506 threadingly engages a respective shaft of a respective threaded fastener member 168. Because each of the apertures 506 is internally threaded, the coupling assembly 500 does not require any nuts for the securement of the threaded fastener members 168 (i.e., the threaded fastener apertures 506 operate as built-in nuts). Each threaded fastener aperture 506 may comprise a plurality of extruded threads formed therein for threadingly engaging a plurality of external threads of the threaded fastener member 168 (i.e., bolt 168). To further stabilize the fastener members 168, fastener holding protrusions 508 are formed in the sides of the upstanding middle portion 504 (see FIGS. 132, 134, and 135). For example, fastener holding protrusions 508 may be in the form of inwardly punched tabs that hold the fastener members 168 in a vertical position. As shown in FIGS. 132 and 135, the upstanding middle portion 504 of the lower coupling member 502 comprises a top wall portion with the threaded apertures 506 that is connected to first and second opposed vertical wall portions. Each of the first and second ledge portions 512, 514 of the lower coupling member 502 is configured to accommodate a photovoltaic module frame member resting thereon. As described above for the preceding embodiments of the lower coupling members 150, 150', 150", the second opposed ledge 514 of the lower coupling member 502 is bent slightly upward, or is tapered slightly upward at an acute angle, so as to be capable of performing the same functionality explained above for the lower coupling members 150, 150', 150" (i.e., the ability for an installer to pivot the north row of PV modules into place).

Referring again to FIGS. 132 and 133, it can seen that, in the illustrative embodiment, the lower coupling member 502 further comprises a pair of drainage slots 510 formed therethrough for draining water from the one or more photovoltaic modules engaged with the coupling assembly 500. In addition, in the illustrative embodiment, the lower coupling member 502 additionally comprises a plurality of diagonally-oriented water drainage channels 516 formed therein for draining water from one or more drainage weep holes of the one or more photovoltaic modules engaged with the coupling assembly 500. Advantageously, the drainage slots 510 and water drainage channels 516 allow the draining of water from one or more photovoltaic modules that incorporate a module drainage feature.

Advantageously, similar to that described above for the clamp assemblies with upper and lower clamp members 402, 414 and 432, 494, the panel receiving gap defined by the upper and lower coupling members 502, 518 of the coupling assembly 500 is continuously adjustable by a user within the range between approximately 32 millimeters and approximately 50 millimeters so as to accommodate any photovoltaic module thickness within that range. That is, the coupling assembly 500 is capable of accommodating any photovoltaic module thickness between 32 millimeters and 50 millimeters, such as but not limited to, photovoltaic module thicknesses of 32 millimeters, 35 millimeters, 40 millimeters, 45 millimeters, and 46 millimeters. In the illustrative embodiment, the panel receiving gap defined by the upper and lower coupling members 502, 518 of the coupling assembly 500 is not limited to incremental adjustment, rather it is continuously adjustable between 32 millimeters and 50 millimeters. In addition, the pair of ledges 512, 514 of the lower coupling member 502 and the pair of flange portions of the upper coupling member 518 allow the coupling assembly 500 to be rotated 180 degrees relative to the one or more photovoltaic modules so that the coupling assembly 500 is capable of being interchangeably used on north and south rows of a photovoltaic array. Further, the coupling assembly 500 with the upper and lower coupling members 502, 518 is capable of being interchangeably used with or without a skirt member of a photovoltaic array (i.e., the same coupling devices can be used for both the middle rows of the array and the north and south rows of the array). The south row of the array with the skirt member does not require a different type of coupling device for the skirt member. Also, advantageously, the coupling assembly 500 allows for the use of a universal skirt (i.e., it is unnecessary to use different skirts for different photovoltaic module heights).

With reference to FIGS. 140A-146, another embodiment of a skirt member of the photovoltaic mounting system will be described. Similar to that described above for the skirt member 174, the skirt member 534 of FIGS. 140A-146 is configured to be located on the southernmost edge of the array of PV modules. The skirt member 534 is supported by spaced-apart support surface attachment devices 100". In particular, as shown in FIGS. 140A and 140B, the hemmed upper edge portion 538 of the skirt member 534 engages with the skirt receiving groove 444 of the upper clamp member 432. As described above, the skirt member 534 is secured to the clamp assembly by means of the head of the fastener member 38 (i.e., the head of the fastener member 38 presses down on the top surface of the skirt member 534—see FIG. 140B). The perspective view of FIG. 140A illustrates the manner in which the skirt member 534 engages with both the support surface attachment device 100" and the coupling device 500. In the detail view of FIG. 141A, it can be seen that the hemmed upper edge portion 538 of the skirt member 534 engages with the skirt receiving groove 532 of the upper coupling member 518 that is formed by the skirt channel portion 526.

Now, referring to FIGS. 143-146, the structure of the skirt member 534 will described in more detail. As best shown in the end view of FIG. 145B, the skirt member 534 comprises a body portion 536 with the hemmed upper edge portion 538 and a curled lower edge portion 540. The curled lower edge portion 540 of the skirt member 534 is configured to receive a pin member therein for facilitating an alignment of multiple skirt sections in a photovoltaic array (i.e., the pin can be used to connect the lower edge portions of adjacent skirt sections to one another). The hemmed upper edge portion 538 of the skirt member 534 enhances the strength of the skirt member 534 and provides a tighter fit in the skirt receiving grooves 444, 530, 532 of the clamp and coupling assemblies. Advantageously, in the illustrative embodiment, the engagement between the skirt member 534 and the clamp assembly of the support surface attachment device 100", and the engagement between the skirt member 534 and the coupling assembly 500, is configured to allow the clamp and coupling assemblies to accommodate any photovoltaic module thickness within a range between approximately 32 millimeters and approximately 50 millimeters. That is, the clamp and coupling assemblies are capable of accommodating any photovoltaic module thickness between 32 millimeters and 50 millimeters, such as but not limited to, photovoltaic module thicknesses of 32 millimeters, 35 millimeters, millimeters, 45 millimeters, and 46 millimeters.

Alternative embodiments of coupling members are illustrated in FIGS. 147-150. Initially, as shown in FIG. 147, two adjacent photovoltaic modules 374 are shown coupled to one another by means of an upper coupling member 542. The upper coupling member 542 in FIG. 147 comprises a pair of punched down tabs 544 that are used to support the photovoltaic modules 374. The punched down tabs 544 also prevent the closeout of the coupling member 542. The lower coupling member 546, which is illustrated in FIGS. 148-150, is configured to be used on the southmost row of the photovoltaic array only (i.e., on the row of the photovoltaic array with the skirt). Referring to FIGS. 148 and 149, it can be seen that the lower coupling member 546 comprises a lower plate-like body portion 548 and a curled upper body portion 550 for engaging one or more skirt members. Also, as shown in FIG. 148, the lower plate-like body portion 548 of the lower coupling member 546 comprises a pair of spaced-apart fastener apertures 552 disposed therein for receiving respective fasteners 264 (see FIG. 150). In FIG. 150, two skirt sections 554 are illustrated being coupled together using the coupling member 546.

Alternative embodiments of the clamp members are depicted in FIGS. 151-156. Initially, with reference to FIG. 151, a clamp assembly that includes the upper clamp member 402 described above and the lower clamp member 558 is being used to secure a skirt member 556 and a photovoltaic module 372 in place. Turning to FIGS. 152 and 153, it can be seen that the lower clamp member 558 comprises a base portion 568 with upturned side edges, and first and second vertical walls 560, 562 extending upwardly from the base portion 568. The base portion 568 of the lower clamp member 558 further comprises a fastener aperture 570 for receiving a fastener member (e.g., bolt 264 depicted in FIG. 151). In addition, as shown in FIGS. 152 and 153, the lower clamp member 558 comprises a pair of spaced-apart skirt receiving notches 564, 566 for receiving a protruding portion of a skirt member 556 (see FIG. 151). Next, referring to FIGS. 154 and 155, a lower clamp member 572 is illustrated that comprises a lower plate-like body portion 574 and a curled upper body portion 576 for engaging one or more skirt members. Also, as shown in FIG. 154, the lower plate-like body portion 574 of the lower clamp member 572 comprises a fastener aperture 578 disposed therein for receiving a fastener (e.g., bolt 264 depicted in FIG. 156). In FIG. 156, a skirt member 580 is illustrated being secured to a support surface attachment device by means of the lower clamp member 572. As shown in FIG. 156, the support surface attachment device includes a glider member 60" and a base member 90".

Now, with reference to FIGS. 157-159, 162-167, and 169, several embodiments of spacer members that are used to hold open the panel receiving gaps of the clamp assembly and the coupling assembly will be described. It is to be understood that spacer members are only necessary in the southmost row of the photovoltaic array to hold open the clamp and coupling assemblies because the photovoltaic modules acts as the spacers in the other rows of the photovoltaic array. Initially, referring to FIG. 157, it can be seen that plate-like spacer member 590 may be inserted between the lower clamp member 414' and the skirt member 582 in order to hold open the clamp assembly and support the skirt member 582 (e.g., during the setting of the sourthmost row in a photovoltaic array so as to prevent the north side of the clamp from closing out). As shown in FIG. 158, the spacer member 590 comprises a plate-like body portion 592 with a rounded upper corner 594 to accommodate the channel portion of the skirt member 582 that defines the groove 586. In FIG. 159, it can be seen that the skirt member 582 comprises a body portion 584 with a hemmed upper edge portion 588 and a groove 586 for receiving the protruding teeth of the upper clamp member 402 (see FIG. 157). As shown in FIG. 157, the hemmed upper edge portion 588 of the skirt member 582 fits within a recess of the upper clamp member 402 so that, together with the engagement between the groove 586 and the protruding teeth of the upper clamp member 402, the skirt member 582 is secured in place on the clamp assembly.

Another embodiment of a spacer member will be described with reference to FIGS. 162 and 163. As shown in these figures, the spacer member 602 has a generally C-shaped body portion 604 with oppositely disposed pronged end portions 606. The spacer member 602 of FIGS. 162 and 163 is designed to clip onto the lower clamp member of the clamp assembly (i.e., the pronged end portions 606 of the spacer member 602 clips onto the lower clamp member). Yet another embodiment of a spacer member is depicted in FIG. 169. As shown in FIG. 169, the spacer member 608 has a semi-circular body portion with a centrally disposed fastener aperture 610 for accommodating a shaft of a fastener member. As shown in FIGS. 164-167, the spacer member 608 is designed to snap into place on the shaft of the clamp fastener member 38 and on the shafts of the coupling fastener members 168 so as to hold the clamp and the coupling assemblies open.

An illustrative embodiment of yet another clamp assembly is seen generally at 782 in FIGS. 171 and 172. In one or more embodiments, the clamp assembly 782 is provided as part of a support surface attachment device that is used to attach one or more photovoltaic modules to a support surface (e.g., a sloped building roof). In addition to the clamp assembly 782 illustrated in FIGS. 171 and 172, the support surface attachment device of the illustrative embodiment additionally comprises a base assembly that includes a base member, a flashing member, and a threaded fastener member. The base assembly of the support surface attachment device is described in detail above in the preceding embodiments (e.g., base assemblies 128, 128' described above).

Initially, with reference to FIGS. 171 and 172, it can be seen that the illustrative embodiment of the clamp assembly 782 generally includes an upper clamp member 710, a lower clamp member 720, and a glider member 760. As best shown in the assembled view of FIG. 171, the upper clamp member 710, lower clamp member 720, and glider member 760 are connected to one another by means of a threaded fastener member 738 and a strut nut 772. In the illustrated embodiment, the threaded fastener member 738 is in the form of a bolt with a head portion having a serrated flange 740 (refer to FIG. 173). The serrations in the lower surface of the bolt head flange of the threaded fastener member 738 are configured to interferingly engage with the top surface of the upper clamp member 710 (i.e., "dig into" the top surface of the upper clamp member 710). The external threads on the shaft of the threaded fastener member 738 are configured to threadingly engage with the internal threads 774 in the middle of the strut nut 772 (see FIG. 183). Also, as shown in FIG. 173, the top surface of the head portion of the threaded fastener member 738 is provided with a visual indicator line 741 formed therein for indicating the orientation of the strut nut 772 that is threadingly engaged with the threaded fastener member 738. As shown in FIG. 183, the strut nut 772 has spaced-apart elongate grooves 776 disposed in the top surface thereof that are each configured to receive a respective downturned lip of a base member (e.g., the downturned lip 108 of the base members 90, 90' described above). In addition, as best shown in the top perspective view of FIG. 183, it can be seen that each of the elongate grooves 776 is provided with two (2) spaced-apart protrusions or teeth 777 disposed therein. The spaced-apart teeth 777 in each groove 776 are configured to interferingly engage with a bottom surface of one of the downturned lips of the base member (i.e., "dig into" the bottom surface of one of the downturned lips of the base member). Also, referring again to FIG. 183, it can be seen that the strut nut 772 comprises curved sidewall portions 778 arranged diagonally opposite from one another. The curved sidewall portions 778 allow the strut nut 772 to rotate clockwise into position until the flat sidewall portions contact the inside walls of the base member.

Referring again to the illustrative embodiment of FIG. 171, it can be seen that the upper clamp member 710 and the lower clamp member 720 of clamp assembly 782 cooperate to clamp one or more photovoltaic modules in place on a support surface. That is, each photovoltaic module is clamped in place either between the first opposed flange portion 714a of the upper clamp member 710 and the second outwardly extending ledge 728 of the lower clamp member 720 or between the second opposed flange portion 714b of the upper clamp member 710 and the first outwardly extending ledge 726 of the lower clamp member 720, depending on which side of the clamp assembly 782 the photovoltaic module is disposed.

Now, with reference to FIGS. 174 and 175, the structure of the upper clamp member 710 will be described. As shown in these figures, the upper clamp member 710 generally includes a base portion 712 that is attached to the bottom surface of a flange portion 714a, 714b at approximately a 90 degree angle. In this figure, it can be seen that one side surface of base portion 712 comprises a plurality of elongate protrusions or teeth 718 that are each spaced apart from one another by respective gaps 719. As will be described hereinafter, a predetermined one of the plurality of elongate protrusions or teeth 718 matingly engage with a predetermined one of elongate protrusions or teeth 730 disposed on the first opposed wall portion 724a of the upstanding middle portion 722 of the lower clamp member 720. Referring again to FIG. 175, it can be seen that the flange portion 714a, 714b of the upper clamp member 710 further comprises a fastener aperture 715 for receiving the threaded fastener member 738 and a downwardly protruding member 717 that forms a back surface against which a photovoltaic module rests when disposed in the clamp assembly 782. Also, as shown in FIGS. 174 and 175, each of the flange portions 714a, 714b includes an elongate groove 716 disposed in the bottom surface thereof. Each of the elongate grooves 716 is configured to receive first and second tab portions 747, 748 of a respective bonding clip 742 (see FIG. 176) that provides integrated grounding for the photovoltaic module installation. The first and second tab portions 747, 748 of each bonding clip 742 are received within the elongate groove 716 in a press-fit or interference-fit type mounting arrangement.

Referring again to FIGS. 174 and 175, it can be seen that the flange portion 714b of the upper clamp member 710 further comprises an angled lower surface 713. As described hereinafter, the angled lower surface 713 of the flange portion 714b is configured to interact with the spring member 750 as so to displace the vertical base portion 712 and the plurality of first teeth 718 outwardly away from the plurality of second teeth 730 on the lower clamp member 720 when the fastener member 738 is being tightened until the desired module thickness setting pulls the upper clamp member 710 into the lower clamp member 720. Also, as shown in FIGS. 174 and 175, the downwardly protruding member 717 of the upper clamp member 710 comprises a groove 711 formed in one side thereof for capturing an edge of the bonding clip 742, and holding it in place (refer to FIGS. 191 and 192).

The bonding or grounding clip 742, which provides integrated grounding for the photovoltaic modules, is illustrated in FIG. 176. The bonding clip 742 generally comprises a plate-like body portion 743 with an upturned flange 745 attached to the one side of the plate-like body portion 743. As shown in FIG. 176, the upturned flange 745 of the bonding clip 742 comprises a pair of spaced-apart bent over tab portions 747, 748, wherein each tab 747, 748 is disposed at an opposite end of the upturned flange 745. In FIG. 176, it can be seen that the plate-like body portion 743 includes a plurality of upwardly protruding annular members 744 and a plurality of downwardly protruding annular members 746. In particular, in the illustrative embodiment, the upwardly and downwardly protruding annular members 744, 746 are arranged in a staggered, alternating sequence (i.e., a first upwardly protruding annular member 744 followed by an offset downwardly protruding annular member 746, then followed by an offset second downwardly protruding annular member 746, and finally, an offset second upwardly protruding annular member 744). The upwardly protruding members 744 are designed to pierce the metallic bottom surface of the flange portion 714a, 714b of the upper clamp member 710, while the downwardly protruding annular members 746 are designed to pierce the anodized layer of the photovoltaic module to provide integrated grounding between the photovoltaic modules. To facilitate integrated grounding between the photovoltaic modules, all of the components of the clamp assembly 782 of the support surface attachment device, and the coupling device 788 described hereinafter, may be formed from metal.

Next, turning to FIGS. 178 and 179, the structure of the lower clamp member 720 will be explained. With reference to these figures, it can be seen that the lower clamp member 720 generally includes an upstanding middle portion 722 with first and second ledge portions 726, 728 extending outwardly from the upstanding middle portion 722. In FIG. 179, it can be seen that the upstanding middle portion 722 of the lower clamp member 720 comprises an upper fastener aperture 725 disposed in a top wall portion 723 thereof. The upstanding middle portion 722 of the lower clamp member 720 similarly comprises a lower fastener aperture disposed in a bottom wall portion thereof. Each of these apertures receives the shaft of the threaded fastener member 738. As shown in FIGS. 178 and 179, the bottom wall portion and the top wall portion 723 of the upstanding middle portion 722 of the lower clamp member 720 are connected to one another by first and second opposed wall portions 724a, 724b. Also, as illustrated in FIGS. 178 and 179, the first opposed wall portion 724a comprises a plurality of elongate protrusions or teeth 730 that are each spaced apart from one another by respective gaps 732. As explained above, a predetermined one of the elongate teeth 730 of the first opposed wall portion 724a engages with a predetermined one of the elongate teeth 718 of the base portion 712 of the upper clamp member 710. Referring again to FIG. 179, it can be seen that, unlike the first opposed wall portion 724a, the second opposed wall portion 724b contains no teeth thereon. Between the rows of the photovoltaic array, each of the first and second ledge portions 726, 728 of the lower clamp member 720 is configured to accommodate a photovoltaic module frame member resting thereon. As described herein, on the south edge of the photovoltaic array, the first ledge portion 726 of the lower clamp member 720 is configured to accommodate a skirt member 826 and a skirt spacer member, while the second ledge portion 728 of the lower clamp member 720 is configured to accommodate a photovoltaic module frame member resting thereon.

With reference to FIGS. 178 and 179, it can be seen that the second opposed ledge 728 of the lower clamp member 720 is bent slightly upward or is tapered slightly upward at an acute angle. In the installed state, the upwardly tapered ledge 728 of the lower clamp member 720 extends uphill and slightly up and away from the building roof so as to act as a leaf spring that takes up the difference in gap between the uphill clamp opening and the photovoltaic (PV) module thickness, thereby preventing the PV module from rattling and allowing it to be secured into place. In some embodiments, this also creates enough pressure on the upper clamp lip (i.e., first opposed flange portion 714a of upper clamp member 710) to enable a bonding point to function. Advantageously, because the second opposed ledge 728 of the lower clamp member 720 is provided with a slight upward taper (i.e., bowed upwardly), the lower clamp member 720 applies a compressive force against the PV module when it is installed therein. During the installation of each PV module, the PV module is initially disposed at an upward acute angle relative to its one or more southern clamp assemblies 782. Then, each PV module is rotated down until it is generally parallel with the roof surface. As each PV module is rotated downwardly towards the roof surface, the edge portion of the uphill PV module presses down on the upwardly tapered ledge(s) 728 of the lower clamp member(s) 720 so as to apply a downward force on the upwardly tapered ledge 728, thereby ensuring that the PV module is securely engaged with the lower clamp member(s) 720 and the PV module is tightly held in place. In response to the downward force applied by the PV module, the upwardly tapered ledge 728 elastically deforms or yields in a spring-like manner. As a result of the leaf spring design of the upwardly tapered ledge 728, the installer is not required to reach down over the PV module to tighten the fasteners on its one or more southern clamp assemblies 782. An attempt by the installer to tighten the fasteners on the one or more southern clamp assemblies 782 would not be safe, ergonomic, or efficient. The second ledge portion 808 of the lower coupling member 800 described hereinafter may be bent slightly upward or tapered slightly upward at an acute angle in the same manner as that described above for the upwardly tapered ledge 728 of the lower clamp member 720 so that the coupling device 788 is provided with the same functionality that is described above for the clamp assembly 782. As shown in FIGS. 178 and 179, the upwardly tapered ledge 728 comprises an end portion of reduced thickness so as to accommodate a wire retaining clip fastened thereto.

Referring again to FIGS. 178 and 179, it can be seen that the upwardly tapered ledge 728 of the lower clamp member 720 further comprises a water drainage trough 734 formed therein for draining water from the one or more photovoltaic modules (i.e., the water drainage trough 734 provides water drainage on the uphill side of the clamp assembly 782 so that the clamp does not impede module drain holes, and the water is allowed to drain from module flanges). Also, as shown in FIGS. 178 and 179, the shorter ledge 726 of the lower clamp member 720 comprises an elongate groove 735 formed therein for engaging with a mating protrusion 842, 850, 858 of a skirt spacer member 836, 844, 852 (see FIGS. 195-200). In the illustrative embodiment, the groove 735 is in the form of a dovetail groove to retain the skirt spacer member 836, 844, 852, and the dovetail protrusion 842, 850, 858 of the skirt spacer member 836, 844, 852 slides into the groove 735 from the side of the lower clamp member 720. Referring again to FIGS. 178 and 179, it can be seen that the shorter ledge 726 of the lower clamp member 720 further comprises a plurality of serrations 736 for securely gripping the one or more photovoltaic modules and for providing airflow and water drainage on the downhill side of the clamp assembly 782. In addition, as shown in the perspective view of FIG. 179, the shorter ledge 726 of the lower clamp member 720 further comprises a retaining element 737 formed thereon for retaining the skirt spacer member 836, 844, 852 in place on the ledge 726 of the lower clamp member 720 after the mating protrusion 842, 850, 858 of the skirt spacer member 836, 844, 852 is engaged with the groove 735 in the ledge 726 (i.e., the retaining element 737 provides resistance once the skirt spacer member 836, 844, 852 slides into the dovetail groove 735 to retain it).

Further, as also shown in FIGS. 178 and 179, the lower clamp member 720 of the clamp assembly 782 comprises a plurality of ridges 727 disposed on a bottom surface thereof. The ridges 727 are configured to increase a frictional engagement between the lower clamp member 720 and the glider member 760 so as prevent the upper and lower clamp members 710, 720 of the clamp assembly 782 from rotating relative to the glider member 760 when the threaded fastener member 738 is tightened by an installer (i.e., the ridges 727 increase the resistance to rotation of the clamp assembly on the glider member 760).

In the illustrative embodiment described herein, the clamp assembly 782 relies on a single tooth design to set the clamp height and allow for photovoltaic module insertion from the uphill side (i.e., north side). Advantageously, the clamp assembly 782 does not require additional tightening after the uphill photovoltaic module is inserted. The alternating tooth interaction 718, 730 between the upper clamp member 710 and the lower clamp member 720 provides settings for the following module thicknesses: 32 millimeters (mm), 33 millimeters (mm), 35 millimeters (mm), 38 millimeters (mm), 40 millimeters (mm), and 46 millimeters (mm). The clamp assembly 782 is universal for each of these settings. As such, there are no changes or additional clamp configurations needed for these six (6) module thicknesses. As described hereinafter, a single, universal skirt member 826 is used for all six module thicknesses.

In order to maintain a predetermined spacing distance between the upper and lower clamp members 710, 720 during PV module installation, a spring member 750 is provided between the clamp members 710, 720 (refer to FIG. 171). In an exemplary embodiment, the spring member 750 may be Z-shaped. That is, as best shown in FIG. 171, the spring member 750 is disposed between the top wall portion 723 of the lower clamp member 720 and the angled lower surface 713 of the flange portion 714*a*, 714*b* of the upper clamp member 710. During the installation of the PV modules in the PV array, the spring member 750 holds the upper clamp member 710 in place above the lower clamp member 720 so that a PV module can be inserted between the two (2) clamp members 710, 720. Without the use of the spring member 750, the flange 714*a*, 714*b* of the upper clamp member 710 would tend to just rest on the top of the lower clamp member 720, thereby making it very difficult to insert the PV module between the two (2) clamp members 710, 720. In addition, the use of the spring member 750 in the clamp assembly 782 allows the fastener member 738 to be tightened so that the strut nut 772 engages the base and secures the clamp to the base without the clamp being compressed.

Turning again to FIG. 177, it can be seen that the spring member 750 of the clamp assembly 782 comprises bottom and top leg portions 752, 756, which are connected to one another by a middle diagonal leg portion 754. Each of the leg portions 752, 754, 756 is provided with a respective oval-shaped fastener aperture 758 disposed therethrough for accommodating the shaft of the threaded fastener member 738.

As best shown in FIG. 171, the lower clamp member 720 is positioned above a glider member 760 that is configured to be adjustably disposed on an upstanding base member 90, 90' in both a horizontal and vertical direction (as explained above in the preceding embodiments). Referring to FIGS. 180 and 181, it can be seen that the glider member 760 of the clamp assembly 782 comprises a generally inverted, U-shaped profile with a top wall portion 764 and first and second opposed wall portions 766*a*, 766*b* extending downwardly from the top wall portion 764. The top wall portion 764 comprises a fastener aperture 762 disposed centrally therein for receiving the shaft of the threaded fastener member 738. In FIGS. 180 and 181, it can be seen that the inner surfaces of each of the first and second opposed wall portions 766*a*, 766*b* comprises a plurality of elongate protrusions or teeth 768 that are each spaced apart from one another by respective elongate grooves 770. The set of teeth 768 on each of the inner surfaces of the opposed wall portions 766*a*, 766*b* are designed to engage with respective teeth on opposed upstanding wall portions of the base member 90, 90' (as described above in the preceding embodiments). The glider member 760 may be elastically deformable such that it is capable of snapping into place on the top of the base member, or alternatively, it may simply be designed to slide into place on the base assembly. To permit horizontal adjustability, the glider member 760 is capable of being slid along the length of the base member. And, to permit vertical adjustability, the glider member 760 is capable of being moved up and down along a vertical height of the upstanding wall portions of the base member 90, 90' and selectively engaging certain ones of the teeth with one another.

Also, as shown in FIGS. 180 and 181, the outer sides of the first and second opposed wall portions 766*a*, 766*b* of the glider member 760 are provided with a plurality of generally parallel, visual indicator grooves 761 formed therein (e.g., three (3) visual indicator grooves 761). During the installation of the PV modules, the visual indicator grooves 761 operate as visual indicating bands for positioning the clamp assembly 782 at its desired height (i.e., the visual indicator grooves 761 enable the desired height of the clamp assembly 782 relative to the base member to be more easily obtained by the installer during the PV module installation process). Also, referring again to FIGS. 180 and 181, it can be seen that opposed protrusions 763 may be provided at the top of the glider member 760 for holding a chalk line (e.g., a string) in place that is used for the alignment of the PV module row on the support surface (e.g., roof). In an illustrative embodiment, the chalk line (e.g., a string) may be received within the topmost one of the grooves 761, and the lower two (2) grooves 761 may be used as visual aid indicators showing the height of the glider member 760 on the upstanding base member (i.e., corresponding to the grooves 761).

With reference to FIGS. 172 and 182, it can be seen that, in the illustrative embodiment, the clamp assembly 782 is further provided with an O-ring 780 disposed between the glider member 760 and the strut nut 772. The O-ring 780 stabilizes the clamp assembly on the glider member 760 prior to installation.

Now, with reference to FIGS. 184-190, an illustrative embodiment of a coupling device or assembly 788 of the solar panel mounting system will be described. Referring to these figures, it can be seen that the illustrative coupling device or assembly 788 generally includes an upper coupling member 790 secured to a lower coupling member 800. As best shown in the assembled view of FIG. 184 and the exploded view of FIG. 185, the upper coupling member 790 and the lower coupling member 800 are connected to one another by means of one or more threaded fastener members 820 (e.g., two (2) threaded fastener members 820). In the illustrated embodiment, each threaded fastener member 820 is in the form of a bolt with a head portion having a serrated flange 822 (e.g., refer to FIG. 186). As described above for the bolt 738 of the clamp assembly 782, the serrations in the lower surface of the bolt head flange of each threaded fastener member 822 are configured to interferingly engage with the top surface of the upper coupling member 790 (i.e., "dig into" the top surface of the upper coupling member 790). The external threads on the shaft of each threaded fastener member 820 are configured to threadingly engage with the internal threads of the threaded apertures 805 of the lower coupling member 800 (see FIGS. 185 and 190).

Turning to FIGS. 187 and 188, the structure of the upper coupling member 790 will be described. As shown in these figures, the upper coupling member 790 generally includes a base portion 792 that is attached to the bottom surface of a flange portion 794a, 794b at approximately a 90 degree angle. In this figure, it can be seen that one side surface of base portion 792 comprises a plurality of elongate protrusions or teeth 798 that are each spaced apart from one another by respective gaps 799. As will be described hereinafter, a predetermined one of the plurality of elongate protrusions or teeth 798 matingly engages with a predetermined one of the elongate protrusions or teeth 810 disposed on the first opposed wall portion 804a of the upstanding middle portion 802 of the lower coupling member 800. Referring again to the perspective view of FIG. 188, it can be seen that the flange portion 794a, 794b of the upper coupling member 790 further comprises a plurality of fastener apertures 793, 795 for receiving respective threaded fastener members 820 and a downwardly protruding member 797 that forms a back surface against which a photovoltaic module rests when disposed in the coupling assembly 788. In the illustrative embodiment of FIG. 188, it can be seen that each of fastener apertures 793 has a generally oval shape, while the fastener aperture 795 has a generally circular shape. Also, as shown in FIGS. 187 and 188, each of the flange portions 794a, 794b includes an elongate groove 796 disposed in the bottom surface thereof. Each of the elongate grooves 796 is configured to receive first and second tab portions 747, 748 of a respective bonding clip 742 (see FIG. 176) that provides integrated grounding for the photovoltaic module installation. The first and second tab portions 747, 748 of each bonding clip 742 are received within the elongate groove 796 in a press-fit or interference-fit type mounting arrangement.

Referring again to FIGS. 187 and 188, it can be seen that the flange portion 794b of the upper coupling member 790 further comprises an angled lower surface 791. The angled lower surface 791 of the flange portion 794b is substantially equivalent to the angled lower surface 713 of the flange 714b of the upper clamp member 710 described above so as to allow the same extrusion profile to be used for both the upper coupling member 790 and the upper clamp member 710. Also, as shown in FIGS. 187 and 188, similar to the upper clamp member 710 described above, the downwardly protruding member 997 of the upper coupling member 790 comprises a groove or notch formed in the outer side thereof for capturing an edge of the bonding clip 742, and holding it in place.

Next, turning to FIGS. 189 and 190, the structure of the lower coupling member 800 will be explained. With reference to these figures, it can be seen that the lower coupling member 800 generally includes an upstanding middle portion 802 with first and second ledge portions 806, 808 extending outwardly from the upstanding middle portion 802. In the perspective view of FIG. 190, it can be seen that the upstanding middle portion 802 of the lower coupling member 800 comprises spaced-apart threaded fastener apertures 805 disposed in a top wall portion 803 thereof. Each of these apertures 805 is configured to threadingly receive a respective shaft of a respective threaded fastener member 820. The bottom wall portion and the top wall portion 803 of the upstanding middle portion 802 of the lower coupling member 800 are connected to one another by first and second opposed wall portions 804a, 804b. As shown in FIGS. 189 and 190, the first opposed wall portion 804a comprises a plurality of elongate protrusions or teeth 810 that are each spaced apart from one another by respective gaps 812. As explained above, a predetermined one of the elongate teeth 810 of the first opposed wall portion 804a engages with a predetermined one of the elongate teeth 798 of the base portion 792 of the upper coupling member 790. Referring again to FIGS. 189 and 190, it can be seen that, unlike the first opposed wall portion 804a, the second opposed wall portion 804b contains no teeth thereon. Between the rows of the photovoltaic array, each of the first and second ledge portions 806, 808 of the lower coupling member 800 is configured to accommodate a photovoltaic module frame member resting thereon. As described herein, on the south edge of the photovoltaic array, the first ledge portion 806 of the lower coupling member 800 is configured to accommodate a skirt member 826 and a skirt spacer member, while the second ledge portion 808 of the lower coupling member 800 is configured to accommodate a photovoltaic module frame member resting thereon. As shown in FIGS. 189 and 190, similar to the upwardly tapered clamp ledge 728 described above, the upwardly tapered ledge 808 of the lower coupling member 800 comprises an end portion of reduced thickness so as to accommodate a wire retaining clip fastened thereto.

Referring again to FIGS. 189 and 190, it can be seen that the upwardly tapered ledge 808 of the lower coupling member 800 further comprises a water drainage trough 807 formed therein for draining water from the one or more photovoltaic modules (i.e., the water drainage trough 807 provides water drainage on the uphill side of the coupling assembly 788 so that the coupling does not impede module drain holes, and the water is allowed to drain from module flanges). Also, as shown in FIGS. 189 and 190, the shorter ledge 806 of the lower coupling member 800 comprises an elongate groove 814 formed therein for engaging with a mating protrusion 842, 850, 858 of a skirt spacer member 836, 844, 852 (see FIGS. 195-200). In the illustrative embodiment, the groove 814 is in the form of a dovetail groove to retain the skirt spacer member 836, 844, 852, and the dovetail protrusion 842, 850, 858 of the skirt spacer member 836, 844, 852 slides into the groove 814 from the side of the lower coupling member 800. Referring again to FIGS. 189 and 190, it can be seen that the shorter ledge 806 of the lower coupling member 800 further comprises a plurality of serrations 816 for securely gripping the one or more photovoltaic modules and for providing airflow and water drainage on the downhill side of the coupling assembly 788. In addition, as shown in the perspective view of FIG. 190, the shorter ledge 806 of the lower coupling member 800 further comprises a pair of retaining elements 818 formed thereon for retaining respective skirt spacer members 836, 844, 852 in place on the ledge 806 of the lower coupling member 800 after the mating protrusions 842, 850, 858 of the respective skirt spacer members 836, 844, 852 are engaged with the groove 814 in the ledge 806 (i.e., the retaining elements 818 provide resistance once the skirt spacer members 836, 844, 852 slide into dovetail groove 814 to retain them).

With reference to the exploded view of FIG. 185, it can be seen that, in the illustrative embodiment, the coupling assembly 788 is further provided with an O-ring 824 disposed between the upper coupling member 790 and the lower coupling member 800. The O-ring 824 helps to hold open the coupling assembly 788 prior to installation.

In the illustrative embodiment described herein, the coupling assembly 788 relies on a single tooth design to set the coupling height and allow for photovoltaic module insertion from the uphill side (i.e., north side). Advantageously, the coupling assembly 788 does not require additional tightening after the uphill photovoltaic module is inserted. The alternating tooth interaction 798, 810 between the upper coupling member 790 and the lower coupling member 800 provides settings for the following module thicknesses: 32 millimeters (mm), 33 millimeters (mm), 35 millimeters (mm), 38 millimeters (mm), 40 millimeters (mm), and 46 millimeters (mm). The coupling assembly 788 is universal for each of these settings. As such, there are no changes or additional coupling configurations needed for these six (6) module thicknesses. As described hereinafter, a single, universal skirt member 826 is used for all six module thicknesses.

With reference to FIGS. 191-194, a skirt member 826 of the photovoltaic mounting system will be described. In a roof-mounted installation, the skirt member 826 is configured to be located on the southernmost edge of the array of PV modules. The skirt member 826 is supported by spaced-apart support surface attachment devices. In particular, as shown in the end views of FIGS. 191 and 192, the skirt member 826 engages with the upper clamp member 710 and the lower clamp member 720 of the clamp assembly 782 of the support surface attachment device. As shown in these figures, the skirt member 826 is clampingly engaged between by the upper and lower clamp members 710, 720. Advantageously, the skirt member 826 is universal for all six module thicknesses described above (i.e., the installer can use same skirt for all modules).

With reference to FIGS. 193 and 194, the structure of the skirt member 826 of the illustrative embodiment will be described. As shown in these figures, the skirt member 826 has a skirt body that generally includes an angled wall portion 828 and an upper end portion 830. A notch 834 is formed in the top surface of the upper end portion 830 of the skirt member 826 for receiving the downwardly extending lip portion of the flange portion 714b of the upper clamp member 710 (see FIGS. 191 and 192) to more securely retain the skirt member 826 in place within the clamp assembly 782. Also, as shown in FIGS. 193 and 194, the skirt member 826 comprises a vertical skirt leg 832 extending downwardly from the upper end portion 830 thereof. The vertical skirt leg 832 retains the skirt member 826 between the skirt spacer member 836, 852 and the lower clamp member 720 during the installation of the skirt member 826 until the skirt member 826 is secured in the clamp assembly 782 between the upper and lower clamp members 710, 720 (refer to FIGS. 191 and 192). The vertical skirt leg 832 advantageously acts as an installation aid. The skirt member 826 is held lightly in place during installation until the skirt member 826 is able to be clamped down in the clamp assembly 782 and the coupling assembly 788.

Now, the skirt spacer members of the solar panel mounting system will be described with reference to FIGS. 191, 192, and 195-200. In the illustrative embodiment, there are six (6) skirt spacer sizes (i.e., one for each individual module thickness). As such, in the illustrative embodiment, there are separate spacer members for each of the following photovoltaic module thicknesses: 32 millimeters (mm), 33 millimeters (mm), 35 millimeters (mm), 38 millimeters (mm), 40 millimeters (mm), and 46 millimeters (mm). For example, a skirt spacer member 836 configured for a 46 millimeter module thickness is illustrated in FIGS. 195 and 196. As shown in these figures, the 46 mm skirt spacer member 836 comprises an angled notch 838 configured to receive the distal end of the vertical skirt leg 832 of the skirt member 826 during installation (refer to FIG. 192). Also, as shown in FIGS. 195 and 196, the 46 mm skirt spacer member 836 comprises indicia or identification markings 840 denoting the spacer size (i.e., the six (6) lines engraved in the top surface of the spacer body portion indicate that the skirt spacer member 836 is for a 46 millimeter module thickness). Referring again to FIGS. 195 and 196, it can be seen that the 46 mm skirt spacer member 836 further comprises a mating protrusion 842 configured to be inserted into the groove 735 of the lower clamp member 720 or the groove 814 of the lower coupling member 800. In the illustrative embodiment, the mating protrusion 842 of the skirt spacer member 836 is in the form of a dovetail protrusion that is configured to be received within the dovetail groove 735 of the lower clamp member 720 or the dovetail groove 814 of the lower coupling member 800 in the manner described above.

As another example, a skirt spacer member 844 configured for a 38 millimeter module thickness is illustrated in FIGS. 197 and 198. As shown in these figures, the 38 mm skirt spacer member 844 comprises an angled notch 846 configured to receive the distal end of the vertical skirt leg 832 of the skirt member 826 during installation (similar to that shown in FIGS. 191 and 192). Also, as shown in FIGS. 197 and 198, the 38 mm skirt spacer member 844 comprises indicia or identification markings 848 denoting the spacer size (i.e., the four (4) lines engraved in the top surface of the spacer body portion indicate that the skirt spacer member 844 is for a 38 millimeter module thickness). Referring again to FIGS. 197 and 198, it can be seen that the 38 mm skirt spacer member 844 further comprises a mating protrusion 850 configured to be inserted into the groove 735 of the lower clamp member 720 or the groove 814 of the lower coupling member 800. In the illustrative embodiment, the mating protrusion 850 of the skirt spacer member 844 is in the form of a dovetail protrusion that is configured to be received within the dovetail groove 735 of the lower clamp member 720 or the dovetail groove 814 of the lower coupling member 800 in the manner described above.

As yet another example, a skirt spacer member 852 configured for a 32 millimeter module thickness is illustrated in FIGS. 199 and 200. As shown in these figures, the 32 mm skirt spacer member 852 comprises an angled notch 854 configured to receive the distal end of the vertical skirt leg 832 of the skirt member 826 during installation (refer to FIG. 191). Also, as shown in FIGS. 199 and 200, the 32 mm skirt spacer member 852 comprises indicia or identification markings 856 denoting the spacer size (i.e., the one (1) line engraved in the top surface of the spacer body portion indicates that the skirt spacer member 852 is for a 32 millimeter module thickness). Referring again to FIGS. 199 and 200, it can be seen that the 32 mm skirt spacer member 852 further comprises a mating protrusion 858 configured to be inserted into the groove 735 of the lower clamp member 720 or the groove 814 of the lower coupling member 800. In the illustrative embodiment, the mating protrusion 858 of the skirt spacer member 852 is in the form of a dovetail protrusion that is configured to be received within the dovetail groove 735 of the lower clamp member 720 or the dovetail groove 814 of the lower coupling member 800 in the manner described above.

While the skirt spacer members for 33 mm, 35 mm, and 40 mm photovoltaic module thicknesses are not explicitly shown in the drawings, it is to be understood that, in the illustrative embodiment, these skirt spacer members contain the same features as the 32 mm, 38 mm, and 46 mm spacer members described above, but have different heights to accommodate their associated module thicknesses. That is, like the 32 mm, 38 mm, and 46 mm spacer members, the 33 mm, 35 mm, and 40 mm spacer members also each include an angled notch for receiving the distal end of the vertical skirt leg 832 of the skirt member 826, indicia or identification markings denoting the spacer size, and a mating protrusion configured to be inserted into the groove 735 of the lower clamp member 720 or the groove 814 of the lower coupling member 800. Also, like the 32 mm, 38 mm, and 46 mm spacer members described above, the 33 mm, 35 mm, and 40 mm spacer members are each configured to be disposed between an upper end portion 830 of the skirt member 826 and the ledge 726 of the lower clamp member 720 or the ledge 806 of the lower coupling member 800 so as to elevate the skirt member 826 above a top surface of the ledge 726 of the lower clamp member 720 or the ledge 806 of the lower coupling member 800.

In the illustrative embodiment, the skirt spacer members are used only on the south row of the photovoltaic array, and are used to set the clamp and coupling opening widths to the proper module thickness. For the photovoltaic array to be properly installed, the skirt spacer member corresponding to the correct module thickness needs to be used by the installer. In the illustrative embodiment, only one spacer is used per clamp assembly 782, while two spacers are used per coupling assembly 788.

Any of the features or attributes of the above described embodiments and variations can be used in combination with any of the other features and attributes of the above described embodiments and variations as desired.

Although the invention has been shown and described with respect to a certain embodiment or embodiments, it is apparent that this invention can be embodied in many different forms and that many other modifications and variations are possible without departing from the spirit and scope of this invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A support surface attachment device configured to attach a photovoltaic module to a support surface, the support surface attachment device comprising:
   a base assembly to secure the photovoltaic module to the support surface;
   a clamp assembly that is attachable to the base assembly, the clamp assembly including:
      a lower clamp member including a ledge, and
      an upper clamp member that is engageable with the lower clamp member;
   a skirt configured to be clamped by the clamp assembly; and
   a plurality of skirt spacers including a first skirt spacer and a second skirt spacer, each of the first skirt spacer and the second skirt spacer including:
      a first side configured to sit on the ledge of the lower clamp member when clamped with the clamp assembly,
      a second side opposite the first side, the second side having a first portion and a second portion to engage the skirt against the clamp assembly, the second portion being offset from the first portion,
      a protrusion that extends from the first side, and
      an identification marking located on the second side, the identification marking denoting a thickness dimension,
   wherein a thickness dimension of the first skirt spacer is different than a thickness dimension of the second skirt spacer, such that:
      the skirt is oriented at a first height position when the first side of the first skirt spacer is positioned on the ledge of the lower clamp member, and
      the skirt is oriented at a second height position when the first side of the second skirt spacer is positioned on the ledge of the lower clamp member.

2. The support surface attachment device according to claim 1, wherein the second portion of the second side of the plurality of skirt spacers is shaped such that, upon installation of the skirt in the clamp assembly, a portion of the skirt is trapped horizontally against the upper clamp member of the clamp assembly.

3. The support surface attachment device according to claim 1, wherein the plurality of skirt spacers includes an opening through a length thereof.

4. The support surface attachment device according to claim 1, wherein the protrusion extends along a length of the first side.

5. The support surface attachment device according to claim 1, wherein the second side includes an angled notch at the second portion.

6. The support surface attachment device according to claim 1, wherein the identification marking denotes one of: 32 mm, 33 mm, 35 mm, 38 mm, 40 mm, or 46 mm, which refer to a size dimension of the photovoltaic module.

7. The support surface attachment device according to claim 1, wherein the thickness dimension of the identification marking corresponds to a thickness of the photovoltaic module for installation with the skirt spacer.

* * * * *